(12) United States Patent
Marumoto et al.

(10) Patent No.: US 8,421,517 B2
(45) Date of Patent: Apr. 16, 2013

(54) SEMICONDUCTOR DEVICE INCLUDING POWER CONVERSION AND A DRIVE RECORDER

(75) Inventors: Kyoji Marumoto, Kyoto (JP); Yuji Kurotsuchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 431 days.

(21) Appl. No.: 12/761,497

(22) Filed: Apr. 16, 2010

(65) Prior Publication Data
US 2010/0271509 A1 Oct. 28, 2010

(30) Foreign Application Priority Data

Apr. 16, 2009 (JP) ................................. 2009-099940

(51) Int. Cl.
*H03L 5/00* (2006.01)
(52) U.S. Cl.
USPC .............. 327/333; 326/80; 327/407; 327/415

(58) Field of Classification Search ................... 326/80, 326/81, 86; 327/333, 407, 408, 415, 416
See application file for complete search history.

(56) References Cited

U.S. PATENT DOCUMENTS

| 7,397,273 | B1 * | 7/2008 | Ng et al. ........................ 326/38 |
| 7,411,421 | B1 * | 8/2008 | Steinke et al. .................. 326/83 |
| 7,973,563 | B2 * | 7/2011 | Tran et al. ...................... 326/86 |
| 8,169,250 | B2 * | 5/2012 | Miyoshi et al. ............... 327/333 |
| 8,179,161 | B1 * | 5/2012 | Williams et al. ................ 326/86 |

FOREIGN PATENT DOCUMENTS

JP 2004-326153 11/2004

* cited by examiner

*Primary Examiner* — Jeffrey Zweizig
(74) *Attorney, Agent, or Firm* — Fish & Richardson P.C.

(57) ABSTRACT

A semiconductor device of the present invention is provided with a terminal for connecting a plurality of buses to the outside of the semiconductor device, a bus interface circuit for treating the plurality of buses as the same bus within the semiconductor device and a controller connected to the bus interface circuit.

9 Claims, 98 Drawing Sheets

FIG.1

| ITEM | TERMINAL NAME | CORRESPONDING GROUND | TYP VOLTAGE |
|---|---|---|---|
| DIGITAL CORE | DVDD | DVSS | 1.5V |
| DAC | DAVDD | DAVSS | 3.3V |
| ADC | ADVDD | ADVSS | 3.3V |
| I2C-1 | I1VDD | DVSS | 3.3V |
| I2C-2 | I2VDD | DVSS | 3.3V |
| SD-CARD | SDVDD | DVSS | 3.3V |
| CAMERA | CAVDD | DVSS | 2.85V |
| OTHER IO | IOVDD | DVSS | 3.3V |

FIG.2

| PIN NO. | PIN NAME | POWER SUPPLY SYSTEM | INPUT AND OUTPUT | INITIAL VALUE | FUNCTION | PROCESSING WHEN NOT USED | CIRCUIT CONFIGURATION |
|---|---|---|---|---|---|---|---|
| 1 | EXT_ADR20 | IO | Out | Low | EXTERNAL BUS ADDRESS bit20 | OPEN | A |
| 2 | EXT_ADR19 | IO | Out | Low | EXTERNAL BUS ADDRESS bit19 | OPEN | A |
| 3 | EXT_ADR18 | IO | Out | Low | EXTERNAL BUS ADDRESS bit18 | OPEN | A |
| 4 | EXT_ADR17 | IO | Out | Low | EXTERNAL BUS ADDRESS bit17 | OPEN | A |
| 5 | EXT_ADR16 | IO | Out | Low | EXTERNAL BUS ADDRESS bit16 | OPEN | A |
| 6 | EXT_ADR15 | IO | Out | Low | EXTERNAL BUS ADDRESS bit15 | OPEN | A |
| 7 | EXT_ADR14 | IO | Out | Low | EXTERNAL BUS ADDRESS bit14 | OPEN | A |
| 8 | EXT_ADR13 | IO | Out | Low | EXTERNAL BUS ADDRESS bit13 | OPEN | A |
| 9 | EXT_ADR12 | IO | Out | Low | EXTERNAL BUS ADDRESS bit12 | OPEN | A |
| 10 | EXT_ADR11 | IO | Out | Low | EXTERNAL BUS ADDRESS bit11 | OPEN | A |
| 11 | EXT_ADR10 | IO | Out | Low | EXTERNAL BUS ADDRESS bit10 | OPEN | A |
| 12 | EXT_ADR9 | IO | Out | Low | EXTERNAL BUS ADDRESS bit9 | OPEN | A |
| 13 | EXT_ADR8 | IO | Out | Low | EXTERNAL BUS ADDRESS bit8 | OPEN | A |
| 14 | EXT_ADR7 | IO | Out | Low | EXTERNAL BUS ADDRESS bit7 | OPEN | A |
| 15 | EXT_ADR6 | IO | Out | Low | EXTERNAL BUS ADDRESS bit6 | OPEN | A |
| 16 | EXT_ADR5 | IO | Out | Low | EXTERNAL BUS ADDRESS bit5 | OPEN | A |
| 17 | IOVDD | IO | Power | — | — | — | — |
| 18 | DVSS | — | Power | — | — | — | — |
| 19 | EXT_ADR4 | IO | Out | Low | EXTERNAL BUS ADDRESS bit4 | OPEN | A |
| 20 | EXT_ADR3 | IO | Out | Low | EXTERNAL BUS ADDRESS bit3 | OPEN | A |
| 21 | EXT_ADR2 | IO | Out | Low | EXTERNAL BUS ADDRESS bit2 | OPEN | A |
| 22 | EXT_ADR1 | IO | Out | Low | EXTERNAL BUS ADDRESS bit1 | OPEN | A |
| 23 | EXT_DATA15 | IO | Bidir | — | EXTERNAL BUS DATA bit15 | OPEN | B |
| 24 | EXT_DATA14 | IO | Bidir | — | EXTERNAL BUS DATA bit14 | OPEN | B |
| 25 | EXT_DATA13 | IO | Bidir | — | EXTERNAL BUS DATA bit13 | OPEN | B |
| 26 | EXT_DATA12 | IO | Bidir | — | EXTERNAL BUS DATA bit12 | OPEN | B |
| 27 | IOVDD | IO | Power | — | — | — | — |
| 28 | DVSS | — | Power | — | — | — | — |
| 29 | EXT_DATA11 | IO | Bidir | — | EXTERNAL BUS DATA bit11 | OPEN | B |
| 30 | EXT_DATA10 | IO | Bidir | — | EXTERNAL BUS DATA bit10 | OPEN | B |
| 31 | EXT_DATA9 | IO | Bidir | — | EXTERNAL BUS DATA bit9 | OPEN | B |
| 32 | EXT_DATA8 | IO | Bidir | — | EXTERNAL BUS DATA bit8 | OPEN | B |
| 33 | EXT_DATA7 | IO | Bidir | — | EXTERNAL BUS DATA bit7 | OPEN | B |
| 34 | EXT_DATA6 | IO | Bidir | — | EXTERNAL BUS DATA bit6 | OPEN | B |
| 35 | EXT_DATA5 | IO | Bidir | — | EXTERNAL BUS DATA bit5 | OPEN | B |
| 36 | EXT_DATA4 | IO | Bidir | — | EXTERNAL BUS DATA bit4 | OPEN | B |
| 37 | EXT_DATA3 | IO | Bidir | — | EXTERNAL BUS DATA bit3 | OPEN | B |
| 38 | EXT_DATA2 | IO | Bidir | — | EXTERNAL BUS DATA bit2 | OPEN | B |
| 39 | EXT_DATA1 | IO | Bidir | — | EXTERNAL BUS DATA bit1 | OPEN | B |
| 40 | EXT_DATA0 | IO | Bidir | — | EXTERNAL BUS DATA bit0 | OPEN | B |
| 41 | EXT_CSB2 | IO | Out | High | EXTERNAL BUS CHIP SELECT #2 (NEGATIVE LOGIC) | OPEN | A |
| 42 | EXT_CSB1 | IO | Out | High | EXTERNAL BUS CHIP SELECT #1 (NEGATIVE LOGIC) | OPEN | A |
| 43 | EXT_CSB0 | IO | Out | High | EXTERNAL BUS CHIP SELECT #0 (NEGATIVE LOGIC) | OPEN | A |
| 44 | EXT_WEB | IO | Out | High | EXTERNAL BUS WRITE ENABLE (NEGATIVE LOGIC) | OPEN | A |
| 45 | EXT_OEB | IO | Out | High | EXTERNAL BUS READ ENABLE (NEGATIVE LOGIC) | OPEN | A |
| 46 | EXT_WPB | IO | Out | Low | EXTERNAL BUS WRITE PROTECT (NEGATIVE LOGIC) | OPEN | A |
| 47 | SSI_CLK | IO | Out | Low | SERIAL CLOCK | OPEN | A |
| 48 | SSI_CSB1 | IO | Out | High | SERIAL CHIP SELECT #1 (NEGATIVE LOGIC) | OPEN | A |

FIG.3

| PIN NO. | PIN NAME | POWER SUPPLY SYSTEM | INPUT AND OUTPUT | INITIAL VALUE | FUNCTION | PROCESSING WHEN NOT USED | CIRCUIT CONFIGURATION |
|---|---|---|---|---|---|---|---|
| 49 | SSI_CSB0 | IO | Out | High | SERIAL CHIP SELECT #0 (NEGATIVE LOGIC) | OPEN | A |
| 50 | SSI_WPB | IO | Out | Low | SERIAL WRITE PROTECT (NEGATIVE LOGIC) | OPEN | A |
| 51 | SSI_DOUT | IO | Out | Low | SERIAL DATA OUTPUT | OPEN | C |
| 52 | SSI_DIN | IO | In | — | SERIAL DATA INPUT | DVSS | D |
| 53 | DVDD | Logic | Power | — | — | — | — |
| 54 | TIM_TRIG | IO | In | — | COUNTER TRIGGER INPUT | DVSS | E |
| 55 | GPIO15 | IO | Bidir | Pull-down | LOGIC INPUT AND OUTPUT | OPEN | B |
| 56 | GPIO14 | IO | Bidir | Pull-down | LOGIC INPUT AND OUTPUT | OPEN | B |
| 57 | GPIO13 | IO | Bidir | Pull-down | LOGIC INPUT AND OUTPUT | OPEN | B |
| 58 | GPIO12 | IO | Bidir | Pull-down | LOGIC INPUT AND OUTPUT | OPEN | B |
| 59 | GPIO11 | IO | Bidir | Pull-down | LOGIC INPUT AND OUTPUT | OPEN | B |
| 60 | GPIO10 | IO | Bidir | Pull-down | LOGIC INPUT AND OUTPUT | OPEN | B |
| 61 | GPIO9 | IO | Bidir | Pull-down | LOGIC INPUT AND OUTPUT | OPEN | B |
| 62 | GPIO8 | IO | Bidir | Pull-down | LOGIC INPUT AND OUTPUT | OPEN | B |
| 63 | GPIO7 | IO | Bidir | Pull-down | LOGIC INPUT AND OUTPUT/PWM OUTPUT | OPEN | B |
| 64 | GPIO6 | IO | Bidir | Pull-down | LOGIC INPUT AND OUTPUT/PWM OUTPUT | OPEN | B |
| 65 | GPIO5 | IO | Bidir | Pull-down | LOGIC INPUT AND OUTPUT/PWM OUTPUT | OPEN | B |
| 66 | GPIO4 | IO | Bidir | Pull-down | LOGIC INPUT AND OUTPUT/PWM OUTPUT | OPEN | B |
| 67 | IOVDD | IO | Power | — | — | — | — |
| 68 | DVSS | — | Power | — | — | — | — |
| 69 | GPIO3 | IO | Bidir | Pull-down | LOGIC INPUT AND OUTPUT/INTERRUPT INPUT | OPEN | B |
| 70 | GPIO2 | IO | Bidir | Pull-down | LOGIC INPUT AND OUTPUT/INTERRUPT INPUT | OPEN | B |
| 71 | GPIO1 | IO | Bidir | Pull-down | LOGIC INPUT AND OUTPUT/INTERRUPT INPUT | OPEN | B |
| 72 | GPIO0 | IO | Bidir | Pull-down | LOGIC INPUT AND OUTPUT/INTERRUPT INPUT | OPEN | B |
| 73 | TX1 | IO | Out | Low | UART1 TRANSMISSION DATA | OPEN | A |
| 74 | RX1 | IO | In | — | UART1 RECEPTION DATA | DVSS | D |
| 75 | RTS1 | IO | Out | Low | UART1 TRANSMISSION REQUEST | OPEN | A |
| 76 | CTS1 | IO | In | — | UART1 TRANSMISSION CLEAR | DVSS | D |
| 77 | TX2 | IO | Out | Low | UART2 TRANSMISSION DATA | OPEN | A |
| 78 | RX2 | IO | In | — | UART2 RECEPTION DATA | DVSS | D |
| 79 | TDI | IO | In | — | JTAG DATA INPUT | PU-IOVDD *1 | D |
| 80 | TDO | IO | Out | Low | JTAG DATA OUTPUT | OPEN | A |
| 81 | TCK | IO | In | — | JTAG CLOCK | PU-IOVDD *1 | D |
| 82 | TMS | IO | In | — | JTAG MODE SELECT | PU-IOVDD *1 | D |
| 83 | NTRST | IO | In | — | JTAG RESET (NEGATIVE LOGIC) | PD-DVSS *1 | E |
| 84 | AUDCKI | IO | In | — | I2S DOT CLOCK INPUT | PD-DVSS *1 | D |
| 85 | AUDLRI | IO | In | — | I2SLR INPUT | PD-DVSS *1 | D |
| 86 | AUDDTI | IO | In | — | I2S DATA INPUT | DVSS | D |
| 87 | AUDCKO | IO | Out | Low | I2S DOT CLOCK OUTPUT | OPEN | A |
| 88 | AUDLRO | IO | Out | Low | I2S LR OUTPUT | OPEN | A |
| 89 | AUDDTO | IO | Out | Low | I2S DATA OUTPUT | OPEN | A |
| 90 | AUDMCKO | IO | Out | Low | I2S MASTER CLOCK OUTPUT | OPEN | A |
| 91 | IOVDD | IO | Power | — | — | — | — |
| 92 | DVSS | — | Power | — | — | — | — |
| 93 | DVDD | Logic | Power | — | — | — | — |
| 94 | RESETB | IO | In | — | RESET OUTPUT INPUT (NEGATIVE LOGIC) | need to use | E |
| 95 | TEST | IO | In | — | TEST MODE (FIXED TO DVSS) | DVSS | F |
| 96 | BIT_SEL | IO | In | — | START-UP MEMORY MAP MODE SETTING | need to use | E |

FIG.4

| PIN NO. | PIN NAME | POWER SUPPLY SYSTEM | INPUT AND OUTPUT | INITIAL VALUE | FUNCTION | PROCESSING WHEN NOT USED | CIRCUIT CONFIGURATION |
|---|---|---|---|---|---|---|---|
| 97 | TCM_SEL | IO | In | — | START-UP MEMORY MAP MODE SETTING | need to use | E |
| 98 | AUTO_READ | IO | In | — | EEPROM AUTOMATIC BOOT MODE SETTING | need to use | E |
| 99 | ADVDD | AD | Power | — | — | — | — |
| 100 | ADVSS | AD | Power | — | — | — | — |
| 101 | ADIN3 | AD | Analog | — | ANALOG INPUT #3 | ADVSS | G |
| 102 | ADIN2 | AD | Analog | — | ANALOG INPUT #2 | ADVSS | G |
| 103 | ADIN1 | AD | Analog | — | ANALOG INPUT #1 | ADVSS | G |
| 104 | ADIN0 | AD | Analog | — | ANALOG INPUT #0 | ADVSS | G |
| 105 | VOUT | DA | Analog | 29/32*VFS_DA | CVBS OUTPUT (PULL-DOWNED BY 75Ω) | OPEN | H |
| 106 | DAVSS | DA | Power | — | — | — | — |
| 107 | IREF | DA | Analog | — | REFERENCE CURRENT SETTING (PULL-DOWNED BY 2.4KΩ) | OPEN | I |
| 108 | DAVDD | DA | Power | — | — | — | — |
| 109 | I1VDD | I1 | Power | — | — | — | — |
| 110 | DVSS | — | Power | — | — | — | — |
| 111 | SDC1 | I1 | Bidir | — | I2C#1 CLOCK | PU-I1VDD *1 | C |
| 112 | SDA1 | I1 | Bidir | — | I2C#1 DATA | PU-I1VDD *1 | C |
| 113 | SDC2 | I2 | Bidir | — | I2C#2 CLOCK | PU-I2VDD *1 | C |
| 114 | SDA2 | I2 | Bidir | — | I2C#2 DATA | PU-I2VDD *1 | C |
| 115 | I2VDD | I2 | Power | — | — | — | — |
| 116 | CAMCKO | CA | Out | Low | CAMERA CLOCK OUTPUT | OPEN | A |
| 117 | CAVDD | CA | Power | — | — | — | — |
| 118 | CAMHS | CA | In | — | CAMERA HORIZONTAL SYNCHRONIZATION SIGNAL INPUT | DVSS | F |
| 119 | CAMVS | CA | In | — | CAMERA VERTICAL SYNCHRONIZATION SIGNAL INPUT | DVSS | F |
| 120 | CAMD7 | CA | In | — | CAMERA INPUT DATA bit7 | DVSS | F |
| 121 | CAMD6 | CA | In | — | CAMERA INPUT DATA bit6 | DVSS | F |
| 122 | CAMD5 | CA | In | — | CAMERA INPUT DATA bit5 | DVSS | F |
| 123 | CAMD4 | CA | In | — | CAMERA INPUT DATA bit4 | DVSS | F |
| 124 | DVDD | Logic | Power | — | — | — | — |
| 125 | CAMD3 | CA | In | — | CAMERA INPUT DATA bit3 | DVSS | F |
| 126 | CAMD2 | CA | In | — | CAMERA INPUT DATA bit2 | DVSS | F |
| 127 | CAMD1 | CA | In | — | CAMERA INPUT DATA bit1 | DVSS | F |
| 128 | CAMD0 | CA | In | — | CAMERA INPUT DATA bit0 | DVSS | F |
| 129 | CAMCKI | CA | In | — | CAMERA CLOCK INPUT | DVSS | F |
| 130 | SD_CLK | SD | Bidir | Low | SD CLOCK | OPEN | C |
| 131 | SD_CMD | SD | Bidir | HIGH-Z | SD COMMAND | PU-SDVDD*1 | C |
| 132 | SD_DAT3 | SD | Bidir | Low | SD DATA bit3 | OPEN | C |
| 133 | SD_DAT2 | SD | Bidir | Low | SD DATA bit2 | OPEN | C |
| 134 | SD_DAT1 | SD | Bidir | Low | SD DATA bit1 | OPEN | C |
| 135 | SD_DAT0 | SD | Bidir | HIGH-Z | SD DATA bit0 | PU-SDVDD*1 | C |
| 136 | SDVDD | SD | Power | — | — | — | — |
| 137 | DVSS | — | Power | — | — | — | — |
| 138 | AXIN | IO | In | — | CLOCK INPUT OR OSCILLATOR CONNECTION | DVSS | J |
| 139 | AXOUT | IO | Out | AXIN INVERSION | OSCILLATOR CONNECTION | OPEN | J |
| 140 | IOVDD | IO | Power | — | — | — | — |
| 141 | XIN | IO | In | — | CLOCK INPUT OR OSCILLATOR CONNECTION | need to use | J |
| 142 | XOUT | IO | Out | XIN INVERSION | OSCILLATOR CONNECTION | OPEN | J |
| 143 | DVSS | — | Power | — | — | — | — |
| 144 | EXT_ADR21 | IO | Out | Low | EXTERNAL BUS ADDRESS bit21 | OPEN | A |

(TOP View) (UNIT:mm)

FIG.9

| ITEM | SYMBOL | STANDARD VALUE | UNIT | CONDITIONS |
|---|---|---|---|---|
| COMMON PORTION | | | | |
| INPUT FREQUENCY 1 | fXIN | 13.5 | MHz | XIN (Duty 50±10%), WHEN PLL ON |
| INPUT FREQUENCY 2 | fAXIN | 16.768 | MHz | AXIN(Duty 50±10%) |
| INTERNAL CLOCK FREQUENCY 1 | fSYS | 41.0 | MHz | WHEN PLL ON, EXCEPT I2S AUDIO PORTION |
| INTERNAL CLOCK FREQUENCY 2 | fAUD | 32.768 | MHz | I2S AUDIO PORTION |
| OPERATION CONSUMPTION CURRENT 1 | IDD1 | TBD | mA | CAMERA ON, CONSTANT RECORDING, AT TIME OF SD WRITING |
| OPERATION CONSUMPTION CURRENT 2 | IDD2 | TBD | mA | SD DATA READING, CONSTANT REPRODUCTION, AT TIME OF TV OUTPUT |
| NON-OPERATION CONSUMPTION CURRENT | IDDST | 200 | $\mu A$ | AT TIME OF CLOCK STOP |
| LOGIC PORTION | | | | |
| INPUT LEAK "H" CURRENT | IIHL | $-10 \sim 10$ | $\mu A$ | VIH = EACH POWER SUPPLY VOLTAGE |
| INPUT LEAK "L" CURRENT | IIHL | $-10 \sim 10$ | $\mu A$ | VIL=0V |
| INPUT PULL DOWN "H" CURRENT 1 | IIHPD1 | 50 | $\mu A$ | PULL DOWN TERMINAL, VIH=IDDOV |
| INPUT PULL DOWN "H" CURRENT 2 | IIHPD2 | TBD | $\mu A$ | PULL DOWN TERMINAL, VIH=CAVDD |
| INPUT PULL DOWN "L" CURRENT | IILPD | $-10 \sim 10$ | $\mu A$ | PULL DOWN TERMINAL, VIL=0V |
| INPUT "H" VOLTAGE 1 | VIH1 | IOPWR×0.8~IOPWR+0.3 | V | NORMAL TYPE INPUT |
| INPUT "L" VOLTAGE 1 | VIL1 | $-0.3 \sim$ IOPWR×0.2 | V | NORMAL TYPE INPUT |
| INPUT "H" VOLTAGE 2 | VIH2 | IOPWR×0.85~IOPWR+0.3 | V | HYSTERESIS INPUT TERMINAL (TIM_TRIG, CNTRST, RESETB, TCM_SEL, AUTO_READ,) |
| INPUT "L" VOLTAGE 2 | VIL2 | $-0.3 \sim$ IOPWR×0.15 | V | |
| HYSTERESIS VOLTAGE WIDTH | Vhys | 0.9 | V | |
| OUTPUT "H" VOLTAGE 1 | VOH1 | IOPWR-0.4~IOPWR | V | IOH1=-2.0mA(DC), NORMAL TYPE OUTPUT EXCEPT SD_CLK, AT TIME OF CAVDD = 3.3 V |
| OUTPUT "L" VOLTAGE 1 | VOL1 | $0.0 \sim 0.4$ | V | IOH1=-2.0mA(DC), NORMAL TYPE OUTPUT EXCEPT SD_CLK, AT TIME OF CAVDD = 3.3 V |
| OUTPUT "H" VOLTAGE 2 | VOH2 | IOPWR-0.4~IOPWR | V | IOH1=-4.0mA(DC), SD_CLK |
| OUTPUT "L" VOLTAGE 2 | VOL2 | $0.0 \sim 0.4$ | V | IOL1=4.0mA(DC), SD_CLK |
| DAC PORTION | | | | |
| DAC BIT NUMBER | RES_DA | 10 | bits | |
| DAC OPERATION CURRENT | IDDDA | 38 | mA | $R_L=37.5 \Omega$, $R_{IREF}=2.4k\Omega$ |
| DAC NON-OPERATION CURRENT | IDDSTDA | 5 | uA | INPUT TERMINAL = 0V |
| INTEGRATION LINEARITY ERROR | INL_DA | ±4.0 | LSB | $R_L=37.5 \Omega$, $R_{IREF}=2.4k\Omega$ |
| DIFFERENTIATION LINEARITY ERROR | DNL_DA | ±1.0 | LSB | $R_L=37.5 \Omega$, $R_{IREF}=2.4k\Omega$ |
| FULL SCALE VOLTAGE | VFS_DA | 1.25 | V | $R_L=37.5 \Omega$, $R_{IREF}=2.4k\Omega$ |
| ADC PORTION | | | | |
| ADC BIT NUMBER | RES_AD | 8 | bits | |
| CONVERSION INPUT VOLTAGE RANGE (UPPER LIMIT) | VIN_AD_T | ADVDDx0.9 | V | |
| CONVERSION INPUT VOLTAGE RANGE (LOWER LIMIT) | VIN_AD_B | ADVDDx0.1 | V | |
| INTEGRATION LINEARITY ERROR | INL_AD | $-2.0 \sim +2.0$ | LSB | |
| DIFFERENTIATION LINEARITY ERROR | DNL_AD | $-2.0 \sim +2.0$ | LSB | |
| CONVERSION REFERENCE CLOCK PERIOD | fADC | $4.0 \sim 16.0$ | MHz | |
| CONVERSION PERIOD | fsps | 30.8K~123K | sps | SAMPLE PER SECOND SINCE CONVERSION PERFORMED PER SWEEP, 130*ADC_CLK NEEDED |

FIG.14

| REGISTER NAME | OFFSET | R/W | BIT WIDTH | DESCRIPTION |
|---|---|---|---|---|
| SCSLR0_LOW | 0x14 | R/W | 32 | ADDRESS OF CHIP SELECT REGISTER 0, 1 IS SPECIFIED. |
| SCSLR1_LOW | 0x18 | | | HIGH 16 BITS AMONG 32 BITS ARE ONLY VALID. |
| SMSKR0 | 0x54 | R/W | 32 | BUS CONTROL REGISTER NUMBER CORRESPONDING TO CHIP SELECT |
| SMSKR1 | 0x58 | | | IS SPECIFIED. |
| CSALIAS0_LOW | 0x74 | R/W | 32 | ALIAS (MIRROR) ADDRESS OF CHIP SELECT IS SPECIFIED. |
| CSALIAS1_LOW | 0x78 | | | HIGH 16 BITS AMONG 32 BITS ARE ONLY VALID. |
| SMTMGR_SET0 | 0x94 | R/W | 32 | TIMING REGISTER SET 0 |
| SMTMGR_SET1 | 0x98 | | | TIMING REGISTER SET 1 |
| SMTMGR_SET2 | 0x9C | | | TIMING REGISTER SET 2 |
| FLASH_TRPDR | 0xA0 | R/W | 32 | WAIT TIME UNTIL FLASH ACCESS IMMEDIATELY AFTER RESET/POWER ON IS SPECIFIED BY CLOCK NUMBER. |
| SMCTLR | 0xA4 | R/W | 32 | BUS ACCESS CONTROL REGISTER |

FIG.15

SCSLRn_LOW#m (OFFSET: CSB0, CSB2 ARE 0x14, CSB1, CSB3 ARE 0x18)

| BIT | BIT NAME | R/W | INITIAL VALUE | DESCRIPTION |
|---|---|---|---|---|
| 31:16 | Chip Select Register | R/W | CSB0 : 0x0000<br>CSB1 : 0x1000<br>CSB2 : 0x2000<br>CSB3 : 0x3000 | EACH CHIP SELECT SPECIFIES FRONT ADDRESS TO BECOME ACTIVE. SETTING IS PERFORMED BY MEMORY SIZE STEP SET BY mem_size BIT OF SMSKRn_LOW#m.<br>MINIMUM AT 8 BIT BUS WIDTH BECOMES 64KB AND MINIMUM AT 16 BIT BUS WIDTH BECOMES 128KB.<br>BUS WIDTH IS SET BY SETTING OF SMCTLR REGISTER.<br>LOW 16 BITS ARE NOT USED, AND THIS RESULTS IN 0x0000. |

FIG.16

SMSKRn_LOW#m (OFFSET: CSB0, CSB2 ARE 0x54, CSB1, CSB3 ARE 0x58)

| BIT | BIT NAME | R/W | INITIAL VALUE | DESCRIPTION |
|---|---|---|---|---|
| 10:8 | reg_select | R/W | CSB0 : set 0<br>CSB1 : set 1<br>CSB2 : set 1<br>CSB3 : set 1 | REGISTER SET THAT SETS TIMING OF EACH CSB IS SPECIFIED.<br>0 - register set 0<br>1 - register set 1<br>2 - register set 2 |
| 7:5 | mem_type | R/W | FLASH | MEMORY TYPE CONNECTED TO EACH CSB IS SPECIFIED.<br>1 - SRAM   2 - FLASH |
| 4:0 | mem_size | R/W | CSB0 : 4MB<br>CSB1 : 16MB<br>CSB2 : 16MB<br>CSB3 : 16MB | MEMORY SIZE CONNECTED TO EACH CSB IS SPECIFIED.<br>0 - MEMORY IS NOT CONNECTED<br>n - 64KB*(THE (n-1)TH POWER OF 2) SIZE |

FIG.17

CSALIASn_LOW#m (OFFSET: CSB0, CSB2 ARE 0x74, CSB1, CSB3 ARE 0x78)

| BIT | BIT NAME | R/W | INITIAL VALUE | DESCRIPTION |
|---|---|---|---|---|
| 31:16 | Chip select alias Register | R/W | CSB0 : 0x4000<br>CSB1 : 0x5000<br>CSB1 : 0x6000<br>CSB1 : 0x7000 | EACH CHIP SELECT SPECIFIES FRONT ADDRESS TO BECOME ACTIVE.<br>IT IS ALIAS (MIRROR) SETTING OF CHIP SELECT REGISTER.<br>LOW 16 BITS ARE NOT USED, AND THIS RESULTS IN 0x0000. |

FIG.18

SMCTLR (OFFSET: CSB0, CSB1 ARE 0xA4 AT BASE 0x90000000,
 CSB2, CSB3 ARE 0xA4 AT BASE 0xA0000000)

| BIT | BIT NAME | R/W | INITIAL VALUE | DESCRIPTION |
|---|---|---|---|---|
| 31:16 | | | | Reserved |
| 15:13 | sm_data_width_set2 | R/W | 000b | SETTING OF DATA BUS WIDTH OF TIMING SET 2<br>000b - 16bit  001b - 32bit  010b - 64bit<br>011b - 128bit  100b - 8bit |
| 12:10 | sm_data_width_set1 | R/W | 000b | SETTING OF DATA BUS WIDTH OF TIMING SET 1 |
| 9:7 | sm_data_width_set0 | R/W | 000b | SETTING OF DATA BUS WIDTH OF TIMING SET 0 |
| 6:4 | | | | Unused |
| 3:1 | wp_n | R/W | 000b | WRITE PROTECT SETTING TO FLASH MEMORY (PROTECTED AT "0")<br>wp_n[3] : set2  wp_n[2] : set1  wp_n[1] : set0<br>WRITE PROCESSING IS PROTECTED WITHIN MEMORY CONTROLLER. |
| 0 | sm_rp_n | R/W | 1b | IMMEDIATELY AFTER RESET, MEMORY CONTROLLER PERFORMS FLASH WRITE PREVENTION AND CANCEL DETERMINATION OPERATION; HOWEVER, FORCIBLE SETTING REGISTER TO MEMORY CONTROLLER<br>0 - WRITING PREVENTED<br>1 - WRITING ALLOWED. |

*TERMINAL EXT_WPB OUTPUT OF WRITE PROTECT CONTROL OF FLASH IS
SET BY SYSTEM CONTROL REGISTER WPB[4].

FIG.19

SMTMGR_SETn#m(OFFSET: set0 is 0x94, set1 is 0x98, set2 is 0x9C)

| BIT | BIT NAME | R/W | INITIAL VALUE | DESCRIPTION |
|---|---|---|---|---|
| 31:30 | | | | Reserved |
| 29:28 | sm_read_pipe | R/W | 00b | WEIGHT CLOCK NUMBER AT TIME OF SYNCHRONIZATION MEMORY READING IS SET. SINCE SYNCHRONIZATION MEMORY IS ONLY SUPPORTED BY BU1511KV2, 00b IS SET. |
| 27 | low_freq_sync_device | R/W | 0b | AT TIME OF 1, BUS CONTROL IS PERFORMED IN SYNCHRONIZATION WITH HIGH TIMING OF INTERNAL sm_clken; SINCE INTERNAL sm_clken IS FIXED HIGH, IT IS NOT PARTICULARLY EFFECTIVE. |
| 26 | ready_mode | R/W | 0b | AT TIME OF MEMORY CORRESPONDENCE WITH READY FUNCTION, IT IS USED; SINCE INTERNAL sm_ready IS NOT AS TERMINAL AND IS FIXED HIGH, IT IS NOT PARTICULARLY EFFECTIVE. |
| 25:24 | page_size | R/W | 00b | SIZE IS SET IN PAGE MODE.<br>00b - 4 DATA  01b - 8 DATA  10b - 16 DATA  11b - 32 DATA |
| 23 | page_mode | R/W | set0 : 0b<br>set1 : 1b<br>set2 : 0b | CORRESPONDENCE OF TARGET DEVICE TO PAGE MODE IS SET.<br>0 - Pagemode Disable Device<br>1 - Pagemode Enable Device |
| 22:19 | t_prc | R/W | set0 : 0000b<br>set1 : 0011b<br>set2 : 0011b | Page mode read cycle time : tprc<br>AT CLOCK CYCLE IN PAGE MODE, SETTING VALUE +1 IS TURNED CLOCK CYCLE. |
| 18:16 | t_bta | R/W | set0 : 001b<br>set1 : 100b<br>set2 : 100b | TURN AROUND TIME OF DATA BUS<br>IDLE CLOCK NUMBER AT TIME OF "WRITE-READ" "READ-WRITE" AND "READ-READ WHERE CHIP SELECT IS CHANGED" IS SET (0 TO 7 CLOCKS). |
| 15:10 | t_wp | R/W | set0#1 : 000100b<br>set0#2 : 000001b<br>set1 : 000110b<br>set2 : 010011b | WRITE PULSE WIDTH IS SET.  1 TO 64 CLOCKS<br>SETTING VALUE +1 BECOMES CLOCK CYCLE OF PULSE WIDTH |
| 9:8 | t_wr | R/W | set0#1 : 01b<br>set0#2 : 00b<br>set1 : 11b<br>set2 : 11b | ADDRESS/DATA HOLD TIME FOR WRITE PULSE AT TIME OF WRITING OR DEASSERT OF CHIP SELECT IS SET BY CLOCK NUMBER.<br>0 TO 3 CLOCKS CAN BE SET. |
| 7:6 | t_as | R/W | 01b | ADDRESS/DATA HOLD TIME FOR WRITE PULSE AT TIME OF WRITING OR DEASSERT OF CHIP SELECT IS SET BY CLOCK NUMBER.<br>0 TO 3 CLOCKS CAN BE SET. |
| 5:0 | t_rc | R/W | set0#1 : 001101b<br>set0#2 : 000001b<br>set1 : 001111b<br>set2 : 011011b | READ CYCLE TIME IS SET BY CLOCK NUMBER.<br>SETTING VALUE +1 BECOMES CLOCK CYCLE OF PULSE WIDTH.<br>1 TO 64 CLOCKS CAN BE SET. |

FIG.25

| FIQ No. | Source | IRQ No. | Priority | Source |
|---|---|---|---|---|
| 0 | WATCH DOG TIMER INTERRUPT | 0 | 15 | TIMER 0 INTERRUPT |
| - | Not USE | 1 | 14 | TIMER 1 INTERRUPT |
| - | Not USE | 2 | 13 | TIMER COUNTER INTERRUPT |
| - | Not USE | 3 | 12 | SPI INTERRUPT |
| - | Not USE | 4 | 11 | UART1 INTERRUPT |
| - | Not USE | 5 | 10 | UART2 INTERRUPT |
| - | Not USE | 6 | 9 | EXTERNAL IRQ TERMINAL INTERRUPT |
| - | Not USE | 7 | 8 | ADC INTERRUPT |
| - | Not USE | 8 | 7 | IMAGE PROCESSING BLOCK INTERRUPT |
| - | Not USE | 9-15 | 6-0 | Not USE |

FIG.26

| REGISTER NAME | OFFSET | R/W | BIT WIDTH | DESCRIPTION | INITIAL VALUE |
|---|---|---|---|---|---|
| irq_inten_l | 0x00 | R/W | 16 | IRQ INTERRUPT SOURCE ENABLE REGISTER<br>VALID/INVALID IS CONTROLLED FOR EACH BIT OF CORRESPONDING PRIORITY<br>0: INTERRUPT INVALID  1: INTERRUPT VALID | 0x0000 |
| irq_intmask_l | 0x08 | R/W | 16 | IRQ INTERRUPT SOURCE MASK REGISTER<br>MASKING CAN BE PERFORMED FOR EACH BIT OF CORRESPONDING PRIORITY<br>0: NOT MASKED  1: MASKED | 0x0000 |
| irq_rawstatus_l | 0x18 | R | 16 | IRQRAW STATUS REGISTER<br>WHETHER SIGNAL LEVEL FROM INTERRUPT FACTOR IS INTERRUPT VALID LEVEL CAN BE READ.<br>0: NOT INTERRUPT LEVEL  1: INTERRUPT LEVEL | 0x0000 |
| irq_status_l | 0x20 | R | 16 | IRQ ENABLE STATUS REGISTER<br>WHETHER INTERRUPT FACTOR AFTER IRQ INTERRUPT ENABLE PROCESSING IS VALID LEVEL CAN BE READ.<br>0: NOT INTERRUPT LEVEL  1: INTERRUPT LEVEL | 0x0000 |
| irq_maskstatus_l | 0x28 | R | 16 | IRQ MASK STATUS REGISTER<br>WHETHER INTERRUPT FACTOR AFTER IRQ INTERRUPT MASK PROCESSING IS VALID LEVEL CAN BE READ.<br>0: NOT INTERRUPT LEVEL  1: INTERRUPT LEVEL | 0x0000 |
| irq_finalstatus_l | 0x30 | R | 16 | IRQ PRIORITY STATUS REGISTER<br>WHETHER INTERRUPT FACTOR MORE THAN SYSTEM PRIORITY IS VALID LEVEL CAN BE READ.<br>0: NOT INTERRUPT LEVEL  1: INTERRUPT LEVEL | 0x0000 |
| fiq_inten | 0xC0 | R/W | 1 | FIQ INTERRUPT SOURCE ENABLE REGISTER | 0x0 |
| fiq_intmask | 0xC4 | R/W | 1 | FIQ INTERRUPT SOURCE MASK REGISTER | 0x0 |
| fir_rawstatus | 0xCC | R | 1 | FIQRAW STATUS REGISTER | 0x0 |
| fiq_status | 0xD0 | R | 1 | FIQ ENABLE STATUS REGISTER | 0x0 |
| fiq_finalstatus | 0xD4 | R | 1 | FIQ STATUS REGISTER | 0x0 |
| irq_plevel | 0xD8 | R/W | 4 | IRQ SYSTEM PRIORITY LEVEL CONTROL REGISTER<br>INTERRUPT FACTOR HAVING PRIORITY OF MORE THAN VALUE SET IN THIS REGISTER IS VALID. | 0x0 |

FIG.27

| REGISTER NAME | OFFSET | R/W | BIT WIDTH | DESCRIPTION | INITIAL VALUE |
|---|---|---|---|---|---|
| WDT_CR | 0x00 | R/W | 5 | CONTROL REGISTER | 0x00 |
| WDT_TORR | 0x04 | R/W | 4 | TIME-OUT TIME SETTING REGISTER | 0xF |
| WDT_CCVR | 0x08 | R | 32 | CURRENT COUNTER VALUE REGISTER | 0x0000FFFF |
| WDT_CRR | 0x0C | W | 8 | COUNTER RESTART REGISTER | 0x00 |
| WDT_STAT | 0x10 | R | 1 | INTERRUPT STATUS REGISTER | 0x0 |
| WDT_EOI | 0x14 | R | 1 | INTERRUPT CLEAR REGISTER | 0x0 |

FIG.28

| WDT_TORR : TOP[3:0] | COUNTER INITIAL VALUE | TIME-OUT TIME WHEN XIN = 27MHZ AND SYS_CLK_WDT IS ALSO 27 MHZ |
|---|---|---|
| 0b0000 | 0x0000FFFF | 2.43msec |
| 0b0001 | 0x0001FFFF | 4.85msec |
| 0b0010 | 0x0003FFFF | 9.71msec |
| 0b0011 | 0x0007FFFF | 19.4msec |
| 0b0100 | 0x000FFFFF | 38.8msec |
| 0b0101 | 0x001FFFFF | 77.7msec |
| 0b0110 | 0x003FFFFF | 0.16sec |
| 0b0111 | 0x007FFFFF | 0.31sec |
| 0b1000 | 0x00FFFFFF | 0.62sec |
| 0b1001 | 0x01FFFFFF | 1.24sec |
| 0b1010 | 0x03FFFFFF | 2.49sec |
| 0b1011 | 0x07FFFFFF | 4.97sec |
| 0b1100 | 0x0FFFFFFF | 9.94sec |
| 0b1101 | 0x1FFFFFFF | 19.88sec |
| 0b1110 | 0x3FFFFFFF | 39.77sec |
| 0b1111 | 0x7FFFFFFF | 79.54sec |

FIG.32

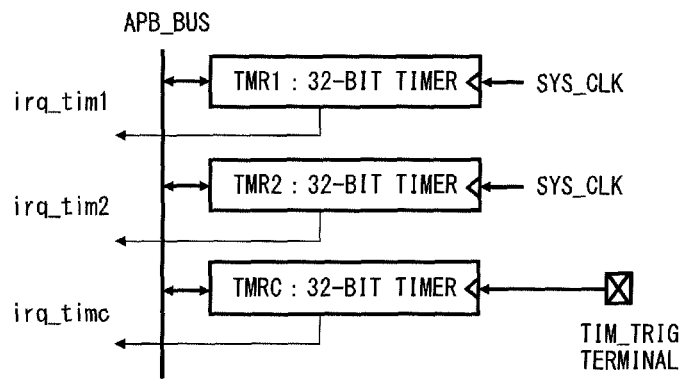

FIG.33

| REGISTER NAME | OFFSET | R/W | BIT WIDTH | DESCRIPTION | INITIAL VALUE |
|---|---|---|---|---|---|
| TMR1LoadCount | 0x00 | R/W | 32 | DATA VALUE TO BE WRITTEN INTO TMR1 | 0x00000000 |
| TMR1CurrentValue | 0x04 | R | 32 | VALUE OF TMR1 TIMER AT TIME OF READING | — |
| TMR1ControlReg | 0x08 | R/W | 3 | bit2:TMR1_INT_MASK "0" : INTERRUPT VALID, "1" : MASK ON<br>bit1:TMR1_MODE "0" : FREE RUN, "1" : USER DEFINITION<br>bit0:TMR1_EN "0" : TIMER OPERATION STOP, "1" : TIMER OPERATION ON | 0x0 |
| TMR1_EOI | 0x0C | R | 1 | CLEAR INTERRUPT STATUS OF TMR1 | 0x0 |
| TMR1_STAT | 0x10 | R | 1 | TMR1 INTERRUPT STATUS REGISTER | 0x0 |
| TMR2LoadCount | 0x14 | R/W | 32 | DATA VALUE TO BE WRITTEN INTO TMR2 | 0x00000000 |
| TMR2CurrentValue | 0x18 | R | 32 | VALUE OF TMR2 TIMER AT TIME OF READING | — |
| TMR2ControlReg | 0x1C | R/W | 3 | bit2:TMR2_INT_MASK "0" : INTERRUPT VALID, "1" : MASK ON<br>bit1:TMR2_MODE "0" : FREE RUN, "1" : USER DEFINITION<br>bit0:TMR2_EN "0" : TIMER OPERATION STOP, "1" : TIMER OPERATION ON | 0x0 |
| TMR2_EOI | 0x20 | R | 1 | CLEAR INTERRUPT STATUS OF TMR2 | 0x0 |
| TMR2_STAT | 0x24 | R | 1 | TMR2 INTERRUPT STATUS REGISTER | 0x0 |
| TMRCLoadCount | 0x28 | R/W | 32 | DATA VALUE TO BE WRITTEN INTO TMRC | 0x00000000 |
| TMRCCurrentValue | 0x2C | R | 32 | VALUE OF TMRC TIMER AT TIME OF READING | — |
| TMRCControlReg | 0x30 | R/W | 3 | bit2:TMRC_INT_MASK "0" : INTERRUPT VALID, "1" : MASK ON<br>bit1:TMRC_MODE "0" : FREE RUN, "1" : USER DEFINITION<br>bit0:TMRC_EN "0" : TIMER OPERATION STOP, "1" : TIMER OPERATION ON | 0x0 |
| TMRC_EOI | 0x34 | R | 1 | CLEAR INTERRUPT STATUS OF TMRC | 0x0 |
| TMRC_STAT | 0x38 | R | 1 | TMRC INTERRUPT STATUS REGISTER | 0x0 |

FIG.35

| UART1: BASE ADDRESS IS 0xC0000000 | | | | | |
|---|---|---|---|---|---|
| REGISTER NAME | OFFSET | R/W | BIT WIDTH | DESCRIPTION | INITIAL VALUE |
| RBR | 0x00 | R | 8 | RECEPTION BUFFER REGISTER(@LCR[7]=" 0" ) | 0x00 |
| THR | 0x00 | W | 8 | TRANSMISSION HOLDING REGISTER(@LCR[7]=" 0" ) | 0x00 |
| DLL | 0x00 | R/W | 8 | DIVISOR LATCH REGISTER (LOW)(@LCR[7]=" 1" ) | 0x00 |
| DLH | 0x04 | R/W | 8 | DIVISOR LATCH REGISTER (UPPER)(@LCR[7]=" 1" ) | 0x00 |
| IER | 0x04 | R/W | 8 | INTERRUPT ENABLE REGISTER(@LCR[7]=" 0" ) | 0x00 |
| IIR | 0x08 | R | 8 | INTERRUPT RECOGNITION REGISTER | 0x01 |
| FCR | 0x08 | W | 8 | FIFO CONTROL REGISTER | 0x00 |
| LCR | 0x0C | R/W | 8 | LINE CONTROL REGISTER | 0x00 |
| MCR | 0x10 | R/W | 6 | MODEM CONTROL REGISTER | 0x00 |
| LSR | 0x14 | R | 8 | LINE STATUS REGISTER | 0x60 |
| MSR | 0x18 | R | 8 | MODEM STATUS REGISTER | 0x00 |
| SCR | 0x1C | R/W | 8 | SCRATCH PAD REGISTER | 0x00 |
| FAR | 0x70 | R/W | 1 | FIFO ACCESS REGISTER | 0x0 |
| TFR | 0x74 | R | 8 | TRANSMISSION FIFO READ REGISTER | 0x00 |
| RFW | 0x78 | W | 10 | RECEPTION FIFO WRITE REGISTER | 0x000 |
| USR | 0x7C | R | 5 | UART STATUS REGISTER | 0x06 |
| TFL | 0x80 | R | 8 | TRANSMISSION FIFO LEVEL REGISTER | 0x00 |
| RFL | 0x84 | R | 8 | RECEPTION FIFO LEVEL REGISTER | 0x00 |
| HTX | 0xA4 | R/W | 1 | TRANSMISSION STOP REGISTER | 0x0 |
| UART2: BASE ADDRESS IS 0xC0001000 | | | | | |
| REGISTER NAME | OFFSET | R/W | BIT WIDTH | DESCRIPTION | INITIAL VALUE |
| RBR | 0x00 | R | 8 | RECEPTION BUFFER REGISTER(@LCR[7]=" 0" ) | 0x00 |
| THR | 0x00 | W | 8 | TRANSMISSION HOLDING REGISTER(@LCR[7]=" 0" ) | 0x00 |
| DLL | 0x00 | R/W | 8 | DIVISOR LATCH REGISTER (LOW)(@LCR[7]=" 1" ) | 0x00 |
| DLH | 0x04 | R/W | 8 | DIVISOR LATCH REGISTER (UPPER)(@LCR[7]=" 1" ) | 0x00 |
| IER | 0x04 | R/W | 8 | INTERRUPT ENABLE REGISTER(@LCR[7]=" 0" ) | 0x00 |
| IIR | 0x08 | R | 8 | INTERRUPT RECOGNITION REGISTER | 0x01 |
| FCR | 0x08 | W | 8 | FIFO CONTROL REGISTER | 0x00 |
| LCR | 0x0C | R/W | 8 | LINE CONTROL REGISTER | 0x00 |
| LSR | 0x14 | R | 8 | LINE STATUS REGISTER | 0x60 |
| SCR | 0x1C | R/W | 8 | SCRATCH PAD REGISTER | 0x00 |
| FAR | 0x70 | R/W | 1 | FIFO ACCESS REGISTER | 0x0 |
| TFR | 0x74 | R | 8 | TRANSMISSION FIFO READ REGISTER | 0x00 |
| RFW | 0x78 | W | 10 | RECEPTION FIFO WRITE REGISTER | 0x000 |
| USR | 0x7C | R | 5 | UART STATUS REGISTER | 0x06 |
| TFL | 0x80 | R | 8 | TRANSMISSION FIFO LEVEL REGISTER | 0x00 |
| RFL | 0x84 | R | 8 | RECEPTION FIFO LEVEL REGISTER | 0x00 |
| HTX | 0xA4 | R/W | 1 | TRANSMISSION STOP REGISTER | 0x0 |

BIT TIME = TSYS_CLK*16 FREQUENCY DIVISION VALUE
(FREQUENCY DIVISION VALUE IS SET BY DLL, DLH REGISTERS)

TRANSMISSION
PREVENTION

FIG.39

RBR(OFFSET: UART1=0x00, UART2=0x1000)
RECEPTION BUFFER REGISTER
IT IS VALID ONLY WHEN DIVISOR LATCH ACCESS IS DISABLED(LCR[7] = 0)

| BIT | BIT NAME | R/W | INITIAL VALUE | DESCRIPTION |
|---|---|---|---|---|
| 7:0 | Receive Buffer Register | R | 0x00 | RECEPTION BUFFER FOR SERIAL INPUT DATA RX1 AND RX2 IN CASE OF FIFO ENABLE (FCR[0] = 1), ACCESS FRONT OF FIFO. |

FIG.40

THR(OFFSET: UART1=0x00, UART2=0x1000)
TRANSMISSION HOLDING REGISTER
IT IS VALID ONLY WHEN DIVISOR LATCH ACCESS IS DISABLED(LCR[7] = 0)

| BIT | BIT NAME | R/W | INITIAL VALUE | DESCRIPTION |
|---|---|---|---|---|
| 7:0 | Transmit Holding Register | W | 0x00 | TRANSMISSION BUFFER FOR SERIAL OUTPUT DATA TX1 AND TX2 IN CASE OF THREmpty (LSR[5] = 1), IT INDICATES THAT DATA IS PRESENT. |

FIG.41

DLL(OFFSET: UART1=0x00, UART2=0x1000)
DIVISOR LATCH (LOW)
IT IS VALID ONLY WHEN DIVISOR LATCH ACCESS IS ENABLED(LCR[7] = 1)

| BIT | BIT NAME | R/W | INITIAL VALUE | DESCRIPTION |
|---|---|---|---|---|
| 7:0 | Divisor Latch (Low) | R/W | 0x00 | DLL COUPLES WITH DLH TO BECOME 16-BIT DLR (DIVISOR LATCH REGISTER). WHEN DLR IS ACCESSED, IT IS NECESSARY TO ASSERT DLAB (= LCR[7]). OUTPUT BAUD RATE IS EQUAL TO VALUE OBTAINED BY DIVIDING FREQUENCY OF SERIAL CLOCK sclk BY 16. OUTPUT BAUD RATE CAN BE CALCULATED BY FORMULA BELOW. BaudRate= (SerialClockFreq) / (16*Divisor) |

FIG.42

DLH(OFFSET: UART1=0x04, UART2=0x1004)
DIVISOR LATCH (HIGH)
IT IS VALID ONLY WHEN DIVISOR LATCH ACCESS IS ENABLED(LCR[7] = 1)

| BIT | BIT NAME | R/W | INITIAL VALUE | DESCRIPTION |
|---|---|---|---|---|
| 7:0 | Divisor Latch (High) | R/W | 0x00 | DLL COUPLES WITH DLH TO BECOME 16-BIT DLR (DIVISOR LATCH REGISTER). WHEN DLR IS ACCESSED, IT IS NECESSARY TO ASSERT DLAB (= LCR[7]). OUTPUT BAUD RATE IS EQUAL TO VALUE OBTAINED BY DIVIDING FREQUENCY OF SERIAL CLOCK sclk BY 16. OUTPUT BAUD RATE CAN BE CALCULATED BY FORMULA BELOW. BaudRate= (SerialClockFreq) / (16*Divisor) |

FIG.43

IER(OFFSET: UART1=0x04, UART2=0x1004)
INTERRUPT ENABLE REGISTER
IT IS VALID ONLY WHEN DIVISOR LATCH ACCESS IS DISABLED(LCR[7] = 0)

| BIT | BIT NAME | R/W | INITIAL VALUE | DESCRIPTION |
|---|---|---|---|---|
| 3 | EDSSI | R/W | 0x0 | ENABLE PROCESSING FOR MODEM INTERRUPT GENERATION IS CONTROLLED.<br>FOURTH PRIORITY INTERRUPT<br>0: DISABLE  1: ENABLE |
| 2 | ELSI | R/W | 0x0 | ENABLE PROCESSING FOR RECEPTION LINE STATUS INTERRUPT GENERATION IS CONTROLLED.<br>HIGHEST PRIORITY INTERRUPT<br>0: DISABLE  1: ENABLE |
| 1 | ETBEI | R/W | 0x0 | ENABLE PROCESSING FOR TRANSMISSION HOLDING REGISTER Empty (THRE) INTERRUPT GENERATION IS CONTROLLED.<br>THIRD PRIORITY INTERRUPT<br>0: DISABLE  1: ENABLE |
| 0 | ERBFI | R/W | 0x0 | ENABLE PROCESSING FOR RECEPTION DATA VALID INTERRUPT AND Character Timeout INTERRUPT GENERATION IS CONTROLLED.<br>SECOND PRIORITY INTERRUPT<br>0: DISABLE  1: ENABLE |

FIG.44

IIR(OFFSET: UART1=0x08, UART2=0x1008)
INTERRUPT RECOGNITION REGISTER

| BIT | BIT NAME | R/W | INITIAL VALUE | DESCRIPTION |
|---|---|---|---|---|
| 7:6 | FIFOs Enabled | R | 0x0 | INDICATE STATE OF FIFO<br>0b00: DISABLE  0b11: ENABLE |
| 3:0 | Interrupt ID | R | 0x1 | INDICATE HIGHEST PRIORITY INTERRUPT FACTOR<br>0b0000: modem status    0b0001: no interrupt pending<br>0b0010: THREmpty       0b0100: received data available<br>0b0110: received line status    0b0111: busy status<br>0b1100: character timeout |

FIG.45

FCR(OFFSET: UART1=0x08, UART2=0x1008)
FIFO CONTROL REGISTER

| BIT | BIT NAME | R/W | INITIAL VALUE | DESCRIPTION |
|---|---|---|---|---|
| 7:6 | RCVR Trigger | W | 0x0 | RECEPTION DATA VALID INTERRUPT IS GENERATED, AND RECEPTION FIFO TRIGGER LEVEL IS SET.<br>0b00: 1 CHARACTER TO FIFO  0b01: 1/4 FILLING OF FIFO<br>0b10: 1/2 FILLING OF FIFO  0b11: FIFO IS FILLED SUCH THAT REMAINDER IS 2. |
| 5:4 | TX Empty Trigger | W | 0x0 | TRANSMISSION HOLDING REGISTER Empty (THRE) INTERRUPT IS GENERATED, AND TRANSMISSION FIFO TRIGGER LEVEL IS SET.<br>0b00: FIFO IS EMPTY  0b01: 2 CHARACTERS TO FIFO<br>0b10: 1/4 FILLING OF FIFO  0b11: 1/2 FILLING OF FIFO |
| 0 | FIFO Enable | W | 0x0 | ENABLE PROCESSING OF TRANSMISSION AND RECEPTION FIFO IS CONTROLLED.<br>0: DISABLE  1: ENABLE |

FIG.46

LCR (OFFSET: UART1=0x0C, UART2=0x100C)
LINE CONTROL REGISTER

| BIT | BIT NAME | R/W | INITIAL VALUE | DESCRIPTION |
|---|---|---|---|---|
| 7 | DLAB | R/W | 0x0 | ENABLE PROCESSING OF DIVISOR LATCH REGISTER (DLL, DLH) ACCESS (BAUD RATE SETTING) IS CONTROLLED. WHEN UART ≠ Busy (USR[0] = 0), WRITING CAN BE PERFORMED. THIS BIT IS NEEDED TO BE CLEARED BEFORE ACCESS TO OTHER REGISTER.<br>0: DISABLE 1: ENABLE |
| 6 | Break | R/W | 0x0 | USED TO CAUSE TRANSMISSION BREAK STATE IN RECEPTION DEVICE IN TRANSMISSION BREAK STATE, SERIAL OUTPUT DATA TX1 AND TX2 IS FIXED LOW.<br>0: NO OPERATION 1: CAUSE TRANSMISSION BRAKE STATE |
| 4 | EPS | R/W | 0x0 | POLARITY OF PARITY IS CONTROLLED. WHEN UART ≠ Busy (USR[0] = 0), WRITING CAN BE PERFORMED. ACCORDING TO SETTING, PARITY IS GENERATED SUCH THAT NUMBER OF 1S WITHIN TRANSMISSION DATA IS ODD OR EVEN.<br>0: ODD 1: EVEN |
| 3 | PEN | R/W | 0x0 | PARITY PROCESSING (GENERATION AND PARITY CHECK) IS CONTROLLED. WHEN UART ≠ Busy (USR[0] = 0), WRITING CAN BE PERFORMED.<br>0: DISABLE 1: ENABLE |
| 2 | STOP | R/W | 0x0 | NUMBER OF STOP BITS IS SET FOR EACH TRANSMISSION AND RECEPTION CHARACTER. WHEN UART ≠ Busy (USR[0] = 0), WRITING CAN BE PERFORMED.<br>0: 1 STOP BIT 1: 1.5 STOP BITS (WHEN DLS[1:0] = 0)<br>2 STOP BITS (WHEN DLS[1:0] ≠ 0) |
| 1:0 | DLS | R/W | 0x0 | NUMBER OF DATA BITS IS SET FOR EACH TRANSMISSION AND RECEPTION CHARACTER. WHEN UART ≠ Busy (USR[0] = 0), WRITING CAN BE PERFORMED.<br>0b00: 5 BITS 0b01: 6 BITS 0b10: 7 BITS 0b11: 8 BITS |

FIG.47

MCR (OFFSET: UART1=0x10)
MODEM CONTROL REGISTER

| BIT | BIT NAME | R/W | INITIAL VALUE | DESCRIPTION |
|---|---|---|---|---|
| 5 | AFCE | R/W | 0x0 | ENABLE PROCESSING OF AutoFlowControl IS CONTROLLED.<br>0: DISABLE 1: ENABLE |
| 4 | Loop Back | R/W | 0x0 | LoopBack MODE IS SET.<br>0: NORMAL MODE 1: LoopBack MODE (TEST MODE) |
| 1 | RTS | R/W | 0x0 | RequestToSend SIGNAL rts_n IS CONTROLLED. RequestToSend SIGNAL INFORMS MODEM OR DATA SET THAT UART IS READY FOR DATA EXCHANGE.<br>0: DEASSERT (rts_n = 1) 1: ASSERT (rts_n = 0) |

FIG.48

LSR(OFFSET: UART1=0x14, UART2=0x1014)
LINE STATUS REGISTER

| BIT | BIT NAME | R/W | INITIAL VALUE | DESCRIPTION |
|---|---|---|---|---|
| 7 | RFE | R | 0x0 | RECEPTION FIFO ERROR STATUS. IT INDICATES WHETHER AT LEAST ONE OF PARITY ERROR, FRAMING ERROR AND BRAKE INDICATOR IS WITHIN RECEPTION FIFO. IN CASE OF FIFO ENABLE (FCR[0] = 1), IT IS VALID.<br>0: NO ERROR  1: ERROR OCCURS |
| 6 | TEMT | R | 0x1 | TRANSMISSION Empty STATUS. IN CASE OF FIFO ENABLE (FCR[0] = 1), WHEN BOTH TRANSMISSION SHIFT REGISTER AND FIFO ARE EMPTY, IT IS SET.<br>0: TRANSMISSION DATA IS NOT Empty  1: TRANSMISSION DATA IS Empty |
| 5 | THRE | R | 0x1 | TRANSMISSION HOLDING REGISTER Empty STATUS.<br>DATA IS TRANSFERRED FROM THR OR TRANSMISSION FIFO TO TRANSMISSION SHIFT REGISTER, AND, WHEN NEW DATA TO BE WRITTEN IS NOT PRESENT, IT IS SET. |
| 4 | BI | R | 0x0 | BRAKE INTERRUPT STATUS. IT INDICATES THAT BREAK SEQUENCE IS DETECTED IN SERIAL INPUT DATA sin. IT IS CLEARED BY READING. |
| 3 | FE | R | 0x0 | FRAMING ERROR STATUS. IT INDICATES THAT FRAMING ERROR OCCURS AT TIME OF RECEPTION. WHEN NORMAL STOP BIT CANNOT BE DETECTED IN RECEPTION DATA, FRAMING ERROR OCCURS. IT IS CLEARED BY READING. |
| 2 | PE | R | 0x0 | PARITY ERROR STATUS. IN CASE OF PARITY ENABLE (LCR[3] = 1), OCCURRENCE OF PARITY ERROR IN RECEPTION IS DETECTED.<br>IT IS CLEARED BY READING. |
| 1 | OE | R | 0x0 | OVERRUN ERROR STATUS. IT INDICATES OCCURRENCE OF OVERRUN ERROR. WHEN SUCCEEDING DATA IS DETECTED BEFORE PREVIOUS DATA IS READ, OVERRUN ERROR OCCURS. IT IS CLEARED BY READING. |
| 0 | DR | R | 0x0 | DATA READY STATUS.<br>IT INDICATES THAT RECEPTION SIDE HOLDS AT LEAST ONE CHARACTER IN RBR OR RECEPTION FIFO. |

FIG.49

MSR(OFFSET: UART1=0x18)
MODEM STATUS REGISTER

| BIT | BIT NAME | R/W | INITIAL VALUE | DESCRIPTION |
|---|---|---|---|---|
| 4 | CTS | R | 0x0 | ClearToSend STATUS.<br>IT INDICATES STATE OF MODEM CONTROL LINE cts_n SIGNAL.<br>0: cts_n INPUT DEASSERT (cts_n = 1)  1: cts_n INPUT ASSERT (cts_n = 0) |
| 0 | DCTS | R | 0x0 | DeltaClearToSend STATUS. IT INDICATES that MODEM CONTROL LINE cts_n SIGNAL IS CHANGED AFTER MSR IS READ PREVIOUSLY.<br>0: NOT CHANGED  1: CHANGED |

FIG.50

SCR(OFFSET: UART1=0x1C, UART2=0x101C)
SCRATCH PAD REGISTER

| BIT | BIT NAME | R/W | INITIAL VALUE | DESCRIPTION |
|---|---|---|---|---|
| 7:0 | Scratchpad Register | R/W | 0x00 | CAN BE USED AS TEMPORARY REGISTER<br>HAVE NO DEFINED FUNCTION |

FIG.51

FAR(OFFSET: UART1=0x70, UART2=0x1070)
FIFO ACCESS REGISTER

| BIT | BIT NAME | R/W | INITIAL VALUE | DESCRIPTION |
|---|---|---|---|---|
| 0 | FIFO Access Register | R/W | 0x0 | ENABLE PROCESSING OF FIFO ACCESS FUNCTION IS CONTROLLED.<br>0: DISABLE  1: ENABLE<br>IN CASE OF ENABLE SETTING, NORMALLY IMPOSSIBLE OPERATIONS BELOW CAN BE PERFORMED.<br>• READ DATA FROM TRANSMIT FIFO<br>• WRITE DATA INTO RECEIVE FIFO |

FIG.52

TFR(OFFSET: UART1=0x74, UART2=0x1074)
TRANSMIT FIFO READ REGISTER

| BIT | BIT NAME | R/W | INITIAL VALUE | DESCRIPTION |
|---|---|---|---|---|
| 7:0 | Transmit FIFO Read Register | R | 0x00 | FRONT DATA OF TRANSMIT FIFO IS READ.<br>WHEN FIFO ACCESS IS ENABLED (FAR[0]=1), IT IS VALID. |

FIG.53

RFW(OFFSET: UART1=0x78, UART2=0x1078)
RECEIVE FIFO WRITE REGISTER

| BIT | BIT NAME | R/W | INITIAL VALUE | DESCRIPTION |
|---|---|---|---|---|
| 9 | REFE | W | 0x0 | USED TO WRITE FRAMING ERROR DETECTION INFORMATION INTO RECEIVE FIFO<br>WHEN FIFO ACCESS IS ENABLED (FAR[0]=1), IT IS VALID. |
| 8 | RFPE | W | 0x0 | USED TO WRITE PARITY ERROR DETECTION INFORMATION INTO RECEIVE FIFO<br>WHEN FIFO ACCESS IS ENABLED (FAR[0]=1), IT IS VALID. |
| 7:0 | RFWD | W | 0x00 | WHEN FIFO ACCESS IS ENABLED (FAR[0]=1), WRITTEN DATA IS PUSHED INTO RECEIVE FIFO.<br>WHEN FIFO ACCESS IS DISABLED (FAR[0]=0), WRITTEN DATA IS PUSHED INTO RBR. |

FIG.54

USR(OFFSET: UART1=0x7C, UART2=0x107C)
UART STATUS REGISTER

| BIT | BIT NAME | R/W | INITIAL VALUE | DESCRIPTION |
|---|---|---|---|---|
| 4 | RFF | R | 0x0 | IT IS RECEIVE FIFO FULL STATUS. IT INDICATES RECEIVE FIFO IS FILLED.<br>0: NOT FILLED 1: FILLED |
| 3 | RFNE | R | 0x0 | IT IS RECEIVE FIFO NOT EMPTY STATUS. IT INDICATES ONE OR MORE PIECES OF DATA ARE PRESENT.<br>0: RECEIVE FIFO IS EMPTY 1: RECEIVE FIFO IS NOT EMPTY |
| 2 | TFE | R | 0x1 | IT IS TRANSMIT FIFO EMPTY STATUS. IT INDICATES TRANSMIT FIFO IS COMPLETELY EMPTY.<br>0: TRANSMIT FIFO IS NOT EMPTY 1: TRANSMIT FIFO IS EMPTY |
| 1 | TFNE | R | 0x1 | IT IS TRANSMIT FIFO NOT EMPTY STATUS. IT INDICATES IT IS NOT FILLED.<br>0: FILLED 1: NOT FILLED |
| 0 | BUSY | R | 0x0 | IT IS UART BUSY STATUS. IT INDICATES SERIAL TRANSFER IS BEING PERFORMED<br>0: UART IS IN IDLE STATE OR INACTIVE STATE 1: UART IS IN BUSY STATE |

FIG.55

TFL(OFFSET: UART1=0x80, UART2=0x1080)
TRANSMIT FIFO LEVEL REGISTER

| BIT | BIT NAME | R/W | INITIAL VALUE | DESCRIPTION |
|---|---|---|---|---|
| 7:0 | Transmit FIFO Level | R | 0x00 | IT INDICATES NUMBER OF PIECES OF DATA WITHIN TRANSMIT FIFO. |

FIG.56

RFL(OFFSET: UART1=0x84, UART2=0x1084)
RECEIVE FIFO LEVEL REGISTER

| BIT | BIT NAME | R/W | INITIAL VALUE | DESCRIPTION |
|---|---|---|---|---|
| 7:0 | Receive FIFO Level | R | 0x00 | IT INDICATES NUMBER OF PIECES OF DATA WITHIN RECEIVE FIFO. |

FIG.57

HTX(OFFSET: UART1=0xA4, UART2=0x10A4)
TRANSMISSION STOP REGISTER

| BIT | BIT NAME | R/W | INITIAL VALUE | DESCRIPTION |
|---|---|---|---|---|
| 0 | Halt TX | R/W | 0x0 | USED TO STOP TRANSMISSION<br>0: TRANSMISSION STOP DISABLE 1: TRANSMISSION STOP ENABLE<br>WHEN IT IS SET AT TRANSMISSION STOP ENABLE (TRANSMISSION STOP STATE), AND DATA IS WRITTEN INTO TRANSMIT FIFO, DATA CAN BE STORED IN TRANSMIT FIFO. |

| PIN No. | TERMINAL NAME | GPIO FUNCTION | INTERRUPT INPUT FUNCTION | PWM OUTPUT FUNCTION |
|---|---|---|---|---|
| 55 | GPIO15 | ○ | | |
| 56 | GPIO14 | ○ | | |
| 57 | GPIO13 | ○ | | |
| 58 | GPIO12 | ○ | | |
| 59 | GPIO11 | ○ | | |
| 60 | GPIO10 | ○ | | |
| 61 | GPIO9 | ○ | | |
| 62 | GPIO8 | ○ | | |
| 63 | GPIO7 | ○ | | ○ |
| 64 | GPIO6 | ○ | | ○ |
| 65 | GPIO5 | ○ | | ○ |
| 66 | GPIO4 | ○ | | ○ |
| 69 | GPIO3 | ○ | ○ | |
| 70 | GPIO2 | ○ | ○ | |
| 71 | GPIO1 | ○ | ○ | |
| 72 | GPIO0 | ○ | ○ | |

FIG.60 gpio_swporta_dr ( OFFSET : 0x00 )
GPIO OUTPUT DATA REGISTER

| BIT | BIT NAME | R/W | INITIAL VALUE | DESCRIPTION |
|---|---|---|---|---|
| 15:0 | PortA Data | R/W | 0x0000 | OUTPUT DATA OF EACH BIT OF GPIO PORT IS SET. TO REFLECT (OUTPUT) SETTING DATA, IT IS NECESSARY TO SET BIT OF CORRESPONDING TERMINAL AT OUTPUT MODE. |

FIG.61 gpio_swporta_ddr ( OFFSET : 0x04 )
GPIO DATA DIRECTION REGISTER

| BIT | BIT NAME | R/W | INITIAL VALUE | DESCRIPTION |
|---|---|---|---|---|
| 15:0 | PortA Data Direction | R/W | 0x0000 | DATA DIRECTION OF EACH BIT OF GPIO PORT IS SET. 0: INPUT MODE  1: OUTPUT MODE |

FIG.62 gpio_ext_porta ( OFFSET : 0x50 )
GPIO INPUT DATA REGISTER

| BIT | BIT NAME | R/W | INITIAL VALUE | DESCRIPTION |
|---|---|---|---|---|
| 15:0 | External PortA | R | 0xXXXX | DATA OF EACH BIT OF GPIO PORT IS READ. VALUE OF TERMINAL CAN BE READ IRRESPECTIVE OF INPUT/OUTPUT SETTING OF EACH BIT. VALUE IMMEDIATELY AFTER RESETTING DEPENDS ON TERMINAL STATE. |

FIG.63 gpio_inten ( OFFSET : 0x30 )
GPIO INTERRUPT ENABLE REGISTER

| BIT | BIT NAME | R/W | INITIAL VALUE | DESCRIPTION |
|---|---|---|---|---|
| 15:0 | Interrupt enable | R/W | 0x0000 | EACH BIT OF GPIO IS SET AT INTERRUPT INPUT. HOWEVER, ONLY WHEN CORRESPONDING BIT IS IN INPUT MODE, IT IS VALID. 0: NORMAL INPUT  1: INTERRUPT INPUT |

FIG.64 gpio_intmask ( OFFSET : 0x34 )
GPIO PORT A INTERRUPT MASK REGISTER

| BIT | BIT NAME | R/W | INITIAL VALUE | DESCRIPTION |
|---|---|---|---|---|
| 15:0 | Interrupt mask | R/W | 0x0000 | MASK SETTING IS PERFORMED ON INTERRUPT INPUT OF GPIO. 0: INTERRUPT INPUT MASK IS NOT PRESENT  1: INTERRUPT INPUT MASK IS PRESENT |

FIG.65 gpio_inttype_level ( OFFSET : 0x38 )
PORT A INTERRUPT LEVEL REGISTER

| BIT | BIT NAME | R/W | INITIAL VALUE | DESCRIPTION |
|---|---|---|---|---|
| 15 : 0 | Interrupt level | R/W | 0x0000 | TYPE OF INTERRUPT INPUT OF GPIO IS SET.<br>0: LEVEL TYPE  1: EDGE TYPE |

FIG.66 gpio_int_polarity ( OFFSET : 0x3C )
GPIO INTERRUPT POLARITY REGISTER

| BIT | BIT NAME | R/W | INITIAL VALUE | DESCRIPTION |
|---|---|---|---|---|
| 15 : 0 | Interrupt polarity | R/W | 0x0000 | TYPE OF INTERRUPT INPUT OF GPIO IS SET.<br>0: ACTIVE LOW (FALLING EDGE)<br>1: ACTIVE HIGH (RISING EDGE) |

FIG.67 gpio_intstatus ( OFFSET : 0x40 )
GPIO PORT A INTERRUPT STATUS

| BIT | BIT NAME | R/W | INITIAL VALUE | DESCRIPTION |
|---|---|---|---|---|
| 15 : 0 | Interrupt status | R | 0x0000 | IT IS INTERRUPT STATUS (AFTER MASK PROCESSING) OF GPIO.<br>0: INTERRUPT IS NOT PRESENT  1: INTERRUPT IS PRESENT |

FIG.68 gpio_rawintstatus ( OFFSET : 0x44 )
GPIO RAW INTERRUPT STATUS

| BIT | BIT NAME | R/W | INITIAL VALUE | DESCRIPTION |
|---|---|---|---|---|
| 15 : 0 | Raw Interrupt status | R | 0x0000 | IT IS INTERRUPT STATUS (AFTER MASK PROCESSING) OF GPIO.<br>0: INTERRUPT IS NOT PRESENT  1: INTERRUPT IS PRESENT |

FIG.69 gpio_porta_eoi ( OFFSET : 0x4C )
GPIO INTERRUPT CLEAR STATUS

| BIT | BIT NAME | R/W | INITIAL VALUE | DESCRIPTION |
|---|---|---|---|---|
| 15 : 0 | Clear Interrupt | W | 0x0000 | INTERRUPT OF GPIO IS CLEARED.<br>WRITING OF 1 ALLOWS INTERRUPT TO BE CLEARED.<br>0: NO OPERATION  1: INTERRUPT IS CLEARED<br>ONLY INTERRUPT OF EDGE DETECTION TYPE CAN BE CLEARED.<br>NOTE THAT INTERRUPT OF LEVEL DETECTION TYPE CANNOT BE CANCELLED. |

FIG.70
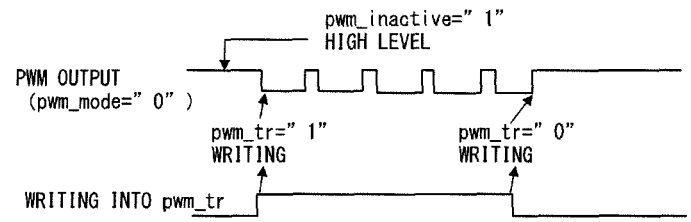
FIG.71
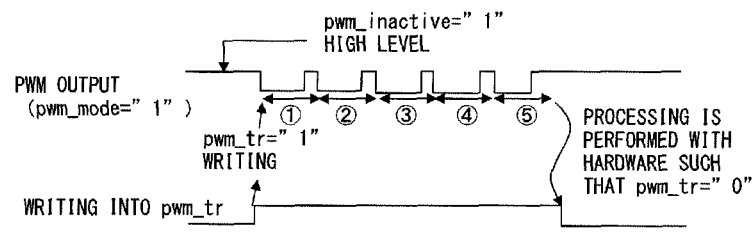
FIG.72
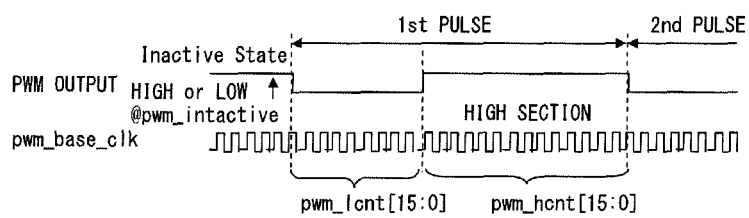
FIG.73
| SYS_CLK=pclk FREQUENCY | PWM PERIOD [min] | PWM PERIOD [max] |
|---|---|---|
| 54MHz | 0.223us | 159s |

FIG.74

| GPIO TERMINAL NAME | PWM CHANNEL NUMBER |
|---|---|
| GPIO4 PIN#66 | CHANNEL 0 |
| GPIO5 PIN#65 | CHANNEL 1 |
| GPIO6 PIN#64 | CHANNEL 2 |
| GPIO7 PIN#63 | CHANNEL 3 |

FIG.75

PWM_EN ( OFFSET : 0x00 )
PWM FUNCTION ENABLE REGISTER

| BIT | BIT NAME | R/W | INITIAL VALUE | DESCRIPTION |
|---|---|---|---|---|
| 0 | pwm_en[0] | R/W | 0x0 | PWM FUNCTION IS SET VALID OR INVALID.<br>0: PWM FUNCTION VALID  1: PWM FUNCTION INVALID |

FIG.76

PWM_MOD ( OFFSET : 0x04 )
PWM MODE SETTING REGISTER

| BIT | BIT NAME | R/W | INITIAL VALUE | DESCRIPTION |
|---|---|---|---|---|
| 11:8 | pwm_out_en[3:0] | R/W | 0x0 | PWM OUTPUT IS SET VALID OR INVALID FOR EACH CHANNEL.<br>0: PWM OUTPUT VALID  1: PWM OUTPUT INVALID |
| 7:4 | pwm_inactive[3:0] | R/W | 0x0 | inactive LEVEL IS SET FOR EACH CHANNEL OF PWM OUTPUT<br>0: inactive STATE LOW LEVEL  1: inactive STATE HIGH LEVEL |
| 3:0 | pwm_op_mode[3:0] | R/W | 0x0 | PWM OPERATION MODE OF EACH CHANNEL IS SET.<br>0: MANUAL MODE  1: AUTO MODE |

FIG.77

PWM_CNT ( OFFSET : 0x08 )
PWM CONTROL REGISTER

| BIT | BIT NAME | R/W | INITIAL VALUE | DESCRIPTION |
|---|---|---|---|---|
| 3:0 | pwm_tr[3:0] | R/W | 0x0 | PWM OUTPUT CONTROL SETTING IS PERFORMED. WRITING OF "1" STARTS OUTPUT. IN MANUAL MODE, WRITING OF "0" STOPS OUTPUT. IN AUTO MODE, PULSE NUMBER SET BY pwm_pulse_num IS OUTPUT, AND THEREAFTER BECOMES "0" AUTOMATICALLY, AND OUTPUT IS STOPPED.<br>0: PWM OUTPUT STOP  1: PWM OUTPUT START (DURING OUTPUT) |

FIG.78

PWM_BSCKDV * ( OFFSET : PWM0=0x0C, PWM1=0x1C, PWM2=0x2C, PWM3=0x3C)
PWM BASE CLOCK FREQUENCY DIVISION SETTING REGISTER

| BIT | BIT NAME | R/W | INITIAL VALUE | DESCRIPTION |
|---|---|---|---|---|
| 15:0 | pwm_bsckdv*[15:0] | R/W | 0x0000 | FREQUENCY DIVISION SETTING IS PERFORMED ON PWM OUTPUT BASE CLOCK OF CHANNEL *. SOURCE CLOCK IS pck=SYS_CLK. VALUE BETWEEN 2 TO 65534 IS PREFERABLY SET. FREQUENCY DIVISION IS PERFORMED AT "SETTING VALUE + 1" |

FIG.79

PWM_LCNT * ( OFFSET : PWM0=0x10, PWM1=0x20, PWM2=0x30, PWM3=0x40 )
PWM OUTPUT LOW SECTION WIDTH SETTING REGISTER

| BIT | BIT NAME | R/W | INITIAL VALUE | DESCRIPTION |
|---|---|---|---|---|
| 15:0 | pwm_lcnt * [15:0] | R/W | 0x0000 | PWM OUTPUT LOW SECTION WIDTH OF CHANNEL * IS SET BY NUMBER OF BASE CLOCKS. VALUE BETWEEN 2 TO 65534 IS PREFERABLY SET. |

FIG.80

PWM_HCNT * ( OFFSET : PWM0=0x14, PWM1=0x24, PWM2=0x34, PWM3=0x44 )
PWM OUTPUT HIGH SECTION WIDTH SETTING REGISTER

| BIT | BIT NAME | R/W | INITIAL VALUE | DESCRIPTION |
|---|---|---|---|---|
| 15:0 | pwm_hcnt * [15:0] | R/W | 0x0000 | PWM OUTPUT HIGH SECTION WIDTH OF CHANNEL * IS SET BY NUMBER OF BASE CLOCKS. VALUE BETWEEN 2 TO 65534 IS PREFERABLY SET. |

FIG.81

PWM_PULSE_NUM * ( OFFSET : PWM0=0x18, PWM1=0x28, PWM2=0x38, PWM3=0x48 )
PWM OUTPUT PULSE NUMBER SETTING REGISTER

| BIT | BIT NAME | R/W | INITIAL VALUE | DESCRIPTION |
|---|---|---|---|---|
| 7:0 | pwm_pulse_num * [7:0] | R/W | 0x0A | WHEN CHANNEL * IS IN AUTO MODE, PWM OUTPUT PULSE NUMBER IS SET. VALUE BETWEEN 2 TO 254 IS PREFERABLY SET. |

FIG.82

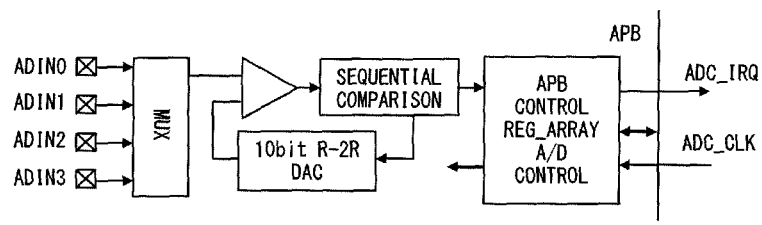

FIG.83

ADC_MOD ( OFFSET : 0x04 )
ADC OPERATION MODE SETTING REGISTER

| BIT | BIT NAME | R/W | INITIAL VALUE | DESCRIPTION |
|---|---|---|---|---|
| 1:0 | ADC Mode | R/W | 0x0 | OPERATION MODE OF A/D CONVERSION BLOCK IS SET.<br>0B00: OPERATION STOP (SUSPEND)  0B01: FREE SWEEP MODE<br>0B10: SINGLE MODE  0B11: SINGLE SWEEP MODE |

FIG.84

ADC_TRIGEN ( OFFSET : 0x08)
ADC SAMPLING TRIGGER ENABLE REGISTER

| BIT | BIT NAME | R/W | INITIAL VALUE | DESCRIPTION |
|---|---|---|---|---|
| 1 | STRGEN | R/W | 0x0 | SOFTWARE SAMPLING TRIGGER BIT IS SET VALID OR INVALID.<br>IN SINGLE MODE OR SINGLE SWEEP MODE, IT IS VALID. IN<br>SINGLE MODE, COMMON SETTING IS PERFORMED ON CHANNELS 0-3;<br>IN SINGLE SWEEP MODE, SETTING IS PERFORMED ON CHANNEL 0.<br>0: SOFTWARE TRIGGER INVALID  1: SOFTWARE TRIGGER VALID |

FIG.85

ADC_SOFTTRIG0 ( OFFSET : 0x10)
ADC SAMPLING TRIGGER CHANNEL 0 REGISTER

| BIT | BIT NAME | R/W | INITIAL VALUE | DESCRIPTION |
|---|---|---|---|---|
| 0 | SOFTTRIG0 | W | 0x0 | IN SINGLE MODE OR SINGLE SWEEP MODE, IT IS VALID. IT IS<br>USED AS OPERATION START TRIGGER OF A/D CONVERSION<br>CIRCUIT. AFTER COMPLETION OF A/D CONVERSION, SETTING<br>VALUE IS AUTOMATICALLY CLEARED.<br>· SINGLE MODE<br>0: A/D CONVERSION OPERATION IS NOT PERFORMED  1: A/D<br>CONVERSION OF CHANNEL 0 IS STARTED<br>· SINGLE SWEEP MODE<br>0: A/D CONVERSION OPERATION IS NOT PERFORMED  1: SWEEP<br>A/D CONVERSION OF ALL CHANNELS IS STARTED |

FIG.86

ADC_SOFTTRIG1 ( OFFSET : 0x14)
ADC SAMPLING TRIGGER CHANNEL 1 REGISTER

| BIT | BIT NAME | R/W | INITIAL VALUE | DESCRIPTION |
|---|---|---|---|---|
| 0 | SOFTTRIG1 | W | 0x0 | IN SINGLE MODE OF CHANNEL 1, IT IS VALID. IT IS USED AS<br>OPERATION START TRIGGER OF A/D CONVERSION CIRCUIT. AFTER<br>COMPLETION OF A/D CONVERSION, SETTING VALUE IS<br>AUTOMATICALLY CLEARED.<br>0: A/D CONVERSION OPERATION IS NOT PERFORMED  1: A/D<br>CONVERSION OF CHANNEL 1 IS STARTED |

FIG.87

ADC_SOFTTRIG2( OFFSET : 0x18)
ADC SAMPLING TRIGGER CHANNEL 2 REGISTER

| BIT | BIT NAME | R/W | INITIAL VALUE | DESCRIPTION |
|---|---|---|---|---|
| 0 | SOFTTRIG2 | W | 0x0 | IN SINGLE MODE OF CHANNEL 2, IT IS VALID. IT IS USED AS<br>OPERATION START TRIGGER OF A/D CONVERSION CIRCUIT. AFTER<br>COMPLETION OF A/D CONVERSION, SETTING VALUE IS<br>AUTOMATICALLY CLEARED.<br>0: A/D CONVERSION OPERATION IS NOT PERFORMED  1: A/D<br>CONVERSION OF CHANNEL 2 IS STARTED |

FIG.88
ADC_SOFTTRIG3 ( OFFSET : 0x1C)
ADC SAMPLING TRIGGER CHANNEL 3 REGISTER

| BIT | BIT NAME | R/W | INITIAL VALUE | DESCRIPTION |
|---|---|---|---|---|
| 0 | SOFTTRIG3 | W | 0x0 | IN SINGLE MODE OF CHANNEL 3, IT IS VALID. IT IS USED AS OPERATION START TRIGGER OF A/D CONVERSION CIRCUIT. AFTER COMPLETION OF A/D CONVERSION, SETTING VALUE IS AUTOMATICALLY CLEARED.<br>0: A/D CONVERSION OPERATION IS NOT PERFORMED 1: A/D CONVERSION OF CHANNEL 3 IS STARTED |

FIG.89
ADC_DATA0 ( OFFSET : 0x40)
ADC CHANNEL 0 SAMPLING DATA REGISTER

| BIT | BIT NAME | R/W | INITIAL VALUE | DESCRIPTION |
|---|---|---|---|---|
| 7:0 | ADC_DATA0 | R | 0x00 | IT IS SAMPLING DATA OF AD CONVERSION CIRCUIT CHANNEL 0. |

FIG.90
ADC_DATA1 ( OFFSET : 0x44)
ADC CHANNEL 1 SAMPLING DATA REGISTER

| BIT | BIT NAME | R/W | INITIAL VALUE | DESCRIPTION |
|---|---|---|---|---|
| 7:0 | ADC_DATA1 | R | 0x00 | IT IS SAMPLING DATA OF AD CONVERSION CIRCUIT CHANNEL 1. |

FIG.91
ADC_DATA2 ( OFFSET : 0x48)
ADC CHANNEL 2 SAMPLING DATA REGISTER

| BIT | BIT NAME | R/W | INITIAL VALUE | DESCRIPTION |
|---|---|---|---|---|
| 7:0 | ADC_DATA2 | R | 0x00 | IT IS SAMPLING DATA OF AD CONVERSION CIRCUIT CHANNEL 2. |

FIG.92
ADC_DATA3 ( OFFSET : 0x4C)
ADC CHANNEL 3 SAMPLING DATA REGISTER

| BIT | BIT NAME | R/W | INITIAL VALUE | DESCRIPTION |
|---|---|---|---|---|
| 7:0 | ADC_DATA3 | R | 0x00 | IT IS SAMPLING DATA OF AD CONVERSION CIRCUIT CHANNEL 3. |

FIG.93
ADC_INTMASK ( OFFSET : 0x74)
ADC CONVERSION COMPLETION INTERRUPT MASK REGISTER

| BIT | BIT NAME | R/W | INITIAL VALUE | DESCRIPTION |
|---|---|---|---|---|
| 0 | ADC_INTMASK | R/W | 0x0 | MASK PROCESSING OF A/D CONVERSION COMPLETION INTERRUPT BY SOFTWARE TRIGGER IS CONTROLLED.<br>0: MASKING IS PERFORMED 1: MASKING IS NOT PERFORMED |

FIG.94

ADC_INTRSTATUS ( OFFSET : 0x78)
ADC CONVERSION COMPLETION INTERRUPT OCCURRENCE (BEFORE MASKING) REGISTER

| BIT | BIT NAME | R/W | INITIAL VALUE | DESCRIPTION |
|---|---|---|---|---|
| 0 | ADC_INTRSTATUS | R | 0x0 | IT IS A/D CONVERSION COMPLETION INTERRUPT STATUS BEFORE MASK PROCESSING.<br>0: INTERRUPT IS NOT PRESENT  1: INTERRUPT IS PRESENT |

FIG.95

ADC_INTSTATUS ( OFFSET : 0x7C)
ADC CONVERSION COMPLETION INTERRUPT OCCURRENCE REGISTER

| BIT | BIT NAME | R/W | INITIAL VALUE | DESCRIPTION |
|---|---|---|---|---|
| 0 | ADC_INTSTATUS | R | 0x0 | IT IS A/D CONVERSION COMPLETION INTERRUPT STATUS BEFORE MASK PROCESSING.<br>0: INTERRUPT IS NOT PRESENT  1: INTERRUPT IS PRESENT |

FIG.96

ADC_INTCLR ( OFFSET : 0x80)
ADC CONVERSION COMPLETION INTERRUPT CLEAR REGISTER

| BIT | BIT NAME | R/W | INITIAL VALUE | DESCRIPTION |
|---|---|---|---|---|
| 0 | ADC_INTCLR | R | 0x0 | A/D CONVERSION COMPLETION INTERRUPT STATUS IS CLEARED. READING OF THIS REGISTER CLEARS BOTH INTERRUPT STATUSES BEFORE AND AFTER MASK PROCESSING. |

| PLLCNT[15:2] | | | | FREQUENCY DIVISION RATIO |
|---|---|---|---|---|
| 0 | 0 | 0 | 0 | SETTING PROHIBITION |
| 0 | 0 | 0 | 1 | 1/64 |
| 0 | 0 | 1 | 0 | 1/60 |
| 0 | 0 | 1 | 1 | 1/56 |
| 0 | 1 | 0 | 0 | 1/52 |
| 0 | 1 | 0 | 1 | 1/48 |
| 0 | 1 | 1 | 0 | 1/44 |
| 0 | 1 | 1 | 1 | 1/40 |
| 1 | 0 | 0 | 0 | 1/36 |
| 1 | 0 | 0 | 1 | 1/32 |
| 1 | 0 | 1 | 0 | 1/28 |
| 1 | 0 | 1 | 1 | 1/24 |
| 1 | 1 | 0 | 0 | 1/20 |
| 1 | 1 | 0 | 1 | 1/16 |
| 1 | 1 | 1 | * | SETTING PROHIBITION |

FIG.100

| REGISTER NAME | OFFSET | R/W | BIT WIDTH | DESCRIPTION | INITIAL VALUE |
|---|---|---|---|---|---|
| CLKCNT | 0x00 | R/W | 1 | CLOCK INPUT FROM AXIN_EN:AXIN IS CONTROLLED. | 0x0 |
| PLLCNT | 0x04 | R/W | 16 | PLLCNT[0]: PLL ENABLE SETTING (PLL VALID AT "1")<br>PLLCNT[4]: REFERENCE CLOCK FREQUENCY DIVISION RATIO SETTING<br>"0": 1/4 FREQUENCY DIVISION OF XIN CLOCK  "1": 1/2 FREQUENCY DIVISION OF XIN CLOCK<br>IT NEEDS TO BE USED SUCH THAT FREQUENCY AFTER FREQUENCY DIVISION OF fXIN FALLS WITHIN 2.5 TO 7.5 MHZ.<br>PLLCNT[8]: OUTPUT CLOCK FREQUENCY DIVISION RATIO SETTING<br>"0": 1/4 FREQUENCY DIVISION OF XIN CLOCK  "1": 1/2 FREQUENCY DIVISION OF XIN CLOCK<br>PLLCNT[15:12]: VCO FREQUENCY DIVISION RATIO SETTING<br>"0000b", "1111b" AND "1110b" ARE PROHIBITED FROM BEING SET.<br>fvco=fXIN*(17-PLLCNT[15:2])*4/(4-2*PLLCNT[4])<br>IT NEEDS TO BE USED SUCH THAT fvco IS 100 MHZ TO 200 MHZ.<br>PLL OUTPUT FREQUENCY f PLL IS EXPRESSED BY FORMULA BELOW.<br>fXIN*4*(17-PLLCNT[15:12])/((4-2*PLLCNT[4])*(4-2*PLLCNT[8])) | 0x0000 |
| CLKARM | 0x10 | R/W | 16 | CLKARM[2:0]: CLK_SEL_ARM (FIG. 4.9-1)<br>FREQUENCY DIVISION OF CLKARM[15:8]: CLK_DIV_ARM (FIG. 4.9-1)<br>FREQUENCY DIVISION RATIO: (bit[15]+1)*(bit[14~8]+1)<br>bit[15] is 1, then Duty 1/2 | 0x0001 |
| CLKADC | 0x14 | R/W | 16 | CLKADC[2:0]: CLK_SEL_ADC (FIG. 4.9-1)<br>FREQUENCY DIVISION OF CLKADC[15:8]: CLK_DIV_ADC (FIG. 4.9-1)<br>FREQUENCY DIVISION RATIO: (bit[15]+1)*(bit[14~8]+1)<br>bit[15] is 1, then Duty 1/2 | 0x0000 |
| CLKIMG | 0x18 | R/W | 16 | CLKIMG[2:0]: CLK_SEL_IMG (FIG. 4.9-1)<br>FREQUENCY DIVISION OF CLKIMG[15:8]: CLK_DIV_IMG (FIG. 4.9-1)<br>FREQUENCY DIVISION RATIO: (bit[15]+1)*(bit[14~8]+1)<br>bit[15] is 1, then Duty 1/2 | 0x0000 |
| CLKTVE | 0x1C | R/W | 16 | CLKTVE[2:0]: CLK_SEL_TVE (FIG. 4.9-1)<br>FREQUENCY DIVISION OF CLKTVE[15:8]: CLK_DIV_TVE (FIG. 4.9-1)<br>FREQUENCY DIVISION RATIO: (bit[15]+1)*(bit[14~8]+1)<br>bit[15] is 1, then Duty 1/2 | 0x0000 |
| CLKSDC | 0x20 | R/W | 16 | CLKSDC[2:0]: CLK_SEL_SDC (FIG. 4.9-1)<br>FREQUENCY DIVISION OF CLKSDC[15:8]: CLK_DIV_SDC (FIG. 4.9-1)<br>FREQUENCY DIVISION RATIO: (bit[15]+1)*(bit[14~8]+1)<br>bit[15] is 1, then Duty 1/2 | 0x0000 |
| CLKAUD | 0x24 | R/W | 16 | CLKAUD[2:0]: CLK_SEL_AUD (FIG. 4.9-1)<br>FREQUENCY DIVISION OF CLKAUD[15:8]: CLK_DIV_AUD (FIG. 4.9-1) FREQUENCY DEVISION OF 1/(SETTING VALUE+1)<br>FREQUENCY DIVISION RATIO: (bit[15]+1)*(bit[14~8]+1)<br>bit[15] is 1, then Duty 1/2 | 0x0000 |
| RST | 0x30 | R/W | 9 | RST[0]: SOFTWARE RESETTING ON IMAGE PROCESSING PORTION (ACTIVE HIGH)<br>RST[4]: TVE SOFTWARE RESETTING (ACTIVE HIGH)<br>RST[8]: ARM SOFTWARE RESETTING (ACTIVE HIGH, AUTOMATIC RESETTING) | 0x000 |
| WPB | 0x40 | R/W | 5 | WPB[0]: LEVEL SETTING ON SSI_WPB<br>WPB[4]: LEVEL SETTING ON EXT_WPB | 0x00 |

FIG.101

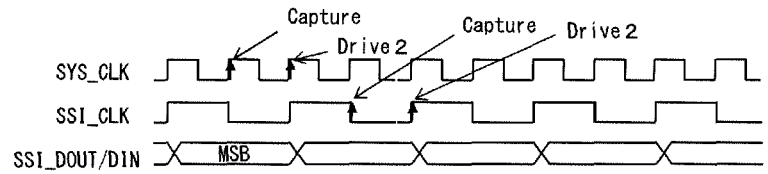

FIG.102

| INTERRUPT NAME | DESCRIPTION OF INTERRUPT |
|---|---|
| TRANSMIT FIFO EMPTY | WHEN TRANSMIT FIFO DATA IS REDUCED TO NUMBER OF THRESHOLD DATA OR LESS SET SUCH THAT Under-RUN DOES NOT OCCUR, SETTING IS PERFORMED. WHEN DATA IS WRITTEN INTO TRANSMIT FIFO TO EXCEED THRESHOLD LEVEL, INTERRUPT IS CLEARED. |
| TRANSMIT FIFO OVERFLOW | WHEN TRANSMIT FIFO IS FULL, WRITING OF DATA ALLOWS SETTING. WRITTEN DATA IS DISCARDED. ONCE IT IS SET, IT IS NOT CLEARED UNTIL TXOICR REGISTER IS READ. |
| RECEIVE FIFO FULL | WHEN NUMBER OF THRESHOLD DATA SET BY RECEIVE FIFO PLUS 1 IS EXCEEDED, SETTING IS PERFORMED. WHEN RECEIVE FIFO DATA IS READ TO BECOME LESS THAN THRESHOLD NUMBER, IT IS AUTOMATICALLY CLEARED. |
| RECEIVE FIFO OVERFLOW | WHEN RECEIVE FIFO IS FULL AND NEW DATA IS RECEIVED, SETTING IS PERFORMED. NEWLY READ DATA IS DISCARDED. ONCE IT IS SET, IT IS NOT CLEARED UNTIL RXOICR REGISTER IS READ. |
| RECEIVE FIFO UNDERFLOW | WHEN DATA IS NOT PRESENT IN RECEIVE FIFO AND FIFO 1; READ, SETTING IS PERFORMED. HERE, "0x0000" IS READ. ONCE IT IS SET, IT IS NOT CLEARED UNTIL RXUICR REGISTER IS READ. |
| MULTI-MASTER COLLISION | WHEN BU1511KV2 IS ASSIGNED AS SLAVE DURING DATA TRANSFER AT TIME OF MULTI-MASTER CONFIGURATION, SETTING IS PERFORMED. ONCE IT IS SET, IT IS NOT CLEARED UNTIL MSTI REGISTER IS READ. |

FIG.103

| TRANSFER MODE | DESCRIPTION OF OPERATION |
|---|---|
| TRANSMISSION AND RECEPTION MODE | WHEN SETTING IS PERFORMED SUCH THAT TMOD=00B, TRANSMISSION AND RECEPTION MODE IS ENTERED. TRANSFER IS PERFORMED BY SET TRANSFER PROTOCOL. AT TIME OF TRANSMISSION, DATA FROM TRANSIT FIFO IS OUTPUT TO SSI_DOUT, AND DATA FROM SLAVE DEVICE IS INPUT FROM SSI_DIN AND STORED IN RECEIVE FIFO. |
| TRANSMISSION MODE | WHEN SETTING IS PERFORMED SUCH THAT TMOD=01B, TRANSMISSION MODE IS ENTERED. SSI_DIN INPUT DATA IS DISREGARDED, AND DOES NOT ENTER RECEIVE FIFO. BY SET TRANSMISSION PROTOCOL, DATA IS OUTPUT FROM TRANSMIT FIFO TO SSI_DOUT. |
| RECEPTION MODE | WHEN SETTING IS PERFORMED SUCH THAT TMOD=10B, RECEPTION MODE IS ENTERED. DATA PREVIOUSLY OUTPUT IS CONTINUOUSLY OUTPUT FROM SSI_DOUT. BY SET TRANSMISSION PROTOCOL, DATA IS INPUT FROM SSI_DIN AND STORED IN RECEIVE FIFO. |
| EEPROM READ MODE | WHEN SETTING IS PERFORMED SUCH THAT TMOD=11B, EEPROM READ MODE IS ENTERED. HERE, TRANSMISSION DATA IS VALID, AND OP CODE AND ADDRESS ARE OUTPUT TO EEPROM. NORMALLY, THREE DATA FRAMES (8-BIT OP CODE AND 16-BIT ADDRESS DATA) ARE OUTPUT. HERE, DATA INPUT FROM SSI_DIN IS DISREGARDED. AFTER COMPLETION OF OUTPUT OF NECESSARY DATA FROM SSI_DOUT, DATA FROM EEPROM IS INPUT TO SSI_DIN, AND STORED IN RECEIVE FIFO. EEPROM READING IS PERFORMED UNTIL RECEPTION OF NUMBER OF FRAME DATA SET IN NDF FIELD OF CTRLR1 REGISTER IS COMPLETED. |

FIG.104

| REGISTER NAME | OFFSET | R/W | BIT | DESCRIPTION | INITIAL VALUE |
|---|---|---|---|---|---|
| CTRLR0 | 0x00 | R/W | 16 | WHEN SERIAL DATA TRANSFER CONTROL REGISTER 0 AND SSI OPERATION IS ENABLED, WRITING CANNOT BE PERFORMED. CONTROL IS PREFERABLY PERFORMED BY SSIENIR REGISTER. CTRLR0[15:12] (CFSI) LENGTH OF CONTROL DATA IN Microwire FRAME FORMAT IS SET. "CFS[3:0]+1" BIT BECOMES CONTROL BIT LENGTH. CTRLR0[11] (SRL) IT IS ONLY USED DURING TEST. WHEN "1" IS SET, OUTPUT OF TRANSMISSION SHIFT REGISTER ENTERS INPUT OF RECEPTION SHIFT REGISTER. SETTING OF "0" RESULTS IN NORMAL MODE. CTRLR0[10] PREFERABLY, "0" IS CONSTANTLY WRITTEN. CTRLR0[9:8] (TMOD) TRANSFER MODE IS SET. "00b" : TRANSMISSION AND RECEPTION "01b" TRANSMISSION ONLY "10b" : RECEPTION ONLY "11b" EEPROM READ CTRLR0[7] (SCPOL) INTERACTIVE LEVEL OF SERIAL CLOCK IN SPI MODE IS SET. "0" : LOW IS INACTIVE "1" : HIGH IS INACTIVE CTRLR0[6] (SCPH) DATA TRANSFER TIMING IN SPI MODE IS SET. "0" : CLOCKS ARE TOGGLED AT INTERMEDIATE OF FIRST DATA WHEN SSI_CSBn IS ACTIVE "1" : CLOCKS ARE TOGGLED SIMULTANEOUSLY AT TIME OF FIRST DATA CHANGE WHEN SSI_CSBn IS ACTIVE CTRLR0[5:4] (FRF) FRAME FORMAT OF SERIAL TRANSFER IS SET. "00b" : SPI MODE "01b" : SSP MODE "10b" Microwire MODE IT IS NECESSARY TO PREVENT "11B" FROM BEING SET. CTRLR0[3:0] (DFS) DATA FRAME SIZE (BIT WIDTH) TO BE TRANSFERRED IS SET. IT IS NECESSARY TO PREVENT "0000b" to "0010b" FROM BEING SET. WHEN "0011b" to "1111b" IS SET, TRANSFER OF BIT WIDTH OF SETTING VALUE PLUS +1 IS PERFORMED. HERE, LSB ALIGNING IS PERFORMED, AND "0b" FILLING IS PERFORMED AT BIT WIDTH SETTING OF LESS THAN 16 BITS. AT TIME OF TRANSMISSION, DATA THAT UNDERGONE LSB ALIGNING IS ALSO PREFERABLY WRITTEN INTO TRANSMIT FIFO. | 0x0000 |
| CTRLR1 | 0x04 | R/W | 16 | WHEN SERIAL DATA TRANSFER CONTROL REGISTER 1 AND SSI OPERATION IS ENABLED, WRITING CANNOT BE PERFORMED. CONTROL IS PREFERABLY PERFORMED BY SSIENR REGISTER. IN RECEIVE MODE, ONLY WHEN TMOD IS "10b" OR "11b" IT IS VALID. CONTINUOUS RECEPTION CAN BE PERFORMED UNTIL FRAME NUMBER OF VALUE SET BY THIS REGISTER PLUS +1. | 0x0000 |
| SSIENR | 0x08 | R/W | 1 | IT IS REGISTER CONTROLLING ENABLING AND DISABLING OF SSI OPERATION. | 0b |
| MWCR | 0x0C | R/W | 3 | IT IS REGISTER THAT SETS DATA TRANSFER DIRECTION AT TIME OF HALF-DUPLEX PROTOCOL OF Microwire MODE. WRITING CANNOT BE PERFORMED WHEN SSI OPERATION IS ENABLED. CONTROL IS PREFERABLY PERFORMED BY SSIENR REGISTER. MWCR[2] (MHS) IN Microwire MODE. "ready/busy" HANDSHAKE OPERATION IS TURNED ON AND OFF. WHEN IT IS TURNED ON, BEFORE BUSY BIT OF SR REGISTER IS CLEARED, WHETHER TARGET SLAVE DEVICE IS READY IS CHECKED. "0" : HANDSHAKE OFF "1" : HANDSHAKE ON MWCR[1] (MDD) DATA TRANSFER DIRECTION IN Microwire MODE IS SET. "0" : RECEPTION MODE "1" : TRANSMISSION MODE MWCR[0] (MWMOD) SEQUENTIAL AND NON-SEQUENTIAL TRANSFER IN Microwire MODE ARE CONTROLLED. WHEN SEQUENTIAL TRANSFER IS SET, CONTROL WORD IS NECESSARY ONCE AT FIRST IN DATA BLOCK; AT NON-SEQUENTIAL TRANSFER, CONTROL WORD IS NECESSARY FOR EACH OF DATA WORD TRANSFER. "0" : NON-SEQUENTIAL TRANSFER "1" : SEQUENTIAL TRANSFER | 000b |

FIG.105

| REGISTER NAME | OFFSET | R/W | BIT | DESCRIPTION | INITIAL VALUE |
|---|---|---|---|---|---|
| SER | 0x10 | R/W | 2 | IT IS SLAVE SELECT SETTING REGISTER. WHEN SSI OPERATION IS ENABLED, WRITING CANNOT BE PERFORMED. CONTROL IS PREFERABLY PERFORMED BY SSIENR REGISTER. BIT 0 CORRESPONDS TO SSI_CSB0, AND BIT 1 CORRESPONDS TO SSI_CSB1. EVEN WHEN THIS BIT IS ENABLED, SSI_CSBn TERMINAL IS NOT CHANGED UNTIL TRANSFER IS STARTED. | 00b |
| BAUDR | 0x14 | R/W | 16 | IT IS REGISTER THAT SETS FREQUENCY OF SERIAL CLOCKS. VALUE BY WHICH FREQUENCY OF SYS_CLK IS DIVIDED IS SET BY 16 BITS. EVEN VALUE FROM 2 TO 65534 IS PREFERABLY SET. LSB IS DISREGARDED. | 0x0001 |
| TXFTLR | 0x18 | R/W | 4 | NUMBER OF INTERRUPT THRESHOLD DATA OF TRANSMIT FIFO IS SET. WHEN SSI OPERATION IS ENABLED, WRITING CANNOT BE PERFORMED. CONTROL IS PREFERABLY PERFORMED BY SSIENR REGISTER. SETTING VALUE FROM 2 TO 15 IS PREFERABLY SET. WHEN VALUE EQUAL TO OR LESS THAN SETTING VALUE IS TRANSMITTED, INTERRUPT OCCURS. | 0x0 |
| RXFTLR | 0x1C | R/W | 4 | NUMBER OF INTERRUPT THRESHOLD DATA OF RECEIVE FIFO IS SET. WHEN SSI OPERATION IS ENABLED, WRITING CANNOT BE PERFORMED. CONTROL IS PREFERABLY PERFORMED BY SSIENR REGISTER. SETTING VALUE FROM 2 TO 15 IS PREFERABLY SET. WHEN VALUE EQUAL TO OR LESS THAN SETTING VALUE IS RECEIVED, INTERRUPT OCCURS. | 0x0 |
| TXFLR | 0x20 | R | 5 | IT IS REGISTER THAT READS NUMBER OF EFFECTIVE DATA OF TRANSMIT FIFO. | 00000b |
| RXFLR | 0x24 | R | 5 | IT IS REGISTER THAT READS NUMBER OF EFFECTIVE DATA OF RECEIVE FIFO. | 00000b |
| SR | 0x28 | R | 7 | IT IS STATUS REGISTER THAT STORES TRANSFER STATE, FIFO STATE AND TRANSMISSION AND RECEPTION ERROR STATE. TIMING OF READING IS NOT LIMITED. EACH FLAG HAS NO INTERRUPT FUNCTION.<br>SR[6] (DCOL) DATA COLLISION ERROR FLAG (COLLISION WITH ANOTHER MASTER IS CONSIDERED) IT IS CLEARED BY READING THIS REGISTER.<br>"0" : ERROR IS NOT PRESENT "1" : COLLISION OF DATA IS PRESENT<br>SR[5] (TXE) TRANSMISSION ERROR; WHEN TRANSIT FIFO PERFORMS TRANSMISSION IN EMPTY STATE, THIS RESULTS IN ERROR. IT IS CLEARED BY READING THIS REGISTER.<br>"0" : ERROR IS NOT PRESENT "1" : TRANSMISSION ERROR<br>SR[4] (RFF) WHEN RECEIVE FIFO IS FULL, "1" IS READ. WHEN RECEIVE FIFO IS READ AND IS THEREFORE NOT FULL, "0" IS READ.<br>SR[3] (RFNE) WHEN RECEIVE FIFO IS NOT EMPTY, "1" IS READ. IT IS WHEN ALL DATA OF RECEIVE FIFO IS READ AND FIFO IS THUS EMPTY THAT "0" IS READ.<br>SR[2] (TFE) WHEN TRANSMIT FIFO IS EMPTY, "1" IS READ. WHEN DATA OF TRANSMIT FIFO IS TRANSMITTED AND IT IS THUS EMPTY, "1" IS READ. OTHERWISE, "0" IS READ.<br>SR[1] (TFNF) WHEN TRANSMIT FIFO IS NOT FULL, "1" IS READ. WHEN TRANSMISSION DATA IS WRITTEN INTO TRANSMIT FIFO AND FIFO IS THUS FULL, "0" IS READ.<br>SR[0] (BUSY) DURING DATA TRANSFER, "1" IS READ; WHEN SSI IS IN IDLE STATE OR CANNOT BE OPERATED, "0" IS READ. | 0000110b |
| IMR | 0x2C | R/W | 6 | IT IS INTERRUPT MASK REGISTER. INTERRUPT IS MASKED AT "1".<br>IMR[5] MASK BIT OF MSTIR   IMR[4] MASK BIT OF RXFIR<br>IMR[3] MASK BIT OF RXOIR   IMR[2] MASK BIT OF MSTIR<br>IMR[1] MASK BIT OF RXFIR   IMR[0] MASK BIT OF RXOIR | 0x3F |
| ISR | 0x30 | R | 6 | IT IS INTERRUPT STATUS REGISTER. STATE AFTER MASKING OF CIRCUIT IS HELD.<br>ISR[5] STATE AFTER MSTIR IS MASKED   ISR[4] STATE AFTER RXFIR IS MASKED<br>ISR[3] STATE AFTER RXOIR IS MASKED   ISR[2] STATE AFTER MSTIR IS MASKED<br>ISR[1] STATE AFTER RXFIR IS MASKED   ISR[0] STATE AFTER RXOIR IS MASKED | 0x00 |

FIG.106

| REGISTER NAME | OFFSET | R/W | BIT | DESCRIPTION | INITIAL VALUE |
|---|---|---|---|---|---|
| RISR | 0x34 | R | 6 | IT IS INTERRUPT STATUS REGISTER BEFORE MASKING.<br>RISR[5] MSTIR STATUS OF MULTI-MASTER COLLISION INTERRUPT IS HELD.<br>RISR[4] RXFIR STATUS OF RECEIVE FIFO FULL INTERRUPT IS HELD.<br>RISR[3] RXOIR STATUS OF RECEIVE FIFO OVERFLOW INTERRUPT IS HELD.<br>RISR[2] RXUIR STATUS OF RECEIVE FIFO UNDERFLOW INTERRUPT IS HELD.<br>RISR[1] TXOIR STATUS OF TRANSMIT FIFO OVERFLOW INTERRUPT IS HELD.<br>RISR[0] TXEIR STATUS OF TRANSMIT FIFO EMPTY INTERRUPT IS HELD. | 0x00 |
| TXOICR | 0x38 | R | 1 | IT IS TRANSMIT FIFO OVERFLOW INTERRUPT CLEAR REGISTER. BY READING THIS REGISTER, TRANSMIT FIFO OVERFLOW INTERRUPT STATUS IS CLEARED. | 0b |
| RXOICR | 0x3C | R | 1 | IT IS RECEIVE FIFO OVERFLOW INTERRUPT CLEAR REGISTER. BY READING THIS REGISTER, RECEIVE FIFO OVERFLOW INTERRUPT STATUS IS CLEARED. | 0b |
| RXUICR | 0x40 | R | 1 | IT IS RECEIVE FIFO UNDERFLOW INTERRUPT CLEAR REGISTER. BY READING THIS REGISTER, RECEIVE FIFO UNDERFLOW INTERRUPT STATUS IS CLEARED. | 0b |
| MSTICR | 0x44 | R | 1 | IT IS MULTI-MASTER COLLISION INTERRUPT CLEAR REGISTER. BY READING THIS REGISTER, MULTI-MASTER COLLISION INTERRUPT STATUS IS CLEARED. | 0b |
| ICR | 0x48 | R | 1 | STATES OF TXO, RXO AND MST INTERRUPTS ARE READ, AND HIGH-LEVEL INTERRUPT STATUS IS CLEARED. | 0b |
| IDR | 0x58 | R | 32 | PERIPHERAL ID CODE IS READ. | 0xFFFFFFFF |
| SSI_COMP_VERSION | 0x5C | R | 32 | VERSION OF SSI CIRCUIT IS READ. | 0x0000 |
| DR | 0x60-0x9C | R/W | 16 | WRITING ALLOWS DATA PUSH OPERATION TO TRANSMIT FIFO; READING ALLOWS DATA POP OPERATION FROM RECEIVE FIFO. WHEN SSI_EN="1", IT IS VALID; WHEN SSI_EN="0", BUFFER IS CLEARED. DATA READING AND WRITING IS PERFORMED WITH LSB ALIGNED.<br>WHEN 4 BYTE WORD ADDRESS OF OFFSET ADDRESS IS USED, NO MATTER WHAT ADDRESS IS ACCESSED, IT IS POSSIBLE TO ACCESS RECEIVE FIFO OR TRANSMIT FIFO SIMILARLY. | 0x0000 |

FIG.112

| OPERATION MODE | OPERATION |
|---|---|
| READY | CLOCKS ARE SUPPLIED TO IMAGE PROCESSING BLOCK OF BU1511KV2. WHEN DEDICATED BLOCK IS CONTROLLED IN MODE OTHER THREE MODES BELOW, THIS MODE IS USED. PERFORM TRANSFER BETWEEN MODES AFTER ONCE THROUGH READY MODE. |
| NORMAL-VIEWER | WHEN SETTING OF Camera I/F AND VIDEO-Encoder IS PERFORMED BEFORE TRANSFER OF MODE, CAMERA IMAGES ARE AUTOMATICALLY CAPTURED, AND OUTPUT TO TV IS PERFORMED. IN THIS CASE, IMAGE USING TRANSPARENT COLOR SETTING IS WRITTEN, AND THUS IT IS ALSO POSSIBLE TO PERFORM OVERLAY OTHER THAN FONT AND RECTANGLE OF IMAGE ON IMAGE OUTPUT TO TV. |
| JPEG-DECODE | BY WRITING JPEG COMPRESSION DATA INTO JPEG CODE MEMORY OF IMAGE PROCESSING BLOCK, JPEG DECODING IS PERFORMED. DECOMPRESSED DATA IS STORED IN FRAME MEMORY THROUGH Camera I/F. IN THIS CASE, IMAGE USING TRANSPARENT COLOR SETTING IS WRITTEN, AND THUS IT IS ALSO POSSIBLE TO PERFORM OVERLAY OTHER THAN FONT AND RECTANGLE OF IMAGE ON IMAGE OUTPUT TO TV. |
| CAMERA-JPEG | IMAGE DATA FROM CAMERA IS JPEG COMPRESSED. COMPRESSED DATA IS STORED I CODE MEMORY, AND CODE MEMORY IS USED AS RING BUFFER. JPEG COMPRESSION IS STARTED AT FRAME IMMEDIATELY AFTER TRANSFER TO MAIN MODE, AND JPEG COMPRESSION IS CONTINUOUSLY PERFORMED UNTIL MAIN MODE TRANSFERS TO ANOTHER MODE. |

FIG.113

| A3 | A2 | OPERATION |
|---|---|---|
| "1" | "0" | ACCESS TO INDEX REGISTER |
| "1" | "1" | ACCESS TO ANOTHER REGISTER |
| "0" | X | ACCESS INVALID |

"X" : Don't care

FIG.114

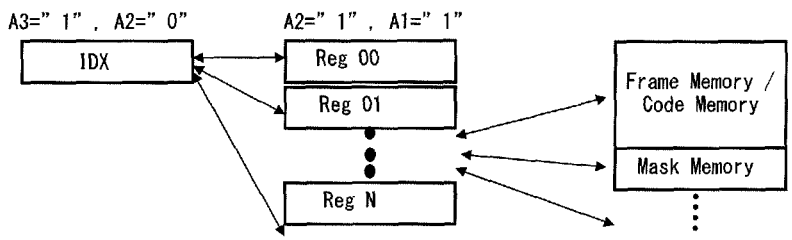

FIG.115

- INDEX REGISTER: IDX    A3= "1" , A2= "0"

| Bit No. | 15 | 14 | 13 | 12 | 11 | 10 | 9 | 8 |
|---|---|---|---|---|---|---|---|---|
| Name | IDX[15:8] | | | | | | | |
| INITIAL VALUE | 0000_0000b[R/W] | | | | | | | |

| Bit No. | 7 | 6 | 5 | 4 | 3 | 2 | 1 | 0 |
|---|---|---|---|---|---|---|---|---|
| Name | IDX[7:0] | | | | | | | |
| INITIAL VALUE | 0000_0000b[R/W] | | | | | | | |

FIG.116

- CLOCK CONTROL REGISTER:CLKCNT      IDX_ADDRESS:00D0h

| Bit No. | 15 | 14 | 13 | 12 | 11 | 10 | 9 | 8 |
|---|---|---|---|---|---|---|---|---|
| Name | - | - | - | - | AUD_EN | - | - | - |
| INITIAL VALUE | - | - | - | - | 0[R/W] | - | - | - |

| Bit No. | 7 | 6 | 5 | 4 | 3 | 2 | 1 | 0 |
|---|---|---|---|---|---|---|---|---|
| Name | - | - | - | - | TE_EN | SCKEN | SD_EN | CMCKEN |
| INITIAL VALUE | - | - | - | - | 0[R/W] | 0[R/W] | 0[R/W] | 0[R/W] |

FIG.117

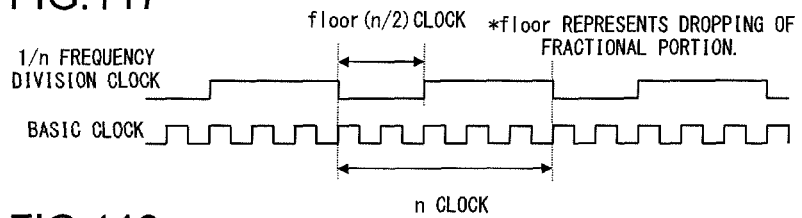

1/n FREQUENCY DIVISION CLOCK floor(n/2) CLOCK *floor REPRESENTS DROPPING OF FRACTIONAL PORTION.

BASIC CLOCK n CLOCK

FIG.118

- CLOCK FREQUENCY DIVISION REGISTER 1:CLKDIV1      IDX_ADDRESS:00D1h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | - | - | - | - | SCLKDV[3:0] | | | |
| INITIAL VALUE | 0 | 0 | 0 | 0 | 0000b[R/W] | | | |

FIG.119

- CLOCK FREQUENCY DIVISION REGISTER 3:CLKDIV3      IDX_ADDRESS:00D3h

| Bit No. | 15 | 14 | 13 | 12 | 11 | 10 | 9 | 8 |
|---|---|---|---|---|---|---|---|---|
| Name | - | - | - | - | - | - | - | CAMCLKO_DLY |
| INITIAL VALUE | 0 | 0 | 0 | 0 | 0 | 0 | 0 | 0[R/W] |

| Bit No. | 7 | 6 | 5 | 4 | 3 | 2 | 1 | 0 |
|---|---|---|---|---|---|---|---|---|
| Name | - | - | ACTSW[1:0] | | CMCKDV[3:0] | | | |
| INITIAL VALUE | 0 | 0 | 01b[R/W] | | 0000b[R/W] | | | |

FIG.120

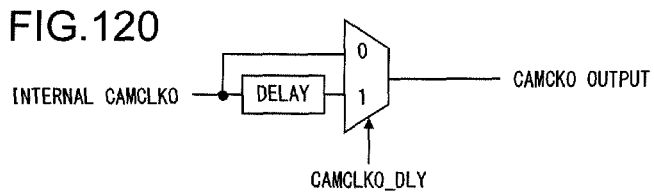

INTERNAL CAMCLKO → DELAY → CAMCKO OUTPUT

CAMCLKO_DLY

FIG.121

- CLOCK FREQUENCY DIVISION REGISTER 4:CLKDIV4    IDX_ADDRESS:00D4h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | - | - | - | - | - | - | - | TEDV |
| INITIAL VALUE | 0 | 0 | 0 | 0 | 0 | 0 | 0 | 0[R/W] |

FIG.122

- HARDWARE OPERATION MODE SETTING REGISTER:HWMODE    IDX_ADDRESS:00D8h

| Bit No. | 15 | 14 | 13 | 12 | 11 | 10 | 9 | 8 |
|---|---|---|---|---|---|---|---|---|
| Name | SD_OFF | - | - | CAMOFF | - | - | - | SUSP |
| INITIAL VALUE | 1[R/W] | - | - | 1[R/W] | - | - | - | 1[R/W] |

| Bit No. | 7 | 6 | 5 | 4 | 3 | 2 | 1 | 0 |
|---|---|---|---|---|---|---|---|---|
| Name | - | - | CAMACT | MODE_EN | HDMODE[3:0] | | | |
| INITIAL VALUE | - | - | 0[R] | 0[R/W] | 0000b[R/W] | | | |

FIG.123

| No. | HDMODE[3:0] | SUSP | OPERATION MODE | OPERATION |
|---|---|---|---|---|
| 1 | 0000b | * | READY | CLOCK IMG_CLK IS SUPPLIED TO IMAGE PROCESSING BLOCK, AND PART OF BLOCK IS OPERATING. |
| 2 | 0001b | 0 | NORMAL-VIEWER | CAPTURE OF CAMERA IMAGE AND TV ENCODER OPERATION ARE CONTINUOUSLY PERFORMED. |
| 3 | 0101b | 0 | JPEG-DECODE | JPEG DATA IS DECODED FROM CPU SIDE, AND IS STORED IN FRAME MEMORY. HERE, TV ENCODER OUTPUT CAN ALSO BE PERFORMED. |
| 4 | 0111b | 0 | CAMERA-JPEG | IMAGE DATA FROM CAMERA IS JPEG COMPRESSED. IN THAT CASE, FRAME MEMORY IS USED AS RING BUFFER. |

FIG.124

- INTERRUPT CONTROL REGISTER:INTCNT    IDX_ADDRESS:00D9h

| Bit No. | 15 | 14 | 13 | 12 | 11 | 10 | 9 | 8 |
|---|---|---|---|---|---|---|---|---|
| Name | - | - | - | - | - | - | - | - |
| Init | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | - | - | - | - | - | - | INT_POL | INT_SEL |
| Init | 0 | 0 | 0 | 0 | 0 | 0 | 1[R/W] | 0[R/W] |

FIG.125

- INTERRUPT STATUS REGISTER 1:INTST1    IDX_ADDRESS:00DAh

| Bit No. | 7 | 6 | 5 | 4 | 3 | 2 | 1 | 0 |
|---|---|---|---|---|---|---|---|---|
| Name | - | - | CAMST_INT | - | CAMVS_INT | CAMED_INT | - | - |
| INITIAL VALUE | 0 | 0 | 0[R/W] | 0 | 0[R/W] | 0[R/W] | 0 | 0 |

FIG.126

- INTERRUPT STATUS REGISTER 2: INTST2     IDX_ADDRESS: 00DCh

| Bit No. | 15 | 14 | 13 | 12 | 11 | 10 | 9 | 8 |
|---|---|---|---|---|---|---|---|---|
| Name | AUDIO_INT | – | TE_HOST_INT | – | – | SD_INT | – | – |
| INITIAL VALUE | 0[R] | – | 0[R/W] | 0 | 0 | 0[R] | 0 | – |

| Bit No. | 7 | 6 | 5 | 4 | 3 | 2 | 1 | 0 |
|---|---|---|---|---|---|---|---|---|
| Name | – | – | – | – | – | RING_INT | JD_ED_INT | JE_ED_INT |
| INITIAL VALUE | 0 | 0 | 0 | 0 | – | 0[R/W] | 0[R/W] | 0[R/W] |

FIG.127

- INTERRUPT MASK REGISTER 1: INTMSK1     IDX_ADDRESS: 00DBh

| Bit No. | 15 | 14 | 13 | 12 | 11 | 10 | 9 | 8 |
|---|---|---|---|---|---|---|---|---|
| Name | – | – | RESERVE | RESERVE | RESERVE | – | – | – |
| INITIAL VALUE | – | – | 1 | 1 | 1 | 0 | 0 | 0 |

| Bit No. | 7 | 6 | 5 | 4 | 3 | 2 | 1 | 0 |
|---|---|---|---|---|---|---|---|---|
| Name | – | – | CAMST_MSK | – | CAMVS_MSK | CAMED_MSK | – | – |
| INITIAL VALUE | 0 | 0 | 1[R/W] | 0 | 1[R/W] | 1[R/W] | – | – |

FIG.128

- INTERRUPT STATUS REGISTER 2: INTMSK2     IDX_ADDRESS: 00DDh

| Bit No. | 15 | 14 | 13 | 12 | 11 | 10 | 9 | 8 |
|---|---|---|---|---|---|---|---|---|
| Name | AUDIO_MSK | – | TE_HOST_MSK | RESERVE | RESERVE | SD_MSK | RESERVE | – |
| INITIAL VALUE | 1[R/W] | – | 1[R/W] | 1 | 1 | 1[R/W] | 0 | – |

| Bit No. | 7 | 6 | 5 | 4 | 3 | 2 | 1 | 0 |
|---|---|---|---|---|---|---|---|---|
| Name | RESERVE | RESERVE | – | RESERVE | – | RING_MSK | JD_ED_MSK | JE_ED_MSK |
| INITIAL VALUE | 1 | 1 | 0 | 1 | – | 1[R/W] | 1[R/W] | 1[R/W] |

FIG.129

| NO. | ACCESSIBLE TARGET | ACCESS METHOD (CONTENTS) |
|---|---|---|
| 1 | IMAGE PROCESSING BLOCK INTERNAL REGISTER | ADDRESS (IMAGE PROCESSING BLOCK OF BU1511KV2) DESIRING ACCESS TO INDEX REGISTER (IDX) IS SET, AND ACCESS TO IMAGE PROCESSING BLOCK IS PERFORMED BY INDIRECT ADDRESSING WHERE ITS INITIAL VALUE IS ADDRESS. |
| 2 | IMAGE PROCESSING BLOCK INTERNAL FRAME MEMORY JPEG CODE MEMORY | ACCESS FROM HOST TO FRAME MEMORY IS PERFORMED THROUGH INTERNAL REGISTER. HERE, ACCESS CAN BE PERFORMED IN WHICHEVER FORMATS OF YUV/RGB. IN WRITING OR READING, ACCESS IS NEEDED IN UNITS OF TWO PIXELS HORIZONTALLY. |
| 3 | CAMERA MODULE (SHOOTING DATA) | PARALLEL INTERFACE (8 BITS) SHOOTING DATA STORED FROM HOST IN FRAME MEMORY THROUGH INTERNAL REGISTER IS READ. |
| 4 | CAMERA MODULE (CONTROL, STATE) / TV ENCODER IC | ACCESS FROM TWO-LINE SERIAL HOST THROUGH INTERNAL REGISTER IS PERFORMED. |

FIG.131

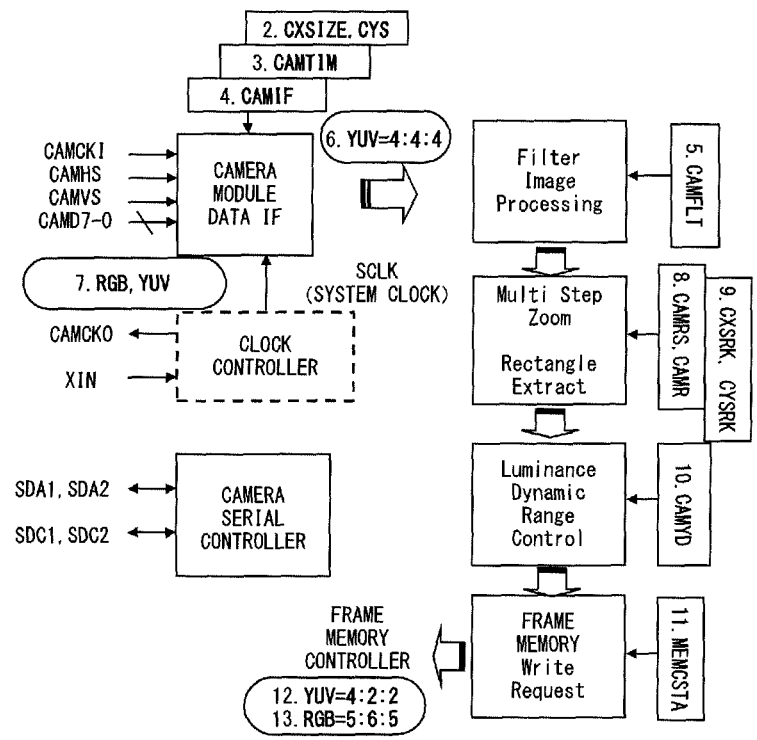

FIG.132

| SIGNAL NAME | I/O | Active | FUNCTION |
|---|---|---|---|
| CAMCKO | Out | CLK | CLOCK SUPPLIED TO CAMERA MODULE |
| CAMD0-CAMD7 | In | DATA | DATA INPUT FROM CAMERA MODULE (ORDER OF DATA INPUT AND TYPES OF COLOR COMPONENTS CAN BE SET BY REGISTER) |
| CAMVS | In | * | VERTICAL SYNCHRONOUS SIGNAL FROM CAMERA MODULE |
| CAMHS | In | * | HORIZONTAL SYNCHRONOUS SIGNAL FROM CAMERA MODULE |
| CAMCKI | In | * | DATA TRANSFER CLOCK INPUT FROM CAMERA MODULE |
| SDA1, SDA2 | In/Out | DATA | TWO-LINE SERIAL DATA OUTPUT TO CAMERA MODULE |
| SDC1, SDC2 | In/Out | CLK | TWO-LINE SERIAL COMMUNICATION SYNCHRONOUS CLOCK OUTPUT WITH CAMERA MODULE |

FIG.133

| OPERATION MODE | SECTION WHERE CAMCKI NEEDS TO BE INPUT |
|---|---|
| SUSPEND | CAMERA DOES NOT NEED TO BE OPERATED. |
| NORMAL-VIEWER | CAMCKI NEEDS TO BE CONSTANTLY INPUT. |
| JPEG-DECODE | CAMERA DOES NOT NEED TO BE OPERATED. |
| CAMERA-JPEG | AFTER WRITING OF JPEG START BIT, CAMCKI NEEDS TO BE INPUT UNTIL OCCURRENCE OF JPEG ENCODE COMPLETION INTERRUPT. |

FIG.134

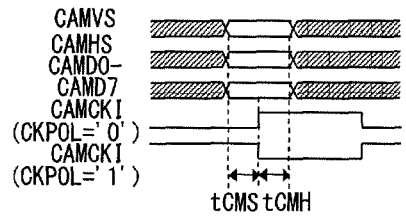

FIG.135

| Symbol | Function | MIN | TYP | MAX | Unit |
|---|---|---|---|---|---|
| tCMS | CAMERA SETUP TIME | 4 | - | - | nS |
| tCMH | CAMERA HOLD TIME | 4 | - | - | nS |

FIG.136

· CAMERA SIGNAL LOGICAL SETTING REGISTER:CAMIF    IDX_ADDRESS:0010h

| Bit No. | 15 | 14 | 13 | 12 | 11 | 10 | 9 | 8 |
|---|---|---|---|---|---|---|---|---|
| Name | CAMRST | RESERVE | RESERVE1 | - | - | VSPOL | HSPOL | CKPOL |
| INITIAL VALUE | 1[R/W] | 0 | 0 | 0 | 0 | 1[R/W] | 1[R/W] | 1[R/W] |

| Bit No. | 7 | 6 | 5 | 4 | 3 | 2 | 1 | 0 |
|---|---|---|---|---|---|---|---|---|
| Name | RGB | - | SUB_OFFSET | RGBORD[2:0] | | | YUVORD[1:0] | |
| INITIAL VALUE | 0[R/W] | 0 | 0[R/W] | 000b[R/W] | | | 00b[R/W] | |

FIG.137

· CAMERA SIGNAL FRAME START PIXEL POSITION REGISTER:CAMTIM    IDX_ADDRESS:0017h

| Bit No. | 15 | 14 | 13 | 12 | 11 | 10 | 9 | 8 |
|---|---|---|---|---|---|---|---|---|
| Name | CYS[7:0] | | | | | | | |
| INITIAL VALUE | 0000_0000b[R/W] | | | | | | | |

| Bit No. | 7 | 6 | 5 | 4 | 3 | 2 | 1 | 0 |
|---|---|---|---|---|---|---|---|---|
| Name | CXS[7:0] | | | | | | | |
| INITIAL VALUE | 0000_0000b[R/W] | | | | | | | |

FIG.138

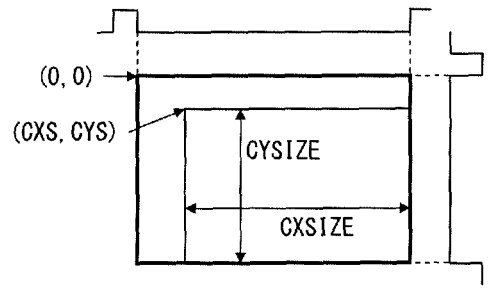

FIG.139

· CAMERA IMAGE FILTER PROCESSING SELECTION REGISTER: CAMFLT    IDX_ADDRESS:0011h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | – | – | – | – | – | | CAMFLT[2:0] | |
| INITIAL VALUE | 0 | 0 | 0 | 0 | 0 | | 00b[R/W] | |

FIG.140

| CAMFLT[2:0] | FILTER PROCESSING METHOD | REGISTER NECESSARY FOR PARAMETER SETTING |
|---|---|---|
| 000b | NO FILTER PROCESSING | NO REGISTER |
| 001b | TWO-STEP GRADATION | FLTTHD |
| 010b | GREY SCALE | NO REGISTER |
| 011b | SEPIA | FLTSEP, SEPRNG |
| 100b | EMBOSSING | FLTCOEF(FLTEBS) |
| 101b | EDGE EXTRACTION 1 *1 | FLTCOEF(FLTEDG1), FLTTHD |
| 110b | EDGE EXTRACTION 2 *2 | FLTEDG2 |
| 111b | NEGATIVE | NO REGISTER |

FIG.141

· CAMERA IMAGE TWO-STEP GRADATION PROCESSING THRESHOLD REGISTER:FLTTHD    IDX_ADDRESS:0012h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | FLTTHD[7:0] | | | | | | | |
| INITIAL VALUE | 0000_0000b[R/W] | | | | | | | |

FIG.142

· CAMERA IMAGE SEPIA PROCESSING COEFFICIENT REGISTER:FLTSEP    IDX_ADDRESS:0013h

| Bit No. | 15 | 14 | 13 | 12 | 11 | 10 | 9 | 8 |
|---|---|---|---|---|---|---|---|---|
| Name | \multicolumn{8}{c}{SEPIAR[7:0]} | | | | | | | |
| INITIAL VALUE | \multicolumn{8}{c}{0000_0000b[R/W]} | | | | | | | |

| Bit No. | 7 | 6 | 5 | 4 | 3 | 2 | 1 | 0 |
|---|---|---|---|---|---|---|---|---|
| Name | | | | SEPIAB[7:0] | | | | |
| INITIAL VALUE | | | | 0000_0000b[R/W] | | | | |

FIG.143

· CAMERA IMAGE SEPIA PROCESSING RANGE REGISTER: SEPRNG    IDX_ADDRESS:0014h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | – | – | – | | | SEPRNG[4:0] | | |
| INITIAL VALUE | 0 | 0 | 0 | | | 0_0000b[R/W] | | |

FIG.144

· CAMERA IMAGE PROCESSING EDGE EXTRACTION 1 COEFFICIENT REGISTER: FLTCOEF    IDX_ADDRESS:0015h

| Bit No. | 15 | 14 | 13 | 12 | 11 | 10 | 9 | 8 |
|---|---|---|---|---|---|---|---|---|
| Name | – | – | – | – | | FLTEDG1[3:0] | | |
| INITIAL VALUE | 0 | 0 | 0 | 0 | | 0000b[R/W] | | |

| Bit No. | 7 | 6 | 5 | 4 | 3 | 2 | 1 | 0 |
|---|---|---|---|---|---|---|---|---|
| Name | – | – | – | – | | FLTEBS[3:0] | | |
| INITIAL VALUE | 0 | 0 | 0 | 0 | | 0000b[R/W] | | |

FIG.145

· CAMERA IMAGE EDGE EXTRACTION 2 PROCESSING COEFFICIENT REGISTER: FLTEDG2    IDX_ADDRESS:0016h

| Bit No. | 15 | 14 | 13 | 12 | 11 | 10 | 9 | 8 |
|---|---|---|---|---|---|---|---|---|
| Name | – | – | – | – | | FLTEDG2[3:0] | | |
| INITIAL VALUE | 0 | 0 | 0 | 0 | | 0000b[R/W] | | |

| Bit No. | 7 | 6 | 5 | 4 | 3 | 2 | 1 | 0 |
|---|---|---|---|---|---|---|---|---|
| Name | – | | | EDG2OFS[6:0] | | | | |
| INITIAL VALUE | 0 | | | 000_0000b[R/W] | | | | |

FIG.146

· X-DIRECTION CAMERA IMAGE SIZE REGISTER:CXSIZE    IDX_ADDRESS:0018h

| Bit No. | 15 | 14 | 13 | 12 | 11 | 10 | 9 | 8 |
|---|---|---|---|---|---|---|---|---|
| Name | – | – | – | – | – | | CXSIZE[10:8] | |
| INITIAL VALUE | 0 | 0 | 0 | 0 | 0 | | 000b[R/W] | |

| Bit No. | 7 | 6 | 5 | 4 | 3 | 2 | 1 | 0 |
|---|---|---|---|---|---|---|---|---|
| Name | | | | CXSIZE[7:0] | | | | |
| INITIAL VALUE | | | | 0000_0000b[R/W] | | | | |

FIG.147

· Y-DIRECTION CAMERA IMAGE SIZE REGISTER:CYSIZE    IDX_ADDRESS:0019h

| Bit No. | 15 | 14 | 13 | 12 | 11 | 10 | 9 | 8 |
|---|---|---|---|---|---|---|---|---|
| Name | – | – | – | – | – | \multicolumn{3}{c}{CYSIZE[10:8]} | | |
| INITIAL VALUE | 0 | 0 | 0 | 0 | 0 | \multicolumn{3}{c}{000b[R/W]} | | |

| Bit No. | 7 | 6 | 5 | 4 | 3 | 2 | 1 | 0 |
|---|---|---|---|---|---|---|---|---|
| Name | \multicolumn{8}{c}{CYSIZE[7:0]} | | | | | | | |
| INITIAL VALUE | \multicolumn{8}{c}{0000_0000b[R/W]} | | | | | | | |

FIG.148

· X-DIRECTION CLIPPING START POSITION REGISTER:CAMRSX    IDX_ADDRESS:001Bh

| Bit No. | 15 | 14 | 13 | 12 | 11 | 10 | 9 | 8 |
|---|---|---|---|---|---|---|---|---|
| Name | – | – | – | – | – | \multicolumn{3}{c}{CAMRSX[10:8]} | | |
| INITIAL VALUE | 0 | 0 | 0 | 0 | 0 | \multicolumn{3}{c}{000b[R/W]} | | |

| Bit No. | 7 | 6 | 5 | 4 | 3 | 2 | 1 | 0 |
|---|---|---|---|---|---|---|---|---|
| Name | \multicolumn{8}{c}{CAMRSX[7:0]} | | | | | | | |
| INITIAL VALUE | \multicolumn{8}{c}{0000_0000b[R/W]} | | | | | | | |

FIG.149

· Y-DIRECTION CLIPPING START POSITION REGISTER:CAMRSY    IDX_ADDRESS:001Ch

| Bit No. | 15 | 14 | 13 | 12 | 11 | 10 | 9 | 8 |
|---|---|---|---|---|---|---|---|---|
| Name | – | – | – | – | – | \multicolumn{3}{c}{CAMRSY[10:8]} | | |
| INITIAL VALUE | 0 | 0 | 0 | 0 | 0 | \multicolumn{3}{c}{000b[R/W]} | | |

| Bit No. | 7 | 6 | 5 | 4 | 3 | 2 | 1 | 0 |
|---|---|---|---|---|---|---|---|---|
| Name | \multicolumn{8}{c}{CAMRSY[7:0]} | | | | | | | |
| INITIAL VALUE | \multicolumn{8}{c}{0000_0000b[R/W]} | | | | | | | |

FIG.150

· X-DIRECTION CLIPPING COMPLETION POSITION REGISTER:CAMREX    IDX_ADDRESS:001Dh

| Bit No. | 15 | 14 | 13 | 12 | 11 | 10 | 9 | 8 |
|---|---|---|---|---|---|---|---|---|
| Name | – | – | – | – | – | \multicolumn{3}{c}{CAMREX[10:8]} | | |
| INITIAL VALUE | 0 | 0 | 0 | 0 | 0 | \multicolumn{3}{c}{000b[R/W]} | | |

| Bit No. | 7 | 6 | 5 | 4 | 3 | 2 | 1 | 0 |
|---|---|---|---|---|---|---|---|---|
| Name | \multicolumn{8}{c}{CAMREX[7:0]} | | | | | | | |
| INITIAL VALUE | \multicolumn{8}{c}{0000_0000b[R/W]} | | | | | | | |

FIG.151

· Y-DIRECTION CLIPPING COMPLETION POSITION REGISTER:CAMREY    IDX_ADDRESS:001Eh

| Bit No. | 15 | 14 | 13 | 12 | 11 | 10 | 9 | 8 |
|---|---|---|---|---|---|---|---|---|
| Name | – | – | – | – | – | \multicolumn{3}{c}{CAMREY[10:8]} | | |
| INITIAL VALUE | 0 | 0 | 0 | 0 | 0 | \multicolumn{3}{c}{000b[R/W]} | | |

| Bit No. | 7 | 6 | 5 | 4 | 3 | 2 | 1 | 0 |
|---|---|---|---|---|---|---|---|---|
| Name | \multicolumn{8}{c}{CAMREY[7:0]} | | | | | | | |
| INITIAL VALUE | \multicolumn{8}{c}{0000_0000b[R/W]} | | | | | | | |

FIG.152
· BRIGHTNESS COMPONENT ENLARGEMENT SETTING REGISTER: CAMYD     IDX_ADDRESS: 001Fh

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | - | - | - | - | - | CAMYD[2:0] | | |
| INITIAL VALUE | 0 | 0 | 0 | 0 | 0 | 000b[R/W] | | |

FIG.153

| CAMYD | ENLARGEMENT FACTOR |
|---|---|
| 000b | ×100% |
| 001b | ×93.75 |
| 010b | ×87.5% |
| 011b | ×75% |
| 100b | ×112.5% |
| 101b | ×125% |
| 110b | ×150% |
| 111b | ×200% |

FIG.154
· X-DIRECTION REDUCTION FACTOR SETTING REGISTER: CXSRK     IDX_ADDRESS: 0021h

| Bit No. | 15 | 14 | 13 | 12 | 11 | 10 | 9 | 8 |
|---|---|---|---|---|---|---|---|---|
| Name | - | - | - | - | - | CXSRK[10:8] | | |
| INITIAL VALUE | 0 | 0 | 0 | 0 | 0 | 000b[R/W] | | |
| Bit No. | 7 | 6 | 5 | 4 | 3 | 2 | 1 | 0 |
| Name | CXSRK[7:0] | | | | | | | |
| INITIAL VALUE | 0000_0000b[R/W] | | | | | | | |

FIG.155
· Y-DIRECTION REDUCTION FACTOR SETTING REGISTER: CYSRK     IDX_ADDRESS: 0022h

| Bit No. | 15 | 14 | 13 | 12 | 11 | 10 | 9 | 8 |
|---|---|---|---|---|---|---|---|---|
| Name | - | - | - | - | - | CYSRK[10:8] | | |
| INITIAL VALUE | 0 | 0 | 0 | 0 | 0 | 000b[R/W] | | |
| Bit No. | 7 | 6 | 5 | 4 | 3 | 2 | 1 | 0 |
| Name | CYSRK[7:0] | | | | | | | |
| INITIAL VALUE | 0000_0000b[R/W] | | | | | | | |

FIG.156
· REDUCTION ALGORISM SETTING REGISTER: SRKTYPE     IDX_ADDRESS: 0023h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | - | - | - | YOFFSET | - | - | CYTYPE | CXTYPE |
| INITIAL VALUE | 0 | 0 | 0 | 0[R/W] | 0 | 0 | 0[R/W] | 0[R/W] |

FIG.157

| H1 | H2 | H3 | H4 | H5 |
|---|---|---|---|---|
| 0.25 | 0.5 | 1 | 0.5 | 0.25 |

FIG.158

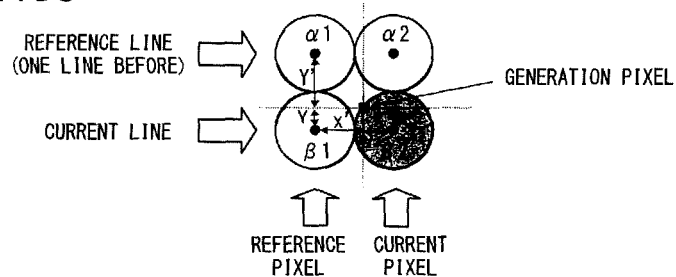

FIG.159

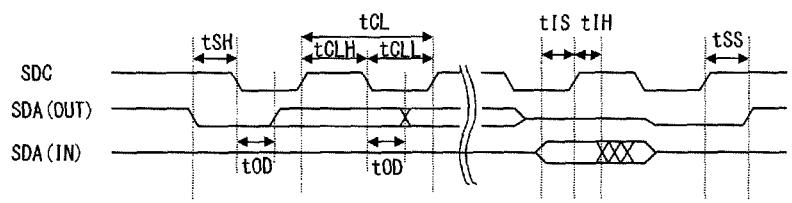

FIG.160

| SIGNAL | DETAIL | MINIMUM | STANDARD | MAXIMUM | UNIT |
|---|---|---|---|---|---|
| tCL | SDC CLOCK PERIOD | 34 | - | 514 | tIMG |
| tCLH | SDC CLOCK HIGH PERIOD | 18 | - | 258 | tIMG |
| tCLL | SDC CLOCK LOW PERIOD | 16 | - | 256 | tIMG |
| tSH | HOLD TIME OF START CONDITIONS | 29 | - | 285 | tIMG |
| tSS | SETUP TIME OF STOP CONDITIONS | 19 | - | 259 | tIMG |
| tOD | OUTPUT SDA DELAY AFTER FALLING EDGE OF SDC | 1 | - | - | tIMG |
| tIS | INPUT SDA SETUP TIME BEFORE RISING EDGE OF SDC | 20 | - | - | nS |
| tIH | INPUT SDA HOLD TIME AFTER RISING EDGE OF SDC | 10 | - | - | nS |

FIG.161

· SERIAL INTERFACE CONTROL REGISTER:SERICNT            IDX_ADDRESS:0060h

| Bit No. | 15 | 14 | 13 | 12 | 11 | 10 | 9 | 8 |
|---|---|---|---|---|---|---|---|---|
| Name | \multicolumn{8}{c|}{SERI_DAT[7:0]} | | | | | | | |
| INITIAL VALUE | \multicolumn{8}{c|}{0000_0000b[R/W]} | | | | | | | |

| Bit No. | 7 | 6 | 5 | 4 | 3 | 2 | 1 | 0 |
|---|---|---|---|---|---|---|---|---|
| Name | PERI_SDC[3:0] | | | | SERI_ST | SERI_BSY | ACK_STAT | SERI_RW |
| INITIAL VALUE | 0000b[R/W] | | | | 0[W] | 0[R] | 0[R] | 0[R/W] |

FIG.162

- SERIAL TRANSFER DEVICE ADDRESS SETTING REGISTER:SERIDEVADR    IDX_ADDRESS : 0061h

| Bit No. | 15 | 14 | 13 | 12 | 11 | 10 | 9 | 8 |
|---|---|---|---|---|---|---|---|---|
| Name | SERI_HZ | – | DEV_TYPE | SERI_EN | SERIB_SEL | – | SERI_DEVADR[9:8] | |
| INITIAL VALUE | 0[R/W] | 0 | 0[R/W] | 0[R/W] | 0[R/W] | 0 | 00b[R/W] | |

| Bit No. | 7 | 6 | 5 | 4 | 3 | 2 | 1 | 0 |
|---|---|---|---|---|---|---|---|---|
| Name | SERI_DEVADR[7:0] | | | | | | | |
| INITIAL VALUE | 0000_0000b[R/W] | | | | | | | |

FIG.163

| SERI_HZ | 0 | | 1 | |
|---|---|---|---|---|
| CAMOFF | 0 | 1 | 0 | 1 |
| SDA1, SDA2 | FUNCTIONAL OPERATION | 0 | High-Z | High-Z |
| SDC1, SDC2 | FUNCTIONAL OPERATION | 0 | High-Z | High-Z |

FIG.164

- SERIAL TRANSFER REGISTER ADDRESS SETTING REGISTER:SERI2NDADR    IDX_ADDRESS : 0062h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | SERI_2NDADR[7:0] | | | | | | | |
| INITIAL VALUE | 0000_0000b[R/W] | | | | | | | |

FIG.165

| INDEX | BIT | FLAG NAME | SEQUENCE TRANSFER | BYTE TRANSFER |
|---|---|---|---|---|
| 060h | [15:8] | SERI_DAT | VALID | INVALID |
| | [7:4] | PERI_SDC | VALID | VALID |
| | [3] | SERI_ST | VALID | INVALID |
| | [2] | SERI_BSY | VALID | VALID |
| | [1] | ACK_STAT | VALID | VALID |
| | [0] | SERI_RW | VALID | VALID |
| 061h | [15] | SERI_HZ | VALID | VALID |
| | [13] | DEV_TYPE | VALID | INVALID |
| | [12] | SERI_EN | VALID | VALID |
| | [11] | SERIB_SEL | SET AT 0 | SET AT 1 |
| | [9:0] | SERI_DEVADR | VALID | INVALID |
| 062h | [7:0] | SERI_2NDADR | VALID | INVALID |
| 063h | [15:8] | SERIB_DAT | INVALID | VALID |
| | [7] | ADD_START | INVALID | VALID |
| | [6] | ADD_STOP | INVALID | VALID |
| | [5] | NOACK | INVALID | VALID |
| | [4] | CONTINUE | INVALID | VALID |
| | [3] | SERIB_ST | INVALID | VALID |

FIG.166

· SERIAL INTERFACE BYTE CONTROL REGISTER: SERIBYTECNT      IDX_ADDRESS : 0063h

| Bit No. | 15 | 14 | 13 | 12 | 11 | 10 | 9 | 8 |
|---|---|---|---|---|---|---|---|---|
| Name | SERIB_DAT[7:0] | | | | | | | |
| INITIAL VALUE | 0000_0000b[R/W] | | | | | | | |

| Bit No. | 7 | 6 | 5 | 4 | 3 | 2 | 1 | 0 |
|---|---|---|---|---|---|---|---|---|
| Name | ADD_START | ADD_STOP | NOACK | CONTINUE | SERIB_ST | - | - | - |
| INITIAL VALUE | 0[R/W] | 0[R/W] | 0[R/W] | 0[R/W] | 0[W] | 0 | 0 | 0 |

FIG.167

```
ADD_START  1          0          0
ADD_STOP   0          0          1
NOACK      0          1          0
CONTINUE   1          1          0
```

SDC ⎍⎍⎍⎍⎍⎍⎍⎍ ⎍⎍⎍⎍⎍⎍⎍⎍ ⎍⎍⎍⎍⎍⎍⎍⎍

SDA ⌐ Read ⌐ Read ⌐ Read ⌐

START     ACK     ACK     ACK STOP

FIG.168

· FRAME MEMORY HORIZONTAL DIRECTION SIZE SETTING REGISTER: IMGHSIZE      IDX_ADDRESS : 0043h

| Bit No. | 15 | 14 | 13 | 12 | 11 | 10 | 9 | 8 |
|---|---|---|---|---|---|---|---|---|
| Name | - | - | - | - | - | - | - | IMGH[8] |
| INITIAL VALUE | 0 | 0 | 0 | 0 | 0 | 0 | 0 | 0[R/W] |

| Bit No. | 7 | 6 | 5 | 4 | 3 | 2 | 1 | 0 |
|---|---|---|---|---|---|---|---|---|
| Name | IMGH[7:0] | | | | | | | |
| INITIAL VALUE | 0000_0000b[R/W] | | | | | | | |

FIG.169

· FRAME MEMORY VERTICAL DIRECTION SIZE SETTING REGISTER: IMGVSIZE      IDX_ADDRESS : 0044h

| Bit No. | 15 | 14 | 13 | 12 | 11 | 10 | 9 | 8 |
|---|---|---|---|---|---|---|---|---|
| Name | - | - | - | - | - | - | - | IMGV[8] |
| INITIAL VALUE | 0 | 0 | 0 | 0 | 0 | 0 | 0 | 0[R/W] |

| Bit No. | 7 | 6 | 5 | 4 | 3 | 2 | 1 | 0 |
|---|---|---|---|---|---|---|---|---|
| Name | IMGV[7:0] | | | | | | | |
| INITIAL VALUE | 0000_0000b[R/W] | | | | | | | |

FIG.170

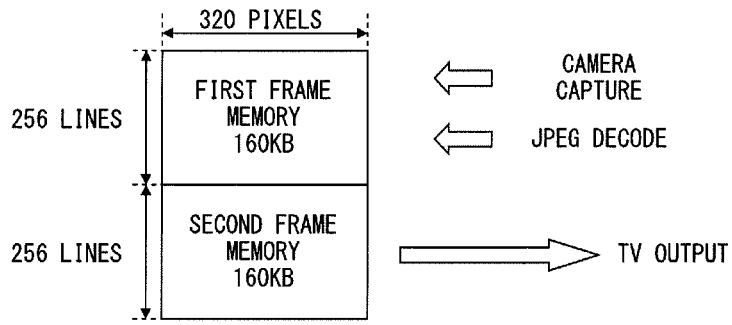

FIG.171
· MEMORY CONTROL REGISTER: MEMCNT      IDX_ADDRESS : 0030h

| Bit No. | 15 | 14 | 13 | 12 | 11 | 10 | 9 | 8 |
|---|---|---|---|---|---|---|---|---|
| Name | - | - | - | RGB_FRAME | - | ROT | VFLIP | HFLIP |
| INITIAL VALUE | 0 | 0 | 0 | 0[R/W] | 0 | 0[R/W] | 0[R/W] | 0[R/W] |

| Bit No. | 7 | 6 | 5 | 4 | 3 | 2 | 1 | 0 |
|---|---|---|---|---|---|---|---|---|
| Name | - | TRON | RESERVED | RESERVED | - | SWAP_BYT | INCMTH | - |
| INITIAL VALUE | 0 | 0[R/W] | 0 | 0 | 0 | 0[R/W] | 0[R/W] | 1 |

FIG.172
· CAMERA IMAGE STORAGE START X POSITION SETTING REGISTER: MEMCSTAX      IDX_ADDRESS : 0031h

| Bit No. | 15 | 14 | 13 | 12 | 11 | 10 | 9 | 8 |
|---|---|---|---|---|---|---|---|---|
| Name | - | - | - | - | - | - | - | MEMCSTA_X[8] |
| INITIAL VALUE | - | - | - | - | - | - | - | 0[R/W] |

| Bit No. | 7 | 6 | 5 | 4 | 3 | 2 | 1 | 0 |
|---|---|---|---|---|---|---|---|---|
| Name | | | | MEMCSTA_X[7:0] | | | | |
| INITIAL VALUE | | | | 0000_0000b[R/W] | | | | |

FIG.173
· CAMERA IMAGE STORAGE START Y POSITION SETTING REGISTER:MEMCSTAY      IDX_ADDRESS : 0032h

| Bit No. | 15 | 14 | 13 | 12 | 11 | 10 | 9 | 8 |
|---|---|---|---|---|---|---|---|---|
| Name | - | - | - | - | - | - | - | MEMCSTA_Y[8] |
| INITIAL VALUE | - | - | - | - | - | - | - | 0[R/W] |

| Bit No. | 7 | 6 | 5 | 4 | 3 | 2 | 1 | 0 |
|---|---|---|---|---|---|---|---|---|
| Name | | | | MEMCSTA_Y[7:0] | | | | |
| INITIAL VALUE | | | | 0000_0000b[R/W] | | | | |

FIG.174

· MEMORY ACCESS REGISTER YUV:MEMACS_YUV  IDX_ADDRESS : 0033h

| Bit No. | 15 | 14 | 13 | 12 | 11 | 10 | 9 | 8 |
|---|---|---|---|---|---|---|---|---|
| Name | MEMACS_YUV[15:8] | | | | | | | |
| INITIAL VALUE | ----_----b[R/W] | | | | | | | |

| Bit No. | 7 | 6 | 5 | 4 | 3 | 2 | 1 | 0 |
|---|---|---|---|---|---|---|---|---|
| Name | MEMACS_YUV[7:0] | | | | | | | |
| INITIAL VALUE | ----_----b[R/W] | | | | | | | |

FIG.175

| ORDER OF WRITING | MEMACS_YUV[15:8] | MEMACS_YUV[7:0] |
|---|---|---|
| 1 | Y[7:0] | U[7:0] |
| 2 | Y[7:0] | V[7:0] |

FIG.176

| ORDER OF READING | MEMACS_YUV[15:8] | MEMACS_YUV[7:0] |
|---|---|---|
| 1 | Y[7:0] | U[7:0] |
| 2 | Y[7:0] | V[7:0] |

FIG.177

· MEMORY ACCESS REGISTER RGB:MEMACS_RGB  IDX_ADDRESS : 0034h

| Bit No. | 15 | 14 | 13 | 12 | 11 | 10 | 9 | 8 |
|---|---|---|---|---|---|---|---|---|
| Name | MEMACS_RGB[15:8] | | | | | | | |
| INITIAL VALUE | ----_----b[R/W] | | | | | | | |

| Bit No. | 7 | 6 | 5 | 4 | 3 | 2 | 1 | 0 |
|---|---|---|---|---|---|---|---|---|
| Name | MEMACS_RGB[7:0] | | | | | | | |
| INITIAL VALUE | ----_----b[R/W] | | | | | | | |

FIG.178

| MEMACS_RGB[15:11] | MEMACS_RGB[10:5] | MEMACS_RGB[4:0] |
|---|---|---|
| R[5:1] | G[5:0] | B[5:1] |

FIG.179

| MEMACS_RGB[15:11] | MEMACS_RGB[10:5] | MEMACS_RGB[4:0] |
|---|---|---|
| R[5:1] | G[5:0] | B[5:1] |

FIG.180
- MEMORY ACCESS REGISTER ABS: MEMACS_ABS    IDX_ADDRESS : 0036h

| Bit No. | 15 | 14 | 13 | 12 | 11 | 10 | 9 | 8 |
|---|---|---|---|---|---|---|---|---|
| Name | \multicolumn{8}{c|}{MEMACS_ABS[15:8]} |
| INITIAL VALUE | \multicolumn{8}{c|}{----_----b[R/W]} |

| Bit No. | 7 | 6 | 5 | 4 | 3 | 2 | 1 | 0 |
|---|---|---|---|---|---|---|---|---|
| Name | \multicolumn{8}{c|}{MEMACS_ABS[7:0]} |
| INITIAL VALUE | \multicolumn{8}{c|}{----_----b[R/W]} |

FIG.181
- MEMORY RECTANGULAR ACCESS START X POSITION SETTING REGISTER:MEM_ADR_STX    IDX_ADDRESS : 0037h

| Bit No. | 15 | 14 | 13 | 12 | 11 | 10 | 9 | 8 |
|---|---|---|---|---|---|---|---|---|
| Name | – | – | – | – | – | – | – | MEM_ADR_S |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | \multicolumn{8}{c|}{MEM_ADR_STX[7:0]} |
| INITIAL VALUE | \multicolumn{8}{c|}{0000_0000b[R/W]} |

FIG.182
- MEMORY RECTANGULAR ACCESS START Y POSITION SETTING REGISTER:MEM_ADR_STY    IDX_ADDRESS : 0038h

| Bit No. | 15 | 14 | 13 | 12 | 11 | 10 | 9 | 8 |
|---|---|---|---|---|---|---|---|---|
| Name | – | – | – | – | – | – | – | MEM_ADR_S |
| INITIAL VALUE | 0 | 0 | 0 | 0 | 0 | 0 | 0 | 0[R/W] |

| Bit No. | 7 | 6 | 5 | 4 | 3 | 2 | 1 | 0 |
|---|---|---|---|---|---|---|---|---|
| Name | \multicolumn{8}{c|}{MEM_ADR_STY[7:0]} |
| INITIAL VALUE | \multicolumn{8}{c|}{0000_0000b[R/W]} |

FIG.183
- MEMORY RECTANGULAR ACCESS COMPLETION X POSITION SETTING REGISTER:MEM_ADR_EDX    IDX_ADDRESS : 0039h

| Bit No. | 15 | 14 | 13 | 12 | 11 | 10 | 9 | 8 |
|---|---|---|---|---|---|---|---|---|
| Name | – | – | – | – | – | – | – | MEM_ADR_E |
| INITIAL VALUE | 0 | 0 | 0 | 0 | 0 | 0 | 0 | 0[R/W] |

| Bit No. | 7 | 6 | 5 | 4 | 3 | 2 | 1 | 0 |
|---|---|---|---|---|---|---|---|---|
| Name | \multicolumn{8}{c|}{MEM_ADR_EDX[7:0]} |
| INITIAL VALUE | \multicolumn{8}{c|}{0000_0000b[R/W]} |

FIG.184
- MEMORY RECTANGULAR ACCESS COMPLETION Y POSITION SETTING REGISTER:MEM_ADR_EDY    IDX_ADDRESS : 003Ah

| Bit No. | 15 | 14 | 13 | 12 | 11 | 10 | 9 | 8 |
|---|---|---|---|---|---|---|---|---|
| Name | – | – | – | – | – | – | – | MEM_ADR_E |
| INITIAL VALUE | 0 | 0 | 0 | 0 | 0 | 0 | 0 | 0[R/W] |

| Bit No. | 7 | 6 | 5 | 4 | 3 | 2 | 1 | 0 |
|---|---|---|---|---|---|---|---|---|
| Name | \multicolumn{8}{c|}{MEM_ADR_EDX[7:0]} |
| INITIAL VALUE | \multicolumn{8}{c|}{0000_0000b[R/W]} |

FIG.185

| | 0 | | 1 | | 2 | | | 174 | | 175 (IMGH) | |
|---|---|---|---|---|---|---|---|---|---|---|---|
| | Y0 | U0 | Y1 | V0 | Y2 | U2 | | Y174 | U174 | Y175 | V174 |
| 0 | Pixel 0 | | Pixel 1 | | Pixel 2 | | | Pixel 174 | | Pixel 175 | |
| 1 | Pixel 176 | | Pixel 177 | | Pixel 178 | | | Pixel 350 | | Pixel 351 | |
| 2 | Pixel 352 | | Pixel 353 | | Pixel 354 | | | Pixel 526 | | Pixel 527 | |
| 218 | Pixel 38368 | | Pixel 38369 | | Pixel 38370 | | | Pixel 38542 | | Pixel 38543 | |
| 219 (IMGV) | Pixel 38544 | | Pixel 38545 | | Pixel 38546 | | | Pixel 38718 | | Pixel 38719 | |

$$ADR = IMGH * y + x \qquad (FORMULA: 4.2\text{-}1)$$

FIG.186

- MEMORY ABSOLUTE ADDRESS SETTING 1 REGISTER: MEM_ADR_ABS1    IDX_ADDRESS : 003Bh

| Bit No. | 15 | 14 | 13 | 12 | 11 | 10 | 9 | 8 |
|---|---|---|---|---|---|---|---|---|
| Name | \multicolumn{8}{c|}{MEM_ADR_ABS1[15:8]} |
| INITIAL VALUE | \multicolumn{8}{c|}{0000_0000b [R/W]} |
| Bit No. | 7 | 6 | 5 | 4 | 3 | 2 | 1 | 0 |
| Name | \multicolumn{8}{c|}{MEM_ADR_ABS1[7:0]} |
| INITIAL VALUE | \multicolumn{8}{c|}{0000_0000b [R/W]} |

FIG.187

- MEMORY ABSOLUTE ADDRESS SETTING 2 REGISTER: MEM_ADR_ABS2    IDX_ADDRESS : 003Ch

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | - | - | - | - | - | - | MEM_ADR_ABS2[1:0] | |
| INITIAL VALUE | 0 | 0 | 0 | 0 | 0 | 0 | 00b [R/W] | |

FIG.188

- MEMORY DATA TRANSPARENT COLOR SETTING REGISTER: MEMTRANS    IDX_ADDRESS : 003Dh

| Bit No. | 15 | 14 | 13 | 12 | 11 | 10 | 9 | 8 |
|---|---|---|---|---|---|---|---|---|
| Name | \multicolumn{8}{c|}{MEMTRANS[15:8]} |
| INITIAL VALUE | \multicolumn{8}{c|}{0000_0000b [R/W]} |
| Bit No. | 7 | 6 | 5 | 4 | 3 | 2 | 1 | 0 |
| Name | \multicolumn{8}{c|}{MEMTRANS[7:0]} |
| INITIAL VALUE | \multicolumn{8}{c|}{0000_0000b [R/W]} |

FIG.189
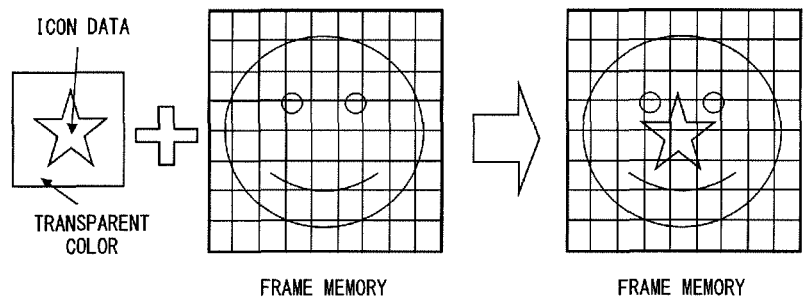
FIG.190
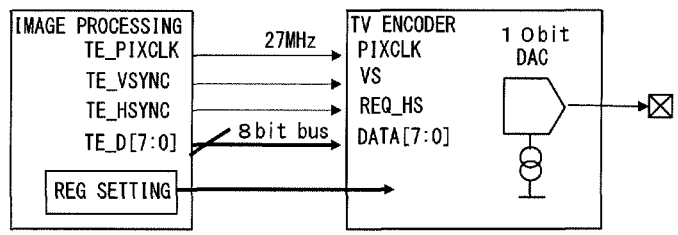
FIG.191
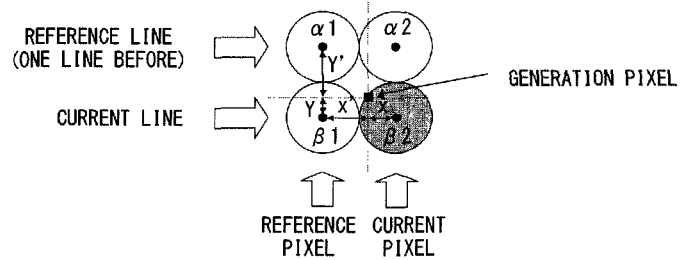
FIG.192

FIG.193

· TV ENCODER CONTROL REGISTER:TE_CNT            IDX_ADDRESS : 00B0h

| Bit No. | 15 | 14 | 13 | 12 | 11 | 10 | 9 | 8 |
|---|---|---|---|---|---|---|---|---|
| Name | OUT_FMT | - | - | TE_VIDEO_M | - | TE_VFLIP | TE_HFLIP | - |
| INITIAL VALUE | 0[R/W] | 0 | - | 0[R/W] | - | 0[R/W] | 0[R/W] | - |

| Bit No. | 7 | 6 | 5 | 4 | 3 | 2 | 1 | 0 |
|---|---|---|---|---|---|---|---|---|
| Name | \multicolumn | TE_BACK_COL[3:0] | | | - | - | ENC_ON[1:0] | |
| INITIAL VALUE | 0000b[R/W] | | | | 0 | 0 | 00b[R/W] | |

FIG.194

| ENC_ON | | OPERATION STATE |
|---|---|---|
| [1] | [0] | |
| 0 | 0 | OPERATION STOP |
| 0 | 1 | |
| 1 | 0 | BACKGROUND COLOR OUTPUT |
| 1 | 1 | FRAME MEMORY OUTPUT |

FIG.195

· TV ENCODER CONTROL REGISTER 2:TE_CNT2         IDX_ADDRESS : 00BDh

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | - | - | - | - | - | - | - | MODE_SHT |
| INITIAL VALUE | 0 | 0 | 0 | 0 | 0 | 0 | 0 | 0[R/W] |

FIG.196

· FRAME MEMORY TRANSFER X START POSITION:TE_STX      IDX_ADDRESS : 00B1h

| Bit No. | 15 | 14 | 13 | 12 | 11 | 10 | 9 | 8 |
|---|---|---|---|---|---|---|---|---|
| Name | - | - | - | - | - | - | - | TE_STX[8] |
| INITIAL VALUE | 0 | 0 | 0 | 0 | 0 | 0 | 0 | 0[R/W] |

| Bit No. | 7 | 6 | 5 | 4 | 3 | 2 | 1 | 0 |
|---|---|---|---|---|---|---|---|---|
| Name | TE_STX[7:0] | | | | | | | |
| INITIAL VALUE | 0000_0000b[R/W] | | | | | | | |

FIG.197

· FRAME MEMORY TRANSFER Y START POSITION:TE_STY      IDX_ADDRESS : 00B2h

| Bit No. | 15 | 14 | 13 | 12 | 11 | 10 | 9 | 8 |
|---|---|---|---|---|---|---|---|---|
| Name | - | - | - | - | - | - | - | TE_STY[8] |
| INITIAL VALUE | 0 | 0 | 0 | 0 | 0 | 0 | 0 | 0[R/W] |

| Bit No. | 7 | 6 | 5 | 4 | 3 | 2 | 1 | 0 |
|---|---|---|---|---|---|---|---|---|
| Name | TE_STY[7:0] | | | | | | | |
| INITIAL VALUE | 0000_0000b[R/W] | | | | | | | |

FIG.198

· FRAME MEMORY TRANSFER X COMPLETION POSITION:TE_EDX      IDX_ADDRESS : 00B3h

| Bit No. | 15 | 14 | 13 | 12 | 11 | 10 | 9 | 8 |
|---|---|---|---|---|---|---|---|---|
| Name | – | – | – | – | – | – | – | TE_EDX[8] |
| INITIAL VALUE | 0 | 0 | 0 | 0 | 0 | 0 | 0 | 0[R/W] |
| Bit No. | 7 | 6 | 5 | 4 | 3 | 2 | 1 | 0 |
| Name | TE_EDX[7:0] |||||||| 
| INITIAL VALUE | colspan 0000_0000b[R/W] ||||||||

FIG.199

· FRAME MEMORY TRANSFER Y COMPLETION POSITION:TE_EDY      IDX_ADDRESS : 00B4h

| Bit No. | 15 | 14 | 13 | 12 | 11 | 10 | 9 | 8 |
|---|---|---|---|---|---|---|---|---|
| Name | – | – | – | – | – | – | – | TE_EDY[8] |
| INITIAL VALUE | 0 | 0 | 0 | 0 | 0 | 0 | 0 | 0[R/W] |
| Bit No. | 7 | 6 | 5 | 4 | 3 | 2 | 1 | 0 |
| Name | TE_EDY[7:0] ||||||||
| INITIAL VALUE | colspan 0000_0000b[R/W] ||||||||

FIG.200

· HORIZONTAL DIRECTION ENLARGEMENT SETTING REGISTER:TE_EXPH      IDX_ADDRESS : 00B5h

| Bit No. | 15 | 14 | 13 | 12 | 11 | 10 | 9 | 8 |
|---|---|---|---|---|---|---|---|---|
| Name | – | – | – | – | – | – | TE_EXPH[9:8] ||
| INITIAL VALUE | 0 | 0 | 0 | 0 | 0 | 0 | colspan 00[R/W] ||
| Bit No. | 7 | 6 | 5 | 4 | 3 | 2 | 1 | 0 |
| Name | TE_EXPH[7:0] ||||||||
| INITIAL VALUE | colspan 0000_0000b[R/W] ||||||||

FIG.201

· VERTICAL DIRECTION ENLARGEMENT SETTING REGISTER:TE_EXPV      IDX_ADDRESS : 00B6h

| Bit No. | 15 | 14 | 13 | 12 | 11 | 10 | 9 | 8 |
|---|---|---|---|---|---|---|---|---|
| Name | – | – | – | – | – | – | TE_EXPV[9:8] ||
| INITIAL VALUE | 0 | 0 | 0 | 0 | 0 | 0 | colspan 00[R/W] ||
| Bit No. | 7 | 6 | 5 | 4 | 3 | 2 | 1 | 0 |
| Name | TE_EXPV[7:0] ||||||||
| INITIAL VALUE | colspan 0000_0000b[R/W] ||||||||

FIG.202

· TV ENCODER OUTPUT HORIZONTAL DIRECTION START
POSITION SETTING REGISTER:TE_OUTSTH      IDX_ADDRESS : 00B7h

| Bit No. | 15 | 14 | 13 | 12 | 11 | 10 | 9 | 8 |
|---|---|---|---|---|---|---|---|---|
| Name | – | – | – | – | – | – | TE_OUTSTH[9:8] ||
| INITIAL VALUE | 0 | 0 | 0 | 0 | 0 | 0 | colspan 0[R/W] ||
| Bit No. | 7 | 6 | 5 | 4 | 3 | 2 | 1 | 0 |
| Name | TE_OUTSTH[7:0] ||||||||
| INITIAL VALUE | colspan 0000_0000b[R/W] ||||||||

FIG.203
· TV ENCODER OUTPUT VERTICAL DIRECTION START
POSITION SETTING REGISTER:TE_OUTSTV    IDX_ADDRESS : 00B8h
| Bit No. | 15 | 14 | 13 | 12 | 11 | 10 | 9 | 8 |
|---|---|---|---|---|---|---|---|---|
| Name | - | - | - | - | - | - | - | TE_OUTSTV |
| INITIAL VALUE | 0 | 0 | 0 | 0 | 0 | 0 | 0 | 0[R/W] |
| Bit No. | 7 | 6 | 5 | 4 | 3 | 2 | 1 | 0 |
|---|---|---|---|---|---|---|---|---|
| Name | TE_OUTSTV [7:0] | | | | | | | |
| INITIAL VALUE | 0000_0000b[R/W] | | | | | | | |
FIG.204
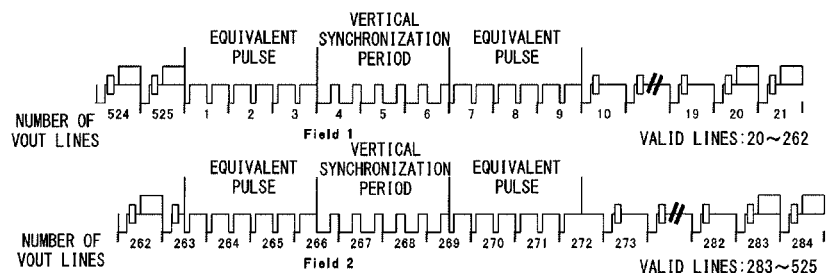
FIG.205
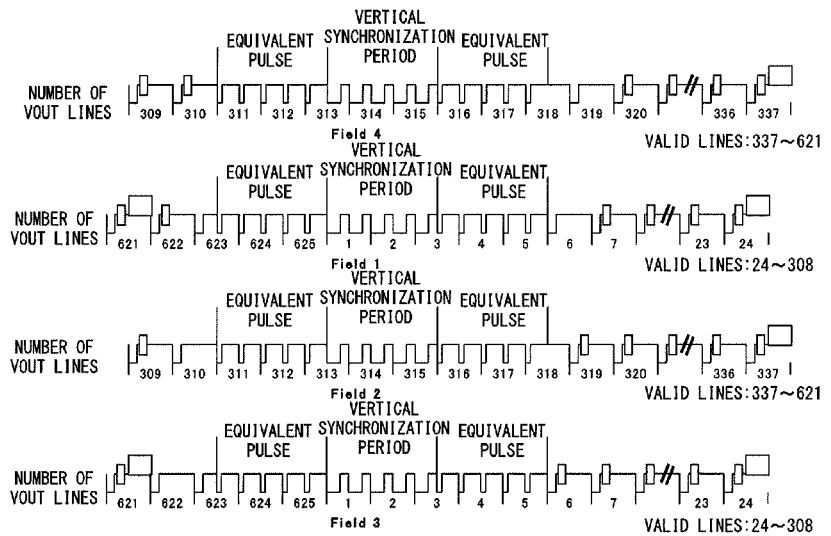

FIG.206
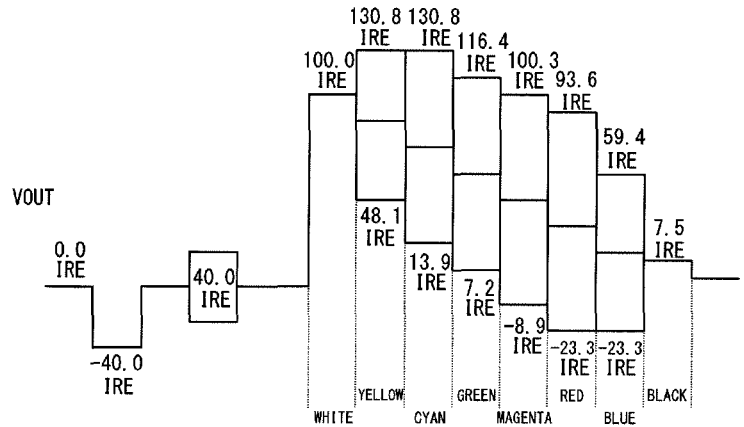
FIG.207
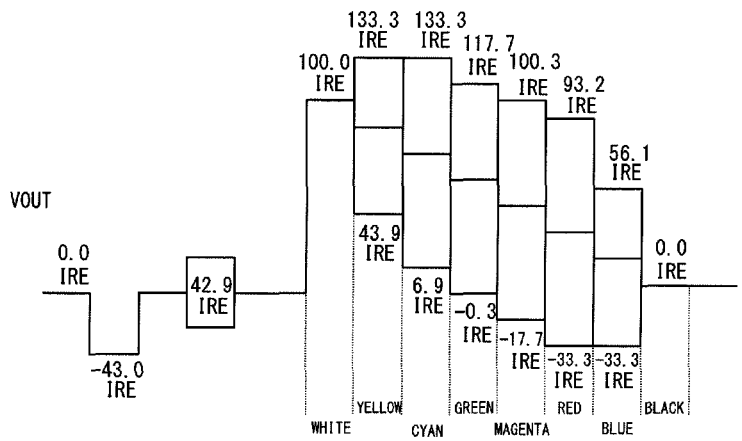
FIG.208
- PARAMETER UPDATE REGISTER: PARAMSET          IDX_ADDRESS : 1011h
| Bit No. | 7 | 6 | 5 | 4 | 3 | 2 | 1 | 0 |
|---|---|---|---|---|---|---|---|---|
| Name | – | – | – | – | – | – | RESERVED | PARAM_SET |
| INITIAL VALUE | 0 | 0 | 0 | 0 | 0 | 0 | 0 | 0[R/W] |

FIG.209
· MODE REGISTER: MODE   IDX_ADDRESS : 1012h

| Bit No. | 7 | 6 | 5 | 4 | 3 | 2 | 1 | 0 |
|---|---|---|---|---|---|---|---|---|
| Name | - | - | RESERVED1 | RESERVED | SUSP | TH_TYPE | MODE[1:0] | |
| INITIAL VALUE | - | - | 1[R/W] | 0[R/W] | 1[R/W] | 0[R/W] | 00b[R/W] | |

FIG.210

| MODE[1:0] | | OPERATION MODE | DESCRIPTION |
|---|---|---|---|
| 0 | 0 | SLEEP MODE | TURN INTO SLEEP MODE |
| 0 | 1 | THROUGH MODE | DATA INPUT TO TV ENCODER IS CONVERTED INTO COMPOSITE SIGNAL AND IS OUTPUT |
| 1 | * | | SETTING SHOULD NOT BE PERFORMED |

FIG.211
· INPUT INTERFACE FORMAT SPECIFICATION REGISTER:YUVIFSET   IDX_ADDRESS : 1013h

| Bit No. | 7 | 6 | 5 | 4 | 3 | 2 | 1 | 0 |
|---|---|---|---|---|---|---|---|---|
| Name | YUV_XST [1:0] | | YUVORD [1:0] | | RESERVED1 | RESERVED1 | ITU656EN | - |
| INITIAL VALUE | 00b[R/W] | | 00b[R/W] | | 0[R/W] | 0[R/W] | 0[R/W] | - |

FIG.212
· MONITOR X DIRECTION PIXEL SIZE SETTING REGISTER: XSIZE_L   IDX_ADDRESS :1014h

| Bit No. | 7 | 6 | 5 | 4 | 3 | 2 | 1 | 0 |
|---|---|---|---|---|---|---|---|---|
| Name | XSIZE [7:0] | | | | | | | |
| INITIAL VALUE | 1000_0000b[R/W] | | | | | | | |

XSIZE_H   IDX_ADDRESS: 1015h

| Bit No. | 7 | 6 | 5 | 4 | 3 | 2 | 1 | 0 |
|---|---|---|---|---|---|---|---|---|
| Name | - | - | - | - | - | XSIZE [10:8] | | |
| INITIAL VALUE | 0 | 0 | 0 | 0 | 0 | 010b[R/W] | | |

FIG.213
· MONITOR Y DIRECTION PIXEL SIZE SETTING REGISTER: YSIZE_L   IDX_ADDRESS :1016h

| Bit No. | 7 | 6 | 5 | 4 | 3 | 2 | 1 | 0 |
|---|---|---|---|---|---|---|---|---|
| Name | YSIZE [7:0] | | | | | | | |
| INITIAL VALUE | 1110_0000b[R/W] | | | | | | | |

YSIZE_H   IDX_ADDRESS: 1017h

| Bit No. | 7 | 6 | 5 | 4 | 3 | 2 | 1 | 0 |
|---|---|---|---|---|---|---|---|---|
| Name | - | - | - | - | - | YSIZE [10:8] | | |
| INITIAL VALUE | - | - | - | - | - | 001b[R/W] | | |

FIG.214
· TV ENCODER RESET REGISTER: PWD   IDX_ADDRESS : 1041h

| Bit No. | 7 | 6 | 5 | 4 | 3 | 2 | 1 | 0 |
|---|---|---|---|---|---|---|---|---|
| Name | - | - | - | - | - | LOGIC_POW | | DAC_POW |
| INITIAL VALUE | - | - | - | - | - | 0[R/W] | | 0[R/W] |

FIG.215
· TV ENCODER DISPLAY MODE REGISTER: DISP              IDX_ADDRESS :1043h

| Bit No. | 7 | 6 | 5 | 4 | 3 | 2 | 1 | 0 |
|---|---|---|---|---|---|---|---|---|
| Name | – | – | – | LEVEL | – | – | – | DISP0 |
| INITIAL VALUE | – | – | – | 0[R/W] | – | – | – | 1[R/W] |

FIG.216
· TV ENCODER VIDEO MODE REGISTER: VIDEO           IDX_ADDRESS :1045h

| Bit No. | 7 | 6 | 5 | 4 | 3 | 2 | 1 | 0 |
|---|---|---|---|---|---|---|---|---|
| Name | – | – | – | – | RESERVED | PAL28 | Q_FSC | NTPAL |
| INITIAL VALUE | – | – | – | – | 0 | 0[R/W] | 0[R/W] | 0[R/W] |

FIG.217

| NTPAL | Q_FSC | PAL28 | DESCRPTION |
|---|---|---|---|
| 0 | 0 | 0 | NTSC 27MHz |
| 0 | 1 | 0 | NTSC 28.63636MHz (8Fsc) |
| 1 | 0 | 0 | PAL 27MHz |
| 1 | 1 | 0 | PAL 35.46895MHz (8Fsc) |
| 1 | 0 | 1 | PAL 28.375MHz |

FIG.218
· TV ENCODER VIDEO MODE REGISTER: CVBS           IDX_ADDRESS :1046h

| Bit No. | 7 | 6 | 5 | 4 | 3 | 2 | 1 | 0 |
|---|---|---|---|---|---|---|---|---|
| Name | – | – | – | – | – | CVBS_OUT | IMAGE_OUT [1:0] | |
| INITIAL VALUE | – | – | – | – | – | 0[R/W] | 01b[R/W] | |

FIG.219
· BACKGROUND COLOR REGISTER: BGCOL              IDX_ADDRESS :1047h

| Bit No. | 7 | 6 | 5 | 4 | 3 | 2 | 1 | 0 |
|---|---|---|---|---|---|---|---|---|
| Name | – | – | – | – | BGCOL [3:0] | | | |
| INITIAL VALUE | – | – | – | – | 0000b[R/W] | | | |

FIG.220
· TV ENCODER COLOR BAR TEST REGISTER: COLBAR        IDX_ADDRESS : 1048h

| Bit No. | 7 | 6 | 5 | 4 | 3 | 2 | 1 | 0 |
|---|---|---|---|---|---|---|---|---|
| Name | – | – | – | – | – | – | – | COLBAR |
| INITIAL VALUE | – | – | – | – | – | – | – | 0[R/W] |

FIG.221
· TV ENCODER SETUP REGISTER: SETUP               IDX_ADDRESS :1055h

| Bit No. | 7 | 6 | 5 | 4 | 3 | 2 | 1 | 0 |
|---|---|---|---|---|---|---|---|---|
| Name | – | – | – | – | – | – | – | SETUP |
| INITIAL VALUE | – | – | – | – | – | – | – | 0[R/W] |

FIG.222

- TV ENCODER gamma collection REGISTER: GM_A0      IDX_ADDRESS : 10D0h

| Bit No. | 7 | 6 | 5 | 4 | 3 | 2 | 1 | 0 |
|---|---|---|---|---|---|---|---|---|
| Name | \multicolumn{8}{c}{GM_A0 [7:0]} | | | | | | | |
| INITIAL VALUE | \multicolumn{8}{c}{00010000b [R/W]} | | | | | | | |

| Bit No. | 7 | 6 | 5 | 4 | 3 | 2 | 1 | 0 |
|---|---|---|---|---|---|---|---|---|
| Name | | | | GM_A0 [7:0] | | | | |
| INITIAL VALUE | | | | 00010000b [R/W] | | | | |

- TV ENCODER gamma collection REGISTER: GM_A1      IDX_ADDRESS : 10D1h

| Bit No. | 7 | 6 | 5 | 4 | 3 | 2 | 1 | 0 |
|---|---|---|---|---|---|---|---|---|
| Name | | | | GM_A1 [7:0] | | | | |
| INITIAL VALUE | | | | 00010000b [R/W] | | | | |

- TV ENCODER gamma collection REGISTER: GM_A2      IDX_ADDRESS : 10D2h

| Bit No. | 7 | 6 | 5 | 4 | 3 | 2 | 1 | 0 |
|---|---|---|---|---|---|---|---|---|
| Name | | | | GM_A2 [7:0] | | | | |
| INITIAL VALUE | | | | 00010000b [R/W] | | | | |

- TV ENCODER gamma collection REGISTER: GM_X0      IDX_ADDRESS : 10D3h

| Bit No. | 7 | 6 | 5 | 4 | 3 | 2 | 1 | 0 |
|---|---|---|---|---|---|---|---|---|
| Name | | | | GM_X0 [7:0] | | | | |
| INITIAL VALUE | | | | 00010000b [R/W] | | | | |

- TV ENCODER gamma collection REGISTER: GM_X1      IDX_ADDRESS : 10D4h

| Bit No. | 7 | 6 | 5 | 4 | 3 | 2 | 1 | 0 |
|---|---|---|---|---|---|---|---|---|
| Name | | | | GM_X1 [7:0] | | | | |
| INITIAL VALUE | | | | 01000000b [R/W] | | | | |

- TV ENCODER gamma collection REGISTER: GM_X2      IDX_ADDRESS : 10D5h

| Bit No. | 7 | 6 | 5 | 4 | 3 | 2 | 1 | 0 |
|---|---|---|---|---|---|---|---|---|
| Name | | | | GM_X2 [7:0] | | | | |
| INITIAL VALUE | | | | 10000000b [R/W] | | | | |

- TV ENCODER gamma collection REGISTER: GM_X3      IDX_ADDRESS : 10D6h

| Bit No. | 7 | 6 | 5 | 4 | 3 | 2 | 1 | 0 |
|---|---|---|---|---|---|---|---|---|
| Name | | | | GM_X3 [7:0] | | | | |
| INITIAL VALUE | | | | 11101011b [R/W] | | | | |

- TV ENCODER gamma collection REGISTER: GM_Y0      IDX_ADDRESS : 10D7h

| Bit No. | 7 | 6 | 5 | 4 | 3 | 2 | 1 | 0 |
|---|---|---|---|---|---|---|---|---|
| Name | | | | GM_Y0 [7:0] | | | | |
| INITIAL VALUE | | | | 00010000b [R/W] | | | | |

- TV ENCODER gamma collection REGISTER: GM_Y1      IDX_ADDRESS : 10D8h

| Bit No. | 7 | 6 | 5 | 4 | 3 | 2 | 1 | 0 |
|---|---|---|---|---|---|---|---|---|
| Name | | | | GM_Y1 [7:0] | | | | |
| INITIAL VALUE | | | | 01000000b [R/W] | | | | |

- TV ENCODER gamma collection REGISTER: GM_Y2      IDX_ADDRESS : 10D9h

| Bit No. | 7 | 6 | 5 | 4 | 3 | 2 | 1 | 0 |
|---|---|---|---|---|---|---|---|---|
| Name | | | | GM_Y2 [7:0] | | | | |
| INITIAL VALUE | | | | 10000000b [R/W] | | | | |

- TV ENCODER gamma collection REGISTER: GM_Y3      IDX_ADDRESS : 10DAh

| Bit No. | 7 | 6 | 5 | 4 | 3 | 2 | 1 | 0 |
|---|---|---|---|---|---|---|---|---|
| Name | | | | GM_Y3 [7:0] | | | | |
| INITIAL VALUE | | | | 11101011b [R/W] | | | | |

| Parameter | Register | Equivalent to γ=1 | Equivalent to γ=1.2 |
|---|---|---|---|
| a0 | GM_A0 | 10h | 1Dh |
| a1 | GM_A1 | 10h | 12h |
| a2 | GM_A2 | 10h | 0Eh |
| x0 | GM_X0 | 10h | 10h |
| x1 | GM_X1 | 40h | 1Eh |
| x2 | GM_X2 | 80h | 56h |
| x3 | GM_X3 | EBh | EBh |
| y0 | GM_Y0 | 10h | 10h |
| y1 | GM_Y1 | 40h | 29h |
| y2 | GM_Y2 | 80h | 68h |
| y3 | GM_Y3 | EBh | EBh |

FIG.225

· INPUT VALID START PIXEL OFFSET SETTING REGISTER: OFS_h      IDX_ADDRESS : 10E0h

| Bit No. | 7 | 6 | 5 | 4 | 3 | 2 | 1 | 0 |
|---|---|---|---|---|---|---|---|---|
| Name | – | – | – | – | – | – | colspan=2: OFS [9:8] | |
| INITIAL VALUE | – | – | – | – | – | – | colspan=2: 00b[R/W] | |

· INPUT VALID START PIXEL OFFSET SETTING REGISTER: OFS_l      IDX_ADDRESS : 10E1h

| Bit No. | 7 | 6 | 5 | 4 | 3 | 2 | 1 | 0 |
|---|---|---|---|---|---|---|---|---|
| Name | colspan=8: OFS [7:0] | | | | | | | |
| INITIAL VALUE | colspan=8: 00001001b[R/W] | | | | | | | |

FIG.226

· TV ENCODER VALID DATA WIDTH SETTING REGISTER: WID_VD_h      IDX_ADDRESS : 10E2h

| Bit No. | 7 | 6 | 5 | 4 | 3 | 2 | 1 | 0 |
|---|---|---|---|---|---|---|---|---|
| Name | – | – | – | – | – | – | colspan=2: WID_VD [9:8] | |
| INITIAL VALUE | – | – | – | – | – | – | colspan=2: 01b[R/W] | |

· TV ENCODER VALID DATA WIDTH SETTING REGISTER: WID_VD_l      IDX_ADDRESS : 10E3h

| Bit No. | 7 | 6 | 5 | 4 | 3 | 2 | 1 | 0 |
|---|---|---|---|---|---|---|---|---|
| Name | colspan=8: WID_VD [7:0] | | | | | | | |
| INITIAL VALUE | colspan=8: 01000000b[R/W] | | | | | | | |

FIG.227

· TV ENCODER VALID LINE WIDTH SETTING REGISTER: HT_VD      IDX_ADDRESS : 10E4h

| Bit No. | 7 | 6 | 5 | 4 | 3 | 2 | 1 | 0 |
|---|---|---|---|---|---|---|---|---|
| Name | colspan=8: HT_VD [7:0] | | | | | | | |
| INITIAL VALUE | colspan=8: 11110000b[R/W] | | | | | | | |

FIG.228

· TV ENCODER HORIZONTAL DISPLAY POSITION OFFSET REGISTER: H_POS      IDX_ADDRESS : 10E5h

| Bit No. | 7 | 6 | 5 | 4 | 3 | 2 | 1 | 0 |
|---|---|---|---|---|---|---|---|---|
| Name | colspan=8: H_POS [7:0] | | | | | | | |
| INITIAL VALUE | colspan=8: 00000000b[R/W] | | | | | | | |

FIG.229

· TV ENCODER VERTICAL DISPLAY POSITION OFFSET REGISTER: V_POS      IDX_ADDRESS : 10E6h

| Bit No. | 7 | 6 | 5 | 4 | 3 | 2 | 1 | 0 |
|---|---|---|---|---|---|---|---|---|
| Name | colspan=8: V_POS [7:0] | | | | | | | |
| INITIAL VALUE | colspan=8: 00000000b[R/W] | | | | | | | |

FIG.230

· INPUT VALID START LINE OFFSET SETTING REGISTER: V_OFS      IDX_ADDRESS : 10E7h

| Bit No. | 7 | 6 | 5 | 4 | 3 | 2 | 1 | 0 |
|---|---|---|---|---|---|---|---|---|
| Name | colspan=8: V_OFS [7:0] | | | | | | | |
| INITIAL VALUE | colspan=8: 00000000b[R/W] | | | | | | | |

FIG.231

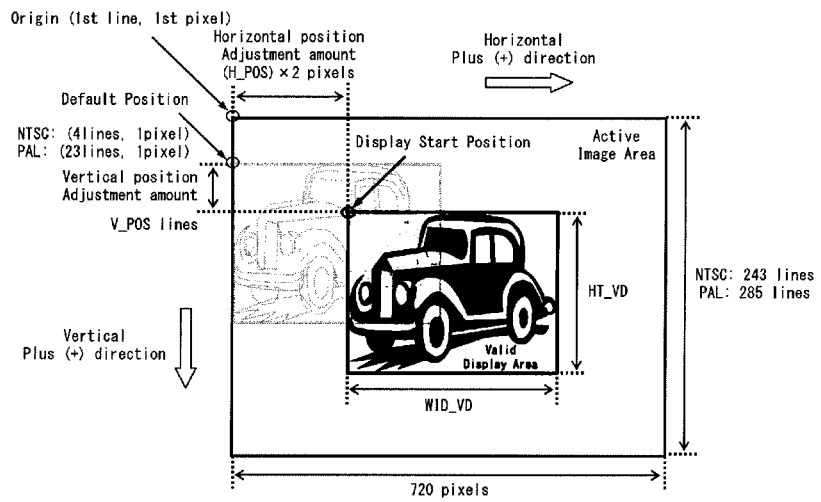

FIG.232
- INITIALIZATION REGISTER: SRST     IDX_ADDRESS : 10FFh

| Bit No. | 7 | 6 | 5 | 4 | 3 | 2 | 1 | 0 |
|---|---|---|---|---|---|---|---|---|
| Name | - | - | - | - | - | SRST_REG | SRST_TVE | - |
| INITIAL VALUE | - | - | - | - | - | 0[R/W] | 0[R/W] | - |

FIG.233
- JPEG CONTROL REGISTER: JPG_CNT     IDX_ADDRESS : 0080h

| Bit No. | 15 | 14 | 13 | 12 | 11 | 10 | 9 | 8 |
|---|---|---|---|---|---|---|---|---|
| Name | JE_CONTINUE | - | - | - | - | - | - | - |
| INITIAL VALUE | 0[R/W] | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | SWRST | - | RESERVE | RESERVE | RESERVE | - | JD_ST | JE_ST |
| INITIAL VALUE | 1[R/W] | 0 | 0 | 0 | 0 | 0 | 0[W] | 0[W] |

FIG.234
- JPEG STATUS 1 REGISTER: JPG_ST1     IDX_ADDRESS : 0083h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| AT | - | - | - | RESERVE | - | - | JD_STAT | JE_STAT |
| INITIAL VALUE | 0 | 0 | 0 | 0 | 0 | 0 | 0[R] | 0[R] |

FIG.235

· JPEG STATUS 2 REGISTER: JPG_ST2     IDX_ADDRESS : 0084h

| Bit No. | 15 | 14 | 13 | 12 | 11 | 10 | 9 | 8 |
|---|---|---|---|---|---|---|---|---|
| Name | - | - | - | - | - | JE_WORD_SIZE | JE_ODD_LEN | - |
| INITIAL VALUE | 0 | 0 | 0 | 0 | 0 | 0[R] | 0[R] | 0 |

| Bit No. | 7 | 6 | 5 | 4 | 3 | 2 | 1 | 0 |
|---|---|---|---|---|---|---|---|---|
| Name | - | RESERVE | RESERVE | | | JD_ERROR[4:0] | | |
| INITIAL VALUE | 0 | 0 | 0 | | | 00_00000b[R] | | |

FIG.236

| JD_ERROR | ERROR FACTOR |
|---|---|
| JD_ERROR[4] | UNTREATABLE RESTART MARKER AND MARKER OTHER THAN EOI ARE DETECTED. |
| JD_ERROR[3] | UNJUST HUFFMAN CODE IS DETECTED. |
| JD_ERROR[2] | MODULO 8 NUMBER OF DETECTED RESTART MARKER IS UNJUST. |
| JD_ERROR[1] | RESTART MARKER IS NOT DETECTED AT PROPER POSITION. |
| JD_ERROR[0] | NUMBER OF ELEMENTS IN ONE BLOCK EXCEEDS 64. |

FIG.237

· JPEG STATUS 3 REGISTER: JPG_ST3     IDX_ADDRESS : 0085h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | - | RESERVE | RESERVE | RESERVE | RESERVE | RESERVE | RESERVE | RESERVE |
| INITIAL VALUE | 0 | 0 | 0 | 0 | 0 | 0 | 0 | 0 |

FIG.238

· JPEG COMPRESSION CONTROL REGISTER: JE_CNT     IDX_ADDRESS : 0090h

| Bit No. | 15 | 14 | 13 | 12 | 11 | 10 | 9 | 8 |
|---|---|---|---|---|---|---|---|---|
| Name | - | - | RESERVED | JE_HFLIP | | JE_HEAD[3:0] | | |
| INITIAL VALUE | 0 | 0 | 0 | 0[R/W] | | 1111b[R/W] | | |

| Bit No. | 7 | 6 | 5 | 4 | 3 | 2 | 1 | 0 |
|---|---|---|---|---|---|---|---|---|
| Name | - | - | - | | | JE_Q[4:0] | | |
| INITIAL VALUE | 0 | 0 | 0 | | | 0_0000b[R/W] | | |

FIG.239

· JPEG CODE SIZE REGISTER 1: JE_CSIZE1     IDX_ADDRESS : 0091h

| Bit No. | 15 | 14 | 13 | 12 | 11 | 10 | 9 | 8 |
|---|---|---|---|---|---|---|---|---|
| Name | | | | JE_CSIZE1[15:8] | | | | |
| INITIAL VALUE | | | | 0000_0000b[R] | | | | |

| Bit No. | 7 | 6 | 5 | 4 | 3 | 2 | 1 | 0 |
|---|---|---|---|---|---|---|---|---|
| Name | | | | JE_CSIZE1[7:0] | | | | |
| INITIAL VALUE | | | | 0000_0000b[R] | | | | |

FIG.240

· JPEG CODE SIZE REGISTER 2: JE_CSIZE2      IDX_ADDRESS : 0092h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | - | - | - | - | - | - | - | JE_CSIZE2 |
| INITIAL VALUE | 0 | 0 | 0 | 0 | 0 | 0 | 0 | 0[R] |

FIG.241

· JPEG CODE SIZE PREREGISTER 1: JE_CSIZE1_PRE      IDX_ADDRESS : 0093h

| Bit No. | 15 | 14 | 13 | 12 | 11 | 10 | 9 | 8 |
|---|---|---|---|---|---|---|---|---|
| Name | JE_CSIZE1_PRE[15:8] | | | | | | | |
| INITIAL VALUE | 0000_0000b[R] | | | | | | | |

| Bit No. | 7 | 6 | 5 | 4 | 3 | 2 | 1 | 0 |
|---|---|---|---|---|---|---|---|---|
| Name | JE_CSIZE1_PRE[7:0] | | | | | | | |
| INITIAL VALUE | 0000_0000b[R] | | | | | | | |

FIG.242

· JPEG CODE SIZE PREREGISTER 2: JE_CSIZE2_PRE      IDX_ADDRESS : 0094h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | - | - | - | - | - | - | - | JE_CSIZE2_PRE |
| INITIAL VALUE | 0 | 0 | 0 | 0 | 0 | 0 | 0 | 0[R] |

FIG.243

· JPEG CODE YUV FORMAT SETTING REGISTER: JD_PICTYPE      IDX_ADDRESS : 00A0h

| Bit No. | 15 | 14 | 13 | 12 | 11 | 10 | 9 | 8 |
|---|---|---|---|---|---|---|---|---|
| Name | JD_FILL | JD_CODE_SIZ | - | RESERVE1 | - | RESERVE | RESERVE | RESERVE |
| INITIAL VALUE | 0[R/W] | 0[R/W] | 0 | 1 | 0 | 0 | 0 | 0 |

| Bit No. | 7 | 6 | 5 | 4 | 3 | 2 | 1 | 0 |
|---|---|---|---|---|---|---|---|---|
| Name | - | RESERVE | RESERVE | RESERVE | - | JD_PICTYPE[2:0] | | |
| INITIAL VALUE | 0 | 0 | 0 | 0 | 0 | 000b[R/W] | | |

FIG.244

| JD_PICTYPE[2:0] | YUV FORMAT |
|---|---|
| 000 | YUV=4:4:4 |
| 001 | YUV=4:2:2 |
| 010 | YUV=4:1:1 |
| 011 | YUV=4:2:0 |
| 100 | GREY SCALE |
| 101 | SETTING SHOULD NOT BE PERFORMED. |
| 110 | |
| 111 | |

FIG.245
· RESTART INTERVAL SETTING REGISTER: JD_INTERVAL     IDX_ADDRESS : 00A1h

| Bit No. | 15 | 14 | 13 | 12 | 11 | 10 | 9 | 8 |
|---|---|---|---|---|---|---|---|---|
| Name | \multicolumn{8}{c}{JD_INTERVAL[15:8]} | | | | | | | |
| INITIAL VALUE | \multicolumn{8}{c}{0000_0000b[R/W]} | | | | | | | |

| Bit No. | 7 | 6 | 5 | 4 | 3 | 2 | 1 | 0 |
|---|---|---|---|---|---|---|---|---|
| Name | | | | JD_INTERVAL[7:0] | | | | |
| INITIAL VALUE | | | | 0000_0000b[R/W] | | | | |

FIG.246
· JPEG CODE X DIRECTION SIZE SETTING REGISTER: JD_XSIZE     IDX_ADDRESS : 00A2h

| Bit No. | 15 | 14 | 13 | 12 | 11 | 10 | 9 | 8 |
|---|---|---|---|---|---|---|---|---|
| Name | – | – | – | – | – | | JD_XSIZE[10:8] | |
| INITIAL VALUE | 0 | 0 | 0 | 0 | 0 | | 000b[R/W] | |

| Bit No. | 7 | 6 | 5 | 4 | 3 | 2 | 1 | 0 |
|---|---|---|---|---|---|---|---|---|
| Name | | | | JD_XSIZE[7:0] | | | | |
| INITIAL VALUE | | | | 0000_0000b[R/W] | | | | |

FIG.247
· JPEG CODE Y DIRECTION SIZE SETTING REGISTER: JD_YSIZE     IDX_ADDRESS : 00A3h

| Bit No. | 15 | 14 | 13 | 12 | 11 | 10 | 9 | 8 |
|---|---|---|---|---|---|---|---|---|
| Name | – | – | – | – | – | | JD_YSIZE[10:8] | |
| INITIAL VALUE | 0 | 0 | 0 | 0 | 0 | | 000b[R/W] | |

| Bit No. | 7 | 6 | 5 | 4 | 3 | 2 | 1 | 0 |
|---|---|---|---|---|---|---|---|---|
| Name | | | | JD_YSIZE[7:0] | | | | |
| INITIAL VALUE | | | | 0000_0000b[R/W] | | | | |

FIG.248
· BRIGHTNESS DC COMPONENT HUFFMAN TABLE 1 SETTING REGISTER: JD_HUF_Y_DC1     IDX_ADDRESS : 00A4h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | – | – | – | – | | JD_HUF_Y_DC1[3:0] | | |
| INITIAL VALUE | 0 | 0 | 0 | 0 | | 0000b[R/W] | | |

FIG.249
· BRIGHTNESS AC COMPONENT HUFFMAN TABLE 1 SETTING REGISTER: JD_HUF_Y_AC1     IDX_ADDRESS : 00A6h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | | | | JD_HUF_Y_AC1[7:0] | | | | |
| INITIAL VALUE | | | | 0000_0000b[R/W] | | | | |

FIG.250

- COLOR-DIFFERENCE DC COMPONENT HUFFMAN TABLE 1 SETTING REGISTER
: JD_HUF_C_DC1    IDX_ADDRESS : 00A8h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | – | – | – | – | JD_HUF_C_DC1[3:0] | | | |
| INITIAL VALUE | 0 | 0 | 0 | 0 | 0000b[R/W] | | | |

FIG.251

- COLOR-DIFFERENCE AC COMPONENT HUFFMAN TABLE 1 SETTING REGISTER
: JD_HUF_C_AC1    IDX_ADDRESS : 00AAh

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | JD_HUF_C_AC1[7:0] | | | | | | | |
| INITIAL VALUE | 0000_0000b[R/W] | | | | | | | |

FIG.252

- RESERVE REGISTER 1:RESERVE    IDX_ADDRESS : 00ACh

| Bit No. | 15 | 14 | 13 | 12 | 11 | 10 | 9 | 8 |
|---|---|---|---|---|---|---|---|---|
| Name | RESERVE | RESERVE | RESERVE | RESERVE | RESERVE | RESERVE | RESERVE | RESERVE |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | RESERVE | RESERVE | RESERVE | RESERVE | RESERVE | RESERVE | RESERVE | RESERVE |
| INITIAL VALUE | 0 | 0 | 0 | 0 | 0 | 0 | 0 | 0 |

- RESERVE REGISTER 2:RESERVE    IDX_ADDRESS : 00ADh

| Bit No. | 15 | 14 | 13 | 12 | 11 | 10 | 9 | 8 |
|---|---|---|---|---|---|---|---|---|
| Name | RESERVE | RESERVE | RESERVE | RESERVE | RESERVE | RESERVE | RESERVE | RESERVE |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | RESERVE | RESERVE | RESERVE | RESERVE | RESERVE | RESERVE | RESERVE | RESERVE |
| INITIAL VALUE | 0 | 0 | 0 | 0 | 0 | 0 | 0 | 0 |

FIG.253

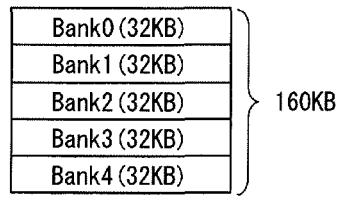

FIG.254

· RING_INT OCCURRENCE CONTROL REGISTER: RING_CNT          IDX_ADDRESS : 0086h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | – | – | – | – | – | – | RING_CNT | |
| INITIAL VALUE | 0 | 0 | 0 | 0 | 0 | 0 | 00b[R/W] | |

FIG.255

· RING_INT NUMBER OF OCCURRENCES REGISTER: RING_COUNT          IDX_ADDRESS : 008Fh

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | RING_COUNT | | | | | | | |
| INITIAL VALUE | 0000_0000b[R] | | | | | | | |

FIG.256

· RING BUFFER READ DATA: RING_RD          IDX_ADDRESS : 003Fh

| Bit No. | 15 | 14 | 13 | 12 | 11 | 10 | 9 | 8 |
|---|---|---|---|---|---|---|---|---|
| Name | RING_RD[15:8] | | | | | | | |
| INITIAL VALUE | ----_----b[R] | | | | | | | |

| Bit No. | 7 | 6 | 5 | 4 | 3 | 2 | 1 | 0 |
|---|---|---|---|---|---|---|---|---|
| Name | RING_RD[7:0] | | | | | | | |
| INITIAL VALUE | ----_----b[R] | | | | | | | |

FIG.257

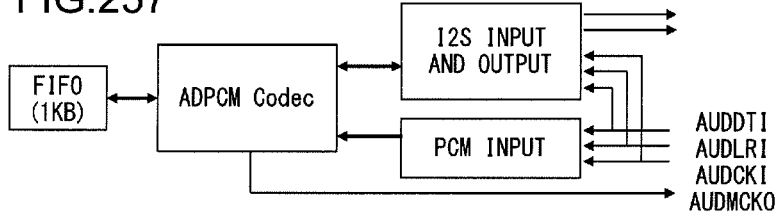

FIG.258

· AUDIO COMMON SETUP REGISTER 1: COMMON_SETUP1          IDX_ADDRESS : 0100h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | AUDOF | AUDOEN | AUDCKSEL | AUDMCKEN | RESERVE | RESERVE | RESERVE | AUD_MUTE |
| INITIAL VALUE | 0[W] | 0[W] | 1[W] | 0[W] | 0 | 0 | 0 | 0[W] |

FIG.259
- AUDIO COMMON SETUP REGISTER 2: COMMON_SETUP2          IDX_ADDRESS : 0101h

| Bit No. | 7 | 6 | 5 | 4 | 3 | 2 | 1 | 0 |
|---|---|---|---|---|---|---|---|---|
| Name | RESERVE | – | AUDOCKSEL | RESERVE | RESERVE | RESERVE | RESERVE | |
| INITIAL VALUE | 0 | – | 0[W] | 0 | 0 | 1 | 00b | |

FIG.260
- ADPCM CHANNEL VOLUME REGISTER: ADPCM_CH_VOL          IDX_ADDRESS : 0103h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | MASTER_SLAVE | ADPCM_CHANNEL_VOLUME[6:0] | | | | | | |
| INITIAL VALUE | x[W] | 100_0000b[W] | | | | | | |

FIG.261
- ADPCM MASTER CHANNEL VOLUME REGISTER: ADPCM_MASTER_LR_VOL          IDX_ADDRESS : 0104h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | MASTER_LR | ADPCM_ MASTER_LR_VOLUME[6:0] | | | | | | |
| INITIAL VALUE | x[W] | 100_0000b[W] | | | | | | |

FIG.262
- ADPCM SLAVE CHANNEL VOLUME REGISTER: ADPCM_SLAVE_LR_VOL          IDX_ADDRESS : 0105h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | SLAVE_LR | ADPCM_SLAVE_LR_VOLUME[6:0] | | | | | | |
| INITIAL VALUE | x[W] | 100_0000b[W] | | | | | | |

FIG.263
- ADPCM INTERRUPT STATUS REGISTER
- AT TIME OF READING: ADPCM_INT_STATUS          IDX_ADDRESS : 0106h
  (NOTHING OCCURS AT TIME OF WRITING)

| Bit No. | 7 | 6 | 5 | 4 | 3 | 2 | 1 | 0 |
|---|---|---|---|---|---|---|---|---|
| Name | – | – | – | – | – | ADPCM_ MASTER_INT | ADPCM_ SLAVE_INT | – |
| INITIAL VALUE | 0 | – | – | – | – | x[R] | x[R] | – |

FIG.264

· ADPCM MASTER FIFO STATUS REGISTER:
AT TIME OF WRITING:ADPCM_MASTER_FIFO_STATUS        IDX_ADDRESS : 0108h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | CLEAR_EMPTY | CLEAR_NEAR_EP | CLEAR_NEAR_FL | CLEAR_FULL | - | FIFO_CLEAR | SLAVE_START2 | MASTER_START |
| INITIAL VALUE | 0[W] | 0[W] | 0[W] | 0[W] | 0 | 0[W] | 0[W] | 0[W] |

FIG.265

· ADPCM MASTER FIFO STATUS REGISTER:
AT TIME OF READING:ADPCM_MASTER_FIFO_STATUS        IDX_ADDRESS : 0108h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | EMPTY | NEAR_EP | NEAR_FL | FULL | - | EMPTY_AREA | FULL_AREA | BUSY |
| INITIAL VALUE | x[R] | x[R] | x[R] | x[R] | 0 | x[R] | x[R] | x[R] |

FIG.266

· ADPCM SLAVE FIFO STATUS REGISTER:
AT TIME OF WRITING:ADPCM_SLAVE_FIFO_STATUS        IDX_ADDRESS : 0109h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | CLEAR_EMPTY | CLEAR_NEAR_EP | CLEAR_NEAR_FL | CLEAR_FULL | - | FIFO_CLEAR | - | SLAVE_START |
| INITIAL VALUE | 0[W] | 0[W] | 0[W] | 0[W] | 0 | 0[W] | 0 | 0[W] |

FIG.267

· ADPCM SLAVE FIFO STATUS REGISTER:
AT TIME OF READING:ADPCM_SLAVE_FIFO_STATUS        IDX_ADDRESS : 0109h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | EMPTY | NEAR_EP | NEAR_FL | FULL | - | EMPTY_AREA | FULL_AREA | BUSY |
| INITIAL VALUE | 0[W] | 0[W] | 0[W] | 0[W] | 0 | 0[W] | 0 | 0[W] |

FIG.268

· ADPCM FIFO SETUP REGISTER: ADPCM_FIFO_SETUP      IDX_ADDRESS : 010Ch

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | NEARLY_FULL _DISABLE | - | NEARLY_FULL _SETUP[1:0] | | NEARLY_EMPTY _DISABLE | - | NEARLY_EMPTY _SETUP[1:0] | |
| INITIAL VALUE | 0[W] | 0 | 01b[W] | | 0[W] | 0 | 01b[W] | |

FIG.269

| NEARLY_FULL_SETUP[1:0] | THRESHOLD (FIFO AVAILABLE CAPACITY) | |
|---|---|---|
| | 1ADPCM REPRODUCTION MODE (CH Control ='0') | 2ADPCM REPRODUCTION MODE (CH Control ='1') |
| 00b | 512 BYTES | 256 BYTES |
| 01b | 256 BYTES | 128 BYTES |
| 10b | 128 BYTES | 64 BYTES |
| 11b | 64 BYTES | 32 BYTES |

FIG.270

| NEARLY_EMPTY_SETUP[1:0] | THRESHOLD (FIFO REMAINING CAPACITY) | |
|---|---|---|
| | 1ADPCM REPRODUCTION MODE (CH Control ='0') | 2ADPCM REPRODUCTION MODE (CH Control ='1') |
| 00b | 511 BYTES | 255 BYTES |
| 01b | 255 BYTES | 127 BYTES |
| 10b | 127 BYTES | 63 BYTES |
| 11b | 63 BYTES | 31 BYTES |

FIG.271

· ADPCM RECORDING VOLUME REGISTER: ADPCM_EXT_VOL      IDX_ADDRESS : 010Dh

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | ADPCM_EXT_VOL[7:0] | | | | | | | |
| INITIAL VALUE | 0100_0000b[W] | | | | | | | |

FIG.272

· ADPCM MASTER SETUP REGISTER: ADPCM_MASTER_SETUP      IDX_ADDRESS : 010Eh

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | MONO_ STEREO | DATA_FORMAT[2:0] | | | - | - | SAMPLING_RATE[1:0] | |
| INITIAL VALUE | 0[W] | 000b[W] | | | 0 | 0 | 00b[W] | |

FIG.273
- ADPCM SLAVE SETUP REGISTER:ADPCM_SLAVE_SETUP    IDX_ADDRESS : 010Fh

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | MONO_STEREO | DATA_FORMAT[2:0] | | | - | - | SAMPLING_RATE[1:0] | |
| INITIAL VALUE | 0[W] | 000b[W] | | | 0 | 0 | 00b[W] | |

FIG.274
- ADPCM CHANNEL CONTROL REGISTER:ADPCM_CH_CONTROL    IDX_ADDRESS : 0110h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | CH_CONTROL | - | - | - | - | - | - | - |
| INITIAL VALUE | 0[W] | 0 | 0 | 0 | 0 | 0 | 0 | 0 |

FIG.275
- PCM IF FORMAT SETTING REGISTER:PCMIF_FORMAT    IDX_ADDRESS : 0111h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | PCMIF_CLKI_POLARITY | PCMIF_LRI_POLARITY | PCMIF_DIFFERENT_EDGE | PCMIF_LONG_FORMAT | PCMIF_BITS[3:0] | | | |
| INITIAL VALUE | 0[W] | 0[W] | 0[W] | 0[W] | 1101b[W] | | | |

FIG.276
- AUDIO DIGITAL IF INPUT SETTING REGISTER:AUDDTI_IF_INPUT_FORMAT    IDX_ADDRESS : 0115h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | - | - | - | - | - | ADPCM_FORMAT[1:0] | | ADPCM_ENABLE |
| INITIAL VALUE | 0 | 0 | 0 | 0 | 0 | 00b[W] | | 0[W] |

FIG.277
- INTERVAL SETTING REGISTER: INTERVAL_SETTING    IDX_ADDRESS : 0116h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | OVER_SAMPLE_ENABLE | RESERVE | RESERVE | AUDMCKO_MODE | AUDCKI_MODE | PLAY_INTERVAL_VALUE[2:0] | | |
| INITIAL VALUE | 0[W] | 0 | 0 | 0[W] | 0[W] | 000b[W] | | |

FIG.278
· ADPCM RECORDING MODE SETTING REGISTER:ADPCM_REC_MODE     IDX_ADDRESS : 0119h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | – | – | RESERVE | ADPCM_MASTER_RECODE | RESERVE | RESERVE | ADPCM_MASTER_REC_PATH[1:0] | |
| INITIAL VALUE | 0 | 0 | 0 | 0[W] | 0 | 0 | 00b[W] | |

FIG.279
· ADPCM MASTER FIFO ACCESS REGISTER:
AT TIME OF WRITING: ADPCM_MASTER_FIFO_WINDOW     IDX_ADDRESS : 011Bh

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | ADPCM_MASTER_FIFO_DATA[7:0] | | | | | | | |
| INITIAL VALUE | xxxx_xxxxb [W] | | | | | | | |

FIG.280
· ADPCM MASTER FIFO ACCESS REGISTER:
AT TIME OF READING: ADPCM_ENCODE_FIFO_WINDOW     IDX_ADDRESS : 011Bh

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | ADPCM_ENCODE_FIFO_DATA[7:0] | | | | | | | |
| INITIAL VALUE | xxxx_xxxxb [R] | | | | | | | |

FIG.281
· ADPCM SLAVE FIFO ACCESS REGISTER: ADPCM_SLAVE_FIFO_WINDOW     IDX_ADDRESS : 011Ch

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | ADPCM_SLAVE_FIFO_DATA[7:0] | | | | | | | |
| INITIAL VALUE | xxxx_xxxxb [W] | | | | | | | |

FIG.282
· SAMPLING FREQUENCY SETTING REGISTER: SAMPLING_TIMING_SETUP     IDX_ADDRESS : 0120h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | U_L | TIME_SETUP[6:0] | | | | | | |
| INITIAL VALUE | x[W] | ―_―――b[W] | | | | | | |

FIG.283
- SEQUENCE CONTROL REGISTER 1:SEQUENCE_CONTROL   IDX_ADDRESS : 0140h

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | RESET | STANDBY | - | RESERVE | ADPCM_STANDBY | | - | - |
| INITIAL VALUE | 1[W] | 0[W] | - | 0 | 11[R/W] | | - | - |

FIG.284

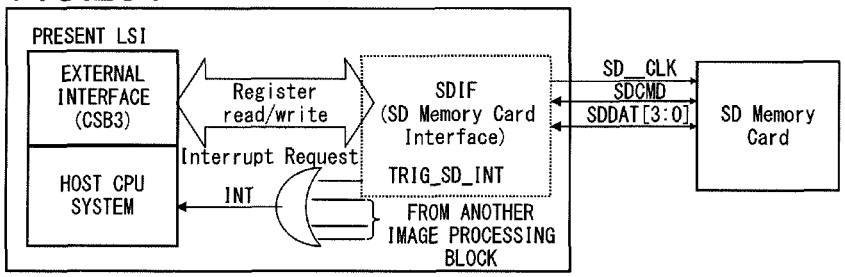

FIG.285

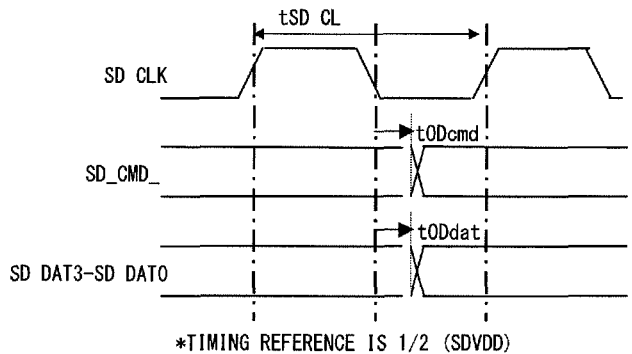

*TIMING REFERENCE IS 1/2 (SDVDD)

FIG.286

| SYMBOL | DESCRIPTION | MIN | TYP | MAX | UNIT |
|---|---|---|---|---|---|
| tSD_CLK | SD_CLK PERIOD | 40 | - | - | ns |
| tODcmd | OUTPUT DELAY VALUE OF SD_CMD ON FALLING EDGE OF SD_CLK | -2 | - | 6 | ns |
| tODdat | OUTPUT DELAY VALUE OF SD_DAT3-0 ON FALLING EDGE OF SD_CLK | -2 | - | 6 | ns |

FIG.287

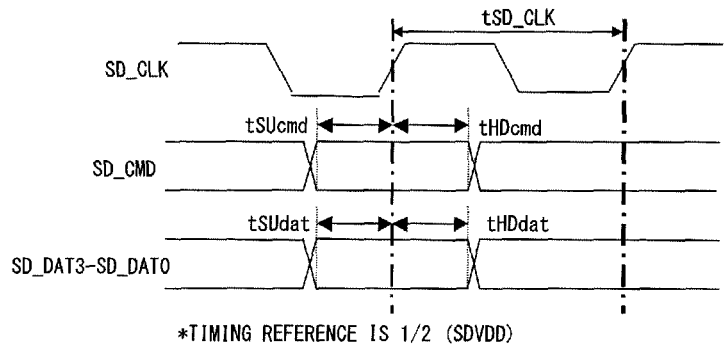

*TIMING REFERENCE IS 1/2 (SDVDD)

FIG.288

| SYMBOL | DESCRIPTION | MIN | TYP | MAX | UNIT |
|---|---|---|---|---|---|
| tSD_CLK | SD_CLK PERIOD | 40 | - | - | ns |
| tSUcmd | SETUP TIME OF SD_CMD ON RISING EDGE OF SD_CLK | 6 | - | - | ns |
| tHDcmd | HOLD TIME OF SD_CMD ON RISING EDGE OF SD_CLK | 4 | - | - | ns |
| tSUdat | SETUP TIME OF SD_DAT3-0 ON RISING EDGE OF SD_CLK | 6 | - | - | ns |
| tHDdat | HOLD TIME OF SD_DAT3-0 ON RISING EDGE OF SD_CLK | 4 | - | - | ns |

FIG.289

· SETUP SEQUENCE CONTROL REGISTER:SETUPCNT     IDX_ADDRESS : 00F8h

| Bit No. | 15 | 14 | 13 | 12 | 11 | 10 | 9 | 8 |
|---|---|---|---|---|---|---|---|---|
| Name | SETUP_RS | - | - | SETUP_EN | - | - | - | - |
| INITIAL VALUE | 1[R/W] | 0 | 0 | 0[R/W] | 0 | 0 | 0 | 0 |

| Bit No. | 7 | 6 | 5 | 4 | 3 | 2 | 1 | 0 |
|---|---|---|---|---|---|---|---|---|
| Name | - | - | - | BIST_EN | - | BIST_END | BIST_BSY | BIST_ST |
| INITIAL VALUE | 0 | 0 | 0 | 0[R/W] | 0 | 0[R] | 0[R] | 0[W] |

FIG.290

· SETUP SEQUENCE SETTING REGISTER:SETUPSET     IDX_ADDRESS : 00FEh

| Bit No. | 15 | 14 | 13 | 12 | 11 | 10 | 9 | 8 |
|---|---|---|---|---|---|---|---|---|
| Name | - | - | - | - | - | - | - | - |
| INITIAL VALUE | 0 | 0 | 0 | 0 | 0 | 0 | 0 | 0 |

| Bit No. | 7 | 6 | 5 | 4 | 3 | 2 | 1 | 0 |
|---|---|---|---|---|---|---|---|---|
| Name | - | - | RESERVE | RESERVE | RESERVE | RESERVE | RESERVE | RESERVE |
| INITIAL VALUE | 0 | 0 | 0[R/W] | 1[R/W] | 0[R/W] | 1[R/W] | 0[R/W] | 1[R/W] |

FIG.291

- PRODUCT ID REGISTER:PRODUCT_ID  IDX_ADDRESS : 0000h

| Bit No. | 15 | 14 | 13 | 12 | 11 | 10 | 9 | 8 |
|---|---|---|---|---|---|---|---|---|
| Name | \multicolumn{8}{c|}{PRODUCT_ID[15:8]} |
| INITIAL VALUE | \multicolumn{8}{c|}{0000_0000b[R]} |
| Bit No. | 7 | 6 | 5 | 4 | 3 | 2 | 1 | 0 |
| Name | \multicolumn{8}{c|}{PRODUCT_ID[7:0]} |
| INITIAL VALUE | \multicolumn{8}{c|}{0001_0111b[R]} |

| Bit No. | 15 | 14 | 13 | 12 | 11 | 10 | 9 | 8 |
|---|---|---|---|---|---|---|---|---|
| Name | | | | | PRODUCT_ID[15:8] | | | |
| INITIAL VALUE | | | | | 0000_0000b[R] | | | |
| Bit No. | 7 | 6 | 5 | 4 | 3 | 2 | 1 | 0 |
| Name | | | | | PRODUCT_ID[7:0] | | | |
| INITIAL VALUE | | | | | 0001_0111b[R] | | | |

FIG.292

- REVISION NO. REGISTER: REV_NO  IDX_ADDRESS : 0001h

| Bit No. | 15 | 14 | 13 | 12 | 11 | 10 | 9 | 8 |
|---|---|---|---|---|---|---|---|---|
| Name | – | – | – | – | – | – | – | – |
| INITIAL VALUE | 0 | 0 | 0 | 0 | 0 | 0 | 0 | 0 |
| Bit No. | 7 | 6 | 5 | 4 | 3 | 2 | 1 | 0 |
| Name | | | | | REV_NO[7:0] | | | |
| INITIAL VALUE | | | | | 0000_0000b[R] | | | |

SEMICONDUCTOR DEVICE INCLUDING POWER CONVERSION AND A DRIVE RECORDER

CROSS-REFERENCE TO RELATED APPLICATIONS

This application is based on Japanese Patent Application No. 2009-099940 filed on Apr. 16, 2009, the contents of which are hereby incorporated by reference.

BACKGROUND OF THE INVENTION

1. Field of the Invention

The present invention relates to a semiconductor device to which a plurality of external devices are connected through a bus.

2. Description of Related Art

In recent years, the size, the consumption power and the like of circuits have been reduced, and thus the interface voltage of a semiconductor device (controller IC) connected to a plurality of external devices through a bus tends to be reduced. With this recent trend, in a plurality of external devices used as a system along with a semiconductor device for the market of mass-produced appliances, low voltages are used.

One example of a conventional technology related to the foregoing (where a plurality of devices are connected to a single bus) is disclosed in JP-A-2004-326153.

SUMMARY OF THE INVENTION

On the other hand, in appliances produced in small amounts, a system is configured by combining a variety of external devices with a semiconductor device (controller IC), and the recommended range (operation guaranteed range) of an interface voltage is significantly varied for each of the external devices.

Hence, when the external devices mentioned above are connected to the semiconductor device through a single bus, the allowable range of the interface voltage set in the bus is small, and thus it may be difficult to achieve the setting.

FIG. 299 is a block diagram showing one example of a conventional semiconductor device connected to a plurality of devices through a bus. FIG. 300 is a diagram showing the setting range of an interface voltage in the semiconductor device of FIG. 299. When, as shown in FIG. 300, the recommended range (operation guaranteed range) of the interface voltage is varied for each of external devices A, B and C, since the interface voltage of the bus needs to be set within a voltage range in which all the interface voltages of the external devices A, B and C overlap each other, the allowable range of the interface voltage set in the bus is small, and thus it is very difficult to achieve the setting. Moreover, in order to stably operate a plurality of external devices, it is necessary to design, in an ingenious manner, circuits around the power supply of the semiconductor device (controller IC) and a printed circuit board (PCB), and this results in increased cost.

FIG. 301 is a block diagram showing another example of the conventional semiconductor device connected to a plurality of devices through a bus. FIG. 302 is a diagram showing the setting range of an interface voltage in the semiconductor device of FIG. 301. As shown in FIGS. 301 and 302, a voltage conversion interface IC (level shifter IC) is used to level shift the recommended range (operation guaranteed range) of the interface voltage of the external device C, and thus it is possible to extend the allowable range of the interface voltage set in the bus. However, in this type of configuration, the voltage conversion interface IC (level shifter IC) is additionally required, and this disadvantageously increases the cost and the size of an appliance.

In view of the foregoing problem found by the applicant of the present invention, the present invention has an object to provide a semiconductor device that can easily connect a plurality of external devices having different interface voltages and a drive recorder using such a semiconductor device.

To achieve the above object, according to one aspect of the present invention, there is provided a semiconductor device including: a terminal for connecting a plurality of buses to the outside of the semiconductor device; a bus interface circuit for treating the plurality of buses as the same bus within the semiconductor device; and a controller connected to the bus interface circuit.

With the semiconductor device of the present invention, it is possible to easily connect a plurality of external devices having different interface voltages.

Other features, elements, steps, advantages and characteristics of the present invention will become further apparent from the following detailed description of preferred embodiments and the accompanying drawings related thereto.

BRIEF DESCRIPTION OF THE DRAWINGS

[FIG. 1] A table showing the power supply systems of the present LSI;

[FIG. 2] A table showing functions of the terminals of the present LSI (pins 1 to 48);

[FIG. 3] The table showing functions of the terminals of the present LSI (pins 49 to 96);

[FIG. 4] The table showing functions of the terminals of the present LSI (pins 97 to 144);

[FIG. 9] A table showing electrical properties of the present LSI;

[FIG. 14] A memory controller register map;

[FIG. 15] A detailed table of a register SCSLRn_LOW#m;

[FIG. 16] A detailed table of a register SMSKRn_LOW#m;

[FIG. 17] A detailed table of a register CSALIASn_LOW#m;

[FIG. 18] A detailed table of a register SMCTLR;

[FIG. 19] A detailed table of a register SMTMGRSETn#m;

[FIG. 25] An interrupt signal map of the present LSI;

[FIG. 26] A register map of an interrupt block;

[FIG. 27] A register map of a watch dog timer block;

[FIG. 28] A table showing the relationship between the setting of WDT_TORR:TOP and the counter initial value;

[FIG. 32] A diagram showing the configuration of timers and a timer counter;

[FIG. 33] A register map of a timer block;

[FIG. 35] A register map of the UART block;

[FIG. 39] A detailed table of a receive buffer register RBR;

[FIG. 40] A detailed table of a transmit holding register THR;

[FIG. 41] A detailed table of a divisor latch (lower-order) DLL;

[FIG. 42] A detailed table of a divisor latch (upper-order) DLH;

[FIG. 43] A detailed table of an interrupt enable register IER;

[FIG. 44] A detailed table of an interrupt recognition register IIR;

[FIG. 45] A detailed table of a FIFO control register FCR;

[FIG. 46] A detailed table of a line control register LCR;

[FIG. 47] A detailed table of a modem control register MCR;

[FIG. 48] A detailed table of a line status register LSR;

[FIG. 49] A detailed table of a modem status register MSR;

[FIG. 50] A detailed table of a scratch pad register SCR;

[FIG. 51] A detailed table of a FIFO access register FAR;

[FIG. 52] A detailed table of a transmit FIFO read register TFR;

[FIG. 53] A detailed table of a receive FIFO write register RFW;

[FIG. 54] A detailed table of a UART status register USR;

[FIG. 55] A detailed table of a transmit FIFO level register TFL;

[FIG. 56] A detailed table of a receive FIFO level register RFL;

[FIG. 57] A detailed table of a transmission stop register HTX;

[FIG. 60] A detailed table of a GPIO output data register gpio_swporta_dr;

[FIG. 61] A detailed table of a GPIO data direction register gpio_swporta_ddr;

[FIG. 62] A detailed table of a GPIO input data register gpio_extporta;

[FIG. 63] A detailed table of a GPIO interrupt enable register gpio_inten;

[FIG. 64] A detailed table of a GPIO port A interrupt mask register gpio_intmask;

[FIG. 65] A detailed table of a port A interrupt level register gpio_inttype_level;

[FIG. 66] A detailed table of a GPIO interrupt polarity register gpio_int_polarity;

[FIG. 67] A detailed table of a GPIO port A interrupt status gpio_intstatus;

[FIG. 68] A detailed table of a GPIO raw interrupt status gpio_rawintstatus;

[FIG. 69] A detailed table of a GPIO interrupt clear register gpioporta_eoi;

[FIG. 70] A PWM output diagram showing an example of timing of the manual mode;

[FIG. 71] A PWM output diagram showing an example of timing of the auto mode;

[FIG. 72] A PWM output waveform diagram;

[FIG. 73] A PWM cyclic range table;

[FIG. 74] A table showing the correspondence of GPIO terminal names and PWM channel numbers;

[FIG. 75] A detailed table of a PWM function enable register PWM_EN;

[FIG. 76] A detailed table of a PWM mode setting register PWM_MOD;

[FIG. 77] A detailed table of a PWM control register PWM_CNT;

[FIG. 78] A detailed table of a PWM base clock frequency division setting register PWM_BSCKDV*;

[FIG. 79] A detailed table of a PWM output low section width setting register PWM_LCNT*;

[FIG. 80] A detailed table of a PWM output high section width setting register PWM_HCNT*;

[FIG. 81] A detailed table of a PWM output pulse number setting register PWM_PULSE_NUM*;

[FIG. 82] A block diagram of an ADC;

[FIG. 83] A detailed table of an ADC operation mode setting register ADC_MOD;

[FIG. 84] A detailed table of an ADC sampling trigger enable register ADC_TRIGEN;

[FIG. 85] A detailed table of an ADC sampling trigger channel 0 register ADCSOFTTRIG0;

[FIG. 86] A detailed table of an ADC sampling trigger channel 1 register ADCSOFTTRIG1;

[FIG. 87] A detailed table of an ADC sampling trigger channel 2 register ADCSOFTTRIG2;

[FIG. 88] A detailed table of an ADC sampling trigger channel 3 register ADC_SOFTTRIG3;

[FIG. 89] A detailed table of an ADC channel 0 sampling data register ADC_DATA0;

[FIG. 90] A detailed table of an ADC channel 1 sampling data register ADC_DATA1;

[FIG. 91] A detailed table of an ADC channel 2 sampling data register ADC_DATA2;

[FIG. 92] A detailed table of an ADC channel 3 sampling data register ADC_DATA3;

[FIG. 93] A detailed table of an ADC conversion completion interrupt mask register ADCINTMASK;

[FIG. 94] A detailed table of an ADC conversion completion interrupt occurrence (prior to masking) register ADC_INTRSTATUS;

[FIG. 95] A detailed table of an ADC conversion completion interrupt occurrence register ADC_INTSTATUS;

[FIG. 96] A detailed table of an ADC conversion completion interrupt clear register ADCINTCLR;

[FIG. 100] A system register map including clock generator control;

[FIG. 101] A timing chart showing, when the maximum frequency is set, the relationship between SYS_CLK, SSI_CLK and SSI_DOUT/DIN;

[FIG. 102] An SSI interrupt table;

[FIG. 103] A table showing an SSI transfer mode;

[FIG. 104] A register map (1) of an SSI block;

[FIG. 105] A register map (2) of the SSI block;

[FIG. 106] A register map (3) of the SSI block;

[FIG. 112] An image processing block operation mode table;

[FIG. 113] A table showing the register access control of the present LSI;

[FIG. 114] A diagram showing register access using an index register;

[FIG. 115] A detailed table of the index register IDX;

[FIG. 116] A detailed table of a clock control register CLKCNT;

[FIG. 117] A diagram showing a 1/n frequency division waveform in the present LSI;

[FIG. 118] A detailed table of a clock frequency division register 1 CLKDIV1;

[FIG. 119] A detailed table of a clock frequency division register 3 CLKDIV3;

Figure 130:
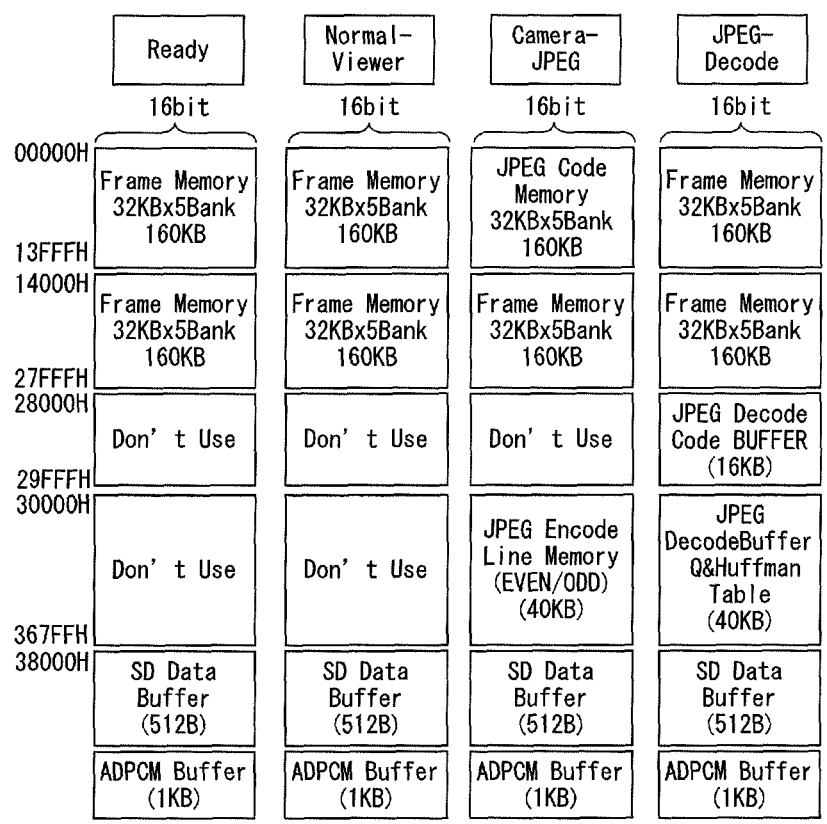
Figures 223, 224:
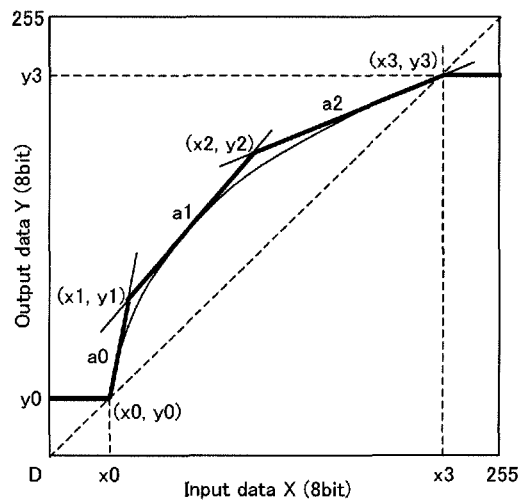
Figure 293:
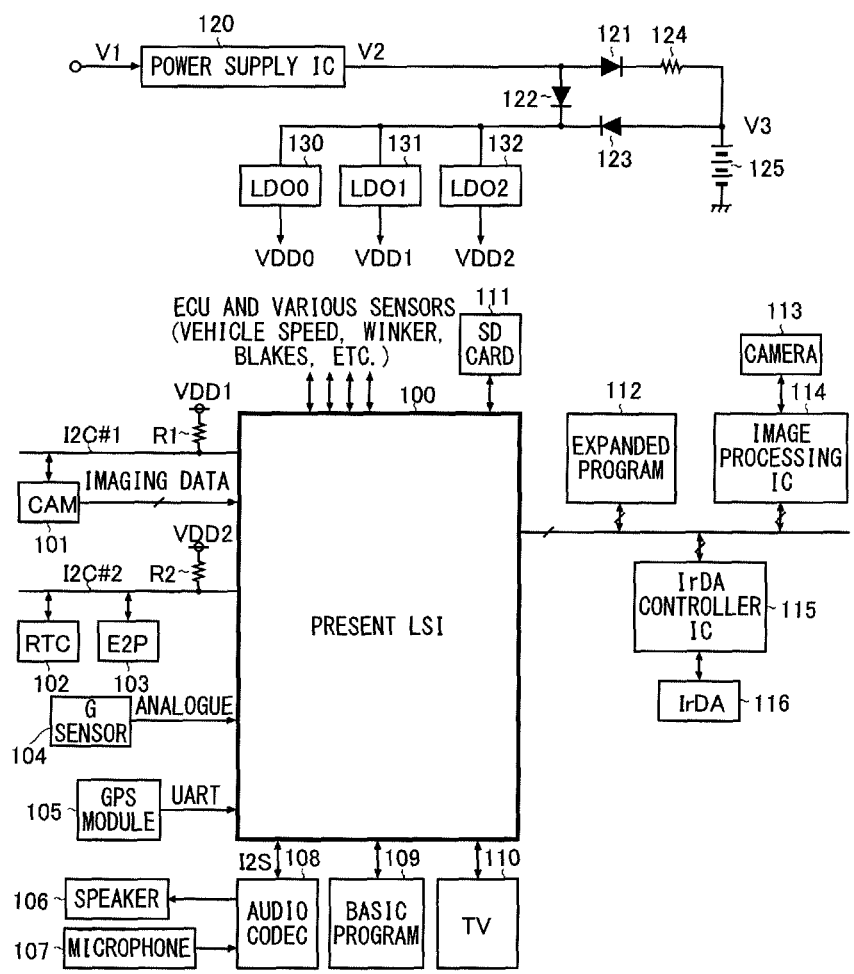
Figure 294:
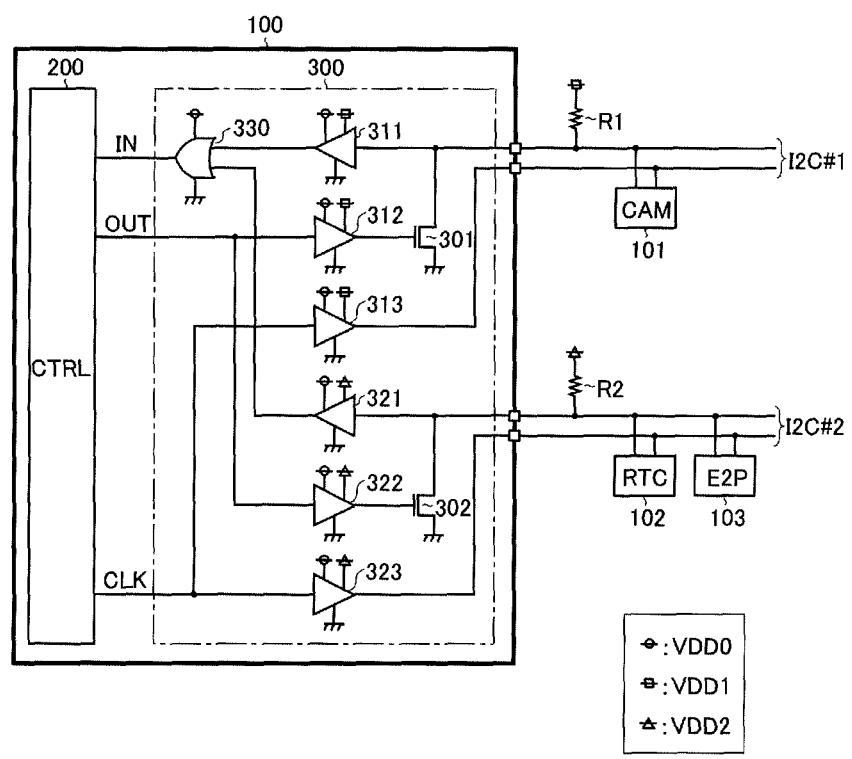
Figure 295:
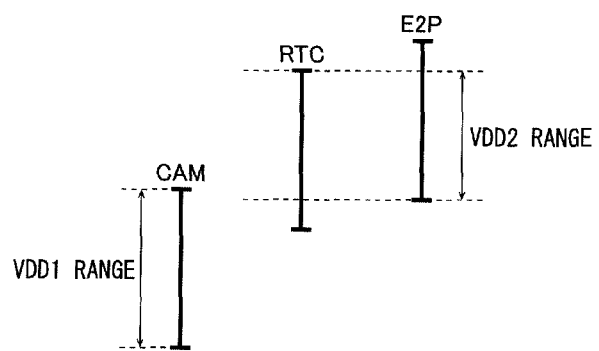
Figure 296:
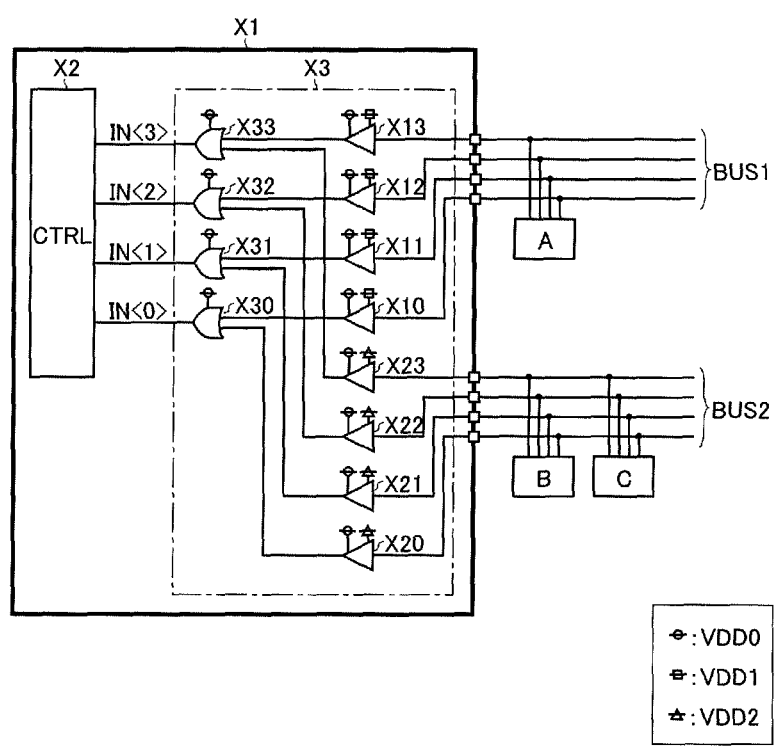
Figure 297:
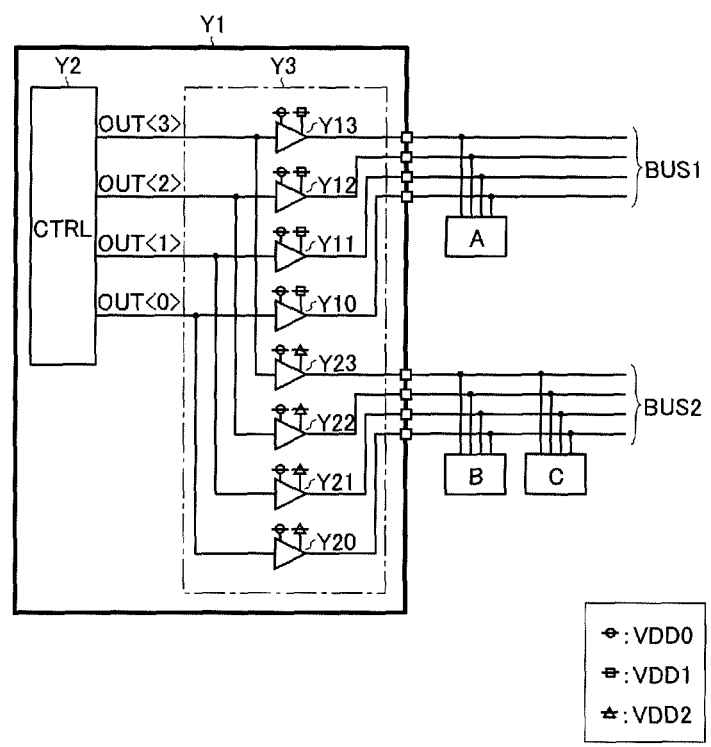
Figure 298:
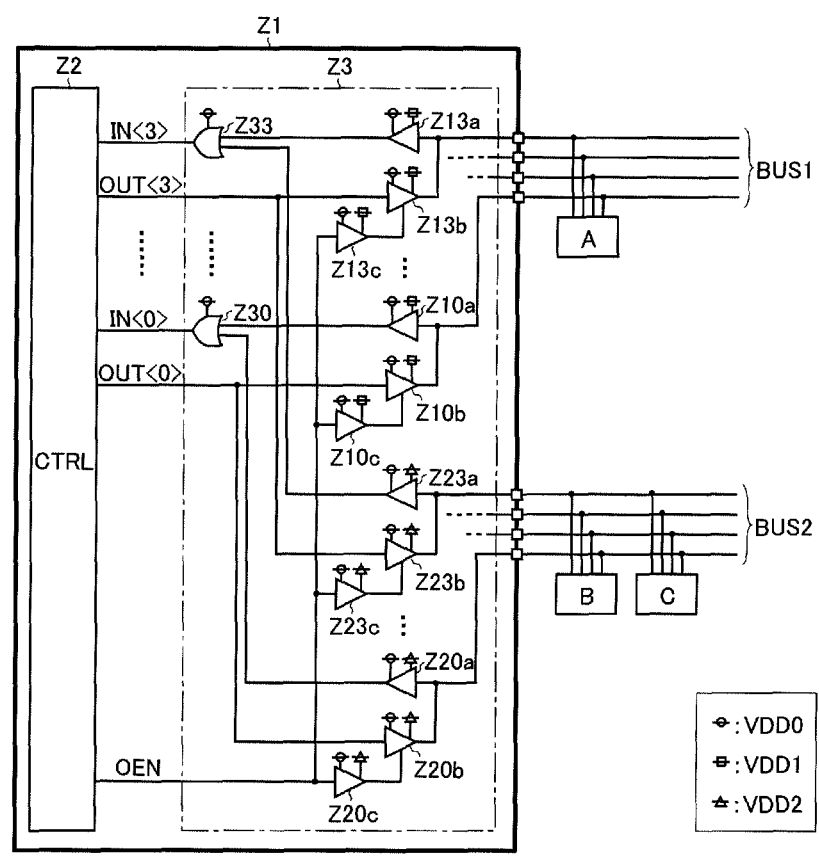
Figure 299:
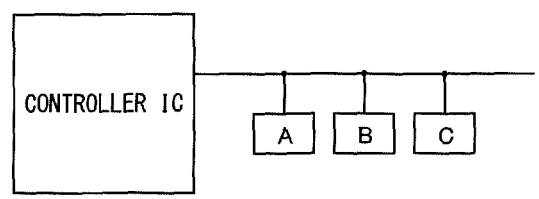
Figure 300:
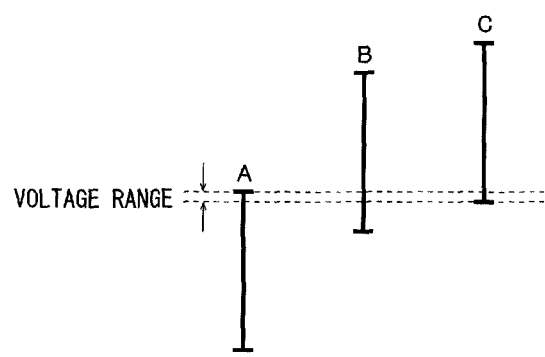
Figure 301:
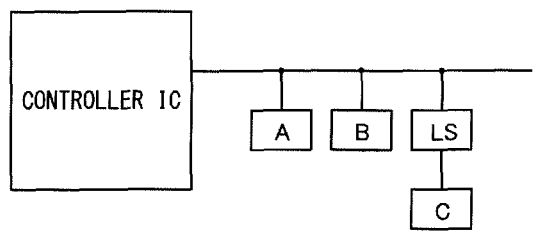

[FIG. 120] A diagram showing the configuration of a CAMCLKO_DLY circuit;

[FIG. 121] A detailed table of a clock frequency division register 4 CLKDIV4;

[FIG. 122] A detailed table of a hardware operation mode setting register HWMODE;

[FIG. 123] A table showing the relationship between the register setting value of HDMODE[3:0] and its operation mode;

[FIG. 124] A detailed table of an interrupt control register INTCNT;

[FIG. 125] A detailed table of an interrupt status register 1: INTST1;

[FIG. 126] A detailed table of an interrupt status register 2: INTST2;

[FIG. 127] A detailed table of an interrupt mask register 1: INTMSK1;

[FIG. 128] A detailed table of an interrupt mask register 2: INTMSK2;

[FIG. 129] An accessible target list in the present LSI;

[FIG. 130] A diagram showing the ABS address arrangement of an image processing block;

[FIG. 131] A block diagram of a camera module interface;

[FIG. 132] An interface signal list with a camera module;

[FIG. 133] A table showing camera clocks (CAMCKI) necessary sections;

[FIG. 134] A timing chart showing timing conditions for camera image signals in the camera module interface;

[FIG. 135] A setting table of ICMS and ICMH;

[FIG. 136] A detailed table of a camera signal logic setting register CAMIF;

[FIG. 137] A detailed table of a camera signal frame start pixel position register CAMTIM;

[FIG. 138] A schematic diagram showing the specification of a camera data processing start position;

[FIG. 139] A detailed table of a camera image filter processing selection register CAMFLT;

[FIG. 140] A table showing a correlation between a CAMFLT register setting value and a filter processing method;

[FIG. 141] A detailed table of a camera image two-step gradation processing threshold register FLTTHD;

[FIG. 142] A detailed table of a camera image sepia processing coefficient register FLTSEP;

[FIG. 143] A detailed table of a camera image sepia processing range register SEPRNG;

[FIG. 144] A detailed table of a camera image processing edge extraction 1 coefficient register FLTCOEF;

[FIG. 145] A detailed table of a camera image processing edge extraction 2 coefficient register FLTEDG2;

[FIG. 146] A detailed table of an X-direction camera image size register CXSIZ;

[FIG. 147] A detailed table of a Y-direction camera image size register CYSIZE;

[FIG. 148] A detailed table of an X-direction clipping start position register CAMRSX;

[FIG. 149] A detailed table of a Y-direction clipping start position register CAMRSY;

[FIG. 150] A detailed table of an X-direction clipping completion position register CAMREX;

[FIG. 151] A detailed table of a Y-direction clipping completion position register CAMREY;

[FIG. 152] A detailed table of a brightness component enlargement setting register CAMYD;

[FIG. 153] A table showing the relationship between register setting values and enlargement factors;

[FIG. 154] A detailed table of an X-direction reduction factor setting register CXSRK;

[FIG. 155] A detailed table of a Y-direction reduction factor setting register CYSRK;

[FIG. 156] A reduction algorism setting register SRKTYPE;

[FIG. 157] A list showing X-direction filter coefficients;

[FIG. 158] A diagram showing an outline of a bilinear algorism;

[FIG. 159] A timing chart showing the operation of a two-line serial interface;

[FIG. 160] A table showing timing conditions for the two-line serial interface;

[FIG. 161] A detailed table of a serial interface control register SERICNT;

[FIG. 162] A detailed table of a serial transfer device address setting register SERIDEVADR;

[FIG. 163] A table showing the relationship between SERI_HZ, CAMOFF and the operations of SDA and SDC;

[FIG. 164] A detailed table of a serial transfer register address setting register SERI2NDADR;

[FIG. 165] A table showing the relationship between individual flags and transfer modes;

[FIG. 166] A detailed table of a serial interface byte control register SERIBYTECNT;

[FIG. 167] A waveform diagram when a serial byte read transfer operation is performed;

[FIG. 168] A detailed table of a frame memory horizontal direction size setting register IMGHSIZE;

[FIG. 169] A detailed table of a frame memory vertical direction size setting register IMGVSIZE;

[FIG. 170] A memory map showing how two frame memories are used;

[FIG. 171] A detailed table of a memory control register MEMCNT;

[FIG. 172] A detailed table of a camera image storage start X position setting register MEMCSTAX;

[FIG. 173] A detailed table of a camera image storage start Y position setting register MEMCSTAY;

[FIG. 174] A detailed table of a memory access register YUV:MEMACS_YUV;

[FIG. 175] A table showing a YUV data write format;

[FIG. 176] A table showing a YUV data read format;

[FIG. 177] A detailed table of a memory access register RGB: MEMACS_RGB;

[FIG. 178] A table showing a RGB data write format;

[FIG. 179] A table showing a RGB data read format;

[FIG. 180] A detailed table of a memory access register ABS:MEMACS_ABS;

[FIG. 181] A detailed table of a memory rectangular access start X position setting register MEM_ADR_STX;

[FIG. 182] A detailed table of a memory rectangular access start Y position setting register MEM_ADR_STY;

[FIG. 183] A detailed table of a memory rectangular access completion X position setting register MEM_ADR_EDX;

[FIG. 184] A detailed table of a memory rectangular access completion Y position setting register MEM_ADR_EDY;

[FIG. 185] A table showing the relationship between (x, y) address specification and memory addresses;

[FIG. 186] A detailed table of a memory absolute address setting 1 register MEM_ADR_ABS1;

[FIG. 187] A detailed table of a memory absolute address setting 2 register MEM_ADR_ABS2;

[FIG. 188] A detailed table of a memory data transparent color setting register MEMTRANS;

[FIG. 189] A schematic diagram showing the writing of icon data with the setting of a transparent color;

[FIG. 190] A detailed table of a memory data transparent color mask register MEMTRMSK;

[FIG. 191] A system connection diagram showing an example of the connection between the image processing block and the TV encoder;

[FIG. 192] A schematic diagram showing the position of pixels and a generated pixel at the time of enlargement;

[FIG. 193] A detailed table of a TV encoder control register TE_CNT;

[FIG. 194] A TV encoder I/F operation setting table:

[FIG. 195] A detailed table of a TV encoder control register 2: TE_CNT2;

[FIG. 196] A detailed table of a frame memory transfer X start position TE_STX;

[FIG. 197] A detailed table of a frame memory transfer Y start position TE_STY;

[FIG. 198] A detailed table of a frame memory transfer X completion position TEEDX;

[FIG. 199] A detailed table of a frame memory transfer Y completion position TEEDY;

[FIG. 200] A detailed table of a horizontal direction enlargement setting register TE_EXPH;

[FIG. 201] A detailed table of a vertical direction enlargement setting register TE_EXPV;

[FIG. 202] A detailed table of a TV encoder output horizontal direction start position setting register TE_OUTSTH;

[FIG. 203] A detailed table of a TV encoder output vertical direction start position setting register TE_OUTSTV;

[FIG. 204] A waveform diagram in a vertical blanking section at an NTSC setting;

[FIG. 205] A waveform diagram in a vertical blanking section at a PAL setting;

[FIG. 206] A color bar waveform diagram at the NTSC setting;

[FIG. 207] A color bar waveform diagram at the PAL setting;

[FIG. 208] A detailed table of a parameter update register PARAMSET;

[FIG. 209] A detailed table of a mode register MODE;

[FIG. 210] An operation mode list;

[FIG. 211] A detailed table of an input interface format specification register YUVIFSET;

[FIG. 212] A detailed table of monitor X-direction pixel size setting registers XSIZE_L and XSIZE_H;

[FIG. 213] A detailed table of monitor Y-direction pixel size setting registers YSIZE_L and YSIZE_H;

[FIG. 214] A detailed table of a TV encoder reset register PWD;

[FIG. 215] A detailed table of a TV encoder display mode register DISP;

[FIG. 216] A detailed table of a TV encoder video mode register VIDEO;

[FIG. 217] A TV encoder frequency setting list;

[FIG. 218] A detailed table of a TV encoder video mode register CVBS;

[FIG. 219] A detailed table of a background color register BGCOL;

[FIG. 220] A detailed table of a TV encoder color bar test register COLBAR;

[FIG. 221] A detailed table of a TV encoder setup register SETUP;

[FIG. 222] A detailed table of TV encoder gamma collection registers (GM_A0, GM_A1, GM_A2, GM_X0, GM_X1, GM_X2, GM_X3, GM_Y0, GM_Y1, GM_Y2 and GM_Y3);

[FIG. 223] A diagram showing a gamma collection curve;

[FIG. 224] A table showing an example of the setting of the gamma collection register;

[FIG. 225] A detailed table of input valid start pixel offset setting registers OFS_h and OFS_1;

[FIG. 226] A detailed table of TV encoder valid data width setting registers WID_VD_h and WID_VD_1;

[FIG. 227] A detailed table of a TV encoder valid line width setting register HT_VD;

[FIG. 228] A detailed table of a TV encoder horizontal display position offset register H_POS;

[FIG. 229] A detailed table of a TV encoder vertical display position offset register V_POS;

[FIG. 230] A detailed table of an input valid start line offset setting register V_OFS;

[FIG. 231] A schematic diagram showing the details of the setting of a display position modification register;

[FIG. 232] A detailed table of an initialization register SRST;

[FIG. 233] A detailed table of a JPEG control register JPG_CNT;

[FIG. 234] A detailed table of a JPEG status 1 register JPG_ST1;

[FIG. 235] A detailed table of a JPEG status 2 register JPG_ST2;

[FIG. 236] A list showing each bit of a JPEG decode error status and error factors;

[FIG. 237] A detailed table of a JPEG status 3 register JPG_ST3;

[FIG. 238] A detailed table of a JPEG compression control register JE_CNT;

[FIG. 239] A detailed table of a JPEG code size register 1: JE_CSIZE1;

[FIG. 240] A detailed table of a JPEG code size register 2: JE_CSIZE2;

[FIG. 241] A detailed table of a JPEG code size pre-register 1: JE_CSIZE1_PRE;

[FIG. 242] A detailed table of a JPEG code size pre-register 2: JE_CSIZE2_PRE;

[FIG. 243] A detailed table of a JPEG code YUV format setting register JD_PICTYPE;

[FIG. 244] A table showing the relationship between register setting values and a YUV format;

[FIG. 245] A detailed table of a restart interval setting register JD_INTERVAL;

[FIG. 246] A detailed table of a JPEG code X-direction size setting register JD_XSIZE;

[FIG. 247] A detailed table of a JPEG code Y-direction size setting register JD_YSIZE;

[FIG. 248] A detailed table of a brightness DC component Huffman table 1 setting register JD_HUF_Y_DC1;

[FIG. 249] A detailed table of a brightness AC component Huffman table 1 setting register JD_HUF_Y_AC1;

[FIG. 250] A detailed table of a color-difference DC component Huffman table 1 setting register JD_HUF_C_DC1;

[FIG. 251] A detailed table of a color-difference AC component Huffman table 1 setting register JD_HUF_C_AC1;

[FIG. 252] A detailed table of a RESERVE register 1, 2: RESERVE;

[FIG. 253] A diagram showing the configuration of a frame memory bank;

[FIG. 254] A detailed table of a RING_INT generation control register RING_CNT;

[FIG. 255] A detailed table of a RING_INT generation count register RING_COUNT;

[FIG. 256] A detailed table of a ring buffer read data RING_RD;

[FIG. 257] A block diagram of an audio interface and an ADPCM codec;

[FIG. 258] A detailed table of an audio common setup register 1: COMMON_SETUP1;

[FIG. 259] A detailed table of an audio common setup register 2: COMMON_SETUP2;

[FIG. 260] A detailed table of an ADPCM channel volume register ADPCM_CH_VOL;

[FIG. 261] A detailed table of an ADPCM master channel volume register ADPCM_MASTER_LR_VOL;

[FIG. 262] A detailed table of an ADPCM slave channel volume register ADPCM_SLAVE_LR_VOL;

[FIG. 263] A detailed table of an ADPCM interrupt status register (at the time of reading): ADPCM_INT_STATUS;

[FIG. 264] A detailed table of an ADPCM master FIFO status register (at the time of writing): ADPCM_MASTER_FIFO_STATUS;

[FIG. 265] A detailed table of the ADPCM master FIFO status register (at the time of reading): ADPCM_MASTER_FIFO_STATUS;

[FIG. 266] A detailed table of an ADPCM slave FIFO status register (at the time of writing) ADPCM_SLAVE_FIFO_STATUS;

[FIG. 267] A detailed table of the ADPCM slave FIFO status register (at the time of reading): ADPCM_SLAVE_FIFO_STATUS;

[FIG. 268] A detailed table of the ADPCM FIFO setup register ADPCM_FIFO_SETUP;

[FIG. 269] A NEARLY_FULL_SETUP setting table;

[FIG. 270] A NEARLY_EMPTY_SETUP setting table;

[FIG. 271] A detailed table of an ADPCM recording volume register ADPCM_EXT_VOL;

[FIG. 272] A detailed table of an ADPCM master setup register ADPCM_MASTER_SETUP;

[FIG. 273] A detailed table of an ADPCM slave setup register ADPCM_SLAVE_SETUP;

[FIG. 274] A detailed table of an ADPCM channel control register ADPCM_CH_CONTROL;

[FIG. 275] A detailed table of a PCM IF format setting register PCMIF_FORMAT;

[FIG. 276] A detailed table of an audio digital IF input setting register AUDDTI_IF_INPUT_FORMAT;

[FIG. 277] A detailed table of an interval setting register INTERVAL_SETTING;

[FIG. 278] A detailed table of an ADPCM recording mode setting register ADPCM_REC_MODE;

[FIG. 279] A detailed table of an ADPCM master FIFO access register (at the time of writing): ADPCM_MASTER_FIFO_WINDOW;

[FIG. 280] A detailed table of the ADPCM master FIFO access register (at the time of reading): ADPCM_ENCODE_FIFO_WINDOW;

[FIG. 281] A detailed table of an ADPCM slave FIFO access register ADPCM_SLAVE_FIFO_WINDOW;

[FIG. 282] A detailed table of a sampling frequency setting register SAMPLING_TIMING_SETUP;

[FIG. 283] A detailed table of a sequence control register 1: SEQUENCE_CONTROL;

[FIG. 284] An SDIF block system;

[FIG. 285] A diagram showing the SDIF_Write transfer timing of the present LSI;

[FIG. 286] A table showing the write transfer timing from the present LSI to an SD module;

[FIG. 287] A diagram showing the SDIF_Read transfer timing of the present LSI;

[FIG. 288] A table showing the read transfer timing from the SD module to the present LSI;

[FIG. 289] A detailed table of a setup sequence control register SETUPCNT;

[FIG. 290] A detailed table of a setup sequence setting register SETUPSET;

[FIG. 291] A detailed table of a product ID register PRODUCT_ID;

[FIG. 292] A detailed table of a revision no. register REV_NO;

[FIG. 293] A block diagram showing an example of the configuration of a drive recorder using the present LSI;

[FIG. 294] A circuit diagram showing an example (serial input and output) of the configuration of a bus interface circuit;

[FIG. 295] A diagram showing the setting range of interface voltages VDD1 and VDD2;

[FIG. 296] A circuit diagram showing an example (parallel input) of the configuration of a bus interface circuit;

[FIG. 297] A circuit diagram showing an example (parallel output) of the configuration of the bus interface circuit;

[FIG. 298] A circuit diagram showing an example (parallel input and output) of the configuration of the bus interface circuit;

[FIG. 299] A block diagram showing one example of a conventional semiconductor device connected to a plurality of devices through a bus;

[FIG. 300] A diagram showing the setting range of an interface voltage in the semiconductor device of FIG. 299;

[FIG. 301] A block diagram showing another example of the conventional semiconductor device connected to a plurality of devices through a bus; and

Figure 302:
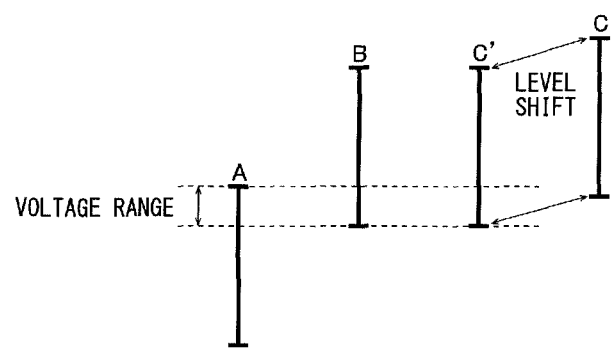

[FIG. 302] A diagram showing the setting range of an interface voltage in the semiconductor device of FIG. 301.

DETAILED DESCRIPTION OF PREFERRED EMBODIMENTS

<Outline>

An outline of a silicon monolithic semiconductor integrated circuit device (hereinafter called the present LSI) disclosed in this specification will first be described. The present LSI is an image sound processing LSI that incorporates a central processing unit (hereinafter called a CPU).

<Feature>

A feature of the present LSI will now be described. The present LSI is a one-chip LSI, for use in a drive recorder, that makes it easy to develop the drive recorder. The present LSI incorporates dedicated hardware that controls a triaxial acceleration sensor necessary for the drive recorder, a camera module, an SD card and the like. The dedicated hardware can be controlled by the CPU, and can perform various applications.

<CPU>

The present LSI incorporates the 32-bit CPU. The CPU has an instruction cache and a data cache, and an instruction tightly coupled memory and a data tightly coupled memory (hereinafter called a TCM). The data sizes of the instruction cache, the data cache, the instruction TCM and the data TCM are 4 KB, 4 KB, 64 KB and 4 KB, respectively. The instruction TCM is enabled at a TCM_SEL terminal.

When resetting is cancelled, data is automatically read from an external serial EEPROM (electrically erasable and programmable read only memory) or a serial FLASH to the instruction TCM (hereinafter called I-TCM), and thereafter the CPU is automatically reset and can perform a program. Here, a fixed length of data of 8K bytes is downloaded. This type of operation is performed to achieve an external serial boot function.

When a program is stored in the I-TCM, the I-TCM can be treated as a ROM, with the result that a flash ROM connected through an external bus becomes unnecessary. This function is enabled at an AUTO_READ terminal. The EEPROM can be accessed by the CPU through a program via a SPI (system packet interface).

The present LSI includes a JTAG (joint test action group) interface for program debugging.

External terminals are as follows.

Terminals for connection to the EEPROM: SSI_CLK, SSI_CSB, SSI_DIN, SSI_DOUT, SSI_WPB Terminals for connection to the JTAG: TCK, TMS, TDI, TDO, nTRST Terminals for the setting of the CPU: TCM_SEL, AUTO_READ <External Memory Interface>

The present LSI includes an 80 system memory interface, and can connect to the FLASH ROM and an SRAM therethrough. A data bus corresponds to 8-bit and 16-bit. When access is performed in units of 8 bits, it is necessary to correspond to 8-bit from the time when boot data immediately after resetting is fed in from the outside. Here, the BIT_SEL terminal is preferably set high. After the completion of the boot, switching can be performed by a register.

External terminals are as follows.

Address terminals (21-bit): EXT_ADR21 to EXT_ADR1

Data terminals (16-bit): EXT_DATA15 to EXT_DATA0

CSB terminals (three terminals): EXT_CSB2 to EXT_CSB0 (CSB3 is internally allocated to an image processing block.)

WEB (write enabling) terminal: EXT_WEB

OEB (read enabling) terminal: EXT_OEB

Switching terminal with a bus width of 8/16: BIT_SEL (effective only for a device connected to an external memory CSB0)

<Interrupt Controller>

The present LSI includes an interrupt controller that performs the mask control of an internal interrupt including a common external input interrupt of GPIO (general purpose I/O) and the control of a handler address.

<Watch Dog Timer>

The present LSI includes one channel of a watch dog timer. A counter is of 32-bit, and down-counts from the initial setting value to zero. After a time-out occurs, one of the following operations can be selected.

The first operation: to generate a system reset

The second operation: to first output an interrupt, and generate the system reset unless clearing from a service routine is performed at the time of the succeeding time-out <Timer and Timer Counter>

The present LSI incorporates two channels of 32-bit timers. Each timer supports a free run mode and a user-defined count mode. The present LSI also incorporates one channel of a 32-bit timer counter (up-counter), and the 32-bit timer counter counts the number of times which the edge rises at a TIM_TRIG terminal. When the count value overflows, the count value returns to zero.

An external terminal is as follows.

Count trigger terminal: TIM_TRIG

<UART (Universal Asynchronous Receiver Transmitter)>

The present LSI incorporates two channels of UARTs as a serial interface. One of them allows auto-flow control. A UART block incorporates a 16-word FIFO. The length of a data bit (5 to 8 bits), a parity bit and stop bits (1 bit, 1.5 bits and 2 bits) can be set. A baud rate can be so set by the register as to be programmable. The UART block can provide a notification of a communication state to the CPU by the interrupt of a reception error, a time-out or the like.

External terminals are as follows.

UART1 function terminals: Tx1, Rx1, RTS1, CTS1

UART2 function terminals: Tx2, Rx2

<GPIO (PWM [Pulse Width Modulation]/IRQ [Interrupt Request] Input)>

The present LSI includes sixteen GPIO ports, the input setting and the output setting of each of which can be performed independently. Four out of the sixteen GPIO ports can be used for an IRQ. Another four ports can be used for PWM output. A frequency division ratio is 1/2 to 1/220; a high section width and a low section width can be individually set.

External terminals are as follows.

GPIO dedicated terminals (8-bit): GPIO15 to GPIO8

GPIO/PWM common terminals (4-bit): GPIO7 to GPIO4

GPIO/IRQ common terminals (4-bit): GPIO3 to GPIO0

<AD (Analog/digital) Converter>

The present LSI incorporates four channels of 8-bit A/D converters (ADC). One channel of a sequential comparison type, R-2R standard type AD is incorporated, and four-channel extension is used through selection by an analogue switch. The change of channel specification, a simultaneous four-channel single sweep and a simultaneous four-channel free sweep change function can be used. A change voltage ranges from 0.1×AVDD to 0.9×AVDD. The A/D converter has an independent power supply ADVDD.

External terminals are as follows.

Analogue input terminals: ADIN0, ADIN1, ADIN2, ADIN3

<Clock Controller/PLL>

The clock controller of the present LSI incorporates two radiator amplifiers for system clocks and audio clocks. A feedback resistor is externally provided. External clocks can also be input. The present LSI incorporates a PLL. The PLL generates CPU clocks, camera module clocks and other clocks from clocks input to an XIN terminal. Within the LSI, 27 MHz VIDEO encoder clocks and audio clocks having a frequency 1024 times higher than a sampling frequency are necessary.

External terminals are as follows.
System clock input and oscillation terminals: XIN, XOUT
Audio clock input and oscillation terminals: AXIN, AXOUT The internal clocks are fed through the following seven systems. Immediately after resetting, XIN is fed to SYSCLK, and XIN is also fed to SYS_CLK_WDT; clocks to the other blocks are operated by the setting of the register.

The internal clocks of the seven systems are as follow.
SYS_CLK: clocks to the CPU
SYS_CLK_WDT: clocks to the watch dog timer
ADC_CLK: clocks to an AD conversion block
IMG_CLK: clocks to an image processing block
TVE_CLK: clocks to a TV encoder (having the frequency limited)
SDC_CLK: clocks to an SD controller
AUD_CLK: clocks to an I2S block (having the frequency limited)

<SSI (Synchronous Serial Interface)>
The present LSI incorporates an SSI block which is also used by a terminal for external serial EEPROM data automatic boot load to the I-TCM of the CPU. An SSI mode supports three modes, namely, SPI, SSP and microwave modes.

External terminals are as follows.
EEPROM function connection terminals: SSI_CLK, SSI_CSB, SSI_DIN, SSI_DOUT, SSI_WPB <Image Processing Portion: Outline>
The image processing block is a mega-block that incorporates a camera interface, a JPEG codec, the TV encoder, an SD card controller, an I2C master interface and the like. An external memory chip select CSB3 is allocated to access from the CPU to this image processing portion and is internally connected. The access to the image processing portion is limited to access that is performed in units of 16 bits. Each block of the image processing portion can run on its own with hardware by the setting of the register. As operation modes, there are four modes, namely, READY, CAMERA-JPEG, NORMAL-VIEWR and JPEG-DECODE modes. For an interrupt for each block, a dedicated interrupt controller is provided within the image processing portion, and an interrupt for the image processing portion is included in the interrupt controller of the CPU.

<Image Processing Portion: Camera Interface>
The camera module interface of the present LSI performs processing for receiving data, clocks and synchronization signals from an externally connected camera module according to the setting of the register. The received sensed image data is converted into a common YUV 4:4:4 format handled within an IC, and is subjected to filter processing for image editing, reduction processing, processing for clipping a rectangle and processing for changing brightness (D range up/down). The camera image data that has undergone the above-mentioned processing is converted from YUV to RGB, and is written into a frame memory according to the setting of a storage position register. A data format within the frame memory is such that RGB=5:6:5. The present LSI has an independent power supply CAVDD to cope with a case where the voltage of a camera is different from IO (such as an external bus).

External terminals are as follows.
Data terminals (8-bit): CAMD0 to CAMD7
Synchronization signal terminals: HSync, VSync
Clock input terminal: CAMCKI
Clock output terminal: CAMCKO <Image Processing Portion: I2C Master Controller>
The present LSI incorporates the I2C master interface to communicate with the camera, a RTC (real time clock) and the EEPROM. There are two sets of serial signals; they are handled as one channel within the present LSI. It is possible to prevent power consumption and noise resistance degradation resulting from a difference between high voltages when devices having different power supply voltages are connected. The power supply has two systems, namely, I1VDD and I2VDD.

External terminals are as follows.
Serial bus terminal connectable to power supply system 1 (I1VDD): SDC1, SDA1
Serial bus terminal connectable to power supply system 2 (I2VDD): SDC2, SDA2

<Image Processing Portion: a Memory within an Image Block>
The present LSI incorporates, as the frame memory, two screens of QVGAs (quarter video graphics arrays) (320× 240), that is, a memory having a total of 320 KB. The two frames are divided into a screen in which an image from the camera or a JPEG decompressed image is written and a screen from which data transmitted to the VIDEO encoder is read, and thus it is possible to eliminate noise (tearing). The data format within the frame memory is such that RGB=5:6:5. The read/write access to the frame memory can be performed by the CPU. It is possible to write, with a transparent color function, an image other than the rectangle over a JPEG decoded image decompressed in the frame memory.

<TV Encoder>
The present LSI can output, with the internal TV encoder, any range of an image frame memory as an analog composite signal (CVBS) of NTSC/PAL. The frame memory is used as the two screens, and the succeeding JPEG is decoded while one screen is TV-output and is stored in the other. After the completion of the decoding, in synchronization with VSYNC, a TV output screen is switched and used. Although 320 KB (QVGA) can be output to the TV, JPEG decoding and TV output simultaneously access the frame memory, and thus noise (tearing) is produced on the TV image. An analog signal is output through a 10-bit current DAC. When a 75Ω resistor is connected between a VOUT terminal and a GND, a 75Ω driver is unnecessary. When the TV encoder is used, oscillation frequencies at XIN and XOUT are preferably determined such that 27 MHz can be supplied. The power supply has a DAVDD dedicated for the DAC.

External terminals are as follows.
VIDEO output terminal (composite format): VOUT
Reference current setting terminal: IREF
*Immediately after the resetting, starting occurs with the DAC on <Image Processing Portion: JPEG Codec>
The present LSI incorporates the ISO/IEC10918-compliant baseline mode compatible JPEG codec, The JPEG codec can compress an image processed by the camera module interface into JPEG. The compression mode is such that YUV=4:2:2 (thinning out in the horizontal direction). A compression ratio can be selected from 32 stages. The compressed data can be read to the CPU through a ring memory (which is also used as one screen of the frame memory and has 160 KB). The compressed JPEG data is written from the CPU into the code memory (16 KB), is decompressed and is further processed by the camera module interface, and thereafter can be stored in the frame memory. As compression modes in which decompression can be performed, there are five modes, namely, YUV=4:4:4, 4:2:2 (corresponding to only thinning out in the horizontal direction), 4:2:0 and 4:1:1 (corresponding to only thinning out in the horizontal direction) and a grey scale.

<Image Processing Portion: ADPCM Audio Interface>

The present LSI incorporates an I2S interface for connection to an external digital audio codec. The I2S interface incorporates one input port and one output port, and corresponds to left-aligning, right-aligning and an IIS mode. Access from the CPU is performed through the FIFO (1 KB). When an IIS interface is used, as audio clocks, clocks having a frequency 1024 times higher than the sampling frequency (in the case of 32 kHz sampling, 32.768 MHz) are necessary. Audio clocks can be frequency division and output such that they are used as master clocks of the external digital audio codec.

External terminals are as follows.
I2S input terminals: ADCKI, ADLRI, ADDTI
I2S output terminals: ADCKO, ADLRO, ADDTO
Clock output terminal: AMCKO <SD Card Interface/SD Card Controller>

The present LSI incorporates one channel of a host controller for a SD standard compatible SD card/MMC (multimedia card). The host controller incorporates a 512 byte card access buffer RAM. The interface supports an SD bus mode (1-bit and 4-bit) and an SPI mode. When serial or parallel (4-bit) access is performed, the interface can comply with SD 2.0. With respect to compatibility with MMC and MMC+, access can be performed under conditions of the above-described restrictions. The present LSI has a power supply SDVDD dedicated for an SD device.

External terminals are as follows.
Clock terminal: SD_CLK
Command terminal: SD_CMD
Data terminals (4-bit): SD_DAT3 to SD_DAT0

<Power Supply System, Resetting and the Like>

The present LSI has eight power supply systems. The power supply is divided into the power supply systems as shown in FIG. 1. FIG. 1 is a table showing the power supply systems of the present LSI. Resetting is all asynchronous resetting. A test terminal is provided to test an IC. It is necessary to ensure that the test terminal is used while connected to GND.

External terminals are as follows.
Terminal for resetting the entire present LSI: RESETB
Terminal for setting to a test mode function: TEST (it is necessary to connect to GND during use)

<Package>

The present LSI employs a VQFP (very small quad flat package)—T144 mold package (22 mm×22 mm×1.6 mm, 0.5 mm pin pitch).

<Description of Terminals, Position of the Terminals and External Dimensions>

Figure 5:
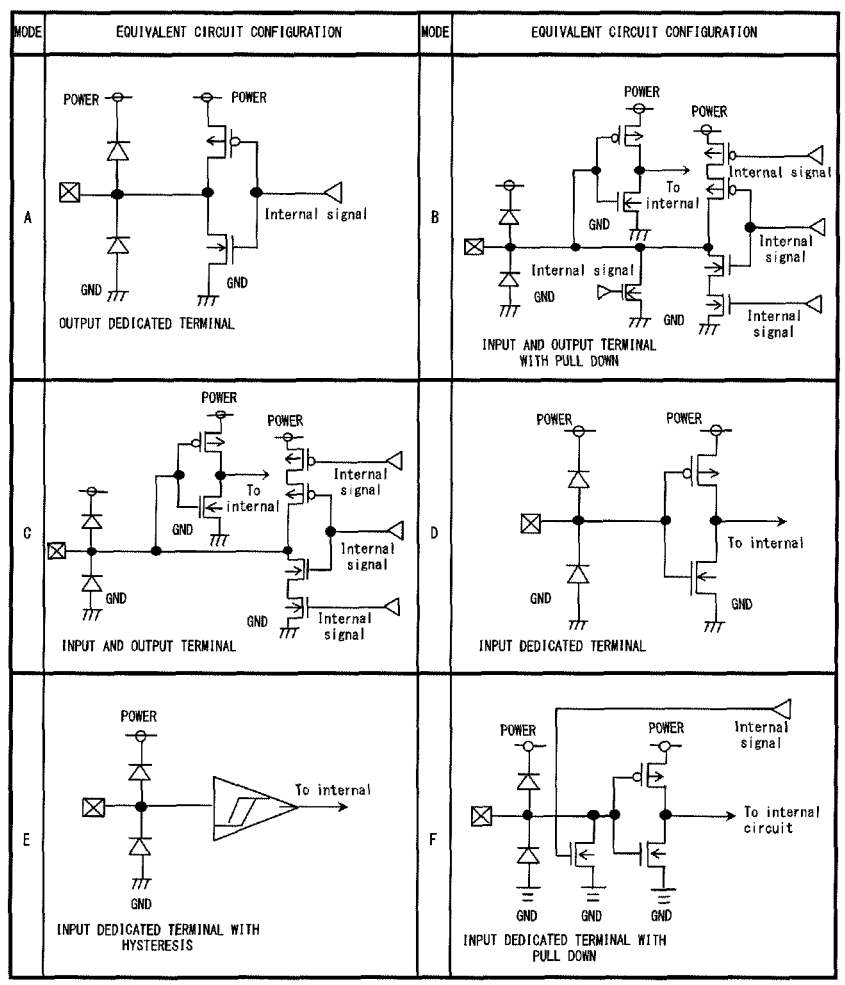
[FIG. 5] A diagram showing the configurations of equivalent circuits of the input-output terminals of the present LSI (configurations A to F)
Figure 6:
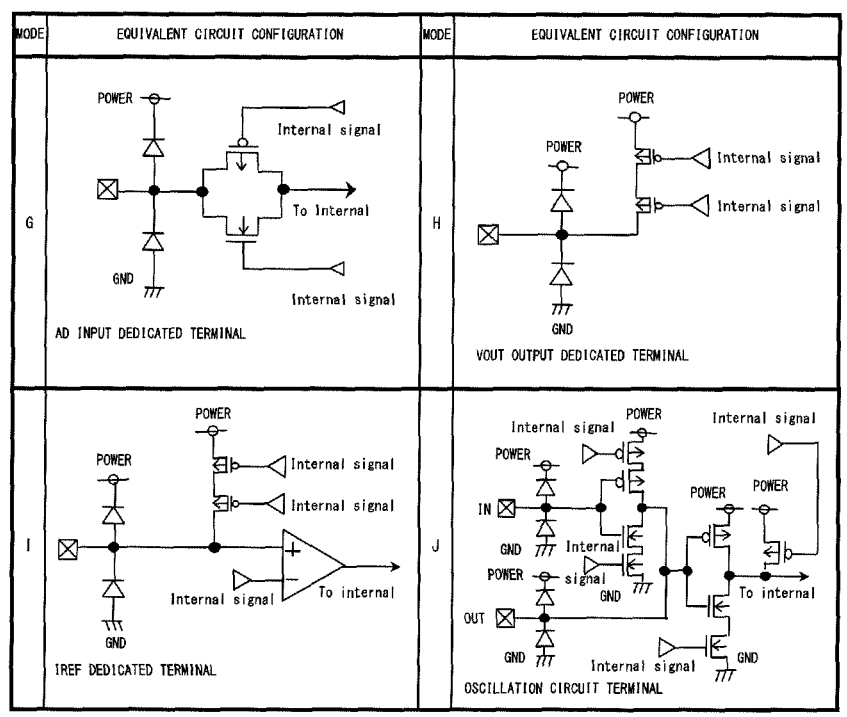
[FIG. 6] A diagram showing the configurations of equivalent circuits of the input-output terminals of the present LSI (configurations G to J)
Figure 7:
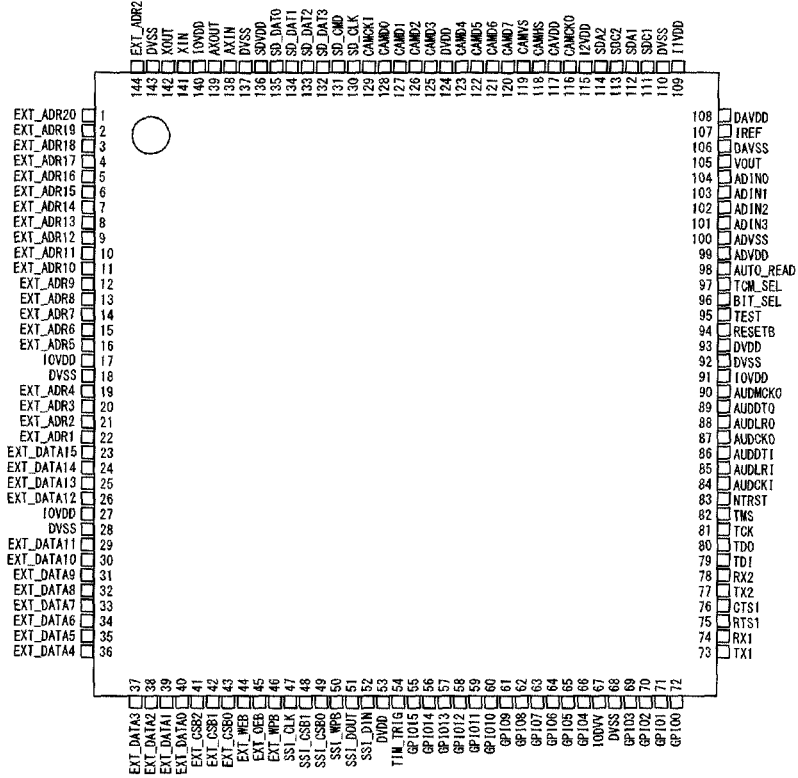
[FIG. 7] A diagram showing the arrangement of the terminals of the present LSI.
Figure 8:
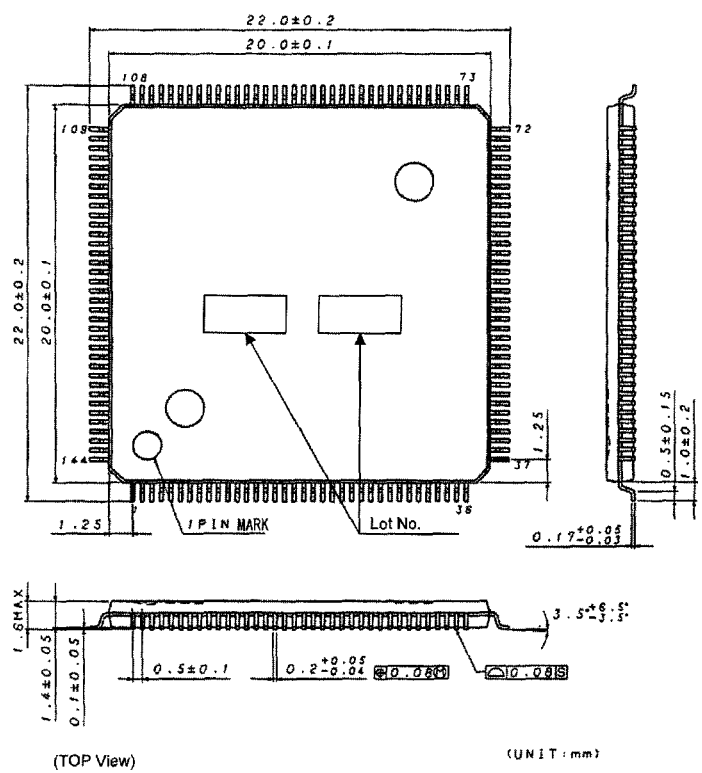
[FIG. 8] A diagram showing external dimensions of the present LSI.

FIGS. 2 to 4 are a table showing functions of the terminals of the present LSI. FIGS. 5 and 6 are diagrams showing the configurations of equivalent circuits of the input-output terminals of the present LSI. FIG. 7 is a diagram showing the arrangement of the terminals of the present LSI. FIG. 8 is a diagram showing external dimensions of the present LSI. The note "*1" written in the column "processing during non-use" shown in FIGS. 2 to 4 indicates that "PD-" represents pulling down to the following signal and that "PU-" represents pulling up to the following signal. The signs A to J written in the column "circuit configuration" shown in FIGS. 2 to 4 indicate that they correspond to the configurations A to J shown in FIGS. 5 and 6.

<Electrical Properties>

FIG. 9 is a table showing electrical properties of the present LSI. Unless otherwise specified, the following conditions are applied. DVDD=1.50 V; DAVDD=ADVDD=I1VDD=I2VDD=SDVDD=I0VDD=3.30 V; CAVDD=2.85 V (all power supply terminals are hereinafter represented by VDD); DAVSS=ADVSS=DVSS=0.0 V; Ta=25° C.; fXIN=13.5 MHz; fAXIN=16.384 MHz; fSYS=41.0 MHz (internal clocks at the time of use of PLL). The representation "IOPWR" in the following description refers to the generic term of all the 10 power supply terminals.

<Block Diagram>

Figure 10:
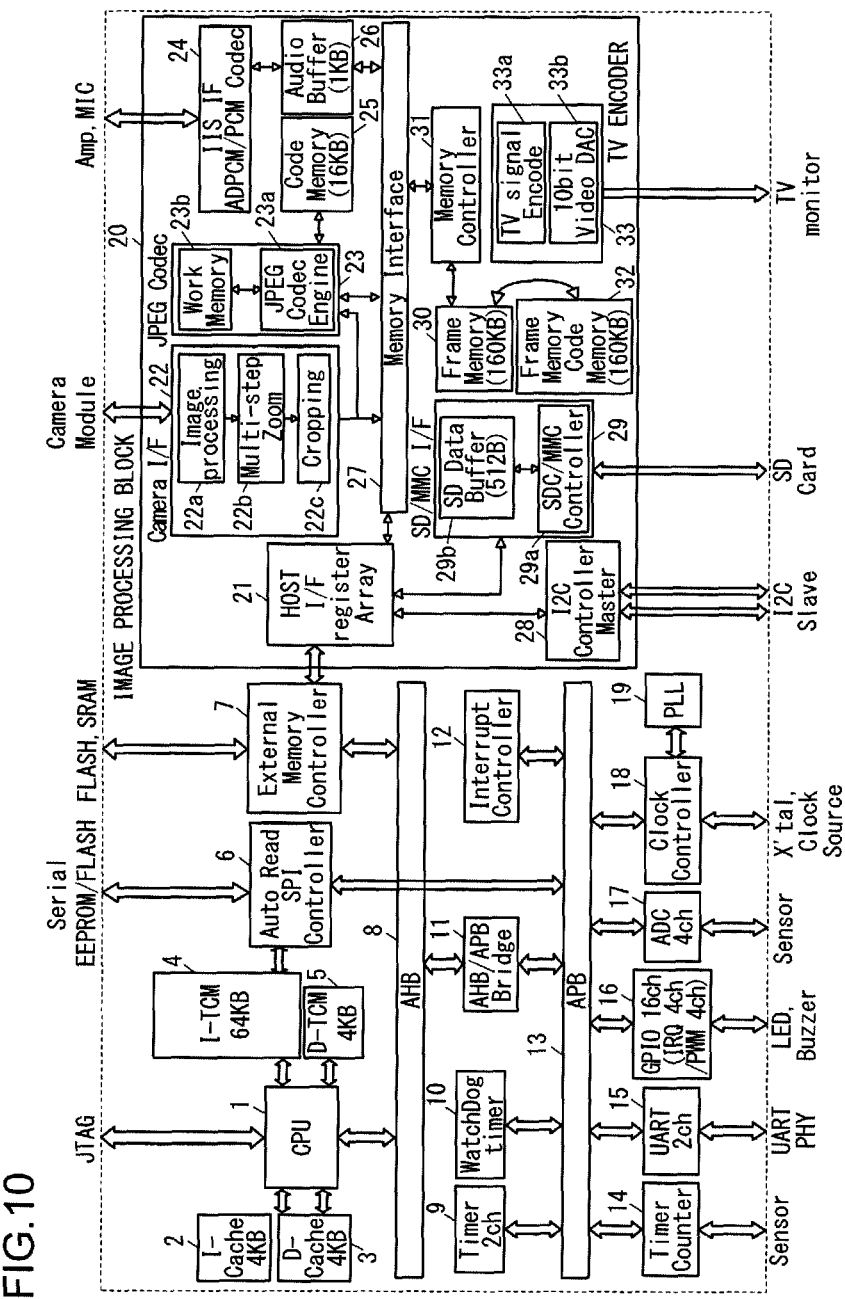
[FIG. 10] A block diagram of the present LSI.

FIG. 10 is a block diagram of the present LSI. As shown in the figure, the present LSI includes a CPU 1, an instruction cache 2, a data cache 3, an instruction TCM 4, a data TCM 5, an auto read SPI controller 6, an external memory controller 7, a high-speed system bus 8 (hereinafter referred to as an AHB (advanced high performance bus) 8), a timer 9, a watch dog timer 10, an AHB/APB bridge 11, an interrupt controller 12, a medium-low speed system bus 13 (hereinafter referred to as an APB (advanced peripheral bus) 13), a timer counter 14, a UART 15, a GPIO 16, an A/D converter 17, a clock controller 18, a PLL 19 and an image processing portion 20.

The image processing portion 20 includes a host interface 21, a camera interface 22, a JPEG codec 23, an ADPCM audio interface 24, a code memory 25, an audio buffer 26, a memory interface 27, an I2C controller 28, an SD/MMC interface 29, a first frame memory 30, a memory controller 31, a second frame memory 32 and a TV encoder 33.

The camera interface 22 includes an image processing portion 22a, a multi-step zoom portion 22b and a cropping portion 22c. The JPEG codec 23 includes a JPEG codec engine 23a and a work memory 23b. The SD/MMC interface 29 includes an SDC/MMC controller 29a and an SD data buffer 29b. The TV encoder 33 includes a TV signal encoder 33a and a 10-bit video DAC 33b.

<Description of Functions>

The outline of the functions of individual portions of the present LSI is described above; the functions of the individual portions of the present LSI will be described more in detail below.

<CPU>

The present LSI incorporates the CPU. The capacities of caches and data tightly coupled memories (TCMs) incorporated in the present LSI are as follows.
Instruction cache (I-cache): 4K bytes
Data cache (D-cache): 4K bytes
Instruction TCM (I-TCM): 64K bytes
Data TCM (D-TCM): 4K bytes The initialization and the reload of the I-TCM will be described. In the present LSI, after the cancellation of an external reset signal, the initialization (downloading of a program) of the I-TCM can be performed with hardware through an SSI interface. During the downloading, clocks are not supplied to the CPU, and, after the completion of the downloading, the supply of the clocks is started, and an execution is started from an address 0x00000000.

Figure 11:
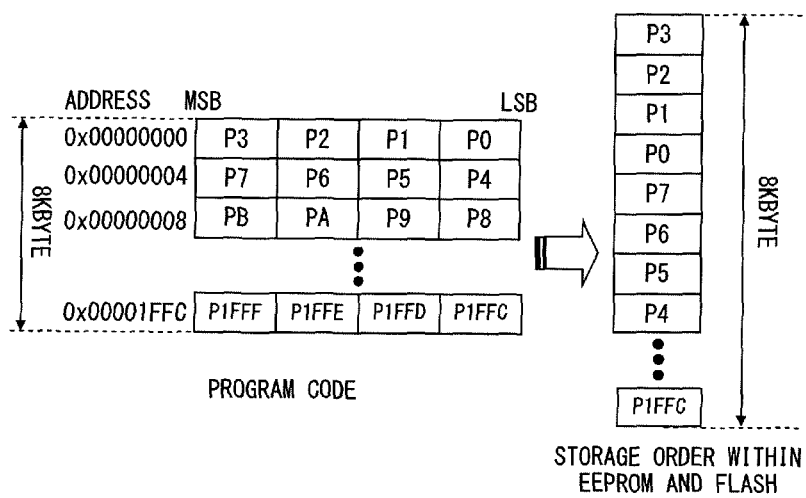
[FIG. 11] A diagram showing an order of storage into a serial medium at the time of auto read.

An external device, interfaces and setting are as follows.
External device: EEPROM serial mode
Interfaces: SSI_CLK, SSI_CSBO, SSI_DIN
Setting: external terminal AUTO_READ is set high Preferably, when the initialization of the I-TCM is performed from an external serial EEPEOM or FLASH device, programs and data are stored in the external device in units of 4 bytes, and the arrangement of the LSB byte and the MSB byte is reversed. It should be noted that, when a compiler performs a big endian conversion, data, codes and the like in bytes or words (2 bytes) are processed in units of each length, and thus their arrangement is changed when the I-TCM is downloaded. The initialization download function of the I-TCM is performed at a constant rate of 8 KB. During the execution of a program, when a different program is downloaded (reloaded) to the I-TCM, it is preferable to use the SSI interface on the program to perform control. FIG. 11 is a diagram showing an order of storage in a serial medium at the time of auto read.

Figure 12:
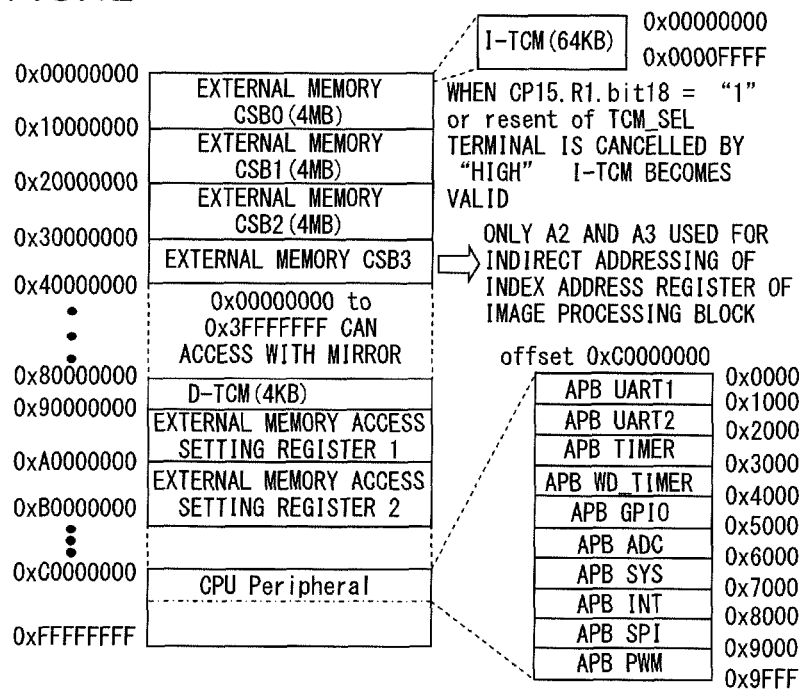
[FIG. 12] A memory map of a CPU.

The memory map of the CPU will be described. The address space of the CPU is 32 bits; the external address is 22 bits (4 M bytes). The address space of the CPU and the mapping of the memory map (CSB0-3) are fixed as shown in FIG. 12. FIG. 12 is the memory map of the CPU.

<External Memory Control>

The present LSI can access four channels (chip select) of memory area; CSB0 to CSB2 are allocated to an image processing block outside the present LSI, and CSB3 is allocated to an image processing block within the present LSI. The external memory allows two ways of access, namely, 8-bit access and 16-bit access (at the time of 16-bit access: 4 M byte space, at the time of 8-bit access: 2 M byte space). The 8-bit access is allowed only to devices connected to CSB0, CSB1 and CSB2 for selecting external devices; the image processing block within the present LSI allows the 16-bit access alone. Due to index address register indirect access, an index register is present at 0x30000008, and a data register is present at 0x3000000C.

Figure 13:
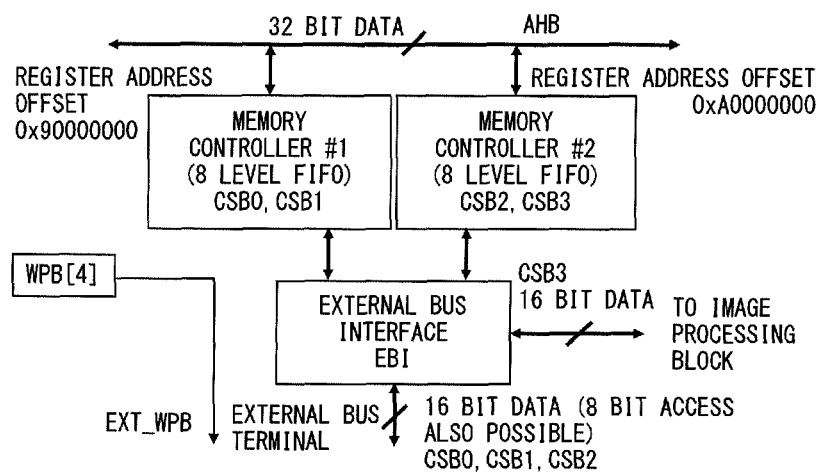
[FIG. 13] A diagram showing the configuration of a memory controller and an external bus interface.

The present LSI can access the external memory and the image processing block through two channels of the memory controller and an external bus interface, FIG. 13 is a diagram showing the configuration of the memory controller and the external bus interface in the present LSI.

The memory spaces of CSBn (n=0 to 3) are predetermined by the default; however, different memory spaces can be set by rewriting the register of the memory controller. Bus access timing can also be set by rewriting the register. FIG. 14 is a memory controller register map. The base address of the memory controller #1 is 0x90000000; the base address of the memory controller #2 is 0xA0000000.

The details of registers related to the external memory controller and the bus timing will be described. FIG. 15 is a detailed table of a register SCSLRn_LOW#m. FIG. 16 is a detailed table of a register SMSKRn_LOW#m. FIG. 17 is a detailed table of a register CSALIASn_LOW#m. FIG. 18 is a detailed table of a register SMCTLR. FIG. 19 is a detailed table of a register SMTMGR_SETn#m. In FIGS. 15 to 19, "n" represents CSB numbers (0, 1) within the same memory controller, and "#m" represents memory controller numbers (#1, #2).

Figure 20:
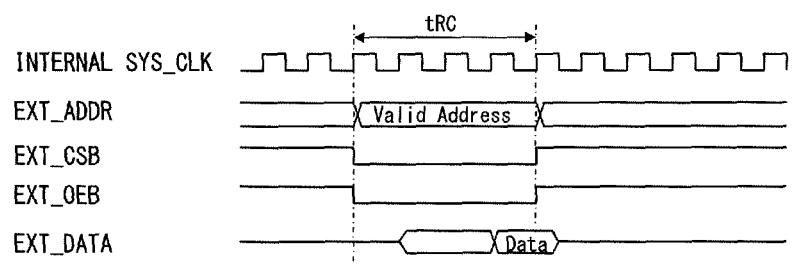
[FIG. 20] A timing chart showing the read timing of an external memory bus I/F.
Figure 21:
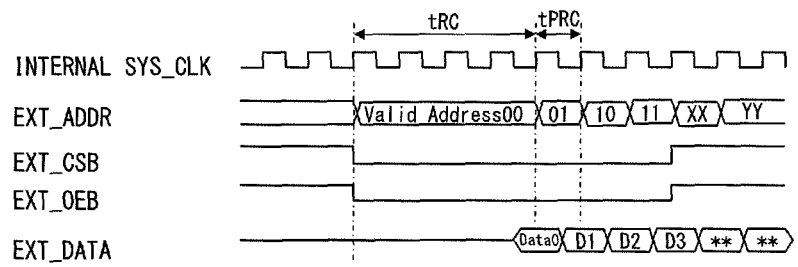
[FIG. 21] A timing chart showing the page read timing of the external memory bus I/F.
Figure 22:
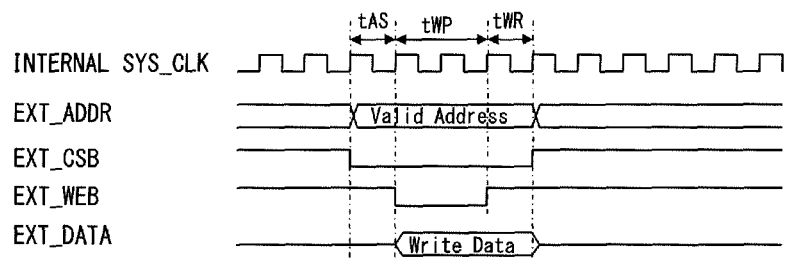
[FIG. 22] A timing chart showing the write timing of the external memory bus I/F.
Figure 23:
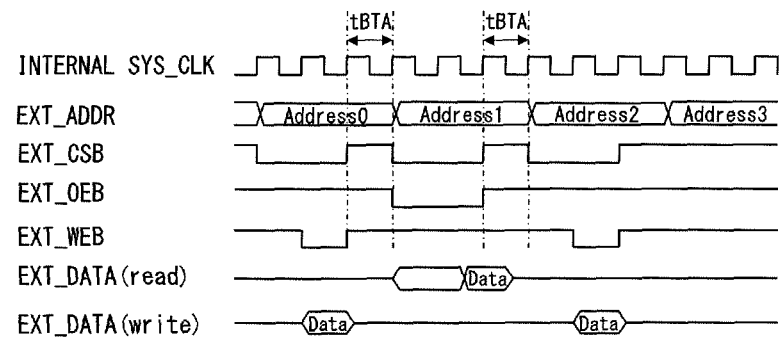
[FIG. 23] A timing chart showing access intervals of the external memory bus I/F.

FIG. 20 is a timing chart showing the read timing of the external memory bus interface. FIG. 21 is a timing chart showing the page read timing of the external memory bus interface. FIG. 22 is a timing chart showing the write timing of the external memory bus interface. FIG. 23 is a timing chart showing the access intervals (turnaround times) of the external memory bus interface.

<Interrupt Controller (INTCTL)>

The present LSI incorporates the interrupt controller. Nine IRQs (normal interrupt) and one FIQ (high-speed interrupt) are allocated. All the interrupts correspond to a low-active level interrupt alone.

Figure 24:
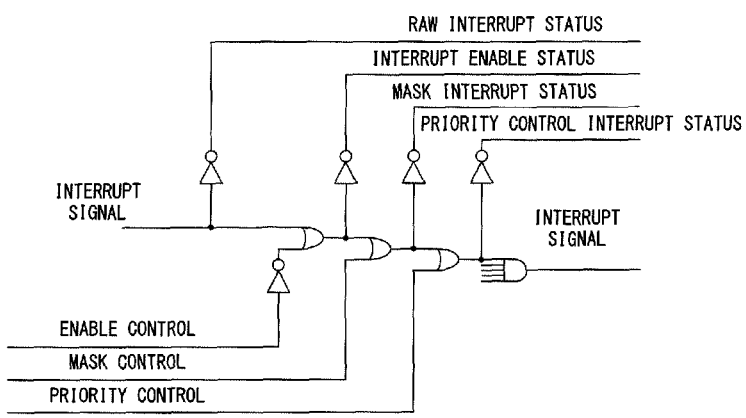
[FIG. 24] A diagram showing an interrupt system of the present LSI.

FIG. 24 is a diagram showing an interrupt system. As shown in FIG. 24, it is possible to control valid-invalid processing on both the IRQ and FIG by performing enabling control, mask control and priority filter control (valid at the time of the value of an irq_plevel register for setting the system priority or more).

FIG. 25 is an interrupt signal map of the present LSI, and shows the sources and the priority of the IRQ and FIQ. In the priority, 15 represents the highest priority, and 0 represents the lowest priority. This priority order is fixed in the present LSI.

FIG. 26 is a register map of an interrupt block. The base address of the interrupt block is 0xC0007000.

<Watch Dog Timer (WDT)>

The present LSI incorporates the watch dog timer (WDT) having a width of 32 bits. When power is turned on or the occurrence of a time out on the WDT causes resetting, the WDT remains in the initial state and does not perform an operation. It is necessary to perform an operation for writing "1" in a WDT operation enable bit (WDT_CR:WDT_EN). Once the WDT operation is started, the operation cannot be stopped by the program until resetting (including time-out resetting) is performed.

FIG. 27 is a register map of a watch dog timer block. The base address of the watch dog timer block is 0xC0003000.

The operation of the watch dog timer will be described. Immediately after the resetting, the operation of the WDT is in a stopped state. In order for the operation to be started, WDT_CR[0]:WDT_EN is turned high by rewriting it. Once the WDT is operated, unless resetting is performed by the external reset or the time out, it is impossible to turn WDT_EN low. Two types of time-out modes below are present; the selection is made by WDT_CR[1]:RMOD.

RMOD="0": WDT resetting occurs at the first time out

RMOD="1": An interrupt occurs at the first time out, and, if the interrupt is not cleared at the time of the second time out, WDT resetting occurs A reset width at the time out can be set by three bits of WDT_CR[4:2]:RPL on an individual clock basis. The time-out determination time can be set by WDT_TORR[3:0]:TOP. When the counter reaches 0x00000000, the time-out determination is performed.

FIG. 28 is a table showing the relationship between the setting of WDT_TORR:TOP and the counter initial value.

The counter value of the WDT can be obtained by reading a WDT_CCVR register. In order for restarting to be performed by returning the counter to the initial value, the data of 0x76 is written into a WDT_CRR register. Here, when an interrupt status is generated (WDT_START[0]="1"), this register value is cleared. In order for the interrupt status to be only cleared without the restarting of the counter, a WDT_EOI register is read.

Figure 29:
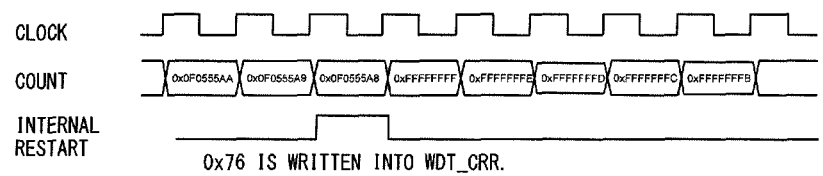
[FIG. 29] A timing chart showing restart control timing.
Figure 30:
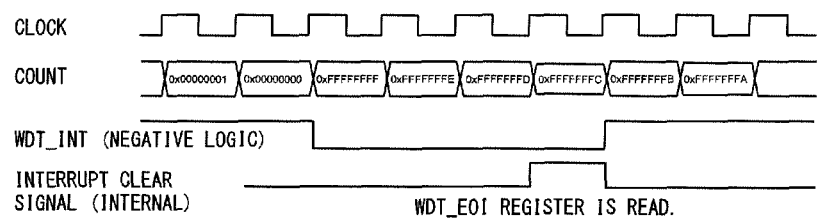
[FIG. 30] A timing chart showing interrupt cancellation timing.
Figure 31:
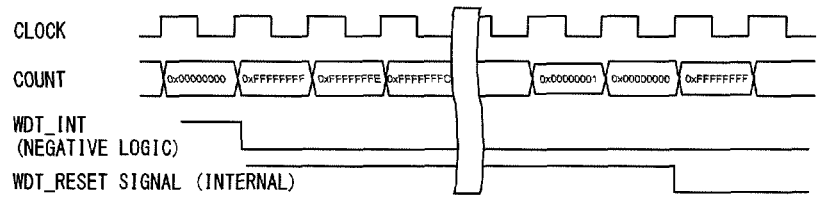
[FIG. 31] A timing chart showing time-out reset timing (RMOD="1") of a watch dog timer.

FIG. 29 is a timing chart showing restart control timing FIG. 30 is a timing chart showing interrupt cancellation timing. FIG. 31 is a timing chart showing time-out reset timing (RMOD="1") of the watch dog timer.

<Timer (TMR) and Timer Counter (TMRC)>

The present LSI incorporates two channels of timers for counting internal clocks and one channel of a timer counter for counting external pluses. The count bit width of all the timers and timer counter is 32 bits.

FIG. 32 is a diagram showing the configuration of the timers and timer counter, TMR1 and TMR2 are counted by the same clocks as the CPU clocks; TMRC is counted by pulses input through an external terminal TIM_TRIG. The internal configurations of TMR1, TMR2 and TMRC are the same except that count input pulses are different.

FIG. 33 is a register map of a timer block. The base address of the timer block is 0xC0002000.

The timer operation will be described. The timer counter can set either of the following operation modes for each of TMR1, TMR2 and TMRC.

Free run mode: a modulo down-count operation is performed between 0xFFFFFFFF and 0

User defined mode: a modulo down-count operation is performed between TMR*LoadCount (* is 1 or 2 or C) and 0

In either mode, the timer counter down-counts to 0, and then counts such that an interrupt occurs in synchronization with APB bus clocks. Since a metastable measure circuit is involved in the occurrence of the interrupt, output is produced two cycles of APB bus clocks after the timing of the reload. The interrupt status within the timer block can be cleared by reading TMR*E0I (* is 1 or 2 or C). The interrupt can also be masked, independently of TMR1, TMR2 and TMRC, by the setting of TMR*Control[2] (* is 1 or 2 or C) bit. Irrespective of whether the interrupt status is cleared, the count operation is continued. The first precaution is that it is preferable to change modes after stopping the operation of a timer to be changed. The second precaution is that, only when the operation of the free run mode is started, the value of TMR*LoadCount (* is 1 or 2 or C) is loaded. When no value is set for TMR*LoadCount (* is 1 or 2 or C), since the default "0x00000000" is loaded and immediately an interrupt occurs, it is preferable to write 0xFFFFFFFF into TMR*LoadCount (* is 1 or 2 or C) and then transfer to the free rum mode.

<UART>

The present LSI incorporates two channels (UART1 and UART2) of UARTs for asynchronous serial communication. The UART has the following functions.

The setting of one character width (5, 6, 7 and 8)

The setting of whether a parity bit (including the selection of ODD and EVEN) is present The setting of a stop bit width (1, 1.5 and 2)

UART 1 and UART 2 each incorporate 16 bytes of a transmit/receive FIFO. UART 1 has an auto-flow control function.

Figure 34:
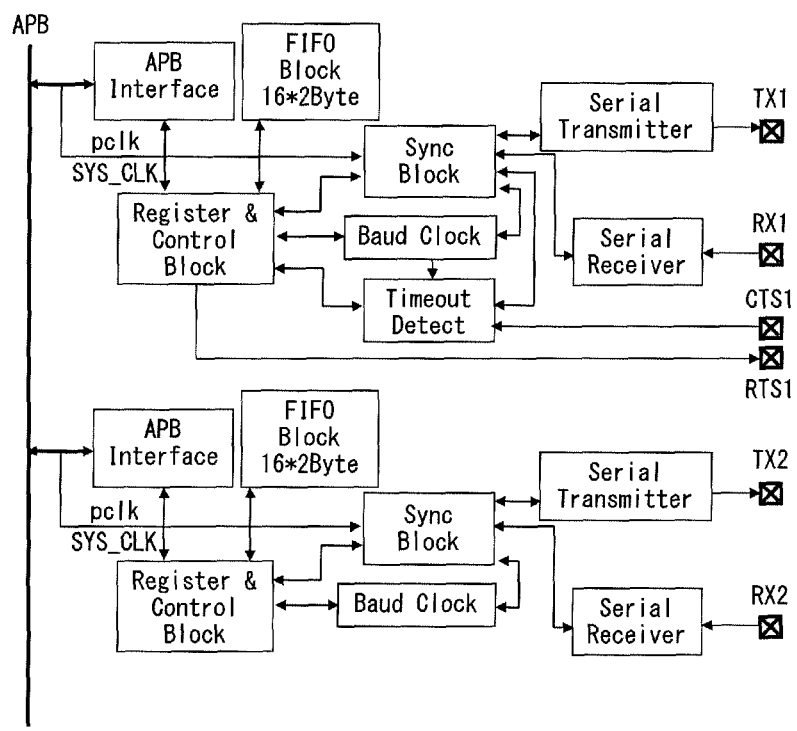
[FIG. 34] A diagram showing the configuration of a UART block.

FIG. 34 is a diagram showing the configuration of the UART block. In FIG. 34, pclk is an APB bus clock, and SYS_CLK is a CPU system clock.

FIG. 35 is a register map of the UART block (UART1 and UART2). The base address of the UART1 block is 0xC0000000, and the base address of the UART2 block is 0xC0001000.

The basic operation of the UART block will be described. The data bit is sent LSB first after the start bit. As reception data, the parity bit for error check is added to the back of the stop bit past the data bit. This parity bit is optional (LCR[3]:PEN). The width of the data bit can vary from 5 bits to 8 bits (LCR[1:0]:DLS); the width of the stop bit can be switched between 1, 1.5 and 2 bit widths (LCR[2]:STOP).

Figure 36:
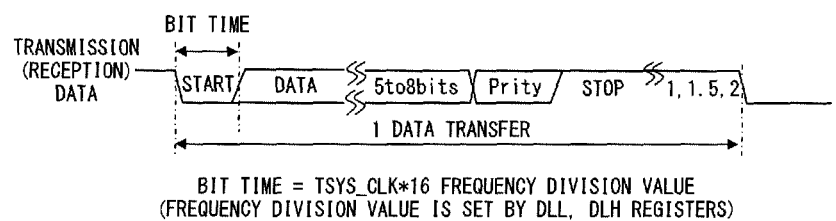
[FIG. 36] A diagram showing a transfer format of serial data.

FIG. 36 is a diagram showing a transfer format of serial data.

A bit time can be set up to a frequency division value of 16 bits by DLL and DLH registers. In this setting, when USR [0]:BUSY="0", DLL and DLH are preferably changed after LCR[7]:DLAB="0".

The bit time setting range when fSYS_CLK=27 MHz: 592 ns to 38.8 ms

The bit time setting range when fSYS_CLK=13.5 MHz: 1.19 μs to 77.67 ms

The bit time setting range when fSYS_CLK=6.5 MHz: 2.46 μs to 161.3 ms

The reception data is read from a RBR[7:0] register. The transmission data is held in a THR[7:0] register. In either case, they are valid only when LCR[7]="0". The change of LCR[7] is preferably made when USR[0]="0", that is, when data transfer is not performed.

When setting is made such that FCR[0]="0", the 16-byte transmit/receive FIFO is invalid; data transfer is performed by RBR and THR registers alone. When setting is made such that FCR[0]="1", data exchange is performed using the 16-byte transmit/receive FIFO. While the state of FIFO is being checked by a USR register, a TFL (the amount of data within the transmit FIFO) register and a RFL (the amount of data within the receive FIFO) register, a handshake is preferably performed on the exchanging of data. When setting is made such that HTX [0]="1", the transmission can be stopped, and data is stored in the transmit FIFO.

The interrupt of the UART block will be described. Interrupts having fixed four types of priority can be generated. Each of the interrupts can be set valid or invalid by an IER register. When reading is performed on IIR[3:0] at the time of occurrence of the interrupt, a factor for the interrupt that is occurring with the highest priority can be found (for more details, see the description of an IIR register).

when a reception error occurs when the reception data becomes available when a character time out occurs at the time of use of FIFO when a transmission data register becomes empty BUSY status when a modem interrupt occurs The auto-flow control of the UART block will be described. The UART block has the auto-flow control function. UART1 alone has the auto-flow control function whereas UART2 does not have it.

Figure 37:
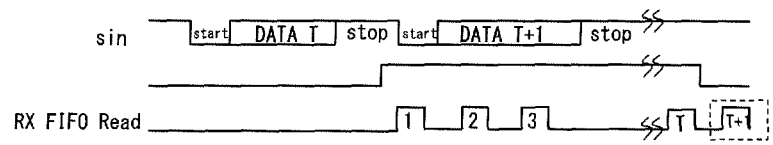
[FIG. 37] A timing diagram of an auto RTS.

FIG. 37 is a timing diagram of an auto RTS. T+1 data is received. Transmission is performed before the transmission side recognizes rts_n (RTS1). T is a receiver FIFO threshold value; sin is the internal signal name of the RX1 terminal. The internal signal inverts rts_n. The inversion of rts_n is output to the RTS1 terminal.

Conditions for the auto RTS are as follows.

| | |
|---|---|
| MCR[5]:AFCE = "1" | Auto follow control bit effective |
| MCR[1]:RTS = "1" | Request To Send signal effective |
| FCR[0]:FiFOEnable = "1" | Transmit/receive FIFO effective |
| FCR[7:6]:RCVR_Trigger | T set by the storage amount of FIFO |

Figure 38:
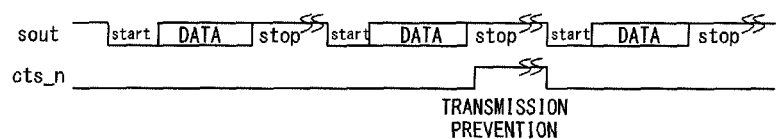
[FIG. 38] A timing diagram of an auto CTS.

FIG. 38 is a timing diagram of an auto CTS. The internal signal name of the TX1 terminal is sout. The internal signal inverts cts_n. The inversion of a signal input to the CTS1 terminal is used as a cts_n signal.

Conditions for the auto CTS are as follows.

| | |
|---|---|
| MCR[5]:AFCE = "1" | Auto follow control bit effective |
| FCR[0]:FiFOEnable = "1" | Transmit/receive FIFO effective |
| FCR[7:6]:RCVR_Trigger | T set by the storage amount of FIFO |

When a CTS1 input from the side of a reception device is low, UART1 stops the transmission. The transmission is stopped in synchronization with a STOP bit output phase. When the CTS1 input is turned low a half bit after the STOP bit output, UART1 outputs the succeeding data and then stops the transmission. Since, even if UART1 stops the transmission, data can be written into the transmit FIFO, an overflow may occur. Thus, it is necessary for USR[1]:TFEN and TFL [7:0] to monitor the state of the transmit FIFO.

The details of registers related to the UART block will be described.

FIG. 39 is a detailed table of a receive buffer register RBR.

FIG. 40 is a detailed table of a transmit holding register THR.

FIG. 41 is a detailed table of a divisor latch (lower-order) DLL. FIG. 42 is a detailed table of a divisor latch (upper-order) DLH. FIG. 43 is a detailed table of an interrupt enable register IER. FIG. 44 is a detailed table of an interrupt recognition register IIR. FIG. 45 is a detailed table of a FIFO control register FCR. FIG. 46 is a detailed table of a line control register LCR. FIG. 47 is a detailed table of a modem control register MCR. FIG. 48 is a detailed table of a line status register LSR. FIG. 49 is a detailed table of a modem status register MSR. FIG. 50 is a detailed table of a scratch pad register SCR. FIG. 51 is a detailed table of a FIFO access register FAR. FIG. 52 is a detailed table of a transmit FIFO read register TFR. FIG. 53 is a detailed table of a receive FIFO write register RFW. FIG. 54 is a detailed table of a DART status register USR. FIG. 55 is a detailed table of a transmit FIFO level register TFL. FIG. 56 is a detailed table of a receive FIFO level register RFL. FIG. 57 is a detailed table of a transmission stop register HTX.

<GPIO (IRQ_IN, PWM_OUT)>

Figures 58, 59:
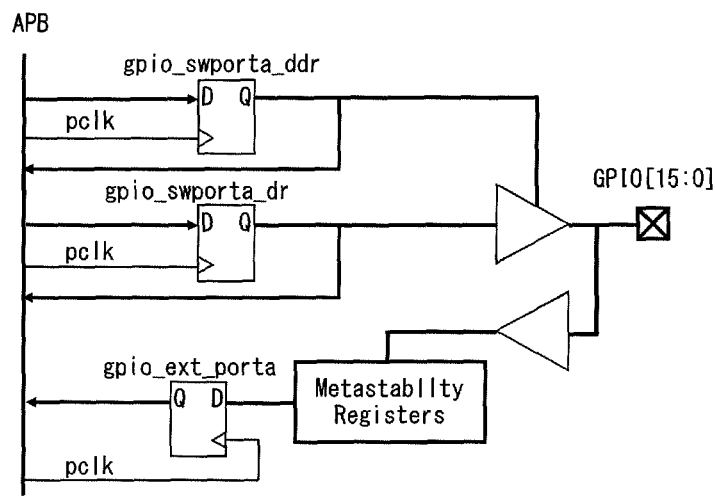
[FIG. 58] A GPIO function table.
[FIG. 59] A block diagram of a GPIO function portion.

The present LSI incorporates a 16-bit GPIO (general purpose input/ouput) terminal. It can be used not only for a GPIO function but also for an external interrupt. In addition, a 4-bit terminal that can be used for PWM output is provided. FIG. 58 is a GPIO function table.

The GPIO function will be described. With the 16-bit terminal, it is possible to set input/output independently for each bit. FIG. 59 is a block diagram of a GPIO function portion. The GPIO function portion can read the data of the GPIO terminal irrespective of input and output.

Registers related to the GPIO will be described. The base address of the GPIO is 0xC0004000. FIG. 60 is a detailed table of a GPIO output data register gpio_swporta_dr. FIG. 61 is a detailed table of a GPIO data direction register gpio_swporta_ddr. FIG. 62 is a detailed table of a GPIO input data register gpio_ext_porta.

The interrupt function of the GPIO will be described. The present LSI can use 4 bits from the side of the LSB on the GPIO terminal, which can also be used for an interrupt input function. It is possible to set the interrupt function valid or invalid for each input. An interrupt from the GPIO block is output as one integrated bit. It is possible to determine, from the value of an interrupt status register, through which terminal the interrupt is fed. An interrupt input from an external terminal can be masked on an individual input basis. The interrupt input can be specified to be a level interrupt/edge interrupt; an active level can be specified to be an active low/active high.

Interrupt registers will be described. The base address of the interrupt registers is 0xC0004000, which is the same as the GPIO. FIG. 63 is a detailed table of a GPIO interrupt enable register gpio_inten. FIG. 64 is a detailed table of a GPIO port A interrupt mask register gpio_intmask. FIG. 65 is a detailed table of a port A interrupt level register gpio_int_type_level. FIG. 66 is a detailed table of a GPIO interrupt polarity register gpio_int_polarity. FIG. 67 is a detailed table of a GPIO port A interrupt status gpio_intstatus. FIG. 68 is a detailed table of a GPIO raw interrupt status gpio_rawintstatus. FIG. 69 is a detailed table of a GPIO interrupt clear register gpioporta_eoi.

The PWM function of the GPIO will be described. In the present LSI, the four terminals (4 channels) of GPIO[7:4] can be used for PWM output. Here, the setting of the GPIO is not limited. The PWM output enable flag pwm_out_en of a PWM control register PWM_MOD is prioritized to function on the GPIO and the external interrupt. It should be noted that, when the GPIO is set for input and the external interrupt is enabled, an unexpected interrupt occurs. As PWM output modes, a manual mode and an auto mode are prepared. In the manual mode, a PWM waveform set by writing "1" into a PWM transfer control register pwm_tr is output. When "0" is written into pwm_tr, the output returns to an inactive level, and the PWM output is stopped. In the auto mode, a PWM waveform set by writing "1" into pwm_tr is output. In order for the output to be stopped, a pulse set by a pwm_pulse_num[7:0] register is output, and then the output is stopped by automatic return to an inactive level output. Here, pwm_tr is automatically cleared to "0" with hardware.

FIG. 70 is a PWM output diagram showing an example of timing of the manual mode. FIG. 71 is a PWM output diagram showing an example of timing of the auto mode. In the PWM output, the output enable control can be performed by the setting of pwm_out_en, and thus HIGH-Z output can be performed instead.

FIG. 72 is a PWM output waveform diagram. A high section is determined by a pwm_hcnt[15:0] register; a low section is determined by a pwm_1cnt[15:0] register. They are each determined by the count number of clocks (pwm_base_clk) obtained through the frequency division of pclk (SYS_CLK) by pwm_bsckdv[15:0]. The logic level of the inactive output of IPWM can be set by a pwm_inactive register.

FIG. 73 is a PWM cyclic range table. As shown in FIG. 73, even if SYS_CLK is set at 54 MHz, a sound frequency region can be generated.

Registers related to a PWM block will be described. FIG. 74 is a table showing the correspondence of GPIO terminal names and PWM channel numbers. The base address of the PWM block is 0xC0009000. FIG. 75 is a detailed table of a PWM function enable register PWM_EN. FIG. 76 is a detailed table of a PWM mode setting register PWM_MOD. FIG. 77 is a detailed table of a PWM control register PWM_CNT. FIG. 78 is a detailed table of a PWM base clock frequency division setting register PWM_BSCKDV*. FIG. 79 is a detailed table of a PWM output low section width setting register PWM_LCNT*. FIG. 80 is a detailed table of a PWM output high section width setting register PWM_HCNT*. FIG. 81 is a detailed table of a PWM output pulse number setting register PWM_PULSE_NUM*. The sign "*" shown in FIGS. 78 to 81 refers to the channel number. Channel 0 is represented by PWM0; channel 1 is represented by PWM1 (the channels range from 0 to 3).

<A/D Conversion Block>

The present LSI includes a four channel multiplex 8-bit A/D conversion block. The A/D conversion block is an 8-bit sequential comparison type A/D converter whose reference is a hybrid type 10-bit D/A converter composed of an R-2R portion and a segment portion. FIG. 82 is a block diagram of the ADC.

The function of the A/D conversion block will be described. The A/D conversion block has four modes. For each of the input selections of the A/D conversion, three modes are present, which are the suspend mode of the A/D conversion block. As three operation modes, there are a free sweep mode, a single mode and a single sweep mode. Since initial data immediately after the mode is changed is not guaranteed, it is necessary to obtain data by changing modes and then performing a conversion operation.

In the free sweep mode, the A/D conversion is performed by repeating all voltages in four channel inputs. For one sweep, 130 clock (ADC_CLK) cycles are necessary. The free sweep mode is set by an operation mode selection register, and simultaneously an operation of repeating sweep is started. The latest A/D conversion data is stored in a sampling data register. In this mode, an interrupt signal (interrupt status) remains unchanged.

In the single mode, the A/D conversion is performed only once on the selected one channel. The A/D conversion is started by a software sampling trigger of the corresponding channel Here, the A/D conversion is completed, and an interrupt (and an interrupt status) occurs, and the result of the A/D conversion is stored in the corresponding sampling data register. The value of a software sampling trigger register is automatically cleared.

In the single sweep mode, the A/D conversion is performed only once on all voltages in the four channel inputs. The single sweep mode is set by the operation mode selection register, and the sweep operation is started by the software sampling trigger of channel 0. The A/D conversion is completed, and the value of the software sampling trigger register of channel 0 is automatically cleared. The A/D converted data is stored in the sampling data register. In this mode, an interrupt signal (and an interrupt status) occurs.

The suspend mode will be described. When the mode is set to the suspend mode, the operation of the A/D conversion block is stopped, and it is put into a low-consumption power state. Here, if ADC_CLK is also stopped, it is possible to further reduce power consumption.

Registers related to an ADC block will be described. The base address of the ADC block is 0xC0005000. FIG. 83 is a detailed table of an ADC operation mode setting register ADC_MOD. FIG. 84 is a detailed table of an ADC sampling trigger enable register ADC_TRIGEN. FIG. 85 is a detailed table of an ADC sampling trigger channel 0 register ADC_SOFTTRIG0. FIG. 86 is a detailed table of an ADC sampling trigger channel 1 register ADC_SOFTTRIG1. FIG. 87 is a detailed table of an ADC sampling trigger channel 2 register ADC_SOFTTRIG2. FIG. 88 is a detailed table of an ADC sampling trigger channel 3 register ADC_SOFTTRIG3. FIG. 89 is a detailed table of an ADC channel 0 sampling data register ADC_DATA0. FIG. 90 is a detailed table of an ADC channel 1 sampling data register ADC_DATA1. FIG. 91 is a detailed table of an ADC channel 2 sampling data register ADC_DATA2. FIG. 92 is a detailed table of an ADC channel 3 sampling data register ADC_DATA3. FIG. 93 is a detailed table of an ADC conversion completion interrupt mask register ADC_INTMASK. FIG. 94 is a detailed table of an ADC conversion completion interrupt occurrence (prior to masking) register ADC_INTRSTATUS. FIG. 95 is a detailed table of an ADC conversion completion interrupt occurrence register ADC_INTSTATUS. FIG. 96 is a detailed table of an ADC conversion completion interrupt clear register ADC_INTCLR.

<Clock Generator/system Control>

Figure 97:
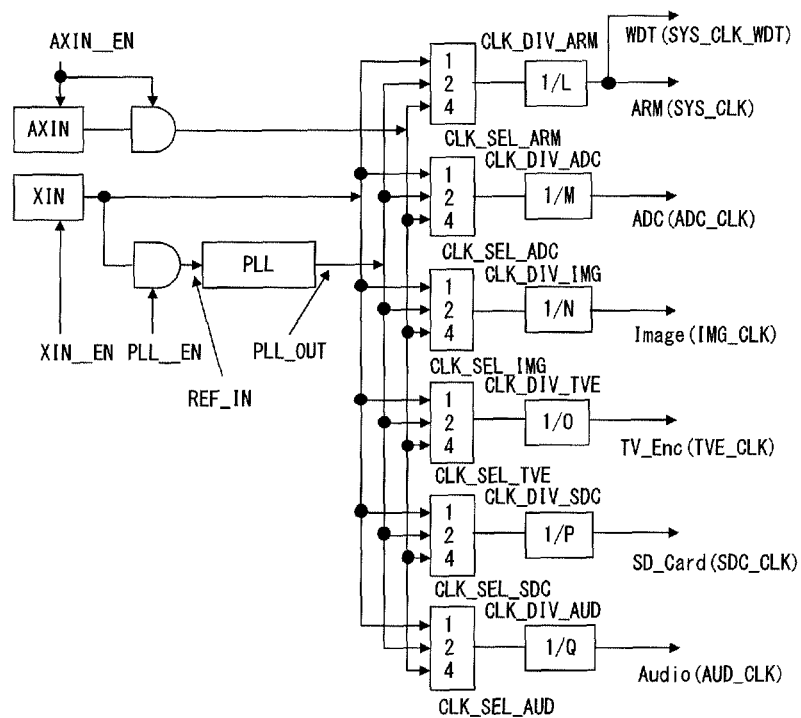
[FIG. 97] A block diagram of a clock generator.
Figures 98, 99:
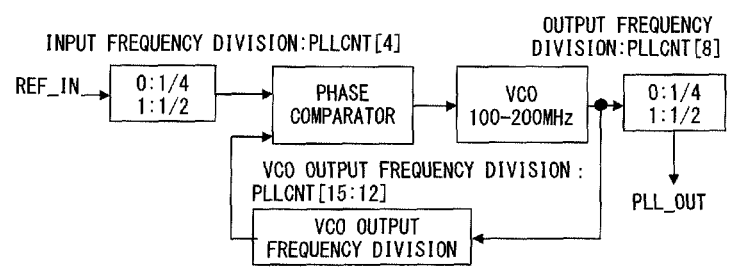
[FIG. 98] A diagram showing the configuration of a PLL.
[FIG. 99] A VCO output frequency division setting table.

The present LSI includes two systems of clock oscillation circuits, namely, XIN and AXIN (clocks can be forcibly input from the XIN and AXIN.) It is possible to use the PLL for external clocks from the side of the XIN. FIG. 97 is a block diagram of a clock generator. FIG. 98 is a diagram showing the configuration of the PLL. FIG. 99 is a VCO output frequency division setting table. The setting is preferably performed such that the values obtained by dividing the frequency of the input of REF_IN clocks fall within the range of 2.5 MHz to 7.5 MHz. The clock frequency of the VCO is determined such that the frequency of a phase comparator is equal to the clock frequency.

A register map related to the clock generator will be described. FIG. 100 is a system register map including clock generator control. The base address of the system register is 0xC0006000.

<Serial Interface>

A serial interface incorporated in the present LSI is an SSI (serial synchronous interface) mode clock synchronous interface. The serial interface is a full duplex multi-interface, and access can be achieved from the CPU to data, control and status information. The serial interface does not support a DMA function. The SSI block can be connected to a serial master or a serial device, and supports the following interface modes. The following protocols are selected by the setting of the FRF bit of CTRLR0.

Serial peripheral interface (SPI)
  Four-line full duplex serial protocol
Synchronous serial protocol (SSP)
  Four-line full duplex serial protocol
  In SSP, a slave select signal is used for frame recognition.
Microwire
  Half duplex serial protocol
  Control is performed by sending command data from a mater to the slave of a target.

A transfer clock will be described. The inside of an SSI block is operated based on SYS_CLK. SSI_CLK and SYS_CLK have the following relationship.

f SSI_CLK=f SYS_CLK/SCKDV

SCKDV is a value that is set by a BAUDR register, and even numbers from 2 to 65534 are set. When "0" is set at SCKDV, SSI_CLK is stopped. FIG. 101 is a timing chart (when the maximum frequency is set) showing the relationship between SYS_CLK, SSI_CLK and SSI_DOUT/DIN.

The transmit/receive FIFO will be described. The transmit/receive FIFO of the SSI block is of 16 words (one word=16 bits) independently. A data frame can be set from 4 bits to 16 bits. It is necessary to write, into the FIFO, frame data at the time of transmission such that the frame data is right-aligned. At the time of reception, the frame data is stored in the receive FIFO such that the frame data is right-aligned within the SSI block. Immediately after the resetting, and when SSI_EN register is "0", the transmit/receive FIFO is cleared.

When it is equal to or less than a threshold value (frame unit) set by the transmit FIFO, the SSI generates an empty interrupt. The threshold value is set in a TXFTLR register. If, when the transmit FIFO is full (16 frames have already been stored), writing is further performed on the transmit FIFO, the SSI generates an overflow interrupt.

When it reaches a threshold value (frame unit) of +1 set by the receive FIFO, the SSI generates an FIFO full interrupt. The threshold value is set in a RXFTLR register. If, when the receive FIFO is full (16 frames have already been stored), reception is further performed, the SSI generates an overflow interrupt. Here, the latest data becomes invalid. On the other hand, when an attempt to read the receive FIFO in an empty state is made, the SSI generates a reception empty interrupt. Here, the read data becomes invalid.

The SSI interrupt will be described. As interrupts within the SSI block, ORs of five types of interrupts are output to the interrupt controller of the present LSI. It is possible to mask each interrupt independently. A generated interrupt status can be read as a status before the masking and a status after the masking.

FIG. 102 is an SSI interrupt table. The five types of interrupts shown in FIG. 102 can all be masked; ORs of the five interrupts after the masking are received, and are notified to the interrupt controller of the present LSI.

A transfer mode will be described. As the transfer mode, four types of modes, namely, a transmit/receive mode, a transmit mode, a receive mode and an EEPROM read mode are supported. The setting of the mode is performed by setting the TMOD bit of a CTRLR0 register. In the microwire mode, TMOD is ignored, and the setting of an MWCR register is prioritized. FIG. 103 is a table showing the SSI transfer mode.

The register map of the SSI block will be described. FIGS. 104 to 106 are the register map of the SSI block. Since these registers are connected to an internal 32-bit bus, they have offset addresses divided in units of 32 bits. No writing is performed on bits that are not present. When reading is performed, "0" can be read. The base address of the SSI block is 0xC0008000.

The operation of the SSI block will be described. The SSI block of the present LSI is operated as a single serial master. At least one piece of data is stored in the transmit FIFO (DUMMY data at the time of the receive mode); while a slave device is selected, setting is performed such that SSIENR: SSI_EN="1", with the result that the data transfer is started. During the data transfer, the BUSY flag of the status register (SR) is set. Preferably, the succeeding transfer sequence is not performed until the BUSY flag is cleared. It should be noted that, when the BUSY flag is polled, timing for setting the BUSY flag is delayed from the start of the transfer by the frequency of SSI_CLK.

Serial transfer at the SPI and SSP settings will be described. In the transmit/receive mode or the transmit mode (TMOD=00b, 01b), when the data of the transmit FIFO becomes empty, the transfer is interrupted. In order to prevent the transmit FIFO from becoming empty until all data is transferred, it is necessary to write a threshold value into the TXFTLR register and to add data by an interrupt.

In the receive mode (TMOD=10b), the slave device is selected, and thereafter the DUMMY data is written into the transmit FIFO, with the result that the transfer is started. When a plurality of pieces of data are received, the output of the DUMMY data is continued. The reception operation is completed when the frame data of the number of pieces of received data that is input to the NDF of the CTRLR1 register is received. Here, it is necessary to write into the NDF the number of pieces of frame data that is one less than the number of pieces of data desired to be received.

In the EEPROM read mode (TMOD=11b), the slave device (EEPROM) is selected, and thereafter an OP code or an address is written into the transmit FIFO, with the result that the transfer is started. Here, a transmit EMPTY occurs. The transfer is completed when the number of pieces of frame data equal to the number of pieces of received data that is input from the EEPROM to the NDF of the CTRLR1 register is received. Here, it is necessary to write into the NDF the number of pieces of frame data that is one less than the number of pieces of data desired to be received. It should be noted that, when the OP code for transfer control or redundant data other than addresses is written, the received data is ignored.

Figure 107:
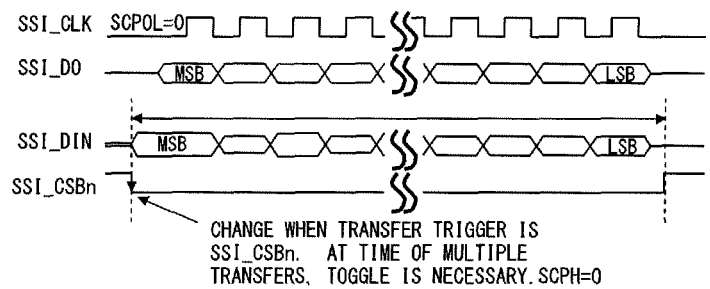
[FIG. 107] A timing chart showing an SPI serial transfer format (CTRLR0: SCPOL=0, SCPH=0, FRP=00b)
Figure 108:
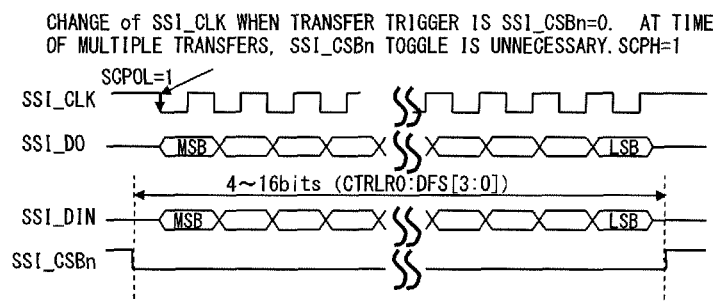
[FIG. 108] A timing chart showing an SPI serial transfer format (CTRLR0: SCPOL=1, SCPH=1, FRP=00b)
Figure 109:
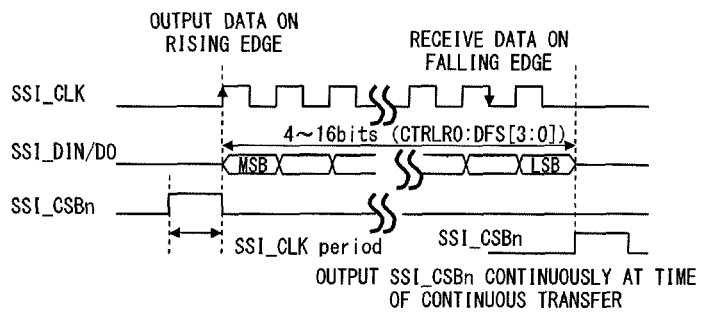
[FIG. 109] A timing chart showing an SSP serial transfer format (FRP=01b)

FIG. 107 is a timing chart showing an SPI serial transfer format (CTRLR0: SCPOL=0, SCPH=0, FRP=00b). FIG. 108 is a timing chart showing an SPI serial transfer format (CTRLR0: SCPOL=1, SCPH=1, FRP=00b). FIG. 109 is a timing chart showing an SSP serial transfer format (FRP=01b).

Serial transfer at a microwire setting will be described. It is possible to perform only a half duplex transfer at the microwire setting. After control data is output from the SSI block to the slave, the transmission operation and the reception operation are performed.

The transmission of the control data from the SSI block is triggered by the falling edge of SI_CSBn. After the half clock of SSI_CLK, the MSB serving as the control bit is output to SSI_DO. The control data can be set between 1 bit and 16 bits (by CTRLR0:CFS [15:12]), and is output in synchronization with the falling edge of SSI_CLK. Here, SSI_DIN has a high impedance and cannot be driven from the slave. The switching between the transmission and the reception is determined by the MDD bit of the MWCR register.

When data is received, at the clock cycle succeeding the transfer of the control data from the SSI block, the slave drives SSI_DIN "0", and then the data of 4 bits to 16 bits is transferred in synchronization with the falling edge of SSI_CLK. A half cycle after the completion of the data transfer, SSI_CSBn returns to an inactive state, that is, "1". When one piece of frame data is read for each of the control data transfer, setting is performed such that MWCR:MWMOD="0", and non-sequential data transfer is performed. When data is received continuously, setting is performed such that MWCR:MWMOD="1"; when sequential data transfer is set, the frame data is continuously output from the side of the slave.

When data is transmitted, the frame data is transmitted at the succeeding clock after the control data is transferred from the SSI block. Since the SSI block does not support sequential transmission, a pair of one command and one piece of frame data is preferably transmitted a necessary number of times. Each time the data transmission (command+data) is performed, a handshake can be performed with the slave device. When the MHS bit of the MWCR register is set at "1", the succeeding transfer is awaited until SSI_DIN is ready after the transfer of one data frame, and the transmission of the command data is started.

Figure 110:
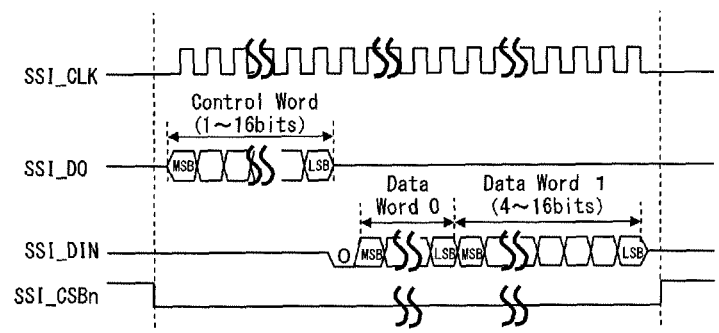
[FIG. 110] A timing chart showing a data reception format (FRP=10b) at a microwire setting.
Figure 111:
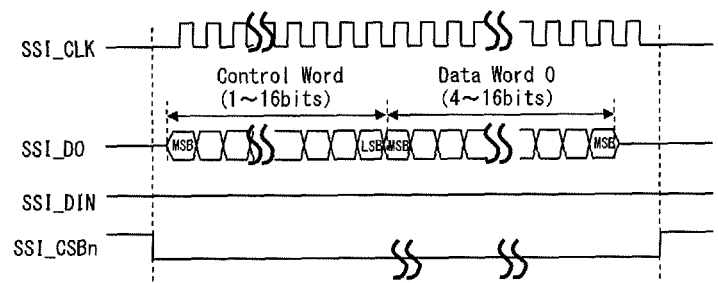
[FIG. 111] A timing chart showing a data reception format at the microwire setting.

FIG. 110 is a timing chart showing a data reception format (FRP=10b) at the microwire setting. FIG. 111 is a timing chart showing a data reception format at the microwire setting.

<Image Processing Block>

A summary of the image processing block will be described. The image processing block of the present LSI roughly has a total of three operation modes, namely, a NORMAL-VIEWER mode where a camera I/F and a video-encoder are operated and a cameral image is displayed on the TV, a CAMERA-JPEG mode where the camera I/F and a JPEG encoder are operated and the cameral image is recorded and a JPEG-DECODE mode where the camera I/F and a JPEG decoder are operated. Theses modes can be switched by the setting of a register.

FIG. 112 is an image processing block operation mode table. In all modes, registers and memories can be assessed. Since a I2C interface requires clocks (IMG_CLK) for image processing, when XIN and AXIN clocks are stopped, the I2C interface does not operate in any mode. Since clocks are independently generated for a 12S interface and the SD controller, all the modes described above can be used without the stopping of AUD_CLK and SDC_CLK.

Although the base address of the image processing block of the present LSI is 0x30000000, the access to the image processing block is all performed by indirect register addressing, and is performed by writing the address of a register that accesses an IDX register or the address of a memory. Within the present LSI, CS to the image processing block is such that CSB3 is connected. The access control on an index register and the other registers is performed by addresses A3 and A2.

FIG. 113 is a table showing the register access control of the present LSI. A method of accessing registers other than the index register is as follows.

(1) Setting is performed such that A3="1" and A2="0", and the address of a register to be accessed is set in the index register.

(2) Setting is performed such that A3="1" and A2="1", and the register to be accessed is accessed.

FIG. 114 is a diagram showing register access using the index register. FIG. 115 is a detailed table of the index register IDX. The address of a register accessed by IDX[15:0] is specified. Unless the value of the index register is rewritten, the same register can be accessed.

Clock system control on the image processing block will be described. FIG. 116 is a detailed table of a clock control register CLKCNT. The details thereof are as follows.

---

AUD_EN: Clock enabling of an audio block within the present LSI
    "0": stop    "1": feed
TE_EN: Clock enabling of a TV encoder I/F block
    "0": stop    "1": feed
SCKEN: Clock enabling of SCLK (system clocks within the image processing block)
    "0": stop    "1": feed
SD_EN: Clock enabling of an SD card I/F block
    "0": stop    "1": feed
CMCKEN: Clock enabling of CAMCKO
    "0": stop    "1": feed

---

A 1/n frequency division waveform in the image processing block will be described. In the present LSI, the 1/n (n is an integer) frequency division waveforms of not only clocks that are output to a terminal like the CAMCKO but also clocks that are used within the present LSI are generated as a frequency division waveform as shown in FIG. 117. FIG. 117 is a diagram showing the 1/n frequency division waveform in the present LSI. When the frequency division ratio is switched, it is necessary to ensure that the enabling of target clocks is turned off.

FIG. 118 is a detailed table of a clock frequency division register 1 CLKDIV1. SCLKDV[3:0] sets the frequency division ratio of the SCLK. The source clock is IMG_CLK. The frequency division ratio is set by 1/(SCLKDV+1), and can be set from 1/1 to 1/16.

FIG. 119 is a detailed table of a clock frequency division register 3 CLKDIV3.

CMCKDV[3:0] sets the frequency division ratio of the CAMCKO. The source clock is IMG_CLK. The frequency division ratio is set by 1/(CMCKDV+1), and can be set from 1/1 to 1/16.

ACTSW sets the frequency ratio between the SCLK and CAMCLKI. The details of the setting are as follows.
    00b: setting prohibition
    01b: used when fSCLK=fCAMCKI
    10b: used when fSCLK≧2×fCAMCKI
    11b: setting prohibition
(Note) it is impossible to perform setting such that fCAMCKI>fSCLK or that 2×fCAMCKI>fSCLK>fCAMCKI.

CAMCLKO_DLY sets the phase of an output of the CAMCKO. The details of the setting are as follows.
    "0": without a delay addition
    "1": with a delay addition (typical 5 ns)

FIG. 120 is a diagram showing the configuration of a CAMCLKO_DLY circuit.

FIG. 121 is a detailed table of a clock frequency division register 4 CLKDIV4. TEDV sets the frequency division ratio of the TV encoder I/F block. The source clock is TVE_CLK. The details of the setting are as follows.
    "0": without frequency division
    "1": with 1/2 frequency division The mode control on the image processing block will be described. FIG. 122 is a detailed table of a hardware operation mode setting register HWMODE.

SD_OFF turns on or off an SDIF controller function. The details of the setting are as follows. When the SDIF controller is used, it is necessary to ensure that this bit is turned on.
    "0": the SD controller function is turned off.
    "1": the SD controller function is turned on.

CAMOFF turn off the pull-down resistors of camera-related terminals. The details of the setting are as follows.
    "0": intended for a camera operated state
        The pull-down resistors of CAMVS, CAMHS, CAMD0-7 and CAMACKI are turned off. The states of SDA, SDC and CAMCKO correspond to the register setting.
    "1": intended for a camera stopped state
        The pull-down resistors of CAMVS, CAMHS, CAMD0-7 and CAMACKI are turned on. The outputs of SDA, SDC and CAMCKO are low.

SUSP performs suspend control. When HDMODE="0000", if "1" is written into this bit, clock supply SCLK to the image processing block of the present LSI is stopped, with the result that it is possible to reduce consumption current (suspend mode). In order to return from this mode, it is necessary to write "0" into this bit.

MODE_EN makes HDMODE valid. Since MODE_EN is "0" immediately after the resetting, it is preferable to write "1" thereinto.

CAMCT monitors the operated state of CAM I/F. The details thereof are as follows.
    "0": the stop of the operation
    "1": in the process of the operation HDMODE[3:0] sets the operation modes of *CAM I/F and PEG codec. FIG. 123 is a table showing the relationship between the register setting value of HDMODE[3:0] and the operation mode. It is necessary to ensure that the switching of the operation modes is performed through a READY mode. It is also necessary to prevent the setting of any combination other than those between HDMODE[3:0] and SUSP shown in FIG. 123.

The interrupt control on the image processing block will be described. Within the image processing block, an interrupt signal control register, an interrupt status register and an interrupt mask register that are independent of the interrupt controller of the present LSI are provided. Since the interrupt controller of the CPU system receives the interrupt such that it is a level interrupt and low-active, the interrupt of the image processing block occurs with the initial setting of an INTCNT register maintained. It is necessary to prevent INTCNT from being changed.

FIG. 124 is a detailed table of the interrupt control register INTCNT.

INT/POL sets the interrupt logic. The details of the setting are as follows.
    "0": the occurrence of a high "H" interrupt
    "1": the occurrence of a low "L" interrupt INT_SEL selects either of an edge interrupt and the level interrupt. The details of the setting are as follows.
    "0": the level interrupt (the logical OR of the status is output.)
    "1": the edge interrupt (a pulse of 32×tSCLK is output for each interrupt factor.)

When an interrupt factor occurs, the image processing block generates an interrupt signal according to the following register setting, and notifies it as the interrupt of the image processing block to the interrupt controller of the CPU. When an interrupt occurs, the corresponding bit of the interrupt status register is turned "1". When "0" is written into each of the bits of this register, the bit is cleared by "0". Preferably, the interrupt is the level interrupt, and a low active signal is output to the interrupt controller on the side of the CPU (INTCNT setting).

FIG. 125 is a detailed table of an interrupt status register 1: INTST1. CAMST_INT can read a camera image capture start interrupt status ("1": the occurrence of an interrupt). CAMVS_INT can read a CAMVS interrupt status ("1": the occurrence of an interrupt). CAMED_INT can read a camera image capture completion interrupt status ("1": the occurrence of an interrupt). When the interrupt occurs in this way, the corresponding bit becomes "1". When "0" is written into each of the bits of this register, the bit is cleared by "0". When a mask is set, the status bit is not set at "1", and no interrupt occurs. CAMVS_INT generates an interrupt on the falling edge (on the rising edge when VSPOL="L") of CAMVS.

FIG. 126 is a detailed table of an interrupt status register 2: INTST2. AUDIO_INT can read an interrupt status for an interrupt generated by the audio block ("1": the occurrence of an interrupt). TE_HOST_INT can read an interrupt status for an interrupt generated by a TE-encoder I/F block ("1": the occurrence of an interrupt). SD_INT can read an SD card I/F interrupt status ("1": the occurrence of an interrupt). RING_INT is a bank write completion interrupt, and, in the CAMERA-JPEG mode, a write for compression/decompression data into the frame memory is generated at the completion of each bank into the frame memory ("1": the occurrence of an interrupt). JD_ED_INT is a JPEG decode completion interrupt and is generated at the completion of JPEG decoding ("1": the occurrence of an interrupt). JE_ED_INT is a JPEG encode completion interrupt and is generated at the completion of JPEG encoding ("1": the occurrence of an interrupt). When the interrupt occurs in this way, the corresponding bit becomes "1". When "0" is written into each of the bits of this register, the bit is cleared by "0". When a mask is set, the status bit is not set at "1", and no interrupt occurs.

FIG. 127 is a detailed table of an interrupt mask register 1: INTMSK1. CAMST_MSK masks a camera image capture start interrupt. CAMVS_MSK masks a CAMVS interrupt. CAMED_MSK masks a camera image capture completion interrupt. Each register cancels the masking at "0", and sets the masking at "1". It is necessary to prevent "0" from being written into a RESERVE bit, FIG. 128 is a detailed table of an interrupt mask register 2: INTMSK2. AUDIO_MSK masks the interrupt generated by the audio block. TE_HOST_MSK masks the interrupt generated by the TE-encoder I/F block, SD_MSK masks an SD card I/F interrupt. RING_MSK masks a JPEG code write completion bank interrupt. JD_ED_MSK masks a JPEG decode completion interrupt. JE_ED_MSK masks a JPEG encode completion interrupt. Each register cancels the masking at "0", and sets the masking at "1". It is necessary to prevent "0" from being written into the RESERVE bit.

The access from the CPU to the image processing block will be described. Access from a host to the image processing block through an external memory interface can be performed with a 16-bit width. CSB3 is allocated. Accessible targets from the CPU are as shown in FIG. 129. FIG. 129 is an accessible target list in the present LSI. Basically, the registers in the image processing block are set and accessed by the CPU, and thus it is possible to control the accessible targets as a system.

The configuration of memories in the image processing block is as shown in FIG. 130; reading/writing can be performed in each memory access register or an ABS access register. FIG. 130 is a diagram showing the ABS address arrangement of the image processing block.

<Camera Module Interface>

The camera module interface of the image processing block performs processing for receiving data, clocks and synchronization signals from an externally connected camera module according to the register setting. The received sensed image data is converted into the common YUV 4:4:4 format handled within the IC, and is subjected to filter processing for enlargement and image editing, an image size setting in the frame memory, processing for reduction corresponding to the image processing function, processing for clipping a rectangle and processing for changing brightness (D range up/down). The camera image data that is generated according to the register setting and that is written into the frame memory is adhered to a position within the set image size according to the setting of a storage position register. A data format within the frame memory is such that YUV=4:2:2 or that RGB=5:6:5 (can be selected by RGB_FRAME=IDX: 0030h).

FIG. 131 is a block diagram of the camera module interface.

FIG. 132 is an interface signal list with the camera module. Signals with the active level marked by "*" can be set by a register.

The relationship between the system clocks and camera clocks will be described. The frequency division of IMG_CLK of the present LSI is set, and then IMG_CLK can be supplied as CAMCKO clocks to the camera module (for the frequency division setting of IMG_CLK, see the paragraph of the clock generator). The relationship between CAMCKI clocks that are data synchronization clocks from the camera and the system clocks SCLK needs to be set by the setting of ACTSW (IDX: 00D3h CLKDIV3[5:4]) such that the following formulas are satisfied.

When ACTSW="01b", fSCLK=fCAMCKI.
When ACTSW="10b", fSCLK≧2×fCAMCKI.

In the above formulas, fSCLK is a clock frequency to the image processing block of the present LSI, and fCAMCKI is an input clock frequency to a CAMCKI terminal. When ACTSW="00b" . . . or "11b", a setting must be prevented. It is impossible to perform setting such that fCAMCKI>fSCLK or that 2×fCAMCKI>fSCLK>fCAMCKI.

The relationship between the camera clocks and the image data will be described. The CAMCKI clocks, which are the data synchronization clocks from the camera, need to be input to the present LSI not only in a section where the image data of the camera is valid but also in a section (sync section) where the image data is invalid. A section where the CAMCKI needs to be input in each mode is shown in FIG. 133. FIG. 133 is a table showing camera clocks (CAMCKI) necessary sections.

Image data timing in the camera module interface will be described. FIG. 134 is a timing chart showing timing conditions for camera image signals in the camera module interface. FIG. 135 is a setting table of ICMS and ICMH.

Camera image processing control will be described. A register CAMIF for setting the camera signal logic of the camera module interface is shown in FIG. 136. FIG. 136 is a detailed table of the camera signal logic setting register CAMIF.

CAMRST resets the entire camera module I/F block. The details of the setting are as follows.

"0": the camera module I/F block performs a normal operation.

"1": the camera module I/F block is set in a reset state.

(Note) When the resetting is performed, it is necessary to prevent the other values in the same IDX address from being changed.

VSPOL sets the active logic of a CAMVS signal. The details of the setting are as follows.

"0": a low section is valid data (high is a sink section.)

"1": a high section is valid data (low is a sink section.)

HSPOL sets the active logic of a CAMHS signal. The details of the setting are as follows.

"0": a low section is valid data (high is a sink section.)
"1": a high section is valid data (low is a sink section.)
CKPOL sets the active edge of a CAMCKI signal in synchronization with CAMDAT. The details of the setting are as follows.
"0": falling edge active (change of CAMDAT in synchronization with the falling edge)
"1": rising edge active (change of CAMDAT in synchronization with the rising edge)
RGB sets the color components of CAMDAT. The details of the setting are as follows.
"0": when the color components of CAMDAT are YUV (4:2:2 mode only)
"1": when the color components of CAMDAT are RGB (4:4:4 mode only)
SUB_OFFSET sets the offset of a Y component when the color components of CAMDAT are YUV. The details of the setting are as follows. When RGB="H", the setting becomes invalid.
"0": an offset is not present in the Y color component.
"1": an offset is present in the Y color component. (16 is subtracted from the Y component.)
RGBORD[2:0] sets the arrangement of RGB data. The details of the setting are as follows.

| | |
|---|---|
| 000b: RGBRGB . . . | 001b: RBGRBG . . . |
| 010b: GRBGRB . . . | 011b: GBRGBR . . . |
| 100b: BRGBRG . . . | 101b: BGRBGR . . . |
| 110b: setting prohibition | 111b: setting prohibition |

YUVORD[1:0] sets the arrangement of YUV data. The details of the setting are as follows.

| | |
|---|---|
| 00b: YUYVYUYV . . . | 01b: YVYUYVYU . . . |
| 10b: UYVYUYVY . . . | 11b: VYUYVYUY . . . |

It is necessary to write "0" both into the RESERVE bit and a RESERVE 1 bit.
FIG. 137 is a detailed table of a camera signal frame start pixel position register CAMTIM. CYS[7:0] sets a Y-direction frame start pixel position (0 to 255). CXS[7:0] sets an X-direction frame start pixel position (0 to 255).
On the entire data range from the camera, a start pixel position where the filter processing is started is set by a CAMTIM register (CXS[7:0], CYS[7:0]). In a horizontal scan direction, the first data position where a CAMHS signal is changed to an effective level is treated such that X=0. In a vertical scan direction, the first change to a CAMHS signal effective level when the CAMVS signal is changed to the effective level is treated such that Y=0.
FIG. 138 is a schematic diagram showing the specification of a camera data processing start position.
FIG. 139 is a detailed table of a camera image filter processing selection register CAMFLT. CAMFLT[2:0] sets a method of performing the filter processing on the camera image (see FIG. 140).
FIG. 140 is a table showing a correlation between a CAMFLT register setting value and the filter processing method. In edge extraction 1, white and black edge extraction is performed. In edge extraction 2, the colors of the original image are stored in an edge.
FIG. 141 is a detailed table of a camera image two-step gradation processing threshold register FLTTHD. FLTTHD [7:0] specifies the threshold of two-step gradation processing.

P'(x)=(P (x)>=FLTTHD)? OFFh: 00h
P'(x): pixel at position x after the filter processing
P(x): pixel at position x before the filter processing
FIG. 142 is a detailed table of a camera image sepia processing coefficient register FLTSEP. SEPIAR[7:0] sets the addition-subtraction coefficient of an R component when sepia processing is performed on the camera image. SEPIAR [7] is a code bit. When a negative number is set, it is preferable to set the coefficient of two's-complement number. SEPIAB [7:0] sets the addition-subtraction coefficient of a B component when the sepia processing is performed on the camera image. SEPIAB[7] is a code bit. When a negative number is set, it is preferable to set the coefficient of two's-complement number.
FIG. 143 is a detailed table of a camera image sepia processing range register SEPRNG. SEPRNG[4:0] sets the range of calculation data when the sepia processing is performed on the camera image.

$$R'(x)=(G(x)<=SEPRNG\|G(x)>=FFh\text{-}SEPRNG)?G(x): G+SEPIAR$$

$$G'(x)=G(x)$$

$$B'(x)=(G(x)<=SEPRNG\|G(x)>=FFh\text{-}SEPRNG)?G(x): G+SEPIAB$$

R'(x): R component at position x after the filter processing
G'(x): G component at position x after the filter processing
B'(x): B component at position x after the filter processing
R(x): R component at position x before the filter processing
G(x): G component at position x before the filter processing
B(x): B component at position x before the filter processing
FIG. 144 is a detailed table of a camera image processing edge extraction 1 coefficient register FLTCOEF.
FLTEBS[3:0] sets a coefficient when emboss processing is performed on the camera image.

| | |
|---|---|
| 00b: 1/4 times | 01b: 1/2 times |
| 1000b: 1 time | 1001b: 2 times |
| 1010b: 3 times | 1011b: 4 times |
| 1100b: 5 times | 1101b: 6 times |
| 1110b: 7 times | 1111b: 8 times |
| P' (x) = FLTEBS × (P (x − 1) − P (x + 1)) + 80h | |

FLTEDG1[3:0] sets a coefficient when edge extraction 1 is performed on the camera image.

| | |
|---|---|
| 00b: 1/4 times | 01b: 1/2 times |
| 1000b: 1 time | 1001b: 2 times |
| 1010b: 3 times | 1011b: 4 times |
| 1100b: 5 times | 1101b: 6 times |
| 1110b: 7 times | 1111b: 8 times |
| tmp_P' (x) = FLTEDG1 × (P (x − 1) − P (x + 1)) | |
| P' (x) = (tmp_P' (x) >= FLTTHD) ? OFFh : 00h | |

FIG. 145 is a detailed table of a camera image processing edge extraction 2 coefficient register FLTEDG2.
FLTEDG2[3:0] sets a coefficient when edge extraction 2 processing is performed on the camera image.

| | |
|---|---|
| 00b: 1/4 times | 01b: 1/2 times |
| 1000b: 1 time | 1001b: 2 times |
| 1010b: 3 times | 1011b: 4 times |

| 1100b: 5 times | 1101b: 6 times |
| 1110b: 7 times | 1111b: 8 times |

EDG2OFS[6:0] specifies the offset value of RBG components when the edge extraction 2 processing is performed on the camera image.

$$Tmp\_P'(x)=FLTEDG2\times(P(x-1)-P(x+1))+80h$$

$$P'(x)=(Tmp\_P'(x)>80h+EDG2OFS\|Tmp\_P'(x)<80h-EDG2OFS)?00h:Tmp\_P'(x)$$

FLTTHD, FLTSEP, FLTCOFF and FLTEDG2 are physically the same register. When a certain type of filter processing is transferred to another type of filter processing, a register setting corresponding to the filter processing is preferably performed.

FIG. 146 is a detailed table of an X-direction camera image size register CXSIZE. CXSIZE[10:0] sets the size of an X-direction camera image. It is necessary to set an even value.

FIG. 147 is a detailed table of a Y-direction camera image size register CYSIZE. CYSIZE[10:0] sets the size of a Y-direction camera image.

FIG. 148 is a detailed table of an X-direction clipping start position register CAMRSX. CAMRSX[10:0] sets a position where the clipping of a reduced camera image in the X-direction is started. It is necessary to set an even value.

FIG. 149 is a detailed table of a Y-direction clipping start position register CAMRSY. CAMRSY[10:0] sets a position where the clipping of the reduced camera image in the Y-direction is started.

FIG. 150 is a detailed table of an X-direction clipping completion position register CAMREX. CAMREX[10:0] sets a position where the clipping of the reduced camera image in the X-direction is completed. It is necessary to set an odd value.

FIG. 151 is a detailed table of a Y-direction clipping completion position register CAMREY. CAMREY[10:0] sets a position where the clipping of the reduced camera image in the Y-direction is completed.

In the case of rotation (ROT (IDX_ADDRESS:0030h MEMCNT[10]="1"), a setting is preferably performed such that (CAMREY−CAMRSY+1) is an even number.

FIG. 152 is a detailed table of a brightness component enlargement setting register CAMYD. CAMYD[2:0] sets the enlargement factor of a brightness component. A pixel exceeding 255 in the enlargement setting is clamped at 255. FIG. 153 is a table showing the relationship between register setting values and enlargement factors.

FIG. 154 is a detailed table of an X-direction reduction factor setting register CXSRK. CXSRK[10:0] sets a reduction factor in the X-direction (main scan direction). The setting of the reduction factor is calculated by the following formula. It is necessary to prevent "0" from being set in the CXSRK register. CXSRK needs to be set such that it is an even number and that CXSIZE/16≦CXSRK≦CXSIZE.

X-direction reduction factor=CXSRK/CXSIZE

FIG. 155 is a detailed table of a Y-direction reduction factor setting register CYSRK. CYSRK[10:0] sets a reduction factor in the Y-direction (sub-scan direction). The setting of the reduction factor is calculated by the following formula. It is necessary to prevent "0" from being set in the CYSRK register. CYSRK needs to be set such that it is an even number and that CYSIZE/16 CYSRK CYSIZE.

Y-direction reduction factor=CYSRK/CYSIZE

FIG. 156 is a detailed table of a reduction algorism setting register SRKTYPE.

YOFFSET performs a Y-direction bilinear calculation assuming that the position of a generated pixel is constantly intermediate between a reference line and the current line. The details of the setting are as follows.

"0": according to a bilinear computation

"1": the generated pixel is intermediate between the reference line and the current line.

CYTYPE sets an addition average on/off when thinning out processing is performed in the Y-direction (sub-scan direction). The details of the setting are as follows.

"0": without the addition average

"1": additional average processing is performed with the previous line.

CXTYPE sets a filter coefficient on/off when the thinning out processing is performed in the X-direction (main scan direction). The details of the setting are as follows.

"0": without a filter

"1": the filter processing is performed in the X-direction to carry out the thinning out processing (see FIG. 157).

FIG. 157 is a list showing X-direction filter coefficients.

The bilinear will be described. When the generated pixel is output, the values of associated four pixels are weighted according to the distance from the generated pixel, and the output value of the generated pixel is calculated. For the first line, an output pixel value is determined by a value in the main scan direction alone; for the front of the line, the output pixel value is determined by a value in the sub-scan direction alone. A formula for calculating the generated pixel is given by the following formula.

$$\text{Generated pixel}=(1/162)\times(x\times y\times\alpha 1+x'\times y\times\alpha 2+x\times y'\times\beta 1+x'\times y'\times\beta 2),$$

where x+x'=y+y'=16.

FIG. 158 is a diagram showing an outline of a bilinear algorism.

<Two-line Serial Setting Control (I2C)>

The present LSI incorporates a two-line serial interface (I2C) in order to change the setting of the camera module and read the state of the camera module. The start bit is set at "1", and thus data is read or written in units of 8 bits. With a SERIB_SEL bit, it is possible to select a byte transfer in units of 8 bits or a sequence transfer.

A read sequence (an automatic transfer after a start setting) is as follows.

(1) the generation of start conditions (2) the output of a camera module unique address and the output of a write setting (3) the reception of acknowledge (4) the output of an address to be read within the camera module (writing)

(5) the reception of acknowledge (6) the generation of start conditions (7) the output of the camera module unique address and the output of a read setting (8) the reception of acknowledge (9) the reception of data read from the camera module

(10) the generation of acknowledge

(11) the generation of stop conditions

A write sequence (an automatic transfer after a start setting) is as follows.

(1) the generation of start conditions (2) the output of the camera module unique address and the output of the write setting (3) the reception of acknowledge (4) the output of the address to be read within the camera module (writing)

(5) the reception of acknowledge (6) the transfer of written data (7) the reception of acknowledge (8) the generation of stop conditions FIG. 159 is a timing chart showing the operation of the two-line serial interface. The clock SDC period of the two-line serial interface is generated by further performing a frequency division setting on: a clock period (tIMG) fed to the image processing block; an internal system clock period (tSCLK) generated by performing a frequency division setting on IMG_CLK with a register; and 1/32 frequency division of SCLK, tSDC=tSCLK×(2+32×(PERI_SDC[3:0]+1))

tSCLK: the clock period of a system clock SCLK within the image processing block PERI_SDC[3:0]: the frequency division setting on clocks obtained by performing 1/32 frequency division of SCLK for generation of SDC clocks FIG. 160 is a table showing timing conditions for the two-line serial interface. The timing conditions are all specified by thresholds of I1VDD×1/2 and I2VDD×1/2.

Registers related to two-line serial setting control will be described.

FIG. 161 is a detailed table of a serial interface control register SERICNT.

SERI_DAT[7:0] sets serial transfer data. When a write setting is performed on SERI_RW, write data for the slave device is set. When a read setting is performed on SERI_RW, read data from the slave device is stored.

PERI_SDC[3:0] sets the SDC period. A serial transfer clock period is such that tSDC=tIMG×(2+32×(PERI_SDC+1)). The SDC period can be set within the range of 1 to 16.

SERI_ST is a serial transfer start flag. The writing of "1" starts the serial transfer. After the start of the transfer, the serial transfer start flag automatically becomes "0". At the time of reading, "0" is constantly read. It is necessary to prevent a host between 5×tIMG from being accessed after the writing of "1".

SERI_BSY is a busy flag indicating that the serial transfer is being performed. The details of the setting are as follows.

"0": in an idle state

"1": during the serial transfer

A write operation on this bit is ignored.

ACK_STAT is an ACK status of the serial transfer. At the time of a write transfer, the OR result of each ACK of a device address, a register address and write data is read.

At the time of a read transfer, the device address is issued twice, and the OR result of each ACK of the register address is read. After the read data transfer, ACK is constantly non-ACK ("H"), and thus this ACK is ignored. The details of the setting are as follows.

"0": normal transfer

"1": a failure occurs during the transfer

A write operation on this bit is ignored.

SERI_RW sets the serial transfer read/write. The details of the setting are as follows.

"0": read

"1": write

FIG. 162 is a detailed table of a serial transfer device address setting register SERIDEVADR.

SDA and SDC are forcibly input to SERI_HZ. The details of the setting are as follows.

"0": the input and the output of the SDA and the SDC are determined by another setting.

"1": the SDA and the SDC are input.

DEV_TYPE specifies the bit width of the device address. The details of the setting are as follows.

"0": device address 7 bits (the setting value of SERIDEVADR[6:0] is transferred.)

"1": device address 10 bits (the setting value of SERI_DEVADR[9:0] is transferred.)

SERI_EN performs an enable setting on a serial transfer block. The details of the setting are as follows.

"0": operation prevention

"1": operation allowance

SERIB_SEL selects the byte transfer or the sequence transfer. The details of the setting are as follows.

"0": sequence transfer

"1": byte transfer

SERI_DEVADR[9:0] sets the device address of the camera module. The 7-bit device address is set in SERI_DEVADR[6:0].

The relationship between SERI_HZ, CAMOFF and the operations of SDA1, SDA2, SDC1 and SDC2 is as shown in FIG. 163. FIG. 163 is a table showing the relationship between SERI_HZ, CAMOFF and the operations of SDA and SDC.

FIG. 164 is a detailed table of a serial transfer register address setting register SERI2NDADR. SERI_2NDADR[7:0] sets the register address of the camera module.

FIG. 165 is a table showing the relationship between individual flags and transfer modes.

The serial transfer can be operated in the READY mode, the NORMAL-VIEWER mode and the CAMERA-JPEG mode (when the supply of IMG_CLK is valid). SDA1 and SDA2 and SDC1 and SDC2 employ a wired-AND logic input within the present LSI. As an output, one master output is only output to both terminals.

FIG. 166 is a detailed table of a serial interface byte control register SERIBYTECNT.

SERIB_DAT[7:0] sets serial byte transfer data. When a write setting is performed on SERI_RW, write data for the slave device is set. When a read setting is performed on SERI_RW, read data from the slave device register is stored.

ADD_START determines whether or not the start conditions are added before the serial byte transfer. The details of the setting are as follows.

"0": the start conditions are not added.

"1": the start conditions are added.

ADD_STOP determines whether or not the stop conditions are added after the serial byte transfer. The details of the setting are as follows.

"0": the stop conditions are not added.

"1": the stop conditions are added.

NOACK determines whether or not ACK is sent at the time of the serial byte read transfer. The details of the setting are as follows.

"0": ACK is sent.

"1": ACK is not sent.

CONTINUE sets "1" when the serial byte transfer is continued. At the time of the setting of "1", the transfer is completed in a state where SDC is turned "L" after ACK. At the time of the setting of "0", the transfer is completed when SDC is turned "L" and is then further turned "H". The details of the setting are as follows.

"0": the completion is performed when SDC is turned from "L" to "H" after ACK.

"1": the completion is performed when SDC is turned "L" after ACK.

SERIB_ST is a serial byte transfer start flag. The writing of "1" starts the serial byte transfer. After the start of the transfer, the serial byte transfer start flag automatically becomes "0".

At the time of reading, "0" is constantly read. It is necessary to prevent a host during 5×tSCLK from being accessed after the writing of "1".

FIG. 167 is a waveform diagram when a serial byte read transfer operation is performed. This diagram shows the waveform obtained by performing the serial byte read transfer three times at the setting shown in the figure.

<Memory within the Image Block>

The setting of the size of an image memory will be described. The present LSI has a memory that can store two frame memories 320×240 pixels (QVGA) in size. When the frame memory is used as the image memory, it is necessary to specify pixel sizes both in the horizontal direction and in the vertical direction.

FIG. 168 is a detailed table of a frame memory horizontal direction size setting register IMGHSIZE. IMGH[8:0] specifies a horizontal direction pixel size in the image size of the frame memory. It can be set within the range from 2 to 510. It is necessary to set the IMGH at an even value. When it is not set at an even value, the operation is not guaranteed.

FIG. 169 is a detailed table of a frame memory vertical direction size setting register IMGVSIZE. IMGV[8:0] specifies a vertical direction pixel size in the image size of the frame memory. It can be set within the range from 2 to 511. It is necessary to perform the setting such that IMGH× IMGV≦163840.

When two 320×240 image frames are used, they are used with reference to a boundary that can independently access internal RAMs. Ten blocks of 32-Kbyte RAMs are provided therewithin. With the two 160 KB image frames, it is possible to employ the following manner: while an image from the camera is input to one frame, the other can be output to the TV, or, while a code image is decompressed with JPEG to one frame, the already decompressed JPEG image is output to the TV on the other.

FIG. 170 is a memory map showing how the two frame memories are used.

Registers related to the operation of the memories will be described.

FIG. 171 is a detailed table of a memory control register MEMCNT.

RGB_FRAME sets a storage format for pixel data to the frame memory. The details of the setting are as follows.

"0": YUV422 format
"1": RGB=5:6:5 format

ROT sets the direction in which data from CAM I/F is written into the frame memory. The details of the setting are as follows.

"0": camera scan direction=frame memory image scan direction
"1": camera scan direction=rot90 (rot90 is an operation of turning 90° in a memory storage direction.)

VFLIP inverts, upside down, an image from CAM I/F with respect to an X-axis and stores it in the memory. The details of the setting are as follows.

"0": normal
"1": inverted upside down

HFLIP reverses, left to right, the image from CAM I/F with respect to a Y-axis and stores it in the memory. The details of the setting are as follows.

"0": normal
"1": reversed left to right

TRON sets a transparent color valid or invalid. The details of the setting are as follows.

"0": invalid
"1": valid

SWAP_BYTE sets endian at the time of access to the internal memory. It is valid for memory access registers MEMACS_ABS (IDX: 0036h), RING_RD (IDX: 003Fh), MEMACS_YUV (IDX: 0033h) and MEMACS_RGB (IDX: 0034h). Within the present LSI, all the blocks are operated by big endian. The details of the setting are as follows.

"0": big endian
"1": little endian

INCMTH sets a method of incrementing an address at the time of access to the memory access register. The details of the setting are as follows.

"0": simple incrementing (it is valid for a write start address. If writing is performed to exceed a write completion address, an address is incremented.)
"1": rectangular incrementing It is necessary to prevent "1" from being written into the RESERVED bit.

FIG. 172 is a detailed table of a camera image storage start X position setting register MEMCSTAX. MEMCSTA_X[8:0] sets an X start address at the time of storage of an image from the camera module into the frame memory. It can be set within the range from 0 to 508. It is necessary to set MEMCSTA_X at an even value. It is necessary to perform the setting such that MEMCSTA_X<IMGH.

FIG. 173 is a detailed table of a camera image storage start Y position setting register MEMCSTAY. MEMCSTA_Y[8:0] sets a Y start address at the time of storage of the image from the camera module into the frame memory. It can be set within the range from 0 to 510. It is necessary to perform the setting such that MEMCSTA_Y<IMGV.

FIG. 174 is a detailed table of a memory access register YUV:MEMACS_YUV. MEMACS_YUV[15:0] is used for access of the frame memory in a YUV format. A read operation while the camera image is captured, a read operation while data is transferred to the TV encoder and a read operation while the JPEG codec is operated are ignored, and read values become invalid.

FIG. 175 is a table showing a YUV data write format. FIG. 176 is a table showing a YUV data read format.

Each of the read operation and the write operation needs to be performed twice. When, in each of them, access is not performed twice, the read operation and the write operation are not guaranteed. When the reading is performed, a dummy read first needs to be performed once. When the frame memory is in a RGB=5:6:5 format, the dummy read first needs to be performed twice. The address is automatically incremented. Whether the read access or the write access is performed, the address is incremented. When the access is performed, it is necessary to prevent the read access and the write access from being mixed together. When index read access is performed, the read operation and the write operation are cleared. Before MEMACS_YUV access is started, it is necessary to ensure that the index read access is performed. When the frame memory is in the RGB=5:6:5 format, if a YUV write is performed, it is necessary to perform the dummy write at the end.

FIG. 177 is a detailed table of a memory access register RGB:MEMACS_RGB. MEMACS_RGB[15:0] is read, and thus the contents of the memory can be read. A read operation while the camera image is captured, a read operation while data is transferred to the TV encoder and a read operation while the JPEG codec is operated are ignored, and read values become invalid.

FIG. 178 is a table showing a RGB data write format. FIG. 179 is a table showing a RGB data read format.

Each of the read operation and the write operation needs to be performed twice. When, in each of them, access is not performed twice, the read operation and the write operation are not guaranteed. When the reading is performed, if the frame memory is in the YUV=4:2:2 format, the dummy read first needs to be performed twice whereas, if the frame memory is in the RGB=5:6:5 format, the dummy read first needs to be performed once. The address is automatically incremented. Whether the read access or the write access is performed, the address is incremented. When the access is performed, it is necessary to prevent the read access and the write access from being mixed together. When the index read access is performed, the read operation and the write operation are cleared. Before MEMACS_RGB access is started, it is necessary to ensure that the index read access is performed FIG. 180 is a detailed table of a memory access register ABS:MEMACS_ABS. MEMACS_ABS[15:0] is used for access for absolute addressing on all memory areas in the present LSI. A read operation while the camera image is captured, a read operation while data is transferred to the TV encoder and a read operation while the JPEG codec is operated are ignored, and read values become invalid.

Each of the read operation and the write operation needs to be performed twice. When, in each of them, access is not performed twice, the read operation and the write operation are not guaranteed. When access is not performed once, the read operation and the write operation are not guaranteed. When the reading is performed, the dummy read first needs to be performed once. Whether the read access or the write access is performed, the address is incremented. When the access is performed, it is necessary to prevent the read access and the write access from being mixed together. When the index read access is performed, the read operation and the write operation are cleared. Before MEMACS_ABS access is started, it is necessary to ensure that the index read access is performed.

FIG. 181 is a detailed table of a memory rectangular access start X position setting register MEM_ADR_STX. MEM_ADR_STX [8:0] sets a rectangular access start X address to the frame memory. It can be set within the range from 0 to 508. It is necessary to set MEM_ADR_STX at an even value. It is necessary to perform the setting such that MEM_ADR_STX<IMGH.

FIG. 182 is a detailed table of a memory rectangular access start Y position setting register MEM_ADR_STY. MEM_ADR_STY [8:0] sets a rectangular access start Y address to the frame memory. It can be set within the range from 0 to 509. It is necessary to perform the setting such that MEM_ADR_STY<IMGV.

FIG. 183 is a detailed table of a memory rectangular access completion X position setting register MEM_ADR_EDX. MEM_ADR_EDX[8:0] sets a rectangular access completion X address to the frame memory. It can be set within the range from 0 to 509. It is necessary to set MEM_ADR_EDX at an odd value. It is necessary to perform the setting such that MEM_ADR_EDX<IMGH. Moreover, it is necessary to perform the setting such that MEM_ADR_EDX>MEM_ADR_STX.

FIG. 184 is a detailed table of a memory rectangular access completion Y position setting register MEM_ADR_EDY. MEM_ADR_EDY[8:0] sets a rectangular access completion Y address to the frame memory. It can be set within the range from 1 to 510. It is necessary to perform the setting such that MEM_ADR_EDY<IMGV. Moreover, it is necessary to perform the setting such that MEM_ADR_EDY>MEM_ADR_STY.

FIG. 185 is a table showing the relationship between (x, y) address specification and memory addresses (for example: at the time of the setting of 176×220).

FIG. 186 is a detailed table of a memory absolute address setting 1 register MEM_ADR_ABS1. FIG. 187 is a detailed table of a memory absolute address setting 2 register MEM_ADR_ABS2. {MEM_ADR_ABS2 [1:0], MEM_ADR_ABS1[15:0]} sets an absolute address for the memory space of the present LSI. The details of the setting are as follows.

MEM_ADR_ABS2[1]=MSB
MEM_ADR_ABS1[0]=LSB

FIG. 188 is a detailed table of a memory data transparent color setting register MEMTRANS. MEMTRANS[15:0] sets the transparent color when data is written into the frame memory. Write data having the same value as the data set here is not written into the frame memory. With this function, it is possible to achieve the movement of an icon on display data (see FIG. 189). Even if transparent color data is written, the address is incremented. The transparent color function can be used only for the writing of RGB format data.

FIG. 189 is a schematic diagram showing the writing of icon data using the setting of the transparent color.

FIG. 190 is a detailed table of a memory data transparent color mask register MEMTRMSK. MEMTRMSK[15:0] sets a mask bit for the transparent color when data is written into the frame memory. When the mask bit is set at "1", the value of the corresponding transparent color setting register becomes a "don't care" value. For example, the setting is performed such that MEMTRANS=0xFFFF and that MEMTRANS=0x00001, the present LSI recognizes that 0xFFFF and 0xFFFE are transparent colors, and thus does not write the same color into the frame memory.

<TV Encoder>

The image processing block is connected to a TV encoder block therewithin, and has the TV encoder I/F that outputs the data of the frame memory to the TV. The image processing block also has the function of enlargement up to eight times with the bilinear when data is output to the TV encoder IC. An example of the connection between the image processing block and the TV encoder is shown in FIG. 191. FIG. 191 is a system connection diagram showing the example of the connection between the image processing block and the TV encoder.

HDMODE (IDX: 00D8h HWMODE[3:0]) in which the TV encoder I/F operates has the following two modes.

NORMAL-VIEWER mode
JPEG-DECODE mode

The TV encoder I/F has the function of enlargement up to eight times in the X-direction and in the Y-direction on an independent basis. The enlargement is performed by the bilinear. Bilinear enlargement is calculated by the following formula.

$$\text{Generated pixel} = (x \times y \times \alpha 1 + x' \times y \times \alpha 2 + x \times y' \times \beta 1 + x' \times y' \times \beta 2)$$

FIG. 192 is a schematic diagram showing the position of pixels and the generated pixel at the time of enlargement.

Registers on the interface to the TV encoder will be described.

FIG. 193 is a detailed table of a TV encoder control register TE_CNT.

OUT_FMT sets a format for data output. The details of the setting are as follows.

"0": ITU-R. BT. 601 format
"1": ITU-R. BT. 656 format

TE_VIDEO_M selects NTSC or PAL. The details of the setting are as follows.

"0": NTSC
"1": PAL

TE_VFLIP inverts, upside down, the data of the frame memory and outputs it to the TV encoder. The details of the setting are as follows.

"0": normal output

"1": inversion output

TE_HFLIP reverses, left to right, the data of the frame memory and outputs it to the TV encoder. The details of the setting are as follows.

"0": normal output

"1": reverse output

TE_BACK_COL[3:0] specifies a background display color. The details of the setting are as follows.

0000b: blue, 0001b: block, 0010b: red, 0011b: green

0100b: yellow, 0101b: cyan, 0110b: magenta, 0111b: 50% white

1000b: 100% white, other: setting prohibition

ENC_ON[1:0] performs a TV encoder I/F operation mode setting. FIG. 194 is a TV encoder I/F operation setting table.

FIG. 195 is a detailed table of a TV encoder control register 2: TE_CNT2. When a setting is performed such that ENC_ON[1]="H", it is necessary to set MODE SHT at "H".

FIG. 196 is a detailed table of a frame memory transfer X start position TE_STX. TE_STX[8:0] sets a frame data transfer start X coordinate to the TV encoder. It can be set within the range from 0 to 508. It is necessary to set TE_STX at an even value. When it is not set at an even value, an operation is not guaranteed. It is necessary to perform the setting such that TE_STX<IMGH. Moreover, it is necessary to perform the setting such that TE_EDX-TE_STX+1<320.

FIG. 197 is a detailed table of a frame memory transfer Y start position TE_STY. TE_STY[8:0] sets a frame data transfer start Y coordinate to the TV encoder. It can be set within the range from 0 to 509. It is necessary to perform the setting such that TE_STY<IMGV and that TE_EDY-TE_STY+1≦320.

FIG. 198 is a detailed table of a frame memory transfer X completion position TE_EDX. TE_EDX[8:0] sets a frame data transfer completion X coordinate to the TV encoder. It can be set within the range from 1 to 509. It is necessary to set TE_EDX at an odd value. When it is not set at an odd value, the operation is not guaranteed. It is necessary to perform the setting such that TE_STX<TE_EDX<IMGH and that TE_EDX-TE_STX+1≦320.

FIG. 199 is a detailed table of a frame memory transfer Y completion position TE_EDY. TE_EDY[8:0] sets a frame data transfer completion Y coordinate to the TV encoder. It can be set within the range from 1 to 510. It is necessary to perform the setting such that TE_STY<TE_EDY<IMGV. When RGB_FRAME="L" (IDX: 0030h MEMCNT[12], it is necessary to set an odd value. It is necessary to perform the setting such that TE_EDY-TE_STY+1≦320.

FIG. 200 is a detailed table of a horizontal direction enlargement setting register TE_EXPH. TE_EXPH[9:0] sets the horizontal direction enlargement size of an enlarged image that is transferred to the TV encoder. It is necessary to set an even value. It is necessary to perform the setting such that the horizontal direction size is constantly an even number. The image size transferred to the TV encoder is given by the following formula.

Horizontal direction size=TE_EDX−TE_STX+1+ TE_EXPH (where the range is from 1 to 8 times.)

FIG. 201 is a detailed table of a vertical direction enlargement setting register TE_EXPV. TE_EXPV[9:0] sets the vertical direction enlargement size of the enlarged image that is transferred to the TV encoder. The image size transferred to the TV encoder is given by the following formula.

Vertical direction size=TE_EDY−TESTY+1+TE_ EXPV (where the range is from 1 to 8 times.)

FIG. 202 is a detailed table of a TV encoder output horizontal direction start position setting register TE_OUTSTH. TE_OUTSTH[9:0] sets a horizontal direction start position at the time of transfer to the TV encoder. This register is valid only when the setting is performed such that OUT_FMT (IDX: 00B0h TE_CNT[15])="0". When OUT_FMT is set at "1", TE_OUTSTH needs to be constantly set at "0".

FIG. 203 is a detailed table of a TV encoder output vertical direction start position setting register TE_OUTSTV. TE_OUTSTV[8:0] sets a vertical direction start position at the time of transfer to the TV encoder. This register is valid only when the setting is performed such that OUT_FMT (IDX: 00B0h TE_CNT[15])="0". When OUT_FMT is set at "1", TE_OUTSTV needs to be constantly set at "0".

The TV encoder block will be described. TV output data from a TV encoder interface block is received, and a composite signal (CVBS) is generated by the TV encoder block. A current is passed from an internal current DAC to a 75Ω pull down resistor (DAVSS) attached to the VOUT terminal, and thus 1.25VPP (TYP) is output when a terminal end on the side of the TV is of 75Ω. Here, the IREF terminal needs to be pulled down by a 2.4 KΩ resistor.

An analog composite output format will be described.

FIG. 204 is a waveform diagram in a vertical blanking section at an NTSC setting. At the default setting, lines from the 23rd line to the 262nd line and lines from the 286th line to the 525th line are displayed.

FIG. 205 is a waveform diagram in a vertical blanking section at a PAL setting. At the default setting, lines from the 46th line to the 285th line and lines from the 359th line to the 598th line are displayed.

FIG. 206 is a color bar waveform diagram at the NTSC setting. The setting can be performed such that a white level is changed from 100IRE to 108IRE and that a black level is changed from 7.5IRE to 0IRE.

FIG. 207 is a color bar waveform diagram at the PAL setting. The setting can be performed such that the white level is changed from 100IRE to 108IRE and that the black level is changed from 0IRE to −7IRE.

Registers related to the TV encoder will be described.

FIG. 208 is a detailed table of a parameter update register PARAMSET, "1" is written into PARAM_SET, and thus a parameter is updated. An internal parameter is updated at the front of a frame after writing. This bit is automatically cleared after the updating. It is necessary to write "0" into the RESERVED bit.

FIG. 209 is a detailed table of a mode register MODE,

MODE[1:0] sets the operation mode of the TV encoder. FIG. 210 is an operation mode list.

TH_TYPE sets the operation type of a through mode. Although the setting is related to the number of stages of internal pipelines, it is necessary to set "1" in the present LSI.

SUSP sets the suspend mode of the TV encoder. In the suspend mode, the TV output is not performed. The details of the setting are as follows.

"0": the cancellation of the suspend mode

"1": the suspend mode

It is necessary to write "1" into RESERVED1 and "0" into the RESERVED.

FIG. 211 is a detailed table of an input interface format specification register YUVIFSET.

YUV_XST[1:0] sets delay after Hsync validity until data validity. It is necessary to set 00b.

YUVORD[1:0] sets the input format (order) of YCbCr to the TV encoder. It is necessary to set 10b in the present LSI.

ITU656EN sets a digital interface for input and output. It is necessary to make the setting agree with the OUT_FMT setting of a TECNT register: IDX00B0h. The details of the setting are as follows.

"0": Hsync, Vsync another signal

"1": ITU656 format

It is necessary to write "1" into the RESERVED1.

FIG. 212 is a detailed table of monitor X-direction pixel size setting registers XSIZE_L and XSIZE_H. XSIZE[10:0] sets the number of pixels in the X-direction of the camera that is used. It is possible to set the number ranging from 144 to 1024.

FIG. 213 is a detailed table of monitor Y-direction pixel size setting registers YSIZE_I, and YSIZE_H. YSIZE[10:0] sets the number of pixels in the Y-direction of the camera that is used.

FIG. 214 is a detailed table of a TV encoder reset register PWD.

DAC_POW turns on and off the operation of DAC incorporated in TV_ENCODER. After the cancellation of resetting, DAC starts from its on-state. The details of the setting are as follows.

"0": the operation of DAC is on.

"1": the operation of DAC is off.

LOGIC_POW controls the turning on and off of the internal clocks of TV_ENCODER. The details of the setting are as follows.

"0": the internal clocks are turned off.

"1": the internal clocks are turned on.

In the initial state immediately after the resetting, the operation of DAC starts from its on-state.

FIG. 215 is a detailed table of a TV encoder display mode register DISP.

LEVEL adjusts the DAC output white level of the TV encoder incorporated in TV_ENCODER. The details of the setting are as follows.

"0": corresponding to white level 100IRE

"1": corresponding to white level 108IRE

DISP0 selects the operation mode of the TV encoder within TV_ENCODER. In a square pixel mode, pixels in the horizontal direction are extended from 640 pixels to 720 pixels. Unless clock input has 27 MHz, "0" needs to be written into this bit. The details of the setting are as follows.

"0": equivalent pixel mode

"1": square pixel mode

FIG. 216 is a detailed table of a TV encoder video mode register VIDEO.

NTPAL selects the video output model of the TV encoder incorporated in TV_ENCODER. The details of the setting are as follows.

"0": NTSC

"1": PAL

Q_FSC selects the clock operation mode of the TV encoder within TV_ENCODER. The clocks of the selected mode need to be entered. The details of the setting are as follows.

"0": 27 MHz clock operation

"1": 4 fsc clock operation (clock input is 8 fsc.)

When the clock operation mode of the TV encoder within TV_ENCODER is PAL, and is of 28.375 MHz, PAL28 is turned on. The details of the setting are as follows.

"0": when PAL is employed and the 28.375 MHz clock operation is not performed

"1": when PAL is employed and the 28.375 MHz clock operation is performed

It is necessary to write "0" into the RESERVED bit.

Available settings are shown in FIG. 217. It is necessary to prevent another setting from being performed. FIG. 217 is a TV encoder frequency setting list.

FIG. 218 is a detailed table of a TV encoder video mode register CVBS.

CYBS_OUT performs an on/off selection on the video output (DAC) of the TV encoder incorporated in TV_ENCODER. The details of the setting are as follows.

"0": DAC output is not performed (here, a voltage of 29/32*VF_DA is output.)

"1": CVBS (a composite video signal) is output as DAC output.

IMAGE_OUT[1:0] selects the video output data of the TV encoder within TV_ENCODER. The details of the setting are as follows.

00b: RESERVED

01b: a color selected by a BGCOL register is output in all screen ranges.

10b: RESERVED

11b: video is output; the color selected by the BGCOL register is output to a background area.

FIG. 219 is a detailed table of a background color register BGCOL. BGCOL[3:0] selects a background color of the video output (DAC) of the TV encoder incorporated in TV_ENCODER. The details of the setting are as follows.

00 (hex): BLUE background color [Default]

01 (hex): BLUE background color 02 (hex): RED background color 03 (hex): GREEN background color 04 (hex): YELLOW background color 05 (hex): CYAN background color 06 (hex): MAGENTA background color 07 (hex): GRAY background color 08 (hex): WHITE background color Others: it is necessary to prevent setting FIG. 220 is a detailed table of a TV encoder color bar test register COLBAR. COLBAR sets the output of the TV encoder incorporated in TV_ENCODER at color bar output. The details of the setting are as follows.

"0": the input data of TV_ENCODER is output.

"1": the color bar is forcibly output.

FIG. 221 is a detailed table of a TV encoder setup register SETUP. It is necessary to set SETUP according to NTSC or PAL. The details of the setting are as follows.

"0": in the case of NTSC, it is necessary to set "0".

"1": in the case of PAL, it is necessary to set "1".

FIG. 222 is a detailed table of TV encoder gamma collection registers (GM_A0, GM_A1, GM_A2, GM_X0, GM_X1, GM_X2, GM_X3, GM_Y0, GM_Y1, GM_Y2 and GM_Y3). The setting of a gamma collection curve is determined by the coordinates of four points shown in FIG. 223 and three inclination coefficients. FIG. 223 is a diagram showing the gamma collection curve. The three inclination coefficients GM_A0, GM_A1 and GM_A2 indicate that high four bits are an integer and low four bits are a decimal fraction.

The gamma curve is approximated under the following conditions.

1) when X<x0, $Y=y0$ 2) when x0≦X<x1, $Y=a0*(X-x0)+y0$ 3) when x1≦X<x2, $Y=a1*(X-x1)+y1$ 4) when x2≦X<x3, $Y=a2*(X-x2)+y2$ 5) when x3≦X, $Y=y3$ FIG. 224 is a table showing an example of the setting of the gamma collection register. An output value 16 (10h) corresponds to DIRE; an output value 235 (EBh) corresponds to 100IRE. In the setting of the table shown in FIG. 224, the maximum value of the output is limited to 235 (EBh), and the white level of TV output is limited to 100IRE.

FIG. 225 is a detailed table of input valid start pixel offset setting registers OFS_h and OFS_1. While H_POS is a display offset at the time of TV encoder output, this register sets a valid data start pixel from HSYNC in input.

FIG. 226 is a detailed table of TV encoder valid data width setting registers WID_VD_h and WID_VD_1. This register sets the number of valid pixels in a horizontal line. The initial value is 320 pixels. It is necessary to set the setting value at an even value. The setting ranges from 100 pixels to 896 pixels. The details of the setting are as follows.

WID_VD[1:0]: it is necessary to write "00b" into these two bits.
WID_VD[9:0]: it is necessary to prevent values from 000 (hex) to 063 (hex) from being set.

064 (hex): 100 pixels
|
|
140 (hex): 320 pixels [Default]
| ex.) At QVGA image input
|
2D0 (hex): 720 pixels
|
|
3F0 (hex): 1008 pixels it is necessary to prevent values from 3F1 (hex) to 3FF (hex) from being set.

It is necessary to set the WID_VD register at a multiple of three.

FIG. 227 is a detailed table of a TV encoder valid line width setting register HT_VD. This register sets the number of valid lines within a field. The initial value is 240. Values that can be set range from 100 lines to 254 lines. The details of the setting are as follows.

HT_VD[0]: write "0" into this bit.

HT_VD[7:0]: it is necessary to prevent values from 000 (HEX) to 063 (HEX) from being set.

064 (HEX): 100 lines
|
|
F0 (HEX): 240 lines; default corresponding to a VGA image
|
|
FE (HEX): 254 lines FIG. 228 is a detailed table of a TV encoder horizontal display position offset register H_POS. This register sets the offset of a horizontal display position within a line. The initial value is 0. The setting can range from 0 to 504 pixels. The offset of a horizontal position that is displayed is given by the following formula.

The offset value of the display horizontal position: H_POS [7:0]x2

[Pixel]

The details of the setting of the H_POS register are as follows.

H_POS[1:0]: it is necessary to write "00b" into these two bits.

H_POS[7:0]: 00 (HEX) default position 04 (HEX) displayed in a position shifted 8 pixels to the right on a screen

|

|

FC (HEX) displayed in a position shifted 504 pixels to the right on the screen it is necessary to prevent values from FD (HEX) to FF (HEX) from being set.

FIG. 229 is a detailed table of a TV encoder vertical display position offset register V_POS. This register sets the offset of a vertical display position within a field. The initial value is 0. The setting can range from 0 to 120 lines. The offset of a vertical position that is displayed is given by the following formulas.

The offset value of the display vertical position: V_POS[7:0]+4 (line in a field) (in the case of NTSC)

The offset value of the display vertical position: V_POS[7:0]+23 (line in a field) (in the case of PAL)

The details of the setting of the V_POS register are as follows.

FIG. 230 is a detailed table of an input valid start line offset setting register V_OFS. While V_POS is a display offset at the time of TV encoder output, this register sets a valid data start line from VSYNC in input.

FIG. 231 is a schematic diagram showing the details of the setting of a display position modification register.

FIG. 232 is a detailed table of an initialization register SRST. This register is a software reset register. The writing of "1" resets the corresponding block. The writing of "1" is only valid. For a period of 100 ns after software resetting, it is necessary to prevent the register from being accessed. After V_POS[1:0]: it is necessary to write "00b" into these two bits.

V_POS[7:0]: 00 (HEX) default position 04 (HEX) displayed in a position shifted 8 lines upward on the screen

|

|

78 (HEX) displayed in a position shifted 240 lines upward on the screen it is necessary to prevent values from 79 (HEX) to 7F (HEX) from being set.

80 (HEX) the same as the default position 84 (HEX) displayed in a position shifted 8 lines downward on the screen

|

|

F8 (HEX) displayed in a position shifted 240 lines downward on the screen it is necessary to prevent values from F9 (HEX) to FF (HEX) from being set.

the hardware resetting, it is unnecessary to perform the software resetting. The details of the setting are as follows.

SRST_TVE: the TV encoder block is reset by the writing of "1".

the resetting is cancelled by the writing of "0".

SRST REG: the register is reset by the writing of "1".

the resetting is automatically cancelled before return to the initial value.

<JPEG Codec>

The present LSI incorporates the JPEG codec that conforms to a base line method in ISO/IEC10918. The present LSI has the following two JPEG operation modes.

J-1: CAMERA-JEPG Mode

In the CAMERA-JEPG mode, the width (CAMREX-CARSY+1) of a compressed image size needs to be a multiple of four, and the height (CAMREX-CAMRSY+1) of the compressed image size needs to be a multiple of eight.

IDX: 001Bh (CAMRSX), IDX: 001Ch (CAMRSY), IDX: 001Dh (CAMREX), IDX: 001Eh (CAMREY)

J-2: JEPG-DECODE Mode

The control of a JPEG operation will be described.

FIG. 233 is a detailed table of a JPEG control register JPG_CNT.

JE_CONTINUE sets a Camera_JPEG continuous mode. The details of the setting are as follows.

"0": only one camera JPEG is in the frame memory.

"1": a plurality of pieces of camera JPEG data are written into the frame memory.

When "0" is written into the continuous mode, after JPEG encoding at that time is completed, an exit from the continuous mode is performed.

SWRST resets the JPEG codec with software. The details of the setting are as follows.

"0": cancellation of the resetting

"1": resetting

JD_ST is a JPEG decode start bit. The writing of "1" into this bit starts JPEG decoding This bit can be used in the JPEG-DECODE mode alone. At the time of reading, "0" is constantly read. After the writing of "1" into this bit, it is necessary to prevent host access during 5×tSCLK.

JE_ST is a JPEG encode start bit. The writing of "1" into this bit starts JPEG encoding. This bit can be used in the CAMERA-JPEG mode alone. At the time of reading, "0" is constantly read. When, in the CAMERA-JPEG mode, "1" is written into JEST, an immediately previous camera frame is captured, and, when the encoding is completed, the operation is stopped. After the writing of "1" into this bit, it is necessary to prevent host access during 5×tSCLK.

It is necessary to prevent "1" from being written into the RESERVE register.

FIG. 234 is a detailed table of a JPEG status 1 register JPG_ST1.

JE_STAT is a JPEG encoding status bit. This bit is only for reading. The details of the setting are as follows.

"0": stop of encoding

"1": encoding

JD_STAT is a JPEG decoding status bit. This bit is only for reading. The details of the setting are as follows.

"0": stop of decoding

"1": decoding

It is necessary to prevent "1" from being written into the RESERVE register.

FIG. 235 is a detailed table of a JPEG status 2 register JPG_ST2.

JE_WORD_SIZE indicates that the code size of JPEG compression data is an odd word or an even word. Since JPEG code size={JE_CSIZE2, JE_CSIZE1} is constantly set at an even value, when JE_WORD_SIZE="1", the host needs to perform reading ({JE_CSIZE2, JE_CSIZE1}−1) times. The details of the setting are as follows.

"0": an even word

"1": an odd word

JE_ODD_LEN indicates that the code size of JPEG compression data is an odd byte or an even byte. When it is an odd byte, the high byte (when SWAP_BYTE is "0") of the final word of the JPEG compression data is invalid, and thus needs to be deleted by the host. The details of the setting are as follows.

"0": the code size is an even byte

"1: the code size is an add byte

When an overflow occurs, the JPEG codec needs to be reset by SWRST with software.

JD_ERROR[4:0] is a JPEG decode error status. This bit is only for reading. Each bit corresponds to one error factor. When an error occurs, any of the bits becomes "1", and the decode operation is immediately stopped. When it is completed and then decoding is performed from the beginning, it is preferable to set the READY mode once and then supply five or more clocks of SCLK.

FIG. 236 is a list showing each bit of the JPEG decode error status and error factors.

FIG. 237 is a detailed table of a JPEG status 3 register JPG_ST3. It is necessary to prevent "1" from being written into the RESERVE register.

JPEG ENCODE will be described. When the present LSI performs encoding, the JPEG code is processed in unit of two bytes. Hence, depending on the size of the encoding, it is possible that 0xFF is inserted before End of Image (0xFFD9), and this results in . . . FFFFD9.

FIG. 238 is a detailed table of a JPEG compression control register JE_CNT.

JE_HFLIP controls whether or not a camera JPEG encode image is reversed left to right (reversed about the Y-axis). The details of the setting are as follows.

"0": the camera JPEG encode image is not reversed left to right.

"1": the camera JPEG encode image is reversed left to right.

JE_HEAD[0] controls the addition of a header at the time of the JPEG encoding. The details of the setting are as follows.

"0": without the header

"1": with the header

JE_HEAD[1] controls the addition of a DHT table. The details of the setting are as follows.

"0": without the addition of the DHT table

"1": with the addition of the DHT table

JE_HEAD[2] controls the addition of a DQT table. The details of the setting are as follows.

"0": without the addition of the DQT table

"1": with the addition of the DQT table

JE_HEAD[3] controls the addition of a "JFIF" identifier. The details of the setting are as follows.

"0": without the addition of the "JFIF"

"1": with the addition of the "JFIF"

JE_Q[4:0] selects a compression ratio at the time of the JPEG encoding. The details of the setting are as follows.

"00000": the highest image quality (low compression ratio)

⋮

"11111": the lowest image quality (highest compression ratio)

It is necessary to prevent "1" from being written into the RESERVE register.

FIG. 239 is a detailed table of a JPEG code size register 1: JE_CSIZE1. JE_CSIZE1[15:0] represents the code size of the JPEG compression data. {JE_CSIZE2, JE_CSIZE1[15:0]} represents a code size (in units of 16 bits). When, in the CAMERA-JPEG mode, write data exceeds 160 KB, this results in return to "0".

FIG. 240 is a detailed table of a JPEG code size register 2: JE_CSIZE2. JE_CSIZE2 represents the code size of the JPEG compression data. {JE_CSIZE2, JE_CSIZE1[15:0]} represents the code size (in units of 16 bits). When, in the CAMERA-JPEG mode, write data exceeds 160 KB, this results in return to "0".

When the code size of the JPEG compression data is determined in units of bytes, it is calculated by the following calculation formula. "N" represents the number of times that the ring memory is read. Here, JE_ODD_LEN is a total of individual frames.

$$\text{Code size} = 160 \times 1024 \times N + (JE\_CSIZE - JE\_WORD\_SIZE) \times 2 - JE\_ODD\_LEN \text{ (byte)}$$

FIG. 241 is a detailed table of a JPEG code size pre-register 1: JE_CSIZE1_PRE. JE_CSIZE1_PRE[15:0] represents the code size of the JPEG data when the JPEG compression is completed and then JE_ED_INT is generated. {JE_CSIZE2_PRE, JE_CSIZE1_PRE[15:0]} represents the code size (in units of 16 bits). When, in the CAMERA-JPEG mode, the write data exceeds 160 KB, this results in return to "0".

FIG. 242 is a detailed table of a JPEG code size pre-register 2: JE_CSIZE2_PRE. JE_CSIZE2_PRE represents the code size of the JPEG data when the JPEG compression is completed and then JE_ED_INT is generated. {JE_CSIZE2_PRE, JE_CSIZE1_PRE[15:0]} represents the code size (in units of 16 bits). When, in the CAMERA-JPEG mode, the write data exceeds 160 KB, this results in return to "0".

JPEG DECODE will be described.

FIG. 243 is a detailed table of a JPEG code YUV format setting register JD_PICTYPE.

JD_FILL sets a method of determining a Fill bit. The details of the setting are as follows.

"0": the Fill bit is not determined.

"1": when the Fill bit is not 1Fill, an error is generated.

JD_CODE_SIZE selects a code size when the JPEG code is written. The details of the setting are as follows.

"0": the writing is performed per 5 KB.

"1": the writing is performed per 16 KB.

JD_PICTYPE[2:0] sets the YUV format of the JPEG code to be decoded. The YUV format to be set is discriminated from the SOFn marker of the header. FIG. 244 is a table showing the relationship between register setting values and the YUV format.

It is necessary to prevent "1" from being written into the RESERVE register. It is also necessary to prevent "0" from being written into the RESERVE1 register.

FIG. 245 is a detailed table of a restart interval setting register JD_INTERVAL. A restart interval definition segment (DRI) is extracted from the header of the JPEG code to be decoded, and is set to JD_INTERVAL[15:0].

FIG. 246 is a detailed table of a JPEG code X-direction size setting register JD_XSIZE. JD_XSIZE[10:0] sets the X-direction size of the JPEG code to be decoded. The setting can range from 2 to 1600. It is necessary to extract and set the X-direction size from the header of a JPEG file to be decoded. It is necessary to set an even value. When the X-direction of the JPEG file to be decoded is odd, a value obtained by adding 1 needs to be set.

FIG. 247 is a detailed table of a JPEG code Y-direction size setting register JD_YSIZE. JD_YSIZE[10:0] sets the Y-direction size of the JPEG code to be decoded. The setting can range from 1 to 1600. It is necessary to extract and set the Y-direction size from the header of the JPEG file to be decoded.

FIG. 248 is a detailed table of a brightness DC component Huffman table 1 setting register JD_HUF_Y_DC1, JD_HUF_Y_DC1[3:0] needs to extract and set the code portion of a brightness DC component Huffman table from the header of the JPEG code to be decoded. It is necessary to write 16 pieces of data continuously from 1 to 16. It is necessary to read, at the time of reading, the register after reading an index.

FIG. 249 is a detailed table of a brightness AC component Huffman table 1 setting register JD_HUF_Y_AC1, JD_HUF_Y_AC1[7:0] needs to extract and set the code portion of a brightness AC component Huffman table from the header of the JPEG code to be decoded. It is necessary to write 16 pieces of data continuously from 1 to 16. It is necessary to read, at the time of reading, the register after reading the index.

FIG. 250 is a detailed table of a color-difference DC component Huffman table 1 setting register JD_HUF_C_DC1. JD_HUF_C_DC1[3:0] needs to extract and set the code portion of a color-difference DC component Huffman table from the header of the JPEG code to be decoded. It is necessary to write 16 pieces of data continuously from 1 to 16. It is necessary to read, at the time of reading, the register after reading the index.

FIG. 251 is a detailed table of a color-difference AC component Huffman table 1 setting register JD_HUF_C_AC1. JD_HUF_C_AC1[7:0] needs to extract and set the code portion of a color-difference AC component Huffman table from the header of the JPEG code to be decoded. It is necessary to write 16 pieces of data continuously from 1 to 16. It is necessary to read, at the time of reading, the register after reading the index.

FIG. 252 is a detailed table of a RESERVE register 1, 2: RESERVE. It is necessary to prevent "1" from being written into the RESERVE register.

A memory ring buffer mode will be described. As the ring buffer mode, the CAMERA-JPEG mode is provided. The size of the ring buffer is different according to the mode; in the CAMERA-JPEG mode, it is 160 KB (see FIG. 253).

In the CAMERA-JPEG mode, the image data from the camera is JPEG compressed. When the JPEG code exceeds a frame memory size of 160 KB, the frame memory is used as the ring buffer, with the result that the host can read a code of 160 KB or more. The host can find the write status of the JPEG code with two types of interrupts below.

RING_INT: JPEG code/image data bank write completion interrupt

JE_EDINT: JPEG encode completion interrupt (IDX: 00DCh)

When the mode is set at the CAMERA-JPEG mode, a JPEG circuit is reset. Thus, it is necessary to write "1" into SWRST (IDX: 0080h JPG_CNT[7]) and perform a reset with software.

The JPEG code memory (sharing the frame memory) of the present LSI is configured as shown in FIG. 253. FIG. 253 is a diagram showing the configuration of a frame memory bank.

When the writing of the JPEG code into the code memory reaches a size corresponding to the setting of RING_COUNT register (IDX: 0086h), RING INT is generated. On receipt of this interrupt, the host reads readable JPEG code/image data by reading and accessing RING_RD, RING_RD_YUV and RING_RD_RGB registers. When JE_ED_INT is generated at the time of the JPEG encoding, since the JPEG encoding of the image data is completed, it is necessary to access JPEG code size registers (JE_CSIZE1 (IDX: 0091h), JE_CSIZE2 (IDX: 0092h)) and read the JPEG code left within the frame memory. After the completion of the mode, BU1511 KV2 needs to be temporarily placed in a READY state.

FIG. 254 is a detailed table of a RING_INT generation control register RING_CNT. RING_CNT[1:0] sets the generation size of a RING_INT interrupt. The details of the setting are as follows.

"00": generated per 32 KB
"01": generated per 64 KB
"10": generated per 96 KB
"11": generated per 128 KB FIG. 255 is a detailed table of a RING_INT generation count register RING_COUNT. RING_COUNT[7:0] indicates the number of times that a RING_COUNT interrupt is generated.

FIG. 256 is a detailed table of a ring buffer read data RING_RD. RING_RD[15:0] is valid in the CAMERA-JPEG mode. RING_RD[15:0] is used to read the JPEG code within the frame memory. This register is read and accessed, and thus an address to the frame memory is automatically incremented. An automatic frame address loop function of automatically setting the frame address at "0" in order for the address to the frame memory not to exceed 160 KB is also included. The address to the frame memory is reset by transferring HDMODE to READY. When reading is first performed after the transfer of the mode, one round of the dummy read needs to be performed.

<ADPCM Audio Interface>

The present LSI includes the I2S interface and a PCM input interface. The present LSI also incorporates an ADPCM codec, and has a configuration as shown in FIG. 257. FIG. 257 is a block diagram of the audio interface and the ADPCM codec.

Registers related to ADPCM reproduction will be described.

FIG. 258 is a detailed table of an audio common setup register 1: COMMON_SETUP1.

AUDOF selects the format of audio serial input and output data. The details of the setting are as follows.

"0": standard left justified format
"1": ITS format

AUDOEN is an audio data output enable from an AUDDTO terminal. The details of the setting are as follows.

"0": valid (AUDDTO="L")
"1": invalid

AUDCKSEL sets timing and clocks to be used. The details of the setting are as follows.

"0": in synchronization with AUDLRO and AUDCKO
"1": in synchronization with AUDLRI and AUDCKI AUDMCKEN is a mater clock control enable/disable to an external DAC. The details of the setting are as follows.

"0": AUDMCKO terminal output is not used as the master clock (disable).
"1": AUDMCKO terminal output is used as the master clock (enable).

AUD_MUTE forcibly mutes ADPCM reproduction. In this bit, ADPCM recording is not muted. The details of the setting are as follows.

"0": normal reproduction
"1": mute

It is necessary to prevent "1" from being written into the RESERVE register.

FIG. 259 is a detailed table of an audio common setup register 2: COMMON_SETUP2. AUDOCKSEL selects the output timing of digital audio data. The details of the setting are as follows.

"0": internal clock synchronization
(Digital audio is output in synchronization with the internal clocks of the present LSI.)
"1": external clock synchronization
(Digital audio is output in synchronization with AUDCKI and AUDLRI signals from a unit other than the present LSI.)

It is necessary to prevent "1" from being written into the RESERVE register. It is also necessary to prevent "0" from being written into the RESERVE1 register.

FIG. 260 is a detailed table of an ADPCM channel volume register ADPCM_CH_VOL.

MASTER_SLAVE selects the channel of an ADPCM decoder. The details of the setting are as follows.

"0": selection of a slave channel output volume
"1": selection of a master channel output volume ADPCM_CHANNEL_VOLUME[6:0] sets the volume of the ADPCM decoder. Its level characteristic is linear. Master and slave channels have the same initial value of 40h. The details of the setting are as follows.

"00h": the minimum (mute)
"7Fh": the maximum

FIG. 261 is a detailed table of an ADPCM master channel volume register ADPCM_MASTER_LRVOL.

MASTER LR selects L/R of an ADPCM master channel. The details of the setting are as follows.

"0": selection of the left volume of the master channel
"1": selection of the right volume of the master channel ADPCM_MASTER_LRVOLUME[6:0] sets the volume of an ADPCM decoder master channel. Its level characteristic is linear. Left and right volumes have the same initial value of 40h. The details of the setting are as follows.

"00h": the minimum (mute)
"7Fh": the maximum

FIG. 262 is a detailed table of an ADPCM slave channel volume register ADPCM_SLAVE_LR_VOL.

SLAVE_LR selects L/R of an ADPCM decoder slave channel. The details of the setting are as follows.

"0": selection of the left volume of the slave channel
"1": selection of the right volume of the slave channel ADPCM_MASTER_LR_VOLUME[6:0] sets the volume of the ADPCM decoder slave channel. Its level characteristic is linear. Left and right volumes have the same initial value of 40h. The details of the setting are as follows.

"00h": the minimum (mute)
"7Fh": the maximum

A total output level of ADPCM at IDX_ADDRESS:0103h, 0104h, 0105h is 20 log 10 ((IDX_ADDRESS:0103h setting value x IDX_ADDRESS:0104h setting value)/(64×64)) [dB] when the master channel is taken as an example.

FIG. 263 is a detailed table of an ADPCM interrupt status register (at the time of reading): ADPCM_INT_STATUS. Nothing occurs at the time of write.

ADPCM_MASTER_INT can read an interrupt status attributable to an ADPCM master FIFO. The details of the setting are as follows.

"0": without an interrupt or after clearing
"1": occurrence of an interrupt attributable to the ADPCM master FIFO Any one of EMPTY, NEAR_EP, NEAR_FL (IDX_ADDRESS:0108h) and ADPCM_MASTERFIFO_STATUS[7:5] is turned "1".

ADPCM_SLAVE_INT can read an interrupt status attributable to an ADPCM slave FIFO. The details of the setting are as follows.

"0": without an interrupt or after clearing

"1": occurrence of an interrupt attributable to the ADPCM slave FIFO Any one of EMPTY, NEAR_EP, NEAR_FL (IDX_ADDRESS: 0109h) and ADPCM_SLAVE_FIFO_STATUS[7:5] is turned "1".

FIG. 264 is a detailed table of an ADPCM master FIFO status register (at the time of writing): ADPCM_MASTER_FIFO_STATUS.

CLEAR_EMPTY clears EMPTY of this register. The details of the setting are as follows.

"0": EMPTY is not cleared.

"1": EMPTY is cleared.

CLEAR_NEAR_EP clears NEAR_EP of this register. The details of the setting are as follows.

"0": NEAR_EP is not cleared.

"1"; NEAR_EP is cleared.

CLEAR_NEAR_FL clears NEAR_FL of this register. The details of the setting are as follows.

"0": NEAR_FL is not cleared.

"1": NEAR_FL is cleared.

CLEAR_FULL clears FULL of this register. The details of the setting are as follows.

"0": FULL is not cleared.

"1": FULL is cleared.

FIFO_CLEAR initializes the ADPCM master FIFO, When this bit is operated during reproduction, the reproduced song is not guaranteed. The details of the setting are as follows.

"0": the ADPCM master FIFO is not initialized.

"1": the ADPCM master FIFO is initialized.

SLAVE_START2 sets the operation of an ADPCM slave channel. After the writing of "1", clearing is automatically performed. The reproduction is not stopped until FIFO_EMPTY becomes "1" or ADPCM data oh is consecutively detected eight times. When this bit is operated during the reproduction, the reproduced sound is not guaranteed. This bit and MASTER_START are utilized simultaneously, and thus it is possible to start two channels of ADPCM synchronously. The details of the setting are as follows.

"0": the ADPCM slave channel decoding is not started.

"1": the ADPCM slave channel decoding is started.

MASTER_START sets the start or the stop of the ADPCM master channel. Which of an ADPCM playing operation and an ADPCM recording operation is performed is determined by the setting of ADPCM_MASTER_RECODE (IDX_ADDRESS:0118h) and ADPCMREC_MODE[4]. The details of the setting are as follows.

"0": stop of the ADPCM master channel

"1": start of the ADPCM master channel

FIG. 265 is a detailed table of the ADPCM master FIFO status register (at the time of reading): ADPCM_MASTER_FIFO_STATUS.

When the ADPCM master FIFO is transferred from a not EMPTY state to an EMPTY state, EMPTY is turned "1". The details of the setting are as follows.

"0": when it is not EMPTY or after clearing

"1": the ADPCM master FIFO is transferred from the not EMPTY state to the EMPTY state In NEAR_EP, the amount of data within the ADPCM master FIFO is NEARLY_EMPTY_SETUP (IDX_ADDRESS:010Ch), and NEAR_EP can read information as to whether a setting value of ADPCM_FIFO_SETUP[1:0] is reached. The details of the setting are as follows.

"0": when it is not NEAR_EP or after clearing

"1": the ADPCM master FIFO is transferred from a not NEAR EMPTY state to the NEAR EMPTY state In NEAR_FL, the amount of data within the ADPCM master FIFO is NEARLY_FULL_SETUP (IDX_ADDRESS:010Ch), and NEAR_FL can read information as to whether a setting value of ADPCM_FIFO_SETUP[5:4] is reached. The details of the setting are as follows.

"0": when it is not NEAR_FL or after clearing

"1": the ADPCM master FIFO is transferred from a not NEAR FULL state to the NEAR FULL state When the amount of data within the ADPCM master FIFO reaches the capacity of FIFO (1K bytes), FULL is turned "1". The details of the setting are as follows.

"0": when the capacity of FIFO is not FULL or after clearing

"1": when the ADPCM master FIFO is FULL

In NEAR_AREA, the amount of data within the ADPCM master FIFO is NEARLY_EMPTY_SETUP (IDX_ADDRESS:010Ch), and NEAR_AREA can read information as to whether a setting value of ADPCM_FIFO_SETUP[1:0] is not reached. The details of the setting are as follows.

"0": the amount of data within the ADPCM master FIFO is equal to or more than the setting value of NEARLY_EMPTY_SETUP "1": the amount of data within the ADPCM master FIFO is less than the setting value of NEARLY_EMPTY_SETUP In FULL_AREA, the amount of data within the ADPCM master FIFO is NEARLYFULL_SETUP (IDX_ADDRESS:010Ch), and FULL_AREA can read information as to whether a setting value of ADPCM_FIFO_SETUP[5:4] is exceeded. The details of the setting are as follows.

"0": the amount of data within the ADPCM FIFO is equal to or less than the setting value of NEARLY_FULL_SETUP "1": the amount of data within the ADPCM FIFO is more than the setting value of NEARLY_FULL_SETUP BUSY can read information as to whether an ADPCM mater channel is operated or stopped. The details of the setting are as follows.

"0": while the ADPCM mater channel is stopped

"1": while the ADPCM mater channel is operated

FIG. 266 is a detailed table of an ADPCM slave FIFO status register (at the time of writing): ADPCM_SLAVE_FIFO_STATUS.

CLEAR_EMPTY clears EMPTY of this register. The details of the setting are as follows.

"0": EMPTY is not cleared.

"1": EMPTY is cleared.

CLEAR_NEAR_EP clears NEAR_EP of this register. The details of the setting are as follows.

"0": NEAR_EP is not cleared.

"1": NEAR_EP is cleared.

CLEAR_NEAR_FL clears NEAR_FL of this register. The details of the setting are as follows.

"0": NEAR_FL is not cleared.

"1": NEAR_FL is cleared.

CLEAR_FULL clears FULL of this register. The details of the setting are as follows.

"0": FULL is not cleared.

"1": FULL is cleared.

FIFO_CLEAR initializes the ADPCM slave FIFO. When this bit is operated during reproduction, the reproduced song is not guaranteed. The details of the setting are as follows.

"0": the ADPCM slave FIFO is not initialized.

"1": the ADPCM slave FIFO is initialized.

SLAVE_START sets the start or the stop of the ADPCM slave channel. The details of the setting are as follows.

"0": stop of the ADPCM slave channel
"1": start of the ADPCM slave channel

FIG. 267 is a detailed table of the ADPCM slave FIFO status register (at the time of reading): ADPCM_SLAVE_FIFO_STATUS.

When the ADPCM slave FIFO is transferred from a not EMPTY state to an EMPTY state, EMPTY is turned "1". The details of the setting are as follows.

"0": when it is not EMPTY or after clearing
"1": the ADPCM slave FIFO is transferred from the not EMPTY state to the EMPTY state In NEAR_EP, the amount of data within the ADPCM slave FIFO is NEARLY_EMPTYSETUP (IDX_ADDRESS: 010Ch), and NEAR_EP can read information as to whether a setting value of ADPCM_FIEO_SETUP[1:0] is reached. The details of the setting are as follows.

"0": when it is not NEAR EPMPTY or after clearing
"1": the ADPCM slave FIFO is transferred from a not NEAR EMPTY state to the NEAR EMPTY state In NEAR_FL, the amount of data within the ADPCM slave FIFO is NEARLY_FULL_SETUP (IDX_ADDRESS: 010Ch), and NEAR_FL can read information as to whether a setting value of ADPCM_FIFO_SETUP[5:4] is reached. The details of the setting are as follows.

"0": when it is not NEAR FULL or after clearing
"1": the ADPCM master FIFO is transferred from a not NEAR FULL state to the NEAR FULL state When the amount of data within the ADPCM slave FIFO reaches the capacity of FIFO (1K bytes), FULL is turned "1". The details of the setting are as follows.

"0": when the capacity of FIFO is not FULL or after clearing
"1": when the ADPCM master FIFO is FULL In EMPTY AREA, the amount of data within the ADPCM slave FIFO is NEARLY_EMPTY_SETUP (IDX_ADDRESS: 010Ch), and EMPTY AREA can read information as to whether a setting value of ADPCM_FIFO_SETUP[1:0] is not reached. The details of the setting are as follows.

"0": the amount of data within the ADPCM slave FIFO is equal to or more than the setting value of an ADPCM FIFO setup register
"1": the amount of data within the ADPCM slave FIFO is less than the setting value of the ADPCM FIFO setup register In FULL_AREA, the amount of data within the ADPCM slave FIFO is NEARLY_FULL_SETUP (IDX_ADDRESS: 010Ch), and FULL_AREA can read information as to whether a setting value of ADPCM_FIFO_SETUP[5:4] is exceeded. The details of the setting are as follows.

"0": the amount of data within the ADPCM slave FIFO is equal to or less than the setting value of NEARLY_FULL_SETUP
"1": the amount of data within the ADPCM slave FIFO is more than the setting value of NEARLY_FULL_SETUP BUSY can read information as to whether an ADPCM slave channel is operated or stopped. The details of the setting are as follows.

"0": while the ADPCM slave channel is stopped
"1": while the ADPCM slave channel is operated FIG. 268 is a detailed table of the ADPCM FIFO setup register ADPCM_FIFO_SETUP.

NEARLY_FULL_DISABLE masks an interrupt of ADPCM FIFO NEARY FULL. The details of the setting are as follows.

"0": cancellation of the masking
"1": setting of the masking

When the remaining capacity of ADPCM FIFO reaches the present setting, in NEARLYFULL_SETUP[1:0], NEAR_FL (IDX_ADDRESS: 0108h[5], 0109[5]) is turned "1". The details of the setting are as follows. The values indicated by parentheses are values when FIFO is used in a two-channel reproduction mode.

00b: set at 512 bytes (256 bytes)
01b: set at 256 bytes (128 bytes)
10b: set at 128 bytes (64 bytes)
11b: set at 64 bytes (32 bytes)

NEARLY_EMPTY_DISABLE masks an interrupt of ADPCM NEARY EMPTY. The details of the setting are as follows.

"0": cancellation of the masking
"1": setting of the masking

When the remaining capacity of ADPCM FIFO reaches the present setting, in NEARLY_EMPTY_SETUP[1:0], NEAR_EP (IDX_ADDRESS: 0108h[6], 0109[6]) is turned "1". The details of the setting are as follows. The values indicated by parentheses are values when FIFO is used in the two-channel reproduction mode.

00b: set at 511 bytes (255 bytes)
01b: set at 255 bytes (127 bytes)
10b: set at 127 bytes (63 bytes)
11b: set at 63 bytes (31 bytes)

In the present setting, setting cannot be performed for each channel of ADPCM. The same setting is performed for each of the two channels. The change of NEARLY_FULL_SETUP[1:0] and NEARLY_EMPTY_SETUP[1:0] is prohibited during the ADPCM reproduction and during the recording. NEARLY_FULL_DISABLE and NEARLY_EMPTY_DISABLE mask an INT terminal. IDX_ADDRESS: 0108h ADPCM_MASTER_FIFO_STATUS and 0109h ADPCM_SLAVE_FIFO_STATUS are operated irrespective of this setting.

FIG. 269 is a NEARLY_FULL_SETLTP setting table. The reproduction mode of ADPCM is determined by CH_CONTROL (IDX_ADDRESS: 0110h ADPCM_CH_CONTROL [7]).

FIG. 270 is a NEARLY_EMPTY_SETUP setting table. The reproduction mode of ADPCM is determined by CH_CONTROL (IDX_ADDRESS: 0110h ADPCM_CH_CONTROL [7]).

Registers related to the ADPCM recording will be described.

FIG. 271 is a detailed table of an ADPCM recording volume register ADPCM_EXT_VOL. ADPCM_EXT_VOL[7:0] sets the volume at the time of the ADPCM recording. Its level characteristic is linear. The details of the setting are as follows.

"00h": the minimum (mute)
"FFh": the maximum

FIG. 272 is a detailed table of an ADPCM master setup register ADPCM_MASTER_SETUP.

MONO_STEREO selects mono or stereo at the time of ADPCM master channel reproduction. The details of the setting are as follows, "0": mono
"1": stereo DATAFORMAT[2:0] selects the data storage format of the ADPCM master channel. It is necessary to perform the setting according to the ADPCM data at the time of the reproduction. At the time of the recording, the ADPCM data in the set format is generated. The details of the setting are as follows.

"000b": ADPCM 4 bits (ROHM 4 bits)
"001b": PCM 8 bits (offset binary)

-continued

| | |
|---|---|
| "010b": PCM 8 bits (two's-complement binary) | "011b": PCM 16 bits (two's-complement binary) |
| "100b": G711.1 u-Law (8 bits) | "101b": G711.1 A-Law (8 bits) |
| "110b": digital audio input (reproduction only) | "111b": setting prohibition |

SAMPLING_RATE[1:0] selects the sampling rate of the ADPCM master channel. It is necessary to perform the setting according to the ADPCM data at the time of the reproduction. At the time of the recording, the ADPCM data in the set format is generated. The details of the setting are as follows.

"00b": 4 k Hz (8-time upsampling for a main sampling rate)
"01b": 8 k Hz (4-time upsampling)
"10b": 16 k Hz (2-time upsampling)
"11b": 32 k Hz (without upsampling)

FIG. 273 is a detailed table of an ADPCM slave setup register ADPCM_SLAVE_SETUP.

MONO_STEREO selects mono or stereo at the time of ADPCM slave channel reproduction. The details of the setting are as follows.

"0": mono
"1": stereo

DATA_FORMAT[2:0] selects the data storage format of the ADPCM slave channel. It is necessary to perform the setting according to the ADPCM data. The details of the setting are as follows.

| | |
|---|---|
| "000b": ADPCM 4 bits (ROHM 4 bits) | "001b": PCM 8 bits (offset binary) |
| "010b": PCM 8 bits (two's-complement binary) | "011b": PCM 16 bits (two's-complement binary) |
| "100b": G711.1 u-Law (8 bits) | "101b": G711.1 A-Law (8 bits) |
| "110b": digital audio input | "111b": setting prohibition |

SAMPLING_RATE[1:0] selects the sampling rate of the ADPCM slave channel. It is necessary to perform the setting according to the ADPCM data at the time of the reproduction. The details of the setting are as follows.

"00b": 4 k Hz (8-time upsampling for the main sampling rate)
"01b": 8 k Hz (4-time upsampling)
"10b": 16 k Hz (2-time upsampling)
"11b": 32 k Hz (without upsampling)

FIG. 274 is a detailed table of an ADPCM channel control register ADPCM_CH_CONTROL. CH_CONTROL selects the number of ADPCM channels. The details of the setting are as follows.

"0": only one master channel
Here, the capacity of ADPCM maser FIFO is 1024 bytes.
"1": two channels of the master channel and the salve channel can be used.
Here, the capacity of ADPCM maser/slave FIFO for each channel is 512 bytes.

FIG. 275 is a detailed table of a PCM IF format setting register PCMIF_FORMAT.

PCMIF_CLKI_POLARITY selects the changing point of AUDCKI taking in AUDDTI. The details of the setting are as follows.

"0": the rising edge of AUDCKI
"1": the falling edge of AUDCKI

PCMIF_LRI_POLARITY selects the changing point of AUDLRI taking in AUDLRI. The details of the setting are as follows.

"0": the rising edge of AUDLRI
"1": the falling edge of AUDLRI

PCMIF_DIFFERENT_EDGE selects whether the changing points of AUDDTI and AUDLRI coincide with or differ from each other. The details of the setting are as follows.

"0": the changing points coincide with each other.
"1": the changing point of AUDLRI is ½ clock faster than that of AUDDTI.

PCMIF_LONG_FORMAT selects the valid starting point of AUDDTI after the change of AUDLRI. The details of the setting are as follows.

"0": AUDDTI one clock later than the change of AUDLRI is set at MSB (SHORT).
"1": AUDDTI equal in clock to the change of AUDLRI is set at MSB (LONG).

PCMIF_BITS [3:0] sets the number of valid bits of AUDDTI. The number of valid bits=the setting value+1. The details of the setting are as follows.

"1101b": 14 bits
"0111b": 8 bits (minimum)
"1111b": 16 bits (maximum)

FIG. 276 is a detailed table of an audio digital IF input setting register AUDDTIIF_INPUT_FORMAT.

ADPCM_FORMAT[1:0] selects an audio digital input format. The details of the setting are as follows.

"00b": standard left justified format
"01b": standard right justified format
"10b": IIS format
"11b": setting prohibition ADPCM_ENABLE sets the operation or the stop of audio digital input. The details of the setting are as follows.

"0": stop
"1": operation

FIG. 277 is a detailed table of an interval setting register INTERVAL_SETTING.

For audio output, OVER SAMPLE ENABLE sets four-point interpolation smoothing processing valid or invalid. The details of the setting are as follows.

"0": invalid
"1": valid

AUDMCKO_MODE selects the period of AUDMCKO for a sampling period. The details of the setting are as follows.

"0": 256Fs
"1": setting prohibition

AUDCKI_MODE selects the period of AUDCKI for the sampling period. The details of the setting are as follows.

"0": 64Fs
"1": 32Fs

PLAY_INTERVAL_VALUE[2:0] selects the occurrence interval of an INTERVAL TIMER interrupt (interrupt for each setting time). The details of the setting are as follows.

"000b": without the INTERVAL TIMER interrupt "001b": occurs at intervals of 8 ms
"010b": occurs at intervals of 16 ms "011b": occurs at intervals of 80 ms
"100b": occurs at intervals of 160 ms "101b": occurs at intervals of 320 ms
"110b": occurs at intervals of 640 ms "111b": occurs at intervals of 1280 ms It is necessary to prevent "1" from being written into the RESERVE register.

FIG. 278 is a detailed table of an ADPCM recording mode setting register ADPCM_REC_MODE.

ADPCM_MASTER_RECODE sets the reproduction mode or the recording mode of the ADPCM master channel. The details of the setting are as follows.
"0": reproduction
"1": recording
ADPCM_MASTER_REC_PATH[1:0] selects the format of the input data at the time of the recording of the ADPCM master channel. The details of the setting are as follows.

| | |
|---|---|
| "00b": G711.1 u-Law | "01b": G711.1 A-Law |
| "10b": PCM linear (a negative value is expressed as a two's-complement.) | "11b": digital audio input |

When the setting is "00b", "01b" or "10b", the number of bits of the input data is determined by PCMIF_BITS (IDX_ADDRESS:0111h PCMIF_FORMAT1[3:0]). When the setting is "11b", the input format is determined by ADPCM_FORMAT (IDX_ADDRESS:0115h AUDDTI_IF_INPUT_FORMAT[2]).

It is necessary to prevent "1" from being written into the RESERVE register.

FIG. 279 is a detailed table of an ADPCM master FIFO access register (at the time of writing): ADPCM_MASTER_FIFO_WINDOW. ADPCMMASTER_FIFO_DATA [7:0] is used to write the ADPCM data into a master channel FIFO.

FIG. 280 is a detailed table of the ADPCM master FIFO access register (at the time of reading): ADPCM_ENCODE_FIFO_WINDOW. ADPCM_ENCODE_FIFO_DATA [7:0] is used to read the ADPCM data from FIFO.

FIG. 281 is a detailed table of an ADPCM slave FIFO access register ADPCM_SLAVE_FIFO_WINDOW. ADPCM_SLAVE_FIFO_DATA [7:0] is used to write the ADPCM data into a slave channel FIFO. This register is valid during the decoding. Decode data stored in this ADPCM slave FIFO data is read through the writing operation.

FIG. 282 is a detailed table of a sampling frequency setting register SAMPLING_TIMING_SETUP.

U_L selects whether a value set by TIME_SETUP is high or low. It is necessary to write high bits. The details of the setting are as follows.
"0": high
"1": low TIME_SETUP[6:0] sets the ratio of the frequency of AUDIO_CLK to the sampling frequency. The frequency ratio is as follows. The initial value is such that 0400h=1024.

Sampling frequency=AUDIO_$CLK$/{TIME_SETUP high[6:0], TIME_SETUP low[6:0]}

FIG. 283 is a detailed table of a sequence control register 1 SEQUENCE_CONTROL.

RESET resets the audio block with software. FIFO, ADPCM and registers 0108$h$ and 0109$h$ are reset. The details of the setting are as follows.
"0": cancellation of the resetting
"1": the resetting STANDBY places the audio block on standby. After the cancellation of the standby, it is necessary to perform writing on the RESET bit ("1" is set.)

During the standby, it is impossible to perform writing and reading on the audio block registers other than IDX_ADDRESS:0140h[6]. The details of the setting are as follows.
"0": cancellation of the standby "1": the standby ADPCM_STANDBY sets the operation or the stop of the ADPCM block. The details of the setting are as follows.
"00": operation
"11": stop <SD Card Interface (Controller)>

The present LSI has the function of an SD memory card interface, controller (hereinafter referred to as an SDIF). The SDIF function can be used by writing "0" into a bit 15 flag (SD_OFF) of HDMODE (IDX:00D8h HWMODE[3:0]). An SDIF block system is shown in FIG. 284. FIG. 284 shows the SDIF block system.

The control of the SDIF block from the host is performed by processing, with the external bus (CSB3) of the CPU, the reading/writing of registers and an interrupt request (from an INT signal). The registers of the SDIF block are composed of control registers and internal registers.

The interrupt request signal from the SDIF block along with interrupt request signals from the other blocks within the image processing block is processed by the local interrupt controller of the image processing block and is connected to the interrupt controller of the CPU system through the internal INT signal.

An outline of the features of the SDIF controller will be described. The SDIF controller has SD memory card access compatibility. The SDIF controller can also be utilized in MMCs (multimedia cards). The SDIF controller has no copyright protection function. Both one-bit and four-bit have compatibility in a bit width to card access (SDDAT3-SDDAT0 pin). The frequency division ratio of SD_CLK can be set up to SD_CLK/29. The SDIF controller incorporates 512-byte data buffer RAM. The SDIF controller is compatible with error check: CRC7 (for commands) and CRC16 (for data). Various response frame formats can be recognized by the register setting. The length of transfer data that can be set ranges from 29 bytes to 1 byte. The SDIF controller incorporates a multi-read/right sector counter. When an SD association SDIF function is used, it is necessary to acquire an SDA license.

Write transfer timing will be described. FIG. 285 is a diagram showing the SDIF_Write transfer timing of the present LSI. FIG. 286 is a table showing the write transfer timing from the present LSI to an SD module.

Read transfer timing will be described. FIG. 287 is a diagram showing the SDIF_Read transfer timing of the present LSI. FIG. 288 is a table showing the read transfer timing from the SD module to the present LSI.

<Setup Register>

After electric power is fed to the present LSI to cancel resetting, in order to initialize the system, it is necessary to perform a setup sequence. After the execution of the initialization sequence, it is necessary to proceed to each HDMODE operation.

Registers related to the setup will be described.

FIG. 289 is a detailed table of a setup sequence control register SETUPCNT.

SETUP_RST resets an initialization circuit. The details of the setting are as follows.
"0": normal operation
"1"; in a reset state SETUP_EN enables a correction performed by the initialization circuit. The details of the setting are as follows.
"0": the correction is enabled.
"1": the correction is disabled.

BIST_EN supplies clocks to an internal BIST circuit. The details of the setting are as follows.
"0": the supply of the clocks is stopped; the correction performed by the initialization circuit can be operated.
"1": the clocks are supplied.

BIST_END can read information as to the completion of the operation of the internal BIST. The details thereof are as follows.

"0": before the operation of the BIST or during the operation

"1": after the operation of the BIST

BIST_BSY can read information as to the current state of the internal BIST. The details thereof are as follows.

"0": the stop of the BIST

"1": during the BIST

BIST_ST starts the internal BIST by the writing of "1". After the writing of "1" into this bit, it is necessary to prevent access from the CPU to the image processing block for a time period of 5×tSCLK.

Here, after an execution is performed such that BIST_ST="H", a time period until BIST_BSY=0 and BIST_END=1 is about 36.5 ms at a frequency of 50 MHz.

FIG. 290 is a detailed table of a setup sequence setting register SETUPSET. It is necessary to prevent writing into this register.

Product IDs and revision nos. will be described. In the present LSI, the following registers are read, and thus the product ID numbers and the revision numbers can be read.

FIG. 291 is a detailed table of a product ID register PRODUCT_ID. PRODUCT_ID can read the product ID numbers of the present LSI.

FIG. 292 is a detailed table of a revision no. register REV_NO. REV_NO can read the revision nos. of the image processing block of the present LSI.

FIG. 293 is a block diagram showing an example of the configuration of a drive recorder using the present LSI. The drive recorder of this configuration is used as means for recording vehicle operation condition data (such as video data or traveling data) at the time of the occurrence of a traffic accident or a dangerous operation; the drive recorder includes the present LSI 100, a camera 101, a real time clock 102 (hereinafter referred to as a RTC [real time clock] 102), an EEPROM 103, an acceleration sensor 104, a GPS (global positioning system) module 105, a speaker 106, a microphone 107, an audio codec 108, a basic program storage memory 109, a television monitor 110, an SD card 111, an expanded program storage memory 112, an optional camera 113, an image processing IC 114, an IrDA (infrared data association) controller IC 115 and an IrDA module 116.

The drive recorder of this configuration includes, as its power supply system, a step-up regulator (power supply IC) 120, diodes 121 to 123, a resistor 124, a secondary battery 125 and step-down regulators (LDO [low dropout] regulators) 130 to 132.

The present LSI 100 is a controller that collectively controls the entire operation of the drive recorder. The following data is transmitted to the present LSI 100 from an ECU (electric control unit) (not shown) incorporated in the vehicle: data on the operated states of the individual portions of the vehicle (such as data on the lit states of lamps (a head lamp, a tale lamp, a winker lamp, a hazard lamp and the like), door lock opened and closed state data, side mirror opened and closed state data, wiper driven state data, power window driven state data, airbag driven state data and ABS (antilock brake system) driven state data).

The vehicle is provided with various vehicle-installed sensors (not shown) that detect the conditions of the individual portions of the vehicle and of the vicinity of the vehicle. Various types of data detected and obtained by these vehicle-installed sensors are also transmitted to the present LSI 100. Examples of the vehicle-installed sensors include: acceleration sensors that detect acceleration generated in the forward and backward direction of and the leftward and rightward direction of the vehicle; a yaw rate sensor that detects the rotation speed (the rotation speed of the vehicle) of the vehicle about its vertical axis; a vehicle speed sensor that detects the traveling speed of the vehicle; wheel speed sensors that detect the rotation speeds of wheels (tires); a steering angle sensor that detects a steering angle; a steering torque sensor that detects a steering torque; a brake pedal sensor that detects the degree to which the brake pedal is stepped on; a hydraulic sensor that detects the hydraulic pressures of the individual portions of the vehicle; air pressure sensors that detect the air pressures of the tires; temperature sensors that detect a temperature outside the vehicle and a temperature inside the vehicle; an illumination sensor that detects the ambient brightness; a road surface sensor that detects the state of a road surface; vehicle-to-vehicle distance sensors that detect the vehicle-to-vehicle distances in front of and behind the vehicle; an obstruction sensor (corner sensor) that detects an obstruction around the vehicle; and a collision sensor that detects a collision occurring on the vehicle.

The camera 101 is an external device (driven by 2.8 volts) that shoots the vicinity of the vehicle (mainly an area in front of the vehicle), and is connected to the present LSI 100 through a two-line serial bus I2C#1. As photoelectric conversion elements that constitute the camera 101, CCDs (charge coupled devices) or CMOS (complementary metal oxide semiconductors) are preferably used. The camera 101 can appropriately capture the moving image of an area in front of the vehicle, and is preferably attached to such a position (such as the back side of the rear view mirror) that the vision of a driver is not blocked. Imaging data generated by the camera 101 is output to the present LSI 100 through a dedicated data bus. As described above, as the elements of the vehicle operation condition data, the video data obtained by shooting the moving image of the vicinity of the vehicle is included, and thus it is possible to quickly and properly investigate the cause of a traffic accident.

The RTC 102 is an external device (driven by 3.3 volts) that generates time data on the date and time and outputs it to the present LSI 100, and is connected to the present LSI 100 through a two-line serial bus I2C#2. As described above, as the elements of the vehicle operation condition data, the data and time are included, and thus it is possible to analyze, after the occurrence of a traffic accident, the passage of time leading to the occurrence of the traffic accident The EEPROM 103 is an external device (driven by 3.3 volts) that stores, when a predetermined trigger condition is satisfied, the vehicle operation condition data buffered in the present LSI 100 in a nonvolatile manner, and is connected to the present LSI 100 through the two-line serial bus I2C#2.

For example, when the acceleration of the vehicle detected by the acceleration sensor 104 exceeds a predetermined threshold (when an impact exceeding a predetermined threshold is applied to the vehicle), the present LSI 100 determines that the predetermined trigger condition is satisfied, and accesses the EEPROM 103 to store the operation condition data. Here, the operation condition data stored in the EEPROM 103 is operation condition data that is temporarily stored in the present LSI 100 for a predetermined period (ranging from a few seconds to a few minutes) around timing when the trigger condition is satisfied.

The two-line serial bus I2C#1 is pulled up, through a resistor R1, to a terminal to which a first interface voltage VDD1 (2.8 volts) is applied. The two-line serial bus I2C#2 is pulled up, through a resistor R2, to a terminal to which a second interface voltage VDD2 (3.3 volts) is applied.

As described above, the present LSI 100 has the two system serial buses according to the power supply voltage of the external device connected thereto. However, within the present LSI 100, the two-line serial buses I2C#1 and I2C#2 are treated as one system. With this type of configuration, even when a plurality of external devices having different power supply voltages are connected, appropriate grouping is performed based on the power supply voltages, and the individual groups (in the above description, the 2.8 volt driven group and the 3.3 volt driven group) are connected to the serial buses of different systems, with the result that it is possible to prevent power consumption and noise resistance degradation resulting from a difference between high-level voltages. By employing the above configuration, it is possible to reduce burdens on the design of the present LSI 100 (such as the selection of components and the stability of the power supply and the associated parts to use the external device by an interface voltage that falls within an operation guaranteed range), the design of a PCB and quality evaluation.

The present LSI 100 incorporates a bus interface circuit for treating the externally connected two system two-line serial buses I2C#1 and I2C#2 as the same bus within the device; the configuration and operation thereof will be described in detail later.

The acceleration sensor 104 individually detects acceleration in three axes perpendicular to each other (in an X-axis direction (=a direction in which the vehicle travels), a Y-axis direction (=the leftward and rightward direction of the vehicle) and a Z-axis direction (=the upward and downward direction of the vehicle)), and outputs it as acceleration data to the present LSI 100. As a method of detecting the acceleration data, a piezoresistance method or a capacitance method can be used. As described above, as the elements that constitute the vehicle operation condition data, the acceleration data indicating the acceleration of the vehicle is included, and thus it is possible to analyze, after the occurrence of a traffic accident, an impact placed on the vehicle at the time of the occurrence of the traffic accident.

The GPS module 105 utilizes a satellite signal from a GPS satellite to detect the current position (latitude, longitude and altitude) of the vehicle, and outputs it as vehicle position data to the present LSI 100. The present LSI 100 and the GPS module 105 are connected by wires through a UART (universal asynchronous receiver transmitter) communication port. As described above, as the elements that constitute the vehicle operation condition data, the vehicle position data is included, and thus it is possible to analyze, after the occurrence of a traffic accident, a travel path leading to the occurrence of the traffic accident.

The speaker 106 and the microphone 107 are connected to the present LSI 100 through the audio codec 108. For example, the speaker 106 is used as means for giving, based on an instruction from the present LSI 100, a warning for preventing a driver from driving dangerously. The above warning is preferably performed by sound from the speaker 106 or a video (or a combination of them) on the television monitor 110. The warning described above causes the driver to always try to perform safety driving, and thus it is possible to help reduce traffic accidents. When the present LSI detects a sudden start of the vehicle, a sudden steering, a sudden stop, a sudden shift change, no lighting at night, changes of lanes without turning on a winker, meandering driving or a sudden approach to a vehicle or a structure therearound, the present LSI 100 provides an instruction to give the above warning to the speaker 106 or the television monitor 110. For example, the microphone 107 is used as means for receiving a voice instruction from the driver.

The basic program storage memory 109 stores programs and data for performing basic operations of the present LSI 100; for example, a flash memory (2M bits) or the like can be used.

The television monitor 110 displays, for example, the video of the vicinity of the vehicle obtained by the camera 101, the video of a television broadcast program or the map information of a car navigation system; a liquid crystal display or the like can be used.

The SD memory 111 is an external memory that can be attached to or removed from the drive recorder, and is used, for example, when the operation condition data stored in the EEPROM 103 is taken out or when the operation program for the present LSI 100 is rewritten.

The expanded program storage memory 112, the optional camera 113, the image processing IC 114, the IrDA controller IC 115 and the IrDA module 116 each are an optional device for expanding the function of the drive recorder; they are each connected to the present LSI 100 through a parallel bus for connection of an optional device.

The expanded program storage memory 112 stores programs and data that cannot be stored in the basic program storage memory 109; for example, a flash memory (2 M bytes) can be used. The optional camera 113 acquires the video of a different view (for example, an area behind the vehicle) from the camera 101. The image processing IC 114 performs predetermined image processing (such as analog/digital conversion processing, noise removal processing, color correction processing and image compression processing) on video data obtained by the optional camera 113, and outputs the resulting data to the present LSI 100. The IrDA controller IC 115 and the IrDA module 116 perform infrared communication with a mobile telephone terminal or a remote controller.

The step-up regulator 120 is a power supply IC that steps up an input voltage V1 (for example, 12 volts or 24 volts) to generate an output voltage V2 (for example, 48 volts).

The anode of the diode 121 is connected to the output terminal of the step-up regulator 120. The cathode of the diode 121 is connected through the resistor 124 to the positive pole of the secondary battery 125. The anode of the diode 122 is connected to the output terminal of the step-up regulator 120. The cathode of the diode 122 is connected to the input terminals of the step-down regulators 130 to 132. The anode of the diode 123 is connected to the positive pole of the secondary battery 124. The cathode of the diode 123 is connected to the input terminals of the step-down regulators 130 to 132. The secondary battery 125 is charged by the output voltage V2 with a charge path through the diode 121 and the resistor 124; a battery voltage V3 is drawn from its positive pole with a discharge path through the diode 123. Which of the output voltage V2 and the battery voltage V3 is higher is supplied to the step-down regulators 130 to 132.

The step-down regulators 130 to 132 generate an internal voltage VDD0 (for example, 1.5 volts), the first interface voltage VDD1 (for example, 2.8 volts) and the second interface voltage VDD2 (for example, 3.3 volts), respectively, and supply them to the individual portions of the drive recorder.

When the drive recorder configured as described above is installed into the vehicle, the driver dislikes the recording of his responsible traffic accident or dangerous driving, and thus the driver always tries to perform safety driving, with the result that it is possible to help reduce traffic accidents. If the driver who is not responsible for a traffic accident is involved in the traffic accident, operation condition data recorded in the drive recorder is analyzed after the occurrence of the traffic accident, and thus it is possible to verify the justification of the driver.

FIG. 294 is a circuit diagram showing an example (serial input and output) of the configuration of a bus interface circuit. As shown in this figure, the present LSI 100 includes a controller 200 and the bus interface circuit 300.

The bus interface circuit 300 is a bidirectional bus multiplexer for treating the externally connected two system two-line serial buses I2C#1 and I2C#2 as the same bus within the device; the bus interface circuit 300 includes an N-channel MOS field effect transistor 301, an N-channel MOS field effect transistor 302, level shifters 311 to 313, level shifters 321 to 323 and a logical OR computation unit 330.

The drain of the transistor 301 is connected to the data line of the two-line serial bus I2C#1, and is pulled up, through the resistor R1, to a terminal to which the first interface voltage VDD1 is applied. The source of the transistor 301 is connected to a ground terminal. The drain of the transistor 302 is connected to the data line of the two-line serial bus I2C#2, and is pulled up, through the resistor R2, to a terminal to which the second interface voltage VDD2 is applied. The source of the transistor 301 is connected to the ground terminal. In other words, the interface voltages corresponding to the power supply voltages of the external devices connected to the two-line serial buses I2C#1 and I2C#2 are supplied to two-line serial buses I2C#1 and I2C#2.

When the transistor 301 is on, the data line of the two-line serial bus I2C#1 is low (ground voltage GND). When the transistor 301 is off, the data line of the two-line serial bus I2C#1 is high (the first interface voltage VDD1). When the transistor 302 is on, the data line of the two-line serial bus I2C#2 is low (ground voltage GND). When the transistor 302 is off, the data line of the two-line serial bus I2C#2 is high (the second interface voltage VDD2).

The input terminal of the level shifter 311 is connected to the data line of the two-line serial bus I2C#1. The output terminal of the level shifter 311 is connected to the first input terminal of the logical OR computation unit 330. The input terminal of the level shifter 321 is connected to the data line of the two-line serial bus I2C#2. The output terminal of the level shifter 321 is connected to the second input terminal of the logical OR computation unit 330. The output terminal of the logical OR computation unit 330 is connected to the data signal input terminal of the controller 200.

The level shifter 311 level-shifts a pulse signal swung between the first interface voltage VDD1 and the ground voltage GND to a pulse signal swung between the internal voltage VDD0 and the ground voltage GND, and outputs it. The level shifter 321 level-shifts a pulse signal swung between the second interface voltage VDD2 and the ground voltage GND to the pulse signal swung between the internal voltage VDD0 and the ground voltage GND, and outputs it. The logical OR computation unit 330 performs a logical OR computation on the pulse signals input from the level shifters 311 and 321, and thereby generates a logical OR signal swung between the internal voltage VDD0 and the ground voltage GND, and feeds out it as an input data signal IN to the controller 200.

The input terminals of the level shifters 312 and 322 each are connected to the data signal output terminal of the controller 200. The output terminal of the level shifter 312 is connected to the gate of the transistor 301. The output terminal of the level shifter 322 is connected to the gate of the transistor 302.

The level shifter 312 level-shifts an output data signal OUT from the controller 200 swung between the internal voltage VDD0 and the ground voltage GND to the pulse signal swung between the first interface voltage VDD1 and the ground voltage GND, and outputs it. The level shifter 322 level-shifts the output data signal OUT from the controller 200 swung between the internal voltage VDD0 and the ground voltage GND to the pulse signal swung between the second interface voltage VDD2 and the ground voltage GND, and outputs it.

The input terminals of the level shifters 313 and 323 each are connected to the clock signal output terminal of the controller 200. The output terminal of the level shifter 313 is connected to the clock line of the two-line serial bus I2C#1. The output terminal of the level shifter 323 is connected to the clock line of the two-line serial bus I2C#2.

The level shifter 313 level-shifts a clock signal CLK from the controller 200 swung between the internal voltage VDD0 and the ground voltage GND to the pulse signal swung between the first interface voltage VDD1 and the ground voltage GND, and outputs it. The level shifter 323 level-shifts a clock signal CLK from the controller 200 swung between the internal voltage VDD0 and the ground voltage GND to the pulse signal swung between the second interface voltage VDD2 and the ground voltage GND, and outputs it.

As described above, the bus interface circuit 300 includes: a signal distribution function portion (the transistors 301 and 302 and the level shifters 312 and 322) that distributes a single output data signal OUT output from the controller 200 and that transmits it to each of the data lines of the two-line serial buses I2C#1 and I2#2; and a signal distribution function portion (the level shifters 313 and 323) that likewise distributes a single clock signal CLK output from the controller 200 and that transmits it to each of the clock lines of the two-line serial buses I2C#1 and I2#2.

The bus interface circuit 300 also includes a signal combination function portion (the level shifters 311 and 321 and the logical OR computation unit 330) that combines a plurality of input signals input from the two-line serial buses I2C#1 and I2#2 to generate the input data signal IN for the controller 200.

The bus interface circuit 300 also includes a level shift function portion (the level shifters 311 to 313 and 321 to 323) that converts, when signals are exchanged between the controller 200 and the two-line serial buses I2C#1 and I2#2, the voltage levels of the signals between the internal voltage VDD0 given to the controller 200 and the interface voltages VDD1 and VDD2 given to the two-line serial buses I2C#1 and I2#2.

As described above, the present LSI 100 has the two system serial buses according to the power supply voltage of the external device connected thereto. However, within the present LSI 100, the two-line serial buses I2C#1 and I2C#2 are treated as one system. With this type of configuration, even when a plurality of external devices having different power supply voltages are connected, appropriate grouping is performed based on the power supply voltages, and the individual groups (in the above description, the 2.8 volt driven group and the 3.3 volt driven group) are connected to the serial buses of different systems, with the result that it is possible to prevent power consumption and noise resistance degradation resulting from a difference between high-level voltages. Hence, by employing the above configuration, for example, it is possible to connect the conventional module (3.3 volt system) and the latest module (2.8 volt system) to the same bus and use them. By employing the above configuration, it is also possible to reduce burdens on the design of the present LSI 100 (such as the selection of components and the stability of the power supply and the associated parts to use the external device by an interface voltage that falls within an operation guaranteed range), the design of a PCB and quality evaluation.

FIG. 295 is a diagram showing the setting range of the interface voltages VDD1 and VDD2. As shown in this figure, even when the camera 101, the RTC 102 and the EEPROM 103 differ in the recommended range (operation guaranteed range) of the interface voltage from each other, it is possible to significantly extend the possible setting range of the interface voltage VDD1 and the possible setting range of the interface voltage VDD2. Moreover, it is unnecessary to additionally provide a voltage conversion interface IC (level shifter IC), and this eliminates the possibility that the cost and the size of an appliance is increased.

The controller 200 performs address control and chip select control on the external devices (the camera 101, the RTC 102 and the EEPROM 103) connected to the two-line serial buses I2C#1 and I2C#2. As described above, in a plurality of external devices connected to the buses, their signal outputting operations are adjusted mainly by the controller 200, and this prevents a problem from occurring when the signals of the two systems are combined.

In addition to the above embodiment, many modifications on the configuration of the present invention are possible without departing from the spirit of the present invention.

For example, although the above embodiment deals with the case in which the present invention is applied to the semiconductor device to which a plurality of external devices are connected through the serial bus, the present invention is not limited to this case. The present invention can be widely applied to semiconductor devices to which a plurality of external devices are connected through a parallel bus.

FIG. 296 is a circuit diagram showing an example (four-bit parallel input) of the configuration of a bus interface circuit. A semiconductor device X1 of this configuration example includes a controller X2 and the bus interface circuit (unidirectional bus multiplexer) X3.

The bus interface circuit X3 includes level shifters X10 to X13, level shifters X20 to X23 and logical OR computation units X30 to X33. The input terminals of the level shifters X10 to X13 are connected to the bit line of a parallel bus BUS1. The output terminals of the level shifters X10 to X13 are connected to the first input terminals of the logical OR computation units X30 to X33, respectively. The input terminals of the level shifters X20 to X23 are connected to the bit line of a parallel bus BUS2. The output terminals of the level shifters X20 to X23 are connected to the second input terminals of the logical OR computation units X30 to X33, respectively. The output terminals of the logical OR computation units X30 to X33 are connected in parallel to the data signal input terminal (four-bit) of the controller X2.

The level shifters X10 to X13 level-shift a pulse signal swung between the first interface voltage VDD1 and the ground voltage GND to a pulse signal swung between the internal voltage VDD0 and the ground voltage GND, and output it. The level shifters X20 to X23 level-shift a pulse signal swung between the second interface voltage VDD2 and the ground voltage GND to the pulse signal swung between the internal voltage VDD0 and the ground voltage GND, and output it. The logical OR computation units X30 to X33 perform logical OR computations on the pulse signals input from the level shifters X10 to X13 and the level shifters X20 to X23, and thereby generate logical OR signals swung between the internal voltage VDD0 and the ground voltage GND, and feed out them as input data signal IN<0> to IN<3> to the controller 200.

FIG. 297 is a circuit diagram showing an example (four-bit parallel output) of the configuration of the bus interface circuit. A semiconductor device Y1 of this configuration example includes a controller Y2 and the bus interface circuit (unidirectional bus multiplexer) Y3.

The bus interface circuit Y3 includes level shifters Y10 to X13 and level shifters Y20 to X23. The input terminals of the level shifters Y10 to Y13 each are connected in parallel to the data signal output terminal (four-bit) of the controller 200. The output terminals of the level shifters Y10 to Y13 each are connected to the bit line of the parallel bus BUS1. The input terminals of the level shifters Y20 to Y23 each are connected in parallel to the data signal output terminal (four-bit) of the controller 200. The output terminals of the level shifters Y20 to Y23 each are connected to the bit line of the parallel bus BUS2.

The level shifters Y10 to Y13 level-shift output data signals OUT<0> to OUT<3> from the controller 200 swung between the internal voltage VDD0 and the ground voltage GND to the pulse signal swung between the first interface voltage VDD1 and the ground voltage GND, and output it. The level shifters Y20 to Y23 level-shift the output data signals OUT<0> to OUT<3> from the controller 200 swung between the internal voltage VDD0 and the ground voltage GND to the pulse signal swung between the second interface voltage VDD2 and the ground voltage GND, and output it.

FIG. 298 is a circuit diagram showing an example (four-bit parallel input and output) of the configuration of the bus interface circuit. A semiconductor device Z1 of this configuration example includes a controller Z2 and the bus interface circuit (bidirectional bus multiplexer) Z3.

The bus interface circuit Z3 includes level shifters Z10a to Z13a, level shifters Z10b to Z13b, level shifters Z10c to Z13c, level shifters Z20a to Z23a, level shifters Z20b to Z23a, level shifters Z20c to Z23c and logical OR computation units Z30 to Z33.

The input terminals of the level shifters Z10a to Z13a are connected to the bit line of the parallel bus BUS1. The output terminals of the level shifters Z10a to Z13a are connected to the first input terminals of the logical OR computation units Z30 to Z33, respectively. The input terminals of the level shifters Z20a to Z23a are connected to the bit line of the parallel bus BUS2. The output terminals of the level shifters Z20a to Z23a are connected to the second input terminals of the logical OR computation units Z30 to Z33, respectively. The output terminals of the logical OR computation units Z30 to Z33 are connected in parallel to the data signal input terminal (four-bit) of the controller Z2.

The input terminals of the level shifters Z10b to Z13b are connected in parallel to the data signal output terminal (four-bit) of the controller 200. The output terminals of the level shifters Z10b to Z13b are connected to the bit line of the parallel bus BUS1. The input terminals of the level shifters Z20b to Z23b are connected in parallel to the data signal output terminal (four-bit) of the controller 200. The output terminals of the level shifters Z20b to Z23b are connected to the bit line of the parallel bus BUS2.

The input terminals of the level shifters Z10c to Z13c are connected to the output enable signal output terminal of the controller 200. The output terminals of the level shifters Z10c to Z13c are connected to the enable control terminals of the level shifters Z10b to Z13b, respectively. The input terminals of the level shifters Z20c to Z23c are connected to the output enable signal output terminal of the controller 200. The output terminals of the level shifters Z20c to Z23c are connected to the enable control terminals of the level shifters Z20b to Z23b, respectively.

The level shifters Z10a to Z13a level-shift a pulse signal swung between the first interface voltage VDD1 and the ground voltage GND to a pulse signal swung between the internal voltage VDD0 and the ground voltage GND, and output it. The level shifters Z20a to Z23a level-shift a pulse signal swung between the second interface voltage VDD2 and the ground voltage GND to the pulse signal swung between the internal voltage VDD0 and the ground voltage GND, and output it. The logical OR computation units Z30 to Z33 perform logical OR computations on the pulse signals input from the level shifters Z10a to Z13a and the level shifters Z20a to Z23a, and thereby generate logical OR signals swung between the internal voltage VDD0 and the ground voltage GND, and feed out them as input data signal IN<0> to IN<3> to the controller 200.

The level shifters Z10b to Z13b level-shift output data signals OUT<0> to OUT<3> from the controller 200 swung between the internal voltage VDD0 and the ground voltage GND to the pulse signal swung between the first interface voltage VDD1 and the ground voltage GND, and output it. The level shifters Z20b to Z23b level-shift the output data signals OUT<0> to OUT<3> from the controller 200 swung between the internal voltage VDD0 and the ground voltage GND to the pulse signal swung between the second interface voltage VDD2 and the ground voltage GND, and output it.

The level shifters Z10c to Z13c level-shift an output enable signal OEN from the controller 200 swung between the internal voltage VDD0 and the ground voltage GND to the pulse signal swung between the first interface voltage VDD1 and the ground voltage GND, and output it. The level shifters Z20c to Z23c level-shift the output enable signal OEN from the controller 200 swung between the internal voltage VDD0 and the ground voltage GND to the pulse signal swung between the second interface voltage VDD2 and the ground voltage GND, and output it.

The present invention is a technology that can be applied to a semiconductor device to which a plurality of external devices are connected through a bus.

Although the preferred embodiment of the present invention is described above, it is known by those skilled in the art that many variations on the disclosed invention are possible and that various embodiments different from the configuration specifically described above are possible. Therefore, the following claims are intended to cover various variations of the present invention within the technical scope thereof without departing from the sprit and technical view point of the invention.

LIST OF REFERENCE NUMERALS

| | |
|---|---|
| 1 | Central processing unit (CPU) |
| 2 | Instruction cache |
| 3 | Data cache |
| 4 | Instruction TCM |
| 5 | Data TCM |
| 6 | Auto read SPI controller |
| 7 | External memory controller |
| 8 | Advanced high performance bus (AHB) |
| 9 | Timer |
| 10 | Watch dog timer |
| 11 | AHB/APB bridge |
| 12 | Interrupt controller |
| 13 | Medium-low speed system bus (APB) |
| 14 | Timer counter |
| 15 | UART |
| 16 | GPIO |
| 17 | A/D converter |
| 18 | Clock controller |
| 19 | PLL |
| 20 | Image processing portion |
| 21 | Host interface |
| 22 | Camera interface |
| 22a | Image processing portion |
| 22b | Multi-step zoom portion |
| 22c | Cropping portion |
| 23 | JPEG codec |
| 23a | JPEG codec engine |
| 23b | Work memory |
| 24 | ADPCM audio interface |
| 25 | Code memory |
| 26 | Audio buffer |
| 27 | Memory interface |
| 28 | I2C controller |
| 29 | SD/MMC interface |
| 29a | SDC/MMC controller |
| 29b | SD data buffer |
| 30 | First frame memory |
| 31 | Memory controller |
| 32 | Second frame memory |
| 33 | TV encoder |
| 33a | TV signal encoder |
| 33b | 10-bit video DAC |
| 100 | Present LSI |
| 101 | Camera (CAM) |
| 102 | Real time clock (RTC) |
| 103 | EEPROM (E2P) |
| 104 | Acceleration sensor (G sensor) |
| 105 | GPS module |
| 106 | Speaker |
| 107 | Microphone |
| 108 | Audio codec |
| 109 | Basic program storage memory |
| 110 | Television monitor |
| 111 | SD card |
| 112 | Expanded program storage memory |
| 113 | Optional camera |
| 114 | Image processing IC |
| 115 | IrDA controller IC |
| 116 | IrDA module |
| 120 | Step-up regulator (power supply IC) |
| 121 to 123 | Diodes |
| 124 | Resistor |
| 125 | Secondary battery |
| 130 to 132 | Step-down regulators (LDO) |
| 200 | Control portion (CTRL) |
| 300 | Bus interface circuit (bidirectional bus multiplexer) |
| 301 and 302 | N-channel MOS field effect transistors |
| 311 to 313 | Level shifters (VDD0/VDD1) |
| 321 to 323 | Level shifters (VDD0/VDD2) |
| 330 | Logical OR computation unit |
| I2C#1 and I2C#2 | Two-line serial buses |
| R1 and R2 | Resistors |
| BUS1 and BUS2 | Parallel buses (four-bit) |
| V1 | Input voltage |
| V2 | Output voltage |
| V3 | Battery voltage |
| VDD0 | Internal voltage |
| VDD1 | First interface voltage |
| VDD2 | Second interface voltage |
| X1 | Semiconductor device |
| X2 | Control portion (CTRL) |
| X3 | Bus interface circuit (unidirectional bus multiplexer) |
| X10 to X13 | Level shifters (VDD0/VDD1) |
| X20 to X23 | Level shifters (VDD0/VDD2) |
| X30 to X33 | Logical OR computation units |
| Y1 | Semiconductor device |
| Y2 | Control portion (CTRL) |
| Y3 | Bus interface circuit (unidirectional bus multiplexer) |
| Y10 to Y13 | Level shifters (VDD0/VDD1) |
| Y20 to Y23 | Level shifters (VDD0/VDD2) |
| Z1 | Semiconductor device |
| Z2 | Control portion (CTRL) |
| Z3 | Bus interface circuit (bidirectional bus multiplexer) |
| Z10a to Z13a | Level shifters (VDD0/VDD1) |
| Z10b to Z13b | Level shifters (VDD0/VDD1) |
| Z10c to Z13c | Level shifters (VDD0/VDD1) |
| Z20a to Z23a | Level shifters (VDD0/VDD2) |
| Z20b to Z23b | Level shifters (VDD0/VDD2) |
| Z20c to Z23c | Level shifters (VDD0/VDD2) |
| Z30 to Z33 | Logical OR computation units |

What is claimed is:

1. A semiconductor device comprising:
a first input terminal to which a first device driven by a first power supply voltage is connected;
a second input terminal to which a second device driven by a second power supply voltage is connected;
a first level shifter which is connected to the first input terminal and which performs conversion into a third power supply voltage;
a second level shifter which is connected to the second input terminal and which performs conversion into the third power supply voltage;
a third level shifter that converts the third power supply voltage into the first power supply voltage;
a fourth level shifter that converts the third power supply voltage into the second power supply voltage;
a first output terminal that outputs to the first device a signal based on a signal from the third level shifter, wherein the first output terminal is a same terminal as the first input terminal;
a second output terminal that outputs to the second device a signal based on a signal from the fourth level shifter;
a transistor which is connected between a connection point between the first level shifter and the first input terminal and a reference voltage, and in which a signal of the third level shifter is input to a control terminal;
a resistor connected between the first input terminal and the first power supply voltage; and
a control portion which is driven by the third power supply voltage and to which an output of the first level shifter and an output of the second level shifter are connected.

2. A semiconductor device comprising:
a first input terminal to which a first device driven by a first power supply voltage is connected;
a second input terminal to which a second device driven by a second power supply voltage is connected;
a first level shifter which is connected to the first input terminal and which performs conversion into a third power supply voltage;
a second level shifter which is connected to the second input terminal and which performs conversion into the third power supply voltage;
a third level shifter that converts the third power supply voltage into the first power supply voltage;
a fourth level shifter that converts the third power supply voltage into the second power supply voltage;
a first output terminal that outputs to the first device a signal based on a signal from the third level shifter;
a second output terminal that outputs to the second device a signal based on a signal from the fourth level shifter, wherein the second output terminal is a same terminal as the second input terminal;
a transistor which is connected between a connection point between the second level shifter and the second input terminal and a reference voltage, and in which a signal of the forth level shifter is input to a control terminal;
a resistor connected between the second input terminal and the second power supply voltage; and
a control portion which is driven by the third power supply voltage and to which an output of the first level shifter and an output of the second level shifter are connected.

3. A drive recorder comprising:
a semiconductor device comprising:
a first input terminal to which a first device driven by a first power supply voltage is connected;
a second input terminal to which a second device driven by a second power supply voltage is connected;
a first level shifter which is connected to the first input terminal and which performs conversion into a third power supply voltage;
a second level shifter which is connected to the second input terminal and which performs conversion into the third power supply voltage; and
a control portion which is driven by the third power supply voltage and to which an output of the first level shifter and an output of the second level shifter are connected;
the drive recorder further comprising:
a camera module connected to the first input terminal; and
a memory connected to the second input terminal.

4. The drive recorder of claim 3, wherein the memory is an EEPROM.

5. The drive recorder of claim 3, further comprising:
a real time clock that is connected to the second input terminal, and that generates a date and time and outputs the date and time to the semiconductor device.

6. The drive recorder of claim 3, further comprising:
a first resistor inserted between the first input terminal and the first power supply voltage.

7. The drive recorder of claim 6, further comprising:
a second resistor inserted between the second input terminal and the second power supply voltage.

8. The drive recorder of claim 6, wherein the first power supply voltage is 2.85 volts.

9. The drive recorder of claim 8, wherein the second power supply voltage is 3.3 volts.

* * * * *